United States Patent
Kim et al.

(10) Patent No.: US 10,114,342 B2
(45) Date of Patent: Oct. 30, 2018

(54) WEARABLE DEVICE

(71) Applicant: Samsung Electronics Co., Ltd., Suwon-si (KR)

(72) Inventors: Myung-Sik Kim, Suwon-si (KR); Jong-Hoon Lim, Suwon-si (KR); Chang-Yeong Kim, Seoul (KR); June-Hee Lee, Seongnam-si (KR); Dong-Churl Kim, Ansan-si (KR); Ho-Seong Seo, Suwon-si (KR); Yang-Wook Kim, Hwaseong-si (KR); Jae-Hyun Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/852,367

(22) Filed: Sep. 11, 2015

(65) Prior Publication Data

US 2016/0109861 A1 Apr. 21, 2016

Related U.S. Application Data

(60) Provisional application No. 62/102,701, filed on Jan. 13, 2015.

(30) Foreign Application Priority Data

| Sep. 11, 2014 | (KR) | 10-2014-0210502 |
| Jan. 9, 2015 | (KR) | 10-2015-0003606 |
| May 15, 2015 | (KR) | 10-2015-0068284 |

(51) Int. Cl.
*G04G 9/00* (2006.01)
*G04G 9/02* (2006.01)
(Continued)

(52) U.S. Cl.
CPC ......... *G04G 21/08* (2013.01); *G04C 17/0091* (2013.01); *G04G 5/00* (2013.01);
(Continued)

(58) Field of Classification Search
CPC .......... G04G 5/04; G04G 9/00; G04G 9/0064; G04G 9/0082; G04G 21/08; G04G 5/00;
(Continued)

(56) References Cited

U.S. PATENT DOCUMENTS

| 4,247,930 A | * | 1/1981 | Martin | G04G 9/0082 349/58 |
| 4,420,263 A | * | 12/1983 | Besson | G04G 7/00 368/157 |

(Continued)

FOREIGN PATENT DOCUMENTS

| CN | 2857060 Y | 1/2007 |
| CN | 202502358 U | 10/2012 |

(Continued)

OTHER PUBLICATIONS

International Search Report, dated Dec. 23, 5 corresponding to International Application No. PCT/KR2015/009588.

(Continued)

*Primary Examiner* — Vit W Miska
(74) *Attorney, Agent, or Firm* — McAndrews, Held & Malloy, Ltd.

(57) ABSTRACT

A wearable device may include: an analog watch unit that includes a time indicating unit that indicates time, and a drive unit that drives the time indicating unit; a touch screen that senses an input for adjusting the drive unit; and a control unit that controls the drive unit in response to the sensed input.

19 Claims, 99 Drawing Sheets

(51) Int. Cl.
*G04G 21/02* (2010.01)
*G04G 21/08* (2010.01)
*G04C 17/00* (2006.01)
*G04G 17/04* (2006.01)
*G04G 21/04* (2013.01)
*G06F 1/16* (2006.01)
*G04G 5/00* (2013.01)

(52) U.S. Cl.
CPC ............... *G04G 9/00* (2013.01); *G04G 9/02* (2013.01); *G04G 17/04* (2013.01); *G04G 21/025* (2013.01); *G04G 21/04* (2013.01); *G06F 1/163* (2013.01)

(58) Field of Classification Search
CPC ........ G04G 9/02; G04G 17/04; G04G 21/025; G04G 21/04; G04C 3/001; G04C 3/002; G04C 3/005; G04C 17/0091; G04F 1/163
See application file for complete search history.

(56) References Cited

U.S. PATENT DOCUMENTS

| | | | |
|---|---|---|---|
| 5,095,469 A | | 3/1992 | Leuenberger et al. |
| 5,270,993 A | * | 12/1993 | Besson .................... G04C 3/14 368/184 |
| 5,892,455 A | * | 4/1999 | Matsumoto ............ G08B 5/228 340/7.55 |
| 6,052,339 A | | 4/2000 | Frenkel et al. |
| 6,515,942 B2 | * | 2/2003 | Basturk ................ G02F 1/1334 349/56 |
| 6,587,083 B1 | * | 7/2003 | Basturk ............ G02F 1/133536 345/4 |
| 6,600,527 B1 | * | 7/2003 | Basturk ............ G02F 1/133536 349/115 |
| 6,678,217 B2 | * | 1/2004 | Bastruk ............ G02F 1/133533 349/97 |
| 7,420,881 B2 | * | 9/2008 | Frenkel ................. G06F 1/3228 345/169 |
| 7,542,379 B2 | | 6/2009 | Kimel et al. |
| 7,907,476 B2 | * | 3/2011 | Lee .......................... G04G 5/04 345/173 |
| 8,279,716 B1 | | 10/2012 | Gossweiler, III et al. |
| 8,301,211 B2 | | 10/2012 | Lee et al. |
| 8,702,301 B2 | * | 4/2014 | Hiraoka ................. G04B 17/06 368/324 |
| 9,348,320 B1 | * | 5/2016 | Defazio ................. G04G 11/00 |
| 2003/0123328 A1 | * | 7/2003 | Guanter ................. G04G 11/00 368/82 |
| 2006/0073851 A1 | | 4/2006 | Colando et al. |
| 2008/0151700 A1 | * | 6/2008 | Inoue ...................... B60K 37/02 368/80 |
| 2013/0051189 A1 | * | 2/2013 | Springer ............ G04C 17/0091 368/69 |
| 2014/0171156 A1 | * | 6/2014 | Pattikonda .......... H04M 1/6041 455/569.1 |
| 2015/0078144 A1 | * | 3/2015 | Gong ................. G04C 17/0041 368/228 |
| 2015/0098309 A1 | * | 4/2015 | Adams ................. G04G 9/0064 368/10 |
| 2015/0241852 A1 | * | 8/2015 | Yang ....................... G04G 17/08 368/223 |
| 2015/0301506 A1 | * | 10/2015 | Koumaiha ............. G04G 21/08 368/10 |
| 2015/0346694 A1 | * | 12/2015 | Hoobler ................... G04G 9/00 368/223 |
| 2016/0091867 A1 | * | 3/2016 | Mansour ................ G04G 21/08 368/294 |

FOREIGN PATENT DOCUMENTS

| | | |
|---|---|---|
| CN | 102955422 A | 3/2013 |
| CN | 202956595 U | 5/2013 |
| CN | 103676604 A | 3/2014 |
| DE | 3317463 | 11/1984 |
| EP | 3091421 | 11/2016 |
| FR | 2759792 | 8/1998 |
| JP | 61111485 | 5/1986 |
| JP | 2009-192860 | 8/2009 |

OTHER PUBLICATIONS

Written Opinion of the International Searching Authority, dated Dec. 23, 2015, corresponding to International Application No. PCT/KR2015/009588.
European Search Report Appln 15840607.4 dated Mar. 14, 2018 (15 pgs.).
Examination Report for Application No. 201580048463.8 dated Aug. 2, 2018 (16 pgs.).

\* cited by examiner (a)

(b)

(c)

(a)

(b)

(a)

(b)

(a)

(b)

WEARABLE DEVICE

CROSS-REFERENCE TO RELATED APPLICATION(S)

This application claims priority from and the benefit under 35 U.S.C. § 119(a) to a U.S. Provisional Patent Application Ser. No. 62/102,701, filed on Jan. 13, 2015, and Korean Patent Application Nos. 10-2014-0120502, 10-2015-0003606 and 10-2015-0068284, filed on Sep. 11, 2014, Jan. 9, 2015 and May 15, 2015, respectively, which are hereby incorporated by reference for all purposes as if fully set forth herein.

BACKGROUND

The present disclosure relates to an electronic device, a control method thereof, and a storage medium.

As the distribution and use of portable devices, such as smart phones, become more common, the distribution and use of wearable devices (e.g., a smart watch), which are being used more to connect with the smart phone, also rapidly increases. The wearable devices may offer various functions or operations provided by the smart phone to a user by being connected with the smart phone through a wired or wireless communication. Recently, due to such convenience, the distribution speed of the wearable devices has been gradually increasing.

However, users, who wish to use a wearable device (for example, a smart watch (e.g., Samsung Galaxy Gear™)), tend to hesitate to use the smart watch, despite the convenience offered to the users by the smart watch due to various reasons, such as the "familiarity" offered by an existing analog wrist watch (the term, "analog wrist watch" or "analog watch" used herein may refer to any device that offers time information to a user through, for example, an hour hand and a minute hand, or an hour hand, a minute hand, and a second hand) or the users' "preference" in terms of, for example, a maker of an analog watch.

Prior to the present disclosure, an electronic device capable of providing the "familiarity" that is provided by an analog wrist watch, satisfying a user "preference" for the appearance provided by analog watch makers, and, at the same time, providing "convenience" that is provided by a smart watch to a user was unknown.

Similarly, prior to the present disclosure, it was unknown to provide a control method of an electronic device that is capable of providing the "familiarity" that is provided by an analog wrist watch, satisfies a user "preference" for the appearance provided by analog watch makers, and, at the same time, providing the "convenience" that is provided by a smart watch to a user.

SUMMARY

According to various embodiments, a wearable device may include: an analog watch unit including a time indicating unit that indicates the time, and a drive unit that drives the time indicating unit; a touch screen that senses an input for adjusting the drive unit; and a control unit that controls the drive unit in response to the sensed input.

According to various embodiments, a wearable device may include: a touch screen; a watch unit including a time indicating unit; and a control unit that acquires information associated with the time indicating unit, and controls the touch screen to display a graphic element based on the acquired information.

According to an electronic device and a control method thereof of various embodiments of the present disclosure, it is possible to provide the "familiarity" that is provided by an analog wrist watch, satisfy the "preference" for the appearance provided by particular analog watch makers, and at the same time, provide the "convenience" that is provided by a smart watch to a user.

It will be apparent to those skilled in the art that the advantages of the present disclosure are not limited to those mentioned above, and the present disclosure includes various implicit advantages.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
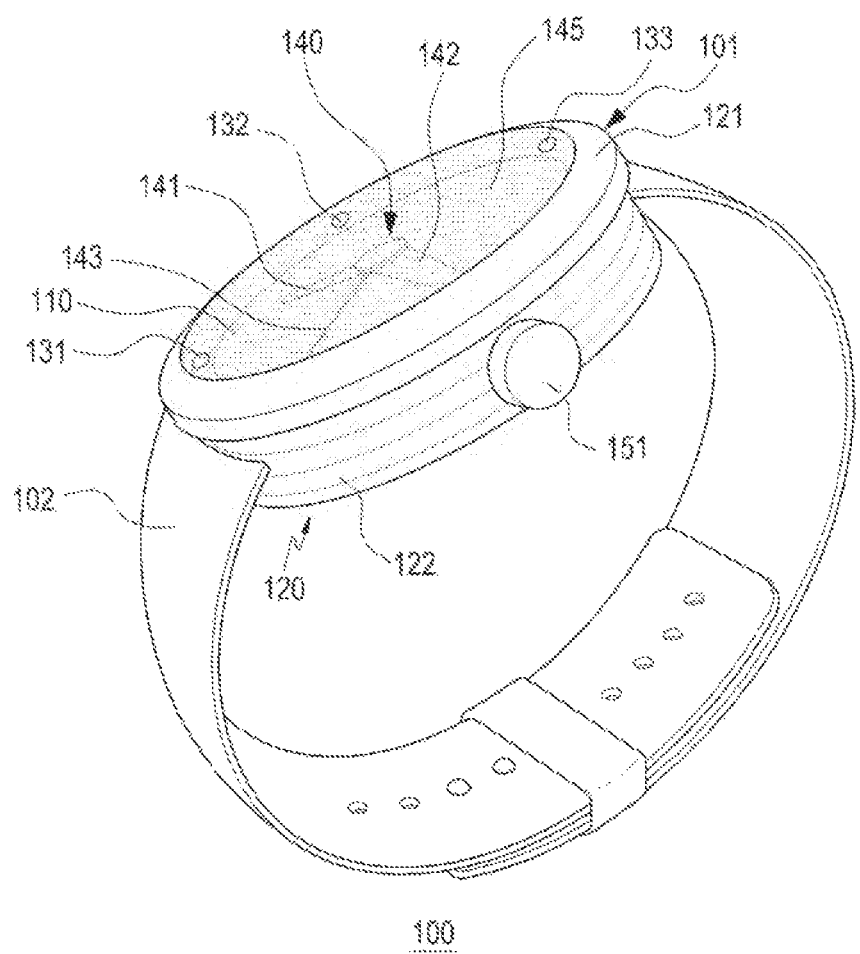
FIGS. 1 and 2 are views illustrating an assembled state, and a disassembled state of a wearable device according to a first embodiment, respectively.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

As used herein, the expression "A or B," "at least one of A and/or B," or "one or more of A and/or B," may include any or all possible combinations of items enumerated together. For example, the expression "A or B," "at least one of A and B," or "at least one of A or B" refers to all of (1)

including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there is no element (e.g., third element) interposed between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

The terms used herein are merely for the purpose of describing particular embodiments and are not intended to limit the scope of other embodiments used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

Figure 2:
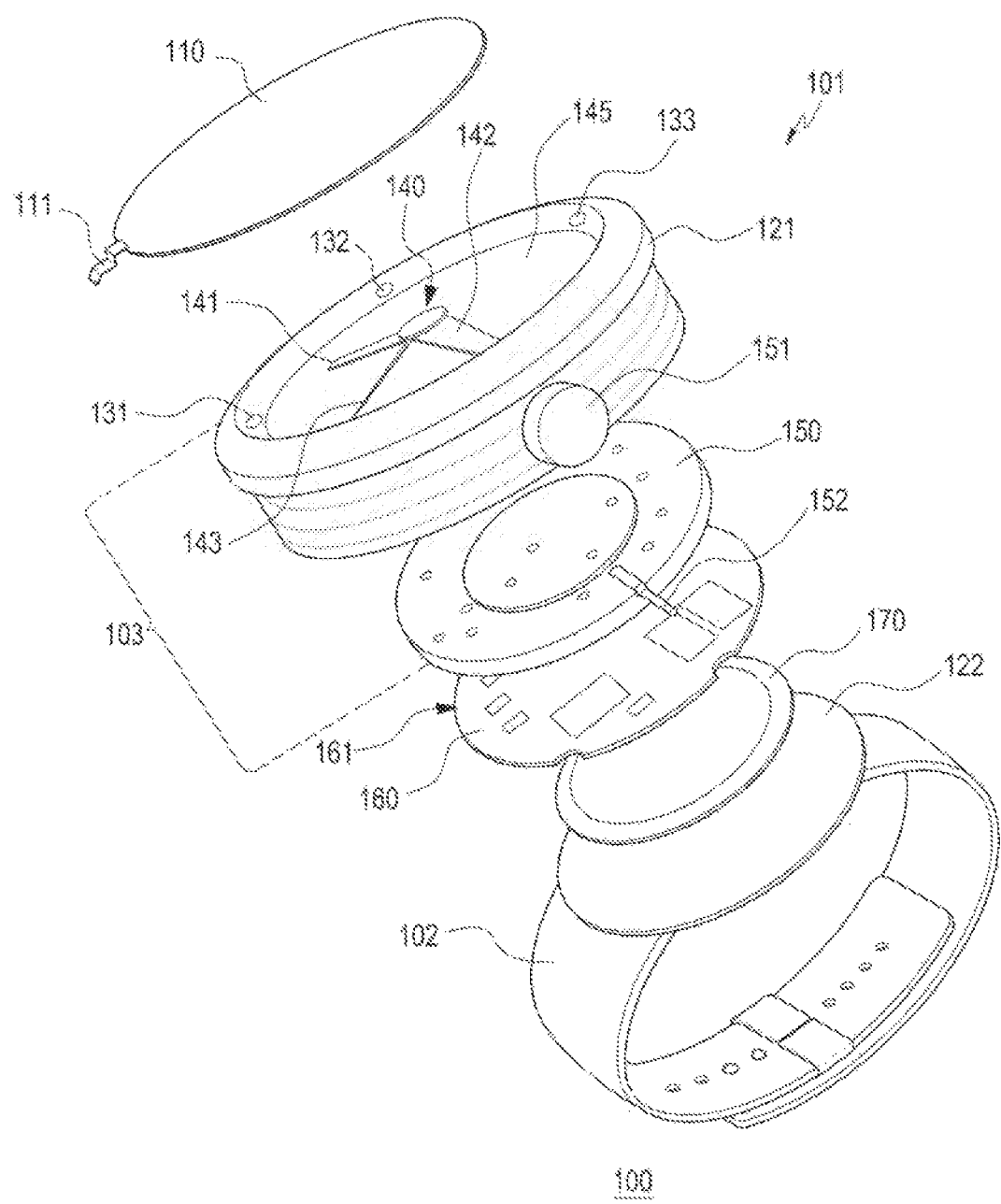

FIG. 1 illustrates a wearable device according to a first embodiment in an assembled state, and FIG. 2 illustrates the wearable device in a disassembled state.

The wearable device 100 may include a main body 101 and a band 102 (or a strap) that fixes the main body 101 to a user's wrist.

The main body 101 may include an analog watch unit 103 that includes a case 120, a time indicating unit 140, a watch plate 145, and a drive unit 150, at least one first sensor 131, 132, or 133, a circuit board 160, a first battery 170, and a touch screen 110. In a case where the touch screen 110 is positioned over the time indicating unit 140, the touch screen 110 may preferably be a transparent touch screen or a translucent touch screen that is made of a transparent material, and in a case where the touch screen 110 is positioned under the time indicating unit 140, the touch screen 110 may preferably be an ordinary opaque touch screen. In addition, the touch screen 110 may also sense an indirect touch, such as hovering, other than a direct touch.

The case 120 may include an upper case 121 and a lower case 122 that are coupled to each other, and may accommodate corresponding constituent elements of the wearable device 100 therein.

The time indicating unit 140 may include one or more mechanically driven watch hands (or indicators or hands). For example, the time indicating unit 140 may include at least one of, for example: an hour hand 141 that indicates an hour, a minute hand 142 that indicates a minute, and a second hand 143 that indicates a second, and the time indicating unit 140 is capable of indicating the present time through the hour hand 141 and the minute hand 142 (and the second hand 143).

The watch plate 145 may include a plate and at least one of, for example: a character, a number, a symbol, and an image, which are formed on the plate.

The drive unit 150 is capable of mechanically driving the time indicating unit 140. The drive unit 150 may include at least one of constituent elements provided in a conventional analog watch, for example, a barrel (or a spring barrel) that supplies a rotational force using a spring, a gear system (or a wheel train) that transmits the rotational force to the time indicating unit 140 through the interlocking of a plurality of gears (or wheels), an escapement wheel and an anchor (or a pallet) that prevent the rotational force from being lost at once, and an escapement that enables a regular time flow. In the present specification, detailed descriptions for the constituent elements provided in the conventional analog watch will be omitted.

In addition, the drive unit 150 may be configured to drive a watch stem 151, a watch stem rotating shaft 152, and/or the gear system individually or in an interlocking manner.

At least one of the first sensors 131, 132, and 133 may be disposed on an inner wall of the upper case 121, and at least one of the first sensors 131, 132, and 133 may be electrically connected to the circuit board 160. At least one of the first sensors 131, 132, and 133 may sense a position of at least a part of the time indicating unit 140, and may output the sensed information to the circuit board 160 (or a first control unit 107 of the circuit board 160).

The circuit board 160 may include a plurality of circuit elements 161. For example, the plurality of circuit elements 161 may include at least one of, for example: the first control unit, a first memory, and a first communication unit.

The first battery 170 may be electrically connected to the circuit board 160 (and the drive unit 150 and/or at least one of the first sensors 131, 132, and 133) so as to supply power to the circuit board 160 (and the drive unit 150 and/or at least one of the first sensors 131, 132, and 133). The first battery 170 may be disposed in/on the band 102.

The touch screen 110 may be electrically connected to the circuit board 160 via, for example, a flexible printed circuit board 111, and the touch screen 110 may sense a user's input (e.g., a touch or hovering). The touch screen 110 may use, for example, a resistive system, a capacitive system, a pressure-sensitive system, an infrared system, an ultrasonic system, an Electro-Magnetic (EM) system, an Electro-Magnetic Resonance (EMR) system, or a combination of two or more of the systems. The touch screen 110 may sense the user's input made through the user's finger or a pen, and may output the sensed information to the circuit board 160 (or the first control unit 107 of the circuit board 160). For example, the first control unit 107 may display a screen that is changed according to the sensed information through the touch screen 110.

Alternatively, the touch screen 110 may replace the watch plate 145, and a conventional glass or window may be disposed on the illustrated position of the touch screen 110.

Figure 3:
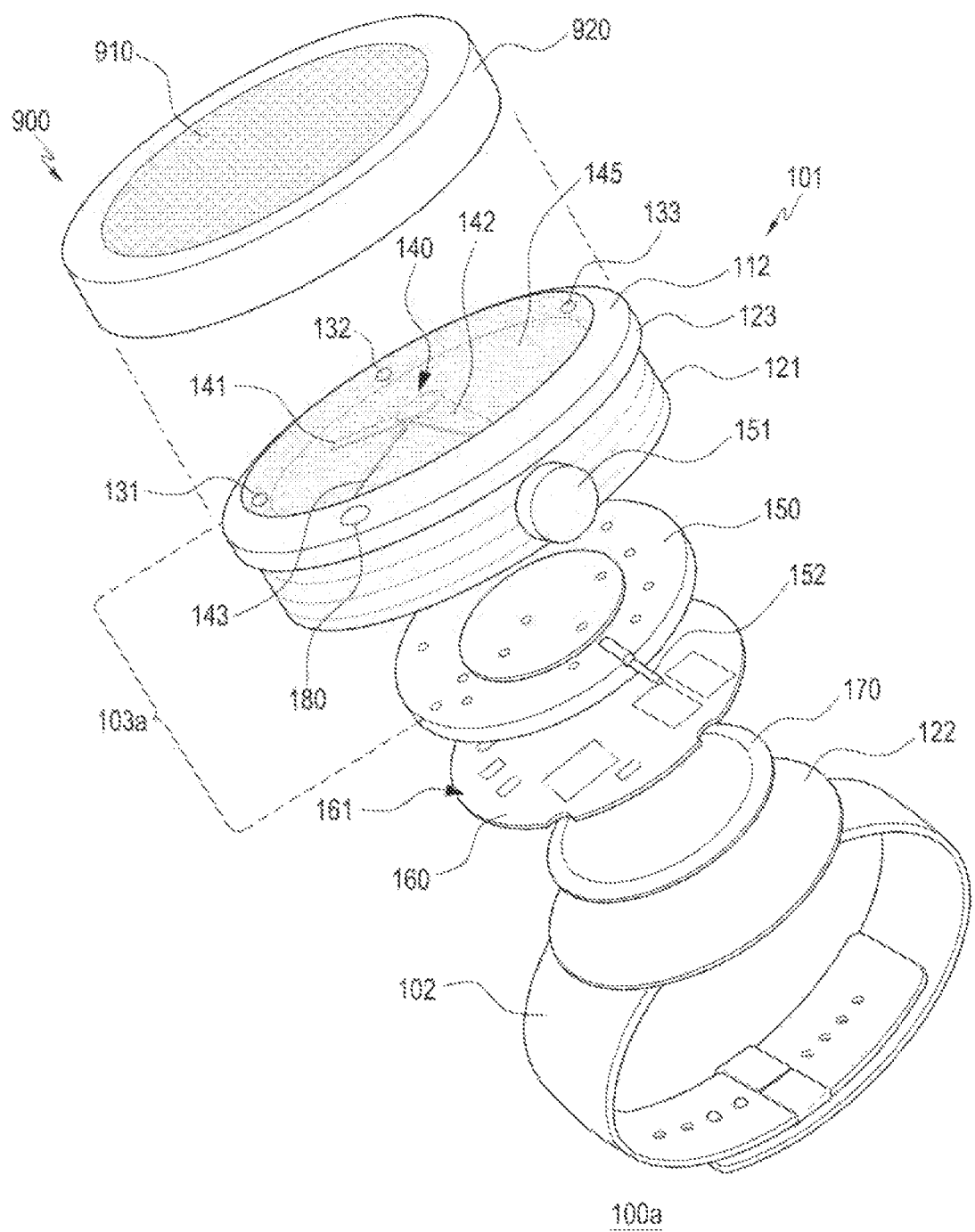
FIGS. 3 and 4 are views illustrating a disassembled state and an disassembled state of a wearable device according to a second embodiment, respectively.
Figure 4:
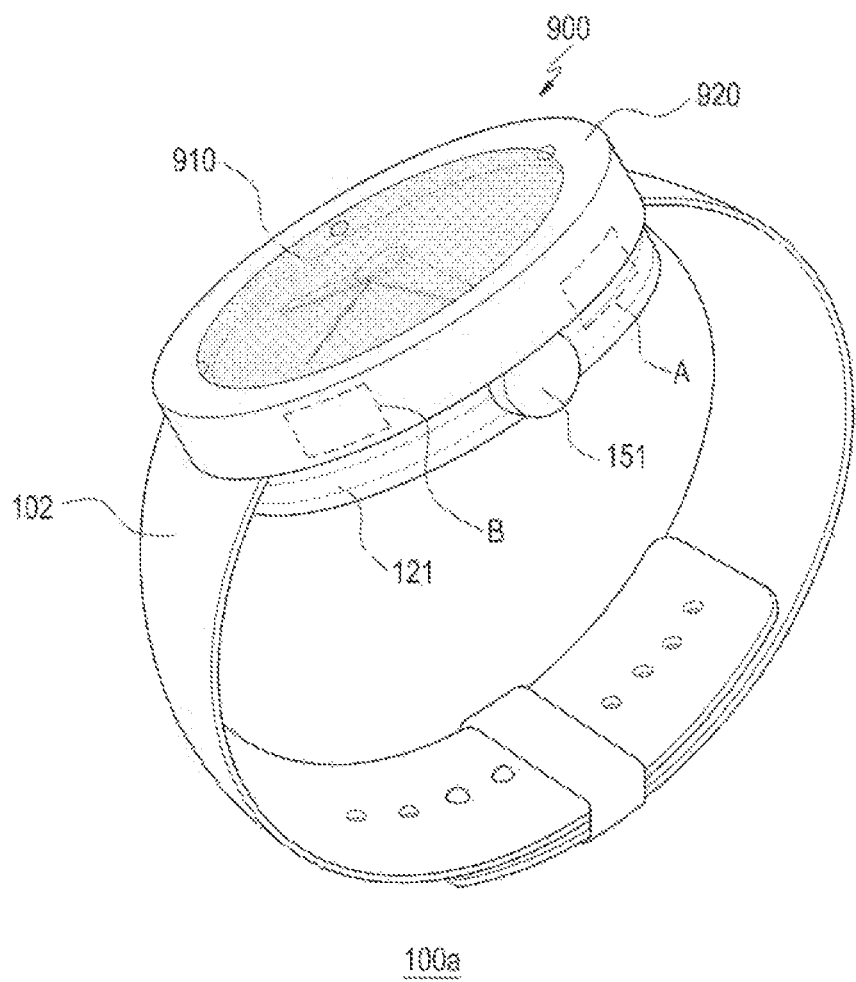

FIG. 3 is illustrates a wearable device according to a second embodiment in a disassembled state, and FIG. 4 illustrates the wearable device in the assembled state.

The wearable device 100a may include a main body 101, a band 102 that fixes the main body 101 to the user's wrist, and a mounting unit 900 (or a mounting device). The main body 101 may be referred to as an analog watch, and the wearable device 100a may include only the mounting unit 900 (and the band 102).

The main body 101 may include an analog watch unit 103a that includes a case 120, a time indicating unit 140, a watch plate 145 (or a dial), a drive unit 150, and a glass 112, at least one of first sensors 131, 132, and 133, a circuit board 160, a first battery 170, and a first connector 180. The wearable device 100a may have the same configuration as the wearable device 100 illustrated in FIG. 1, except that the wearable device 100a further includes the mounting unit 900 that includes the touch screen 910, and the first connector 180.

Figure 5:
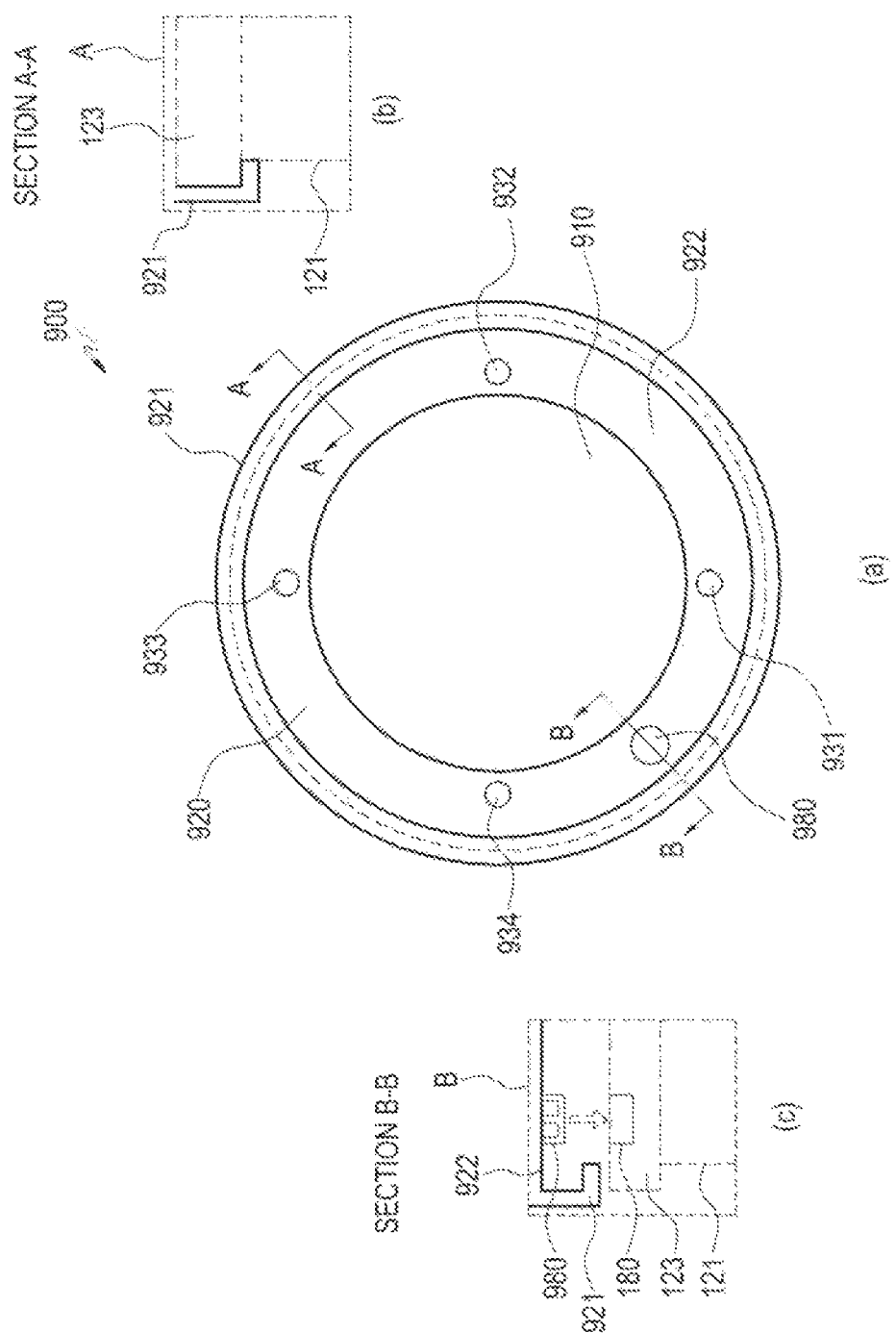
FIGS. 5 and 6 are views for describing mechanical or electric coupling/connection of a main body and a mounting unit.
Figure 6:
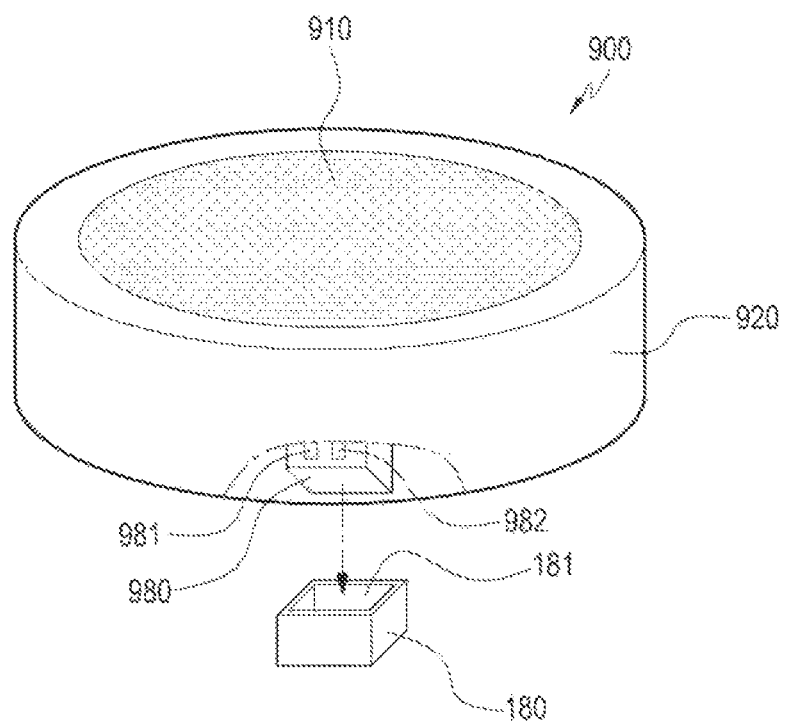

FIGS. 5 and 6 are views for describing the mechanical/electrical coupling/connection of the main body and the mounting unit.

The mounting unit 900 may include a ring-shaped housing 920 that accommodates corresponding constituent elements of the mounting unit 900 therein, a touch screen 910 inserted into an opening of the housing 920, at least one of sixth sensors 931, 932, 933, and 934 that senses at least a part of the time indicating unit 140, and a second connector 980. The second battery 970 of the mounting unit 900 may be disposed within the housing 920 or in/on the band 102. Alternatively, the second battery 970 of the mounting unit 900 may be a transparent battery, which may be disposed within the touch screen 910.

Referring to FIG. 5(a) that illustrates a bottom view of the mounting unit 900, at least one of the sixth sensors 931 to 934, and the second connector 980 may be disposed on the inner lower surface 922 (or the bottom surface or the rear surface) of the housing 920.

For example, at least one of the sixth sensors 931 to 934 may be operated in the same principle as at least one of the first sensors 131, 132, and 133. Each of the sixth sensors 931 to 934 may sense a time indicator that has come closer thereto, and may output the sensed information to the second control unit 907 that is accommodated in the housing 920 or the first control unit 107. Alternatively, each sixth sensor 931 to 934 may be an infrared camera, and may output the sensed information (or a sensed image) to the second control unit 907 or the first control unit 107.

Referring to FIG. 5(b) that illustrates a portion A in FIG. 4 in detail, the outer lower end of the housing 920 corresponds to a second coupling portion 921. For example, the second coupling portion 921 may have the shape of an engagement step. The upper end of the upper case 121 corresponds to the first coupling portion 123. For example, the first coupling portion 123 may have the shape of an engagement step. The first and second coupling portions 123 and 921 may be mechanically coupled to each other. In addition, the first and second coupling portions 123 and 921 may be separated from each other.

Referring to FIG. 5(c) that illustrates a portion B in FIG. 4, the first connector 180 may be disposed on the top surface of the upper case 121, and the second connector 980 may be disposed on the bottom surface 922 of the housing 920. When the second connector 980 is inserted into a recess 181 of the first connector 180, the main body 101 and the mounting unit 900 may be electrically connected to each other.

FIG. 6 is a view for describing the electrical connection between the main body and the mounting unit in detail.

The first connector 180, which includes the recess 181, may be disposed on the top surface of the upper case 121, and the second connector 980, which includes at least one data terminal 981 and at least one power terminal 982, may be disposed on the bottom surface of the housing 920. When the second connector 980 is inserted into the recess 181 of the first connector 180, the main body 101 and the mounting unit 900 may be connected to each other in a wired manner, and through the wired connection, each of the main body 101 (or the first control unit 107) and the mounting unit 900 (or the second control unit 907) may perform data communication and/or power reception/supply.

FIGS. 7A to 7L are views for describing mechanical coupling of the main body and the mounting unit.

Figure 7A:
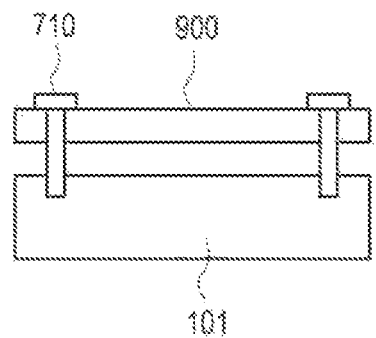
FIGS. 7A to 7L are views for mechanical coupling of the main body and the mounting unit.

Referring to FIG. 7A, the main body 101 may include a plurality of screw recesses, and the mounting unit 900 may include a plurality of screw holes that correspond to the screw recesses. The main body 101 and the mounting unit 900 may be coupled to each other by screws 710 that pass through the screw holes and are inserted into the screw recesses, respectively.

Figure 7B:
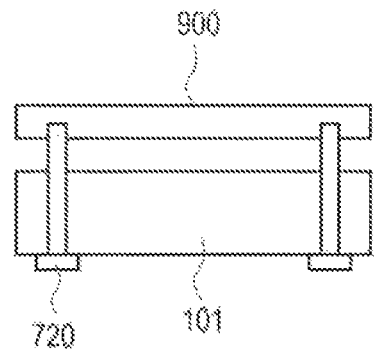

Referring to FIG. 7B, the main body 101 may include a plurality of screw holes, and the mounting unit 900 may include a plurality of screw recesses that correspond to the screw holes. The main body 101 and the mounting unit 900 may be coupled to each other by screws 720 that pass through the screw holes and inserted into the screw recesses, respectively.

Figure 7C:
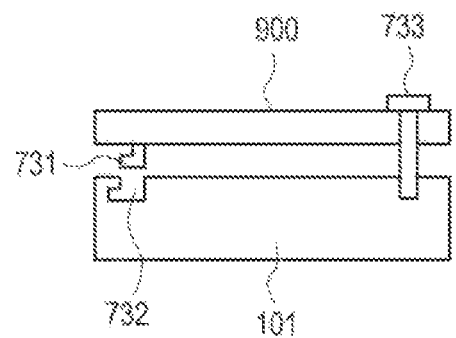

Referring to FIG. 7C, the mounting unit 900 may include at least one engagement step 731 and at least one screw hole, and the main body 101 may include at least one engagement recess 732 (or an engagement step) that corresponds to the engagement step 731 and at least one screw recess that corresponds to the at least one screw hole. The main body 101 and the mounting unit 900 may be coupled to each other through the engagement between the engagement step 731 and the engagement recess 732, and a screw 733 that passes through the screw hole and is inserted into the screw recess.

Figure 7D:
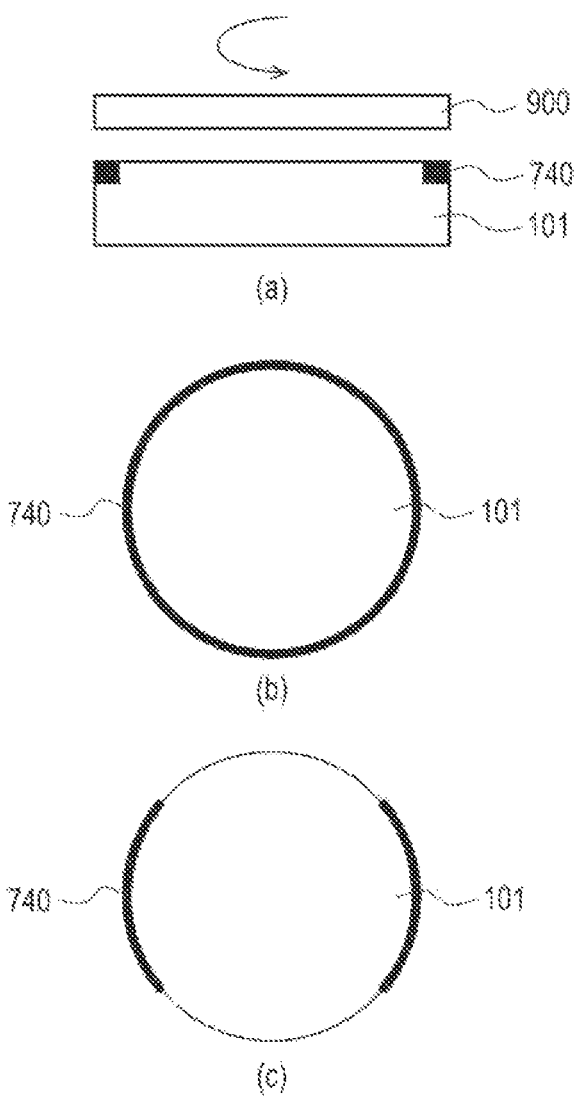

Referring to FIG. 7D(a), the mounting unit 900 may include a female screw (not illustrated), and the main body 101 may include a male screw 740 that corresponds to the female screw. The main body 101 and the mounting unit 900 may be coupled to each other by rotating the mounting unit 900 so as to cause the female screw and the male screw 740 to be coupled to each other.

Referring to FIG. 7D(b), the male screw 740 may be formed around the entire side surface of the main body 101.

Referring to FIG. 7D(c), the male screw 740 may be partially formed (e.g., in the form of a plurality of circular arcs) on the side surface of the main body 101.

Figure 7E:
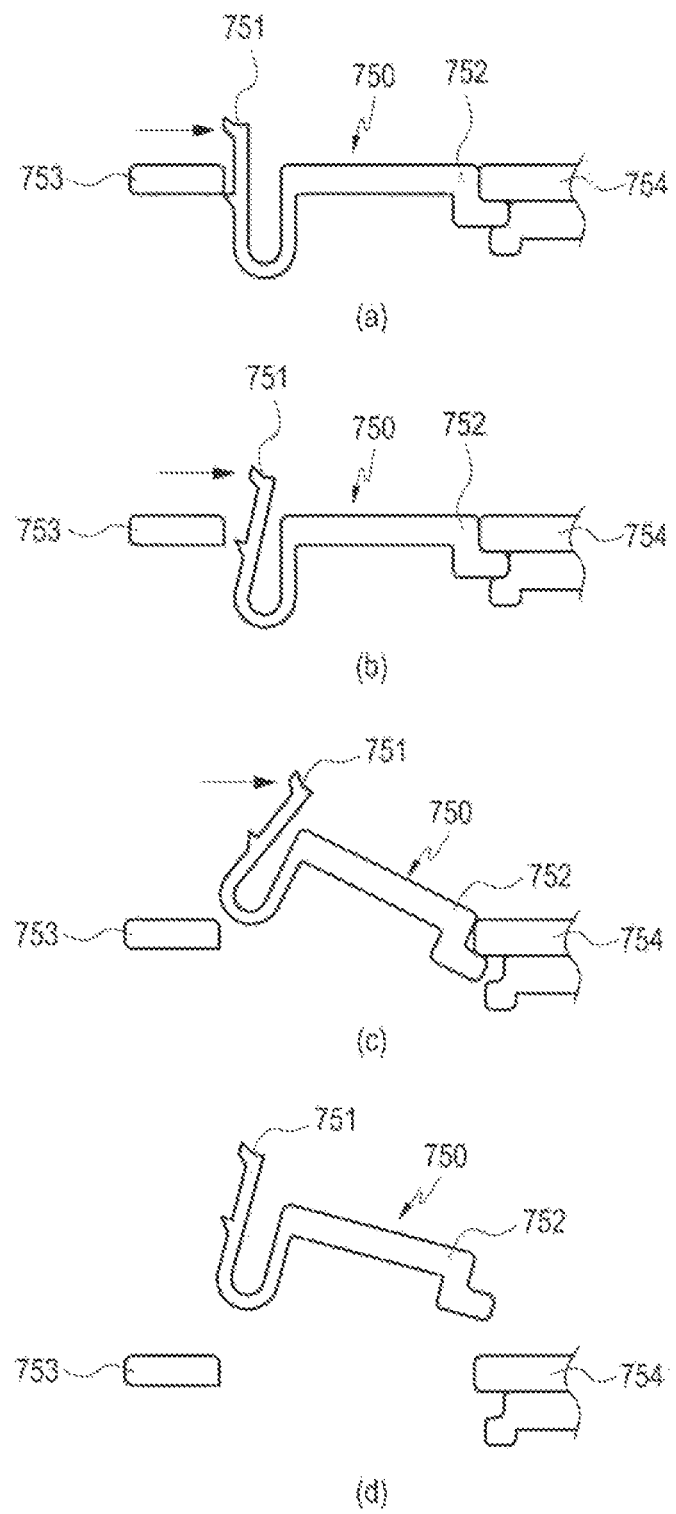

Referring to FIG. 7E(a), the mounting unit 900 may include a snap-fit 750 that includes a first engagement step 751 and a second engagement step 752, and the main body 101 may include a third engagement step 753 that corresponds to the first engagement step 751 and a fourth engagement step 754 that corresponds to the second engagement step 752. The main body 101 and the mounting unit 900 may be coupled to each other through the engagement between the first engagement step 751 and the third engagement step 753, and the engagement between the second engagement step 752 and the fourth engagement step 754.

Referring to FIG. 7E(b), when the first engagement step 751 is compressed, the first engagement step 751 and the third engagement step 753 may be separated from each other.

When the first engagement step 751 is raised up in the compressed state as illustrated in FIG. 7E(c), the second engagement step 752 and the fourth engagement step 754 may be separated from each other as illustrated in FIG. 7E(d).

Figure 7F:
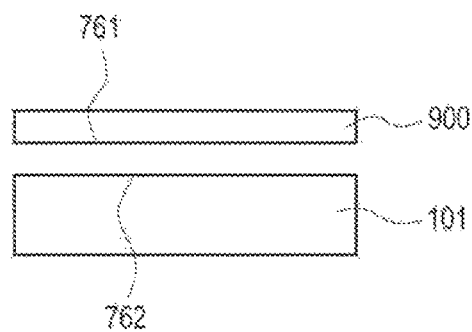

Referring to FIG. 7F, the mounting unit 900 may include a metal surface/layer 761 (or a magnetic surface/layer) at the lower portion thereof, and the main body 101 may include a magnetic surface/layer 762 (or a metal surface/layer) at the upper portion thereof. When the metal surface/layer 761 and the magnetic surface/layer 762 are attached to each other by the magnetic force, the main body 101 and the mounting unit 900 may be coupled to each other.

Figure 7G:
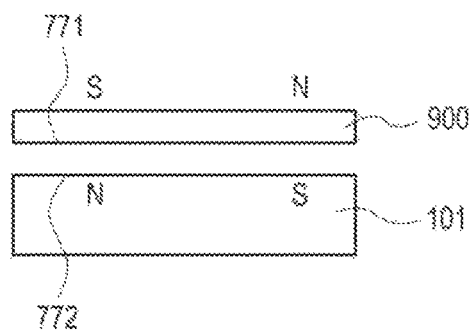

Referring to FIG. 7G, the mounting unit 900 may include a first magnetic surface/layer 771 at the lower portion thereof, and the main body 101 may include a second magnetic surface/layer 772 at the upper portion thereof. The main body 101 and the mounting unit 900 may be coupled to each other by the attachment of the first magnetic surface/layer 771 and the second magnetic surface/layer 772 by the magnetic force (i.e., S pole-N pole attachment).

The arrangement of a metal surface/layer and/or the magnetic surface/layer for coupling the main body 101 and the mounting unit 900 may be variously implemented.

Figure 7H:
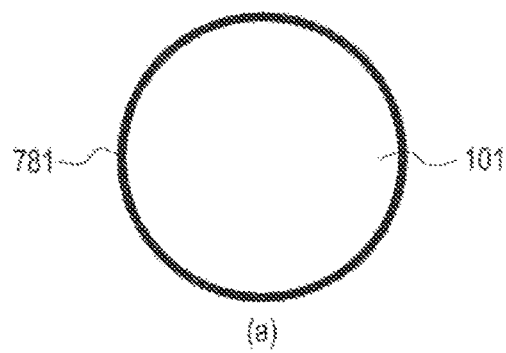
Figure 7H:
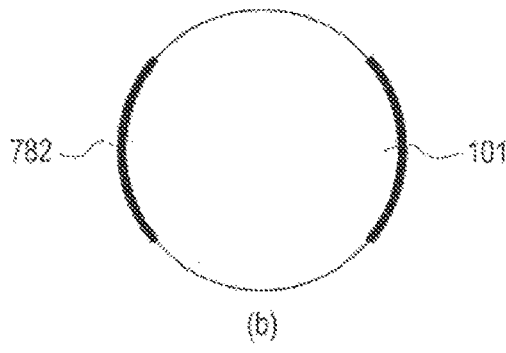
Figure 7H:
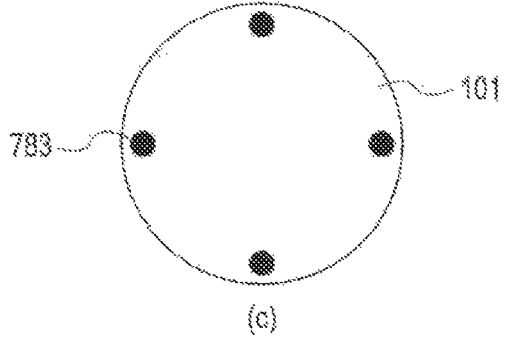

Referring to FIG. 7H(a), the metal surface/layer or magnetic surface/layer 781 may be arranged on the upper portion of the main body 101 (or the lower portion of the mounting unit 900) in a closed ring shape.

Referring to FIG. 7H(b), the metal surface/layer or magnetic surface/layer 782 may be partially (e.g., in the form of a plurality of circular arcs) disposed on the upper portion of the main body 101 (or the lower portion of the mounting unit 900).

Referring to FIG. 7H(c), the metal surface/layer or magnetic surface/layer 783 may be partially (e.g., in the form of a plurality of dots) disposed on the upper portion of the main body 101 (or the lower portion of the mounting unit 900).

Figure 7I:
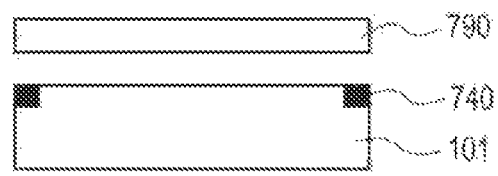

Referring to FIG. 7I, the main body 101 may include a male screw 740 that corresponds to the female screw of the mounting unit 900. A cover 790 may be provided so as to cover, or to be coupled to, the male screw 740. The cover 790 may include a female screw that corresponds to the male screw 740, and when the female screw and the male screw 740 are coupled to each other by rotating the cover 790, the main body 101 and the cover 790 may be coupled to each other. The cover 790 may have a ring shape or a transparent characteristic so that the top surface of the main body 101 is visible to the outside.

Figure 7J:
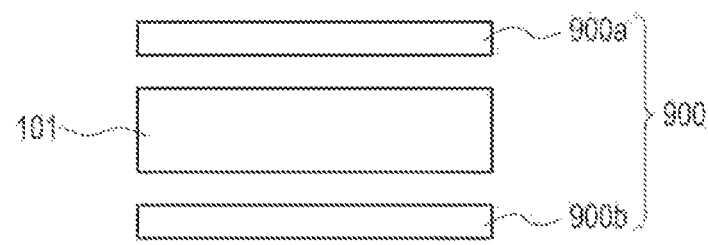

Referring to FIG. 7J, the mounting unit 900 may be formed by multiple portions (e.g., a first portion 900a and a second portion 900b). The mounting unit 900 and the main body 101 may be coupled to each other by using the above-described methods (e.g., coupling using screws, coupling using a male screw (recess), coupling using an engagement step (recess), coupling using a snap-fit, and coupling using a magnet).

Figure 7K:
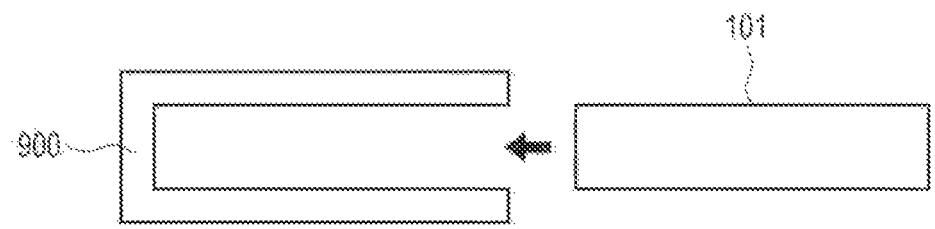

Referring to FIG. 7K, the mounting unit 900 may have a C-shape with an opening, through which the main body 101 may be inserted into the mounting unit 900. When the main body 101 is inserted into the mounting unit 900, the mounting unit 900 and the main body 101 may be coupled to each other.

Figure 7L:
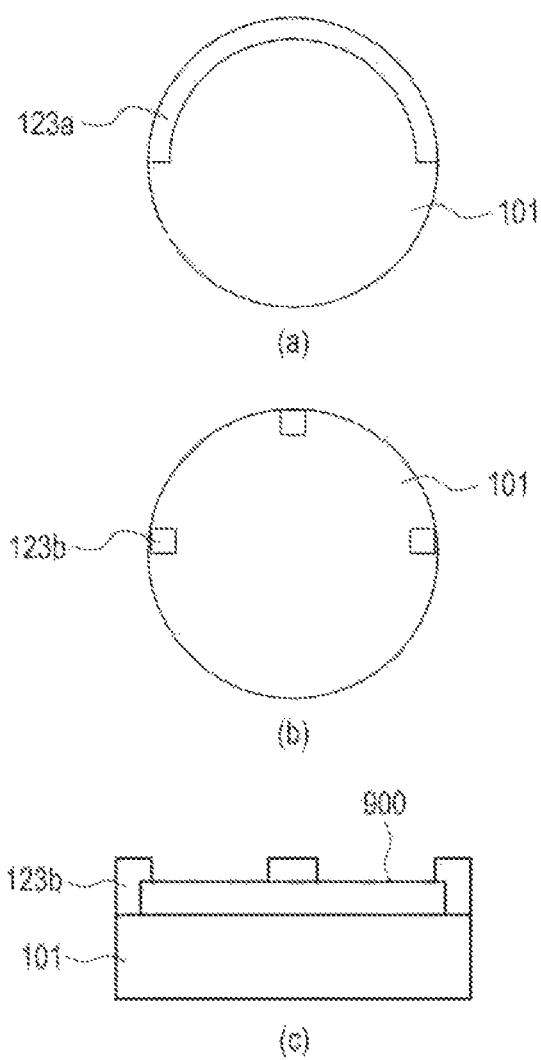

Referring to FIG. 7L(a), the main body 101 may include an engagement step 123a having a semi-circular shape on the top surface thereof, and the mounting unit 900 may be inserted into, and fixed to, the engagement step 123a.

Referring to FIG. 7L(b), the main body 101 may have a plurality of engagement steps 123b on the top surface thereof, and the mounting unit 900 may be inserted into and fixed to the engagement steps 123b.

Referring to FIG. 7L(c), when the mounting unit 900 is inserted into the engagement steps 123b of the main body 101, the mounting unit 900 and the main body 101 may be coupled to each other.

Figure 8:
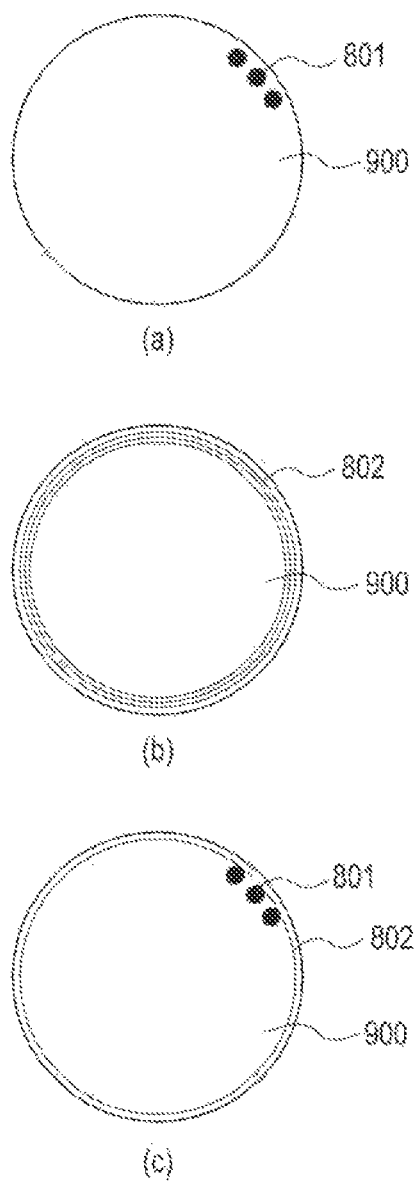
FIG. 8 is a view for describing wired connection between the main body and the mounting unit.

FIG. 8 is a view for describing a wired connection between the main body and the mounting unit.

Referring to FIG. 8(*a*), the mounting unit 900 may include a plurality of dot-shaped first electric contacts 801 (or connectors) at the lower portion thereof, and the main body 101 may include a plurality of dot-shaped second contacts (not illustrated), or connectors for wired connection which correspond to the first electric contacts 801. Through the contact between the first electric contacts 801 and the second electric contacts, the main body 101 and the mounting unit 900 may be electrically connected to each other. The number of the first electric contacts 801 may vary depending on the kind of wired interface. For example, for a power (or electric power) interface, each of the mounting unit 900 and the main body 101 may include two contacts (e.g., VCC (for power transmission/reception)/GND (for ground)). For example, for an RS232 data interface, each of the mounting unit 900 and the main body 101 may include three contacts (e.g., RX (for data reception)/TX (for data transmission)/GND (for ground)). For example, for an I2C data interface, each of the mounting unit 900 and the main body 101 may include three contacts (e.g., GND (for ground)/Data (for data transmission/reception)/Clock (for transmission/reception of a clock signal)). For example, for an SPI (Serial Peripheral) data interface, each of the mounting unit 900 and the main body 101 may include four or five contacts (e.g., GND (for ground)/Input (for data input)/Output (for data reception)/Clock (for transmission/reception of a clock signal)/Selection). In addition, in the contacts for the power interface and the data interface, the contact for the ground may be shared. For example, in the case of the power interface and the RS232 data interface, each of the mounting unit 900 and the main body 101 may include four contacts (e.g., VCC (power transmission/reception)/RX (for data reception)/TX (for data transmission)/GND (for ground)).

Referring to FIG. 8(b), the mounting unit 900 may include a plurality of ring-shaped first electric contacts 802, or connectors, for wired connection at the lower portion thereof, and the main body 101 may include a plurality of ring-shaped second electric contacts (not illustrated), or connectors for wired connection which correspond to the first electric contacts 802.

Referring to FIG. 8(c), the mounting unit 900 may include a plurality of dot-shaped/ring-shaped first electric contacts 801 and 802 (or connectors) at the lower portion thereof, and the main body 101 may include a plurality of dot-shaped/ring-shaped second electric contacts (not illustrated) (or connectors) for wired connection which corresponds to the first electric contacts 801 and 802.

Figure 9A:
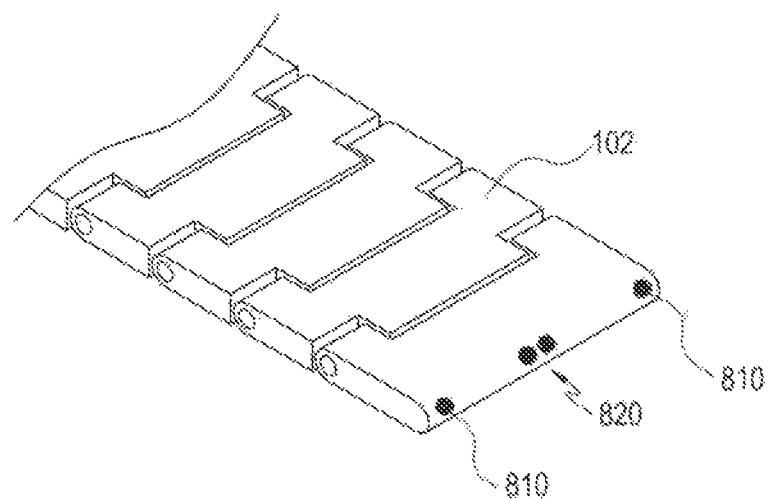
FIGS. 9A to 9C are views for describing wired connection between a band that fixes the main body to a user's wrist and the main body/mounting unit.
Figure 9B:
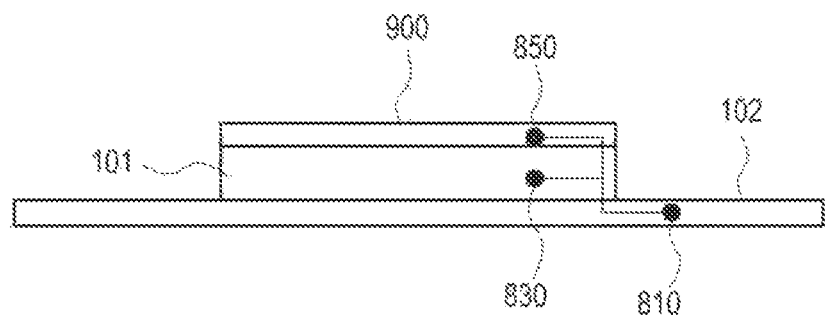
Figure 9C:
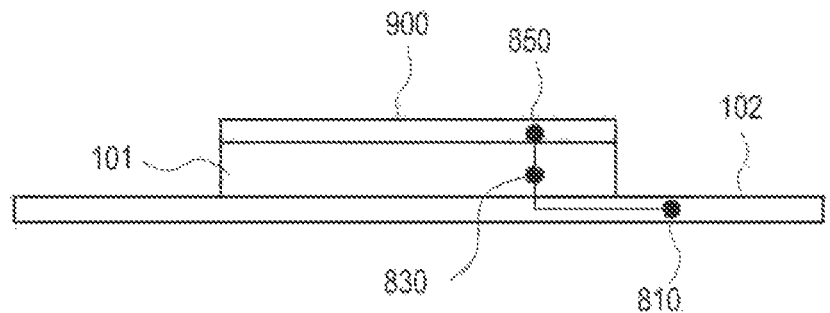

FIGS. 9A to 9C are views for describing a wired connection between the band that fixes the main body to the user's wrist and the main body/mounting unit.

Referring to FIG. 9A, the band 102 may include at least one first contact 810 (or connector) for power (or electric power) interface and/or at least one second contact 820 (or connector) for data interface.

Referring to FIG. 9B, the main body 101 may include a third contact 830, or connector, that corresponds to the first contact 810, and power (or electric power) transmission/reception between the band 102 and the main body 101 may be performed through the contact between the first contact 810 and the third contact 830. The main body 101 may include a fourth contact (not illustrated), or connector, that corresponds to the second contact 820, and data transmission/reception between the band 102 and the main body 101 may be performed through the contact between the second contact 820 and the fourth contact.

The mounting unit 900 may include a fifth contact 850, or connector, that corresponds to the first contact 810, and the power (or electric power) transmission/reception between the band 102 and the mounting unit 900 may be performed through the contact between the first contact 810 and the fifth contact 850. The mounting unit 900 may include a sixth contact (not illustrated), or connector, that corresponds to the second contact 820, and the data transmission/reception between the band 102 and the mounting unit 900 may be performed through the contact between the second contact 820 and the sixth contact.

Referring to FIG. 9C, the fifth contact 850 of the mounting unit 900 may be electrically connected with the first contact 810 via the third contact 830 of the main body 101. The sixth contact (not illustrated) of the mounting unit 900 may be electrically connected with the second contact 820 through the fourth contact of the main body 101.

Figure 10:
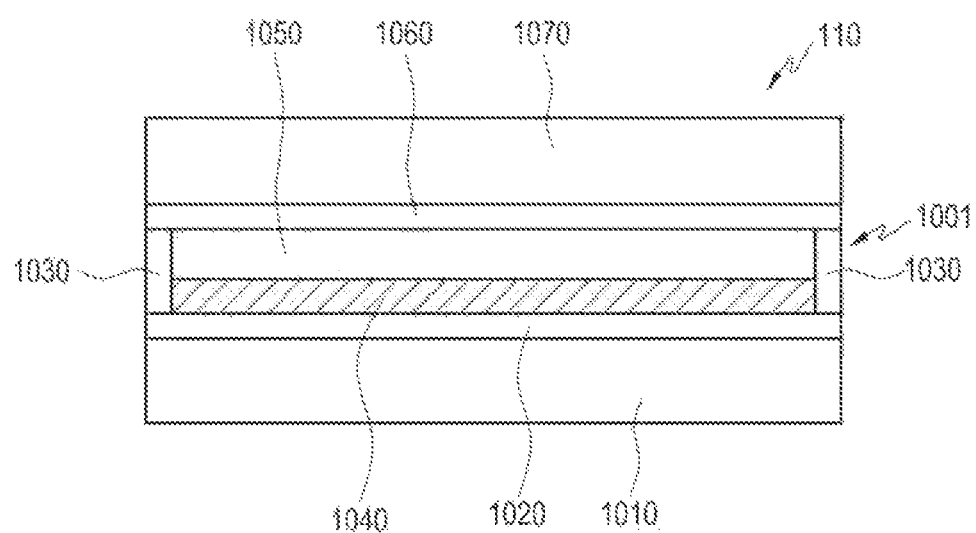
FIG. 10 is an exemplary view for describing a touch screen that is variable in transparency.

FIG. 10 is an exemplary view for describing a touch screen of which the transparency varies.

The touch screen 110 (or the touch screen 910) may have a characteristic of changing the transmissivity (i.e., transparency) in response to a signal or voltage that is applied thereto by the first control unit 107 of the main body 101 or the second control unit 907 of the mounting unit 900. The touch screen 110 may include a touch panel 1070 that senses a touch input, and a variable window 1001 that adjusts the transparency.

As for the variable window 1001, at least one of, for example: an electrochromic glass, an SPD (Suspended Particle Device), and an LC (Liquid Crystal). Alternatively, in some cases, as for the variable window 1001, it is possible to use at least one of, for example: a photochromic glass and a thermochromic glass that is not actively controllable by applying a signal and changes the transmissivity by reacting with a light having a specific wavelength or a temperature change.

The variable window 1001 may be manufactured through various methods, such as a method of applying a transmissivity-controllable material on a glass or a method of attaching a transmissivity-controllable thin film to a glass.

The present example exemplifies a case in which an electrochromic glass is used for the variable window 1001.

The variable window 1001 may include a substrate 1010, a first conductive electrode 1020 laminated on the top surface of the substrate 1010, a second conductive electrode 1060 laminated on the bottom surface of the touch panel 1070, spacers 1030 that separate the first electrode 1020 and the second electrode 1060 and seals a space therebetween, and an electrochromic layer 1040 and an electrolyte 1050 disposed in the space.

The substrate 1010 may be made of a transparent glass or plastic, and the plastic may be any one of, for example, polyacrylate, polyethyleneetherphthalate, polyethylenenaphthalate, polycarbonate, polyarylate, polyetherimide, polyethersulphone, and polyimide.

The first electrode 1020 may be made of a transparent conductor, and may contain, for example: an inorganic conductive material, such as indium tin oxide (ITO); fluorine-containing tin oxide (FTO); or antimony-doped tin oxide (ATO); or an organic conductive material, such as polyacetylene or polythiophene.

The second electrode 1060 may be made of a transparent or opaque conductive material, and may contain, for example: indium tin oxide (ITO); fluorine-containing tin oxide (FTO); a metal, such as Al, antimony-doped tin oxide (ATO); or a combination thereof.

On the first electrode 1020, an electrochromic layer 1040 containing an electrochromic material is disposed. The electrochromic layer 1040 may be disposed on the first electrode 1020 in the form of a film.

The electrolyte 1050 supplies an oxidation-reduction material that reacts with the electrochromic material, and may be a liquid electrolyte or a solid high-molecular electrolyte. As the liquid electrolyte, a solution, in which, for example, a lithium salt, such as LiOH or $LiClO_4$, or a potassium salt, such as KOH, or a sodium salt, such as NaOH, is dissolved in a solvent, may be used, but the liquid electrolyte is not limited thereto. As the solid electrolyte, at least one of, for example: poly(2-acrylamino-2-methylpropane sulfonic acid) and poly(ethylene oxide) may be used, but the solid electrolyte is not limited thereto.

The material that forms the electrochromic layer 1040, that is, the electrochromic material may include a metal-organic composite, in which a metal and an organic compound are bonded, the organic compound having a functional group capable of forming a coordinate with the metal. The metal may include a light metal, a transition metal, a lanthanide metal, an alkali metal, or a combination thereof. The metal may include beryllium (Be), barium (Ba), copper (Cu), zinc (Zn), cerium (Ce), magnesium (Mg), aluminum (Al), titanium (Ti) or a combination thereof. The functional group may include a carboxyl group, a pyridine group, an imidazole group, or a combination thereof. The organic compound may include a viologen derivative, an anthraquinone derivative, or a combination thereof.

The second electrode 1060 may be connected to a ground, and the first control unit 107 of the main body 101 or the second control unit 907 of the mounting unit 900 may adjust the transparency of the touch screen 110 by controlling the magnitude of the voltage applied to the first electrode 1020.

For example, the first control unit 107 of the main body 101 or the second control unit 907 of the mounting unit 900 may control the touch screen 110 to be seen transparently, may control the touch screen 110 to be seen translucently, or may control the touch screen 110 to be seen opaquely.

Figure 11:
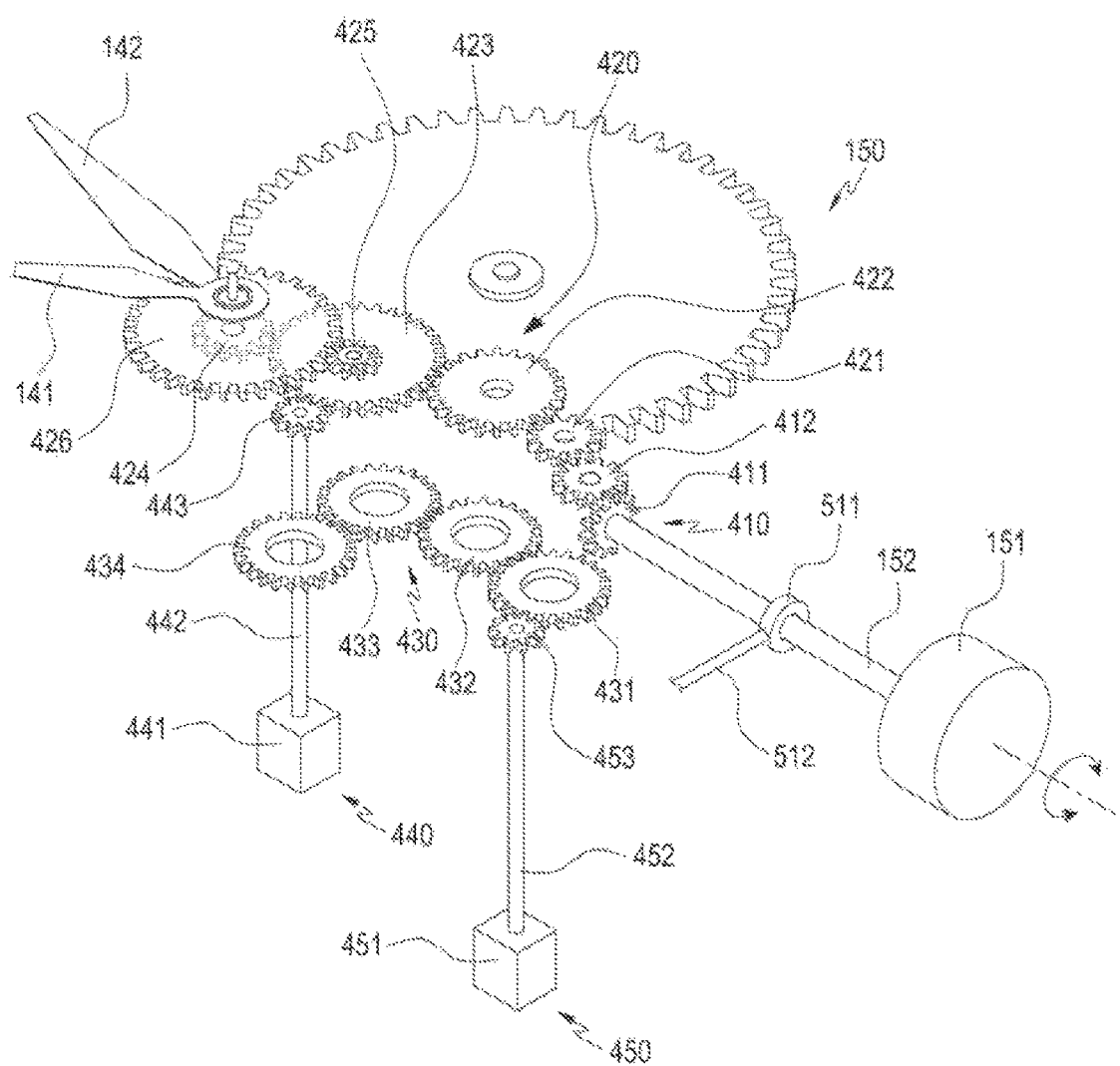
FIGS. 11 and 12 are views illustrating an example of a drive unit and an example of a moving unit included in the drive unit, respectively.
Figure 12:
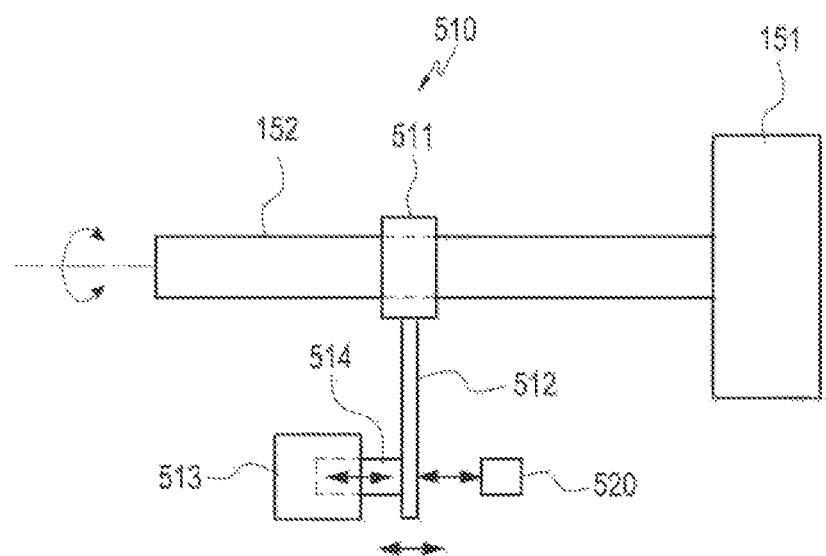

FIG. 11 illustrates an example of the drive unit, and FIG. 12 illustrates an example of a moving unit included in the drive unit.

The drive unit 150 may include a watch stem 151 (or a button/operation unit/input unit), first to third gear systems 410, 420, and 430, and first and second rotating units 440 and 450, and a moving unit 510.

The watch stem 151 is fixed to one end of a watch stem rotating shaft 152, and is capable of being rotated about the watch stem rotating shaft 152 and moving forward or backward in the longitudinal direction of the watch stem rotating shaft 152.

Through the push or pull of the watch stem 151 (and/or a movement of the watch stem rotating shaft 152 in the longitudinal direction thereof), the operating mode of the wearable device 100 or 100a may be changed. For example, at a first operating mode corresponding to a first position of the watch stem 151 in the longitudinal direction of the watch stem rotating shaft 152 (or a first position of the watch stem rotating shaft 152 in the longitudinal direction thereof), at least a part of the time indicating unit 140 may be rotated through the rotation of the watch stem 151 (and/or the rotation of the watch stem rotating shaft 152). For example, at a second operating mode corresponding to a second position of the watch stem 151 in the longitudinal direction of the watch stem rotating shaft 152 (or a second position of the watch stem rotating shaft 152 in the longitudinal direction thereof), the position and/or operation of at least a part of an auxiliary indicating unit may be controlled through the rotation of the watch stem 151 (and/or the rotation of the watch stem rotating shaft 152).

A first gear system 410 is configured to transmit the rotational force of the watch stem 151 (or the rotational force of the watch stem rotating shaft 152) to one of the second and third gear systems 420 and 430, and may include $11^{th}$ and $12^{th}$ gears 411 and 412) (and the rotating shafts of respective gears).

The $11^{th}$ gear 411 is fixed to the watch stem rotating shaft 152, and the $11^{th}$ gear 411 may be mechanically coupled to the $12^{th}$ gear 412. When the $11^{th}$ gear 411 is rotated about the watch stem rotating shaft 152, the $12^{th}$ gear 412 may be rotated at the same time.

The first gear system 410 may be configured to move forward or backward together with the watch stem 151 by the push or pull of the watch stem 151 (and/or the longitudinal movement of the watch stem rotating shaft 152). For example, at the first operating mode, according to the push of the watch stem 151, the first gear system 410 may be mechanically coupled to the second gear system 420, and at the second operating mode according to the pull of the watch stem 151, the first gear system 410 may be separated from the second gear system 420 and then mechanically coupled to a third gear system 430.

The second gear system 420 is configured to transmit the rotational force of the first gear system 410 to at least a part of the time indicating unit 140, and may include $21^{st}$ to $26^{th}$ gears 421 to 426 (and rotating shafts of respective gears). At the first operating mode, the $21^{st}$ gear 421 may be coupled to the $12^{th}$ gear 412.

The $21^{st}$ to $24^{th}$ gears 421 to 424 are mechanically coupled to each other to be rotatable, and may be configured such that when any one gear is rotated, the remaining gears can be rotated simultaneously. The $24^{th}$ gear 424 may be fixed to a minute hand rotating shaft, the minute hand 142 may be fixed to the minute hand rotating shaft, and according to the rotation of the $24^{th}$ gear 424, the minute hand 142 may be rotated simultaneously.

The $25^{th}$ gear 425 and the $23^{rd}$ gear 423 may be fixed to the same rotating shaft, and the $23^{rd}$ and $25^{th}$ gears 423 and 425 may be rotated simultaneously. The $25^{th}$ and $26^{th}$ gears 425 and 426 are mechanically coupled to each other to be rotatable, and may be configured such that, when any one of the two gears is rotated, the remaining one is rotated simultaneously. The $26^{th}$ gear 426 may be fixed to the hour hand rotating shaft, the hour hand 141 may be fixed to the hour hand rotating shaft, and according to the rotation of the $26^{th}$ gear 426, the hour hand 141 may be rotated simultaneously.

Alternatively, each of the hour hand 141 and the minute hand 142 may be independently controlled, at the third operating mode, the rotational force of the watch stem 151 (or the rotational force of the watch stem rotating shaft 152) may be transmitted to the hour hand 141 through a fourth gear system (not shown), and the hour hand 141 may be rotated independently from the minute hand 142.

The third gear system 430 is configured to transmit the rotational force of the first gear system 410 to at least a part of the auxiliary indicating unit, and may include $31^{st}$ to $34^{th}$ gears 431 to 434 (and rotating shafts of respective gears). At the second operating mode, the $31^{st}$ gear 431 may be coupled to the $12^{th}$ gear 412.

The $31^{st}$ to $34^{th}$ gears 431 to 434 are mechanically coupled to each other to be rotatable, and may be configured such that when any one of these gears is rotated, the remaining gears are rotated simultaneously. The $34^{th}$ gear 434 may correspond to the auxiliary indicating unit, may be fixed to the rotating shaft of the auxiliary indicating unit, or may be mechanically coupled to the gear of the rotating shaft of the auxiliary indicating unit. For example, by arranging date indicators, each of which corresponds to one of $1^{st}$ date to $31^{st}$ date, in a circular form on the surface of the $34^{th}$ gear 434, the $34^{th}$ gear 434 itself may form the auxiliary indicating unit. For example, the $34^{th}$ gear 434 may be a frequency control gear of a mechanical metronome device.

The first rotating unit 440 may include a first motor 441 that provides a rotational force of a direction and duration according to control data/signal of the first control unit 107 or the second control unit 907, a first rotating shaft 442 rotated according to the rotational force provided from the first motor 441, and a first gear 443 fixed to one end of the first rotating shaft 442 to be rotated. The first gear 443 may be mechanically coupled to one of the gears of the first and second gear systems 410 and 420. For example, the first gear 443 may be mechanically coupled to the $23^{rd}$ gear 423. According to the drive of the first motor 441, the first gear 443 and the gears of the second gear system 420 (and the first gear system 410) may be rotated simultaneously, and according to the rotation of the $24^{th}$ gear 424 of the second gear system 420, the minute hand 142 may be rotated simultaneously.

Alternatively, in a case where each of the hour hand 141 and the minute hand 142 is independently controlled, a second rotating unit 450, which is mechanically coupled to the hour hand 141 directly or through a fourth gear system, may be additionally provided.

The second rotating unit 450 may include a second motor 451 that provides a rotational force of a direction and duration according to control data/signal of the first control unit 107 of the main body 101 or the second control unit 907 of the mounting unit 900, a second rotating shaft 452 rotated according to the rotational force provided from the second motor 451, and a second gear 453 fixed to one end of the second rotating shaft 452 to be rotated. The second gear 453 may be mechanically coupled to one of the gears of the first and third gear systems 410 and 430. For example, the second gear 453 may be mechanically coupled to the 31$^{st}$ gear 431. According to the drive of the second motor 451, the gears of the second gear 453 and the gears of the third gear system 430 (and the first gear system 410) may be rotated simultaneously. According to the rotation of the 31st gear 431 of the third gear system 430, at least a part of the auxiliary indicating unit may be rotated.

Referring to FIG. 12, the moving unit 510 may include a stationary unit 511, a connection unit 512, and an actuator 513.

The stationary unit 511 is mechanically coupled to the watch stem rotating shaft 152 to be rotatable, and may be configured such that the movement in the longitudinal direction of the watch stem rotating shaft 152 is limited, and the rotation about the watch stem rotating shaft 152 is allowed. For example, the stationary unit 511 may be formed as a ring having an opening, into which the watch stem rotating shaft 152 is inserted, and, for example, a bearing may be used as the stationary unit 511.

The connection unit 512 may extend from a side surface of the stationary unit 511 in a direction perpendicular to the longitudinal direction of the watch stem rotating shaft 152.

The actuator 513 includes a reciprocal arm 514, one end of which may be fixed to the connection unit 512. The actuator 513 may move the arm 514 in the longitudinal direction of the watch stem rotating shaft 152 (or in the direction parallel thereto) to correspond to a distance or position according to control data/signal of the first control unit 107 or the second control unit 907.

For example, the first control unit 107 of the main body 101 or the second control unit 907 of the mounting unit 900 may cause the first gear system 410 to be selectively coupled to one of the second and third gear systems 420 and 430 according to the movement of the watch stem rotating shaft 152 (and the watch stem 151) and according to the drive of the actuator 513.

Alternatively, in the case where one gear of the first and second rotating units 440 and 450 is mechanically coupled to one of the gears of the first gear system 410, as the first gear system 410 is selectively coupled to one of the second and third gear systems 420 and 430 according to the drive of the actuator 513 by the control data/signal of the first control unit 107 of the main body 101 or the second control unit 907 of the mounting unit 900, the rotation/operation control of the time indicating unit 140 or the auxiliary indicating unit may be enabled. In addition, in such a case, the first and second rotating units 440 and 450 may be replaced by one rotating unit.

For example, the first sensor unit 104 of the main body 101 may include at least one of: at least one first sensor 131, 132, or 133 that senses a position of at least a part of the time indicating unit 140; at least one second sensor 1420 that senses a position of at least a part of the time indicating unit 140; at least one third sensor 1520 that senses a position of the rotating shaft of the auxiliary indicating unit; at least one fourth sensor 1540 that senses a position (or an angular position), rotation, or a rotating angle (or a rotating amount) of the watch stem 151 and/or a position (or an angular position), rotation, or a rotating angle (or a rotating amount) of the watch stem rotating shaft 152; and at least one fifth sensor 520 that senses a position (or a position in the longitudinal direction), a movement, or a moving amount of the watch stem 151 and/or a position (or a position in the longitudinal direction), a movement, or a moving amount of the watch stem rotating shaft 152.

The main body 101 may be provided with the at least one fifth sensor 520 that senses a position (or a position in the longitudinal direction), a movement, or a moving amount of the watch stem 151 and/or a position (or a position in the longitudinal direction), a movement, or a moving amount of the watch stem rotating shaft 152.

The fifth sensor 520 may be disposed to be spaced apart from the connection unit 512. The fifth sensor 520 may emit infrared rays and may sense the infrared rays reflected from the surface of the connection unit 512. The sensed information output from the fifth sensor 520 may vary depending on the distance between the fifth sensor 520 and the connection unit 512. The first control unit 107 of the main body 101 or the second control unit 907 of the mounting unit 900 may detect the position (or the position in the longitudinal direction), the movement, or the moving amount of the watch stem 151 and/or the position (or the position in the longitudinal direction), the movement, or the moving amount of watch stem rotating shaft 152 through the fifth sensor 520.

Figure 13:
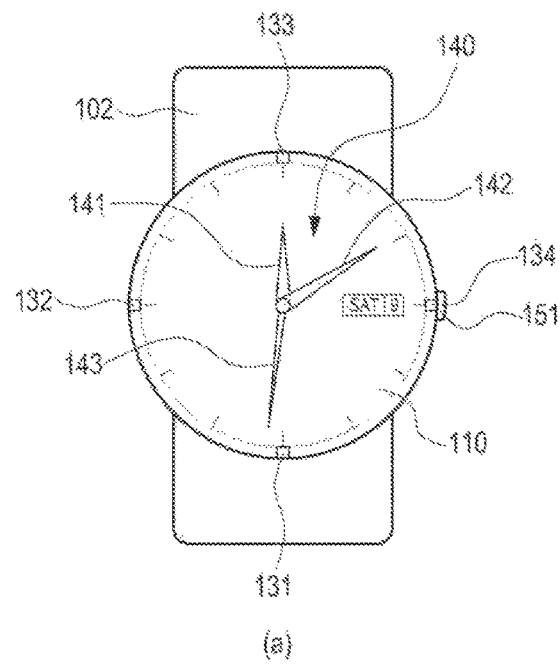
FIG. 13 is a view for describing a sensing operation of a first sensor.
Figure 13:
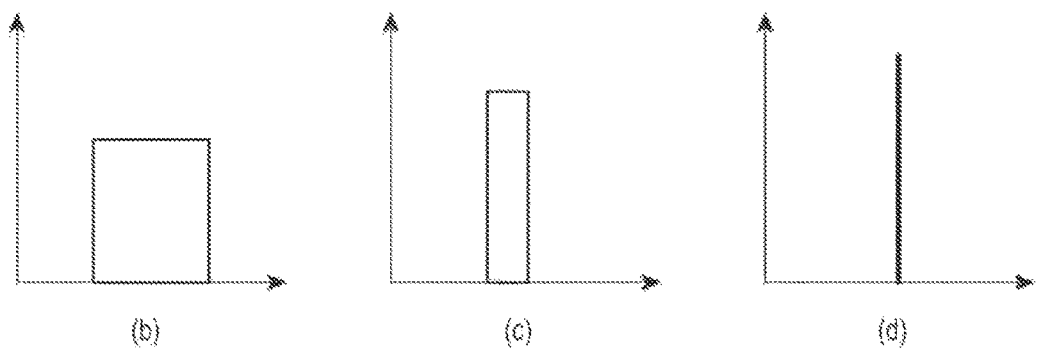

FIG. 13 is a view illustrating a sensing operation of the first sensor.

Referring to FIG. 13(*a*), a plurality of first sensors 131 to 134 may be arranged around the time indicating unit 140. Each first sensor may sense an indicator that has come closer thereto, and may output the sensed information to the first control unit 107 of the main body 101 or the second control unit 907 of the mounting unit 900. For example, each first sensor may be a proximity sensor (or an infrared sensor).

In FIGS. 13(*b*) to 13(*d*), a horizontal axis represents time, and a vertical axis represents an intensity of a sensing signal. FIG. 13(*b*) represents a first sensing signal of the hour hand 141, which is output from the first sensor 133 positioned at 12 o'clock, FIG. 13(*c*) represents a second sensing signal of the minute hand 142, which is output from the first sensor 133 positioned at 12 o'clock, and FIG. 13(*d*) represents a third sensing signal of the second hand 143, which is output from the first sensor 133 positioned at 12 o'clock. The durations of the sensing signals may decrease in the order of the hour hand 141, the minute hand 142, and the second hand 143, and the intensities of the sensing signals may increase in the order of the hour hand 141, the minute hand 142, and the second hand 143 (for example, in the case where the lengths of the hands become longer in the order of the hour hand, the minute hand, and the second hand). For example, when the first sensor 133 is positioned at 12 o'clock, the peak of the sensing signal for each of the watch hands may occur when the corresponding watch hand is positioned at 12 o'clock. Accordingly, the first control unit 107 of the main body 101 or the second control unit 907 of the mounting unit 900 may determine whether the hour hand 141, the minute hand 142, or the second hand 143 is positioned at the corresponding position through each first sensor. For example, when the peaks of the sensing signals of the hour hand 141, the minute hand 142, and the second hand 143 are detected at the same time from the first sensor positioned at 12 o'clock at a specific time point, the first control unit 107 of the main body 101 or the second control unit 907 of the mounting unit 900 may determine that the time point is 12 o'clock.

In an embodiment, a camera sensor (not illustrated) including an image sensor that photographs the time indicating unit 140 may be used in place of the plurality of first sensors 131 to 134. The camera may be an infrared camera, and may include an infrared light source that outputs infrared rays to the time indicating unit 140, and an image sensor that detects the infrared rays reflected from the time indicating unit 140, converts the infrared rays into an electric image signal or data (i.e., a digital image), and outputs the electric image signal or data.

For example, the first control unit 107 of the main body 101 or the second control unit 907 of the mounting unit 900 may compare information for characteristic features extracted from the image of the time indicating unit 140, which is acquired through the camera (for example, an edge, a corner, an image pattern, and an outline) with characteristic feature information for the time indicating unit 140, which has been previously stored in the first memory 105 of the main body 101 or the second memory 905 of the mounting unit 900. The first control unit 107 of the main body 101 or the second control unit 907 of the mounting unit 900 may recognize the time indicating unit 140 and the position of the time indicating unit 140 (i.e., time) through the characteristic feature/pattern matching.

Figure 14:
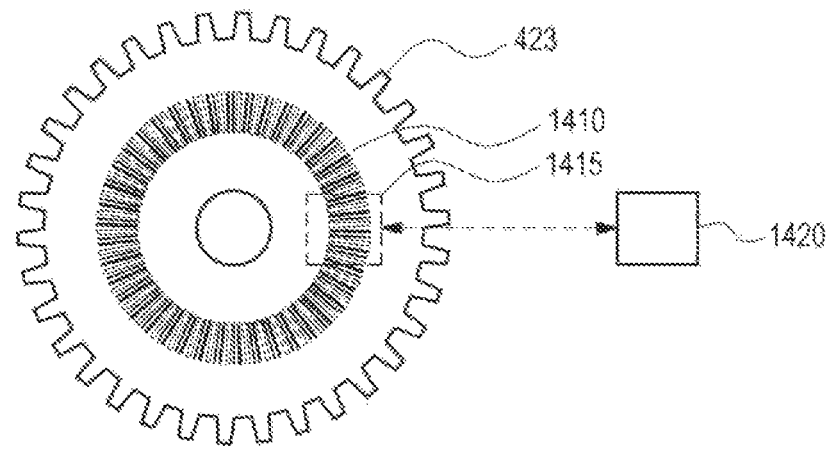
FIG. 14 is a view for describing a sensing operation of a second sensor.
Figure 14:
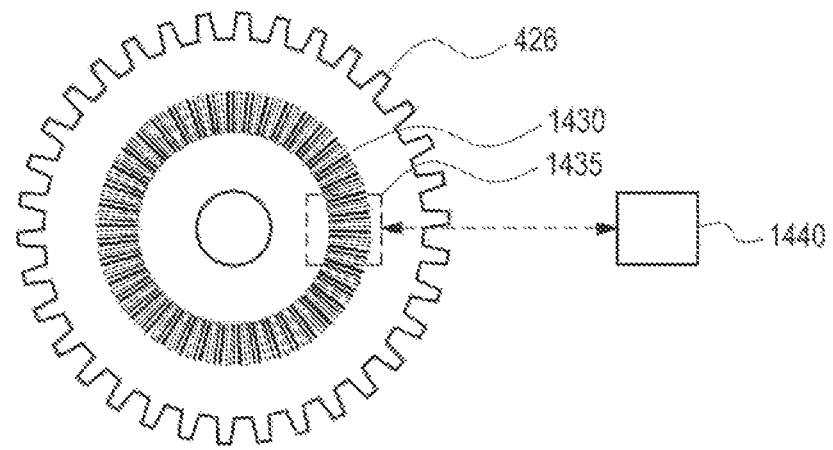

FIG. 14 is a view for describing a sensing operation of a second sensor.

FIG. 14(a) illustrates a second sensor 1420 and an identifier 1410 for sensing the position of the minute hand.

The identifier 1410 may have an annular pattern. For example, the identifier 1410 may be a circular bar-code. The identifier 1410 may be formed on a surface of one of the gears of the second gear system 420 that is mechanically coupled with the minute hand 142. For example, the identifier may be formed on the surface of the $23^{rd}$ gear 423. The second sensor 1420 senses the pattern of a part 1415 of the identifier 1410, and the sensed information output from the second sensor 1420 may vary depending on the rotation of the $23^{rd}$ gear 423. For example, the second sensor 1420 may be, for example, an infrared sensor (or an infrared camera) or a bar-code reader that emits infrared rays and detects reflected infrared rays. The first control unit 107 of the main body 101 or the second control unit 907 of the mounting unit 900 may detect the position (or angular position), or the rotation or rotating angle (or rotating amount) of the minute hand 142, which corresponds to the position (or angular position), or the rotation or rotating angle (or rotating amount) of the $23^{rd}$ gear 423, through the second sensor 1420.

FIG. 14(b) illustrates a second sensor 1440 and an identifier 1430 that senses the position of the hour hand 141.

The identifier 1430 may have an annular pattern. For example, the identifier 1430 may be a circular bar-code. The identifier 1430 may be formed on a surface of one of the hour hand 141 or the surface of one of the gears of the second gear system 420 or fourth gear system that is mechanically coupled with the hour hand 141. For example, the identifier 1430 may be formed on the surface of the $26^{th}$ gear 426. The second sensor 1440 senses the pattern of a part 1435 of the identifier 1430, and the sensed information output from the second sensor 1440 may vary depending on the rotation of the $26^{th}$ gear 426. The first control unit 107 of the main body 101 or the second control unit 907 of the mounting unit 900 may detect the position (or angular position), or the rotation or rotating angle (or rotating amount) of the hour hand 141, which corresponds to the position (or angular position), or the rotation or rotating angle (or rotating amount) of the $26^{th}$ gear 426, through the second sensor 1440.

Figure 15:
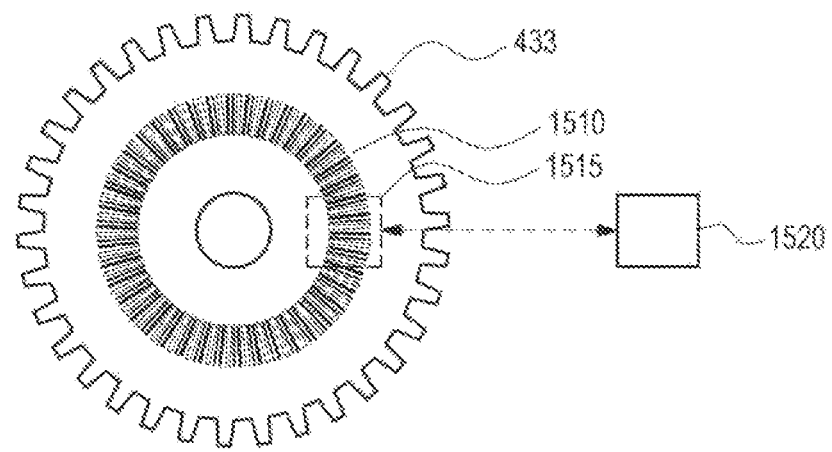
FIG. 15 is a view for describing a sensing operation of third and fourth sensors.
Figure 15:
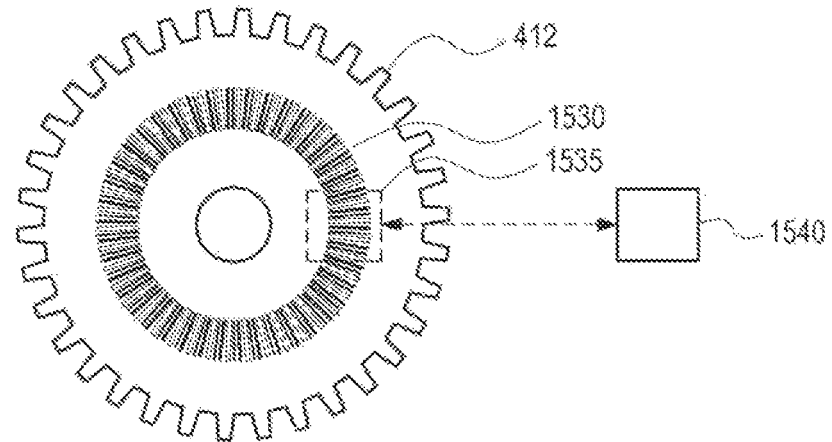

FIG. 15 is a view for describing sensing operations of the third and fourth sensors.

FIG. 15(a) illustrates a third sensor 1520 and an identifier 1510 for sensing the position of the rotating shaft of the auxiliary indicating unit.

The identifier 1510 may have an annular pattern. For example, the identifier 1510 may be a circular bar-code. The identifier 1510 may be formed on a surface of one of the gears of the third gear system 430 that is mechanically coupled with the rotating shaft of the auxiliary indicating unit. For example, the identifier 1510 may be formed on the surface of the $33^{rd}$ gear 433. The third sensor 1520 senses the pattern of a part 1515 of the identifier 1510, and the sensed information output from the third sensor 1520 may vary depending on the rotation of the $33^{rd}$ gear 433. The first control unit 107 of the main body 101 or the second control unit 907 of the mounting unit 900 may detect the position (or angular position), or the rotation or rotating angle (or rotating amount) of the auxiliary indicating unit, which corresponds to the position (or angular position), or the rotation or rotating angle (or rotating amount) of the $33^{rd}$ gear 433, through the third sensor 1520.

FIG. 15(b) illustrates a fourth sensor 1540 and an identifier 1530 for sensing the position (or longitudinal position), the movement or moving amount of the watch stem 151 and/or the position (or angular position), the rotating position or rotating angle (or rotating amount) of the watch stem rotating shaft 152.

The identifier 1530 may have an annular pattern. For example, the identifier 1530 may be a circular bar-code. The identifier 1530 may be formed on a surface of one of the gears of the first gear system 410 that is mechanically coupled with the watch stem 151 (and/or the watch stem rotating shaft 152). For example, the identifier 1530 may be formed on the surface of the $12^{th}$ gear 412. The fourth sensor 1540 senses the pattern of a part 1535 of the identifier 1530, and the sensed information output from the fourth sensor 1540 may vary depending on the rotation of the $12^{th}$ gear 412. The first control unit 107 of the main body 101 or the second control unit 907 of the mounting unit 900 may detect the position (or angular position), or the rotation or rotating angle (or rotating amount) of the watch stem 151 (and/or the watch stem rotating shaft 152), which corresponds to the position (or angular position), or the rotation or rotating angle (or rotating amount) of the $12^{th}$ gear 412, through the fourth sensor 1540.

Figure 16:
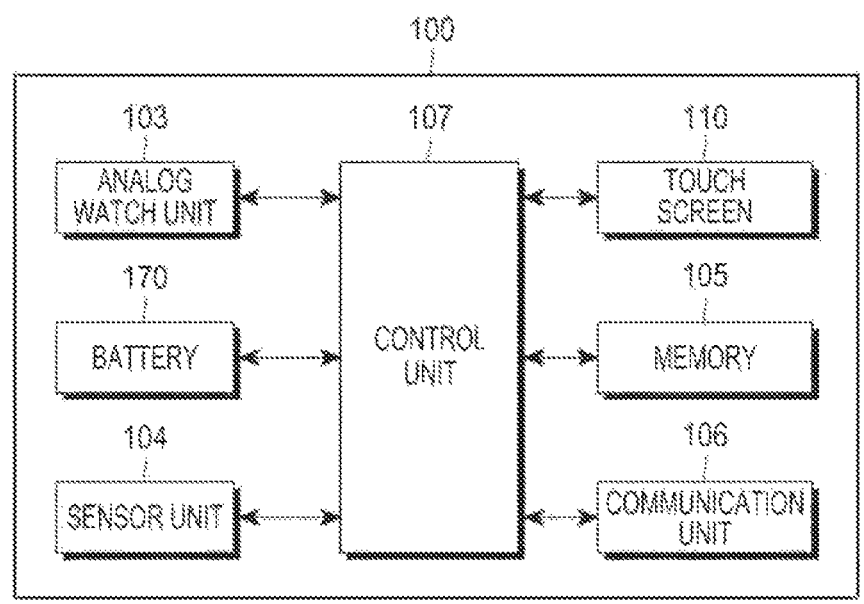
FIG. 16 is a block diagram of the wearable device according to the first embodiment.

FIG. 16 illustrates a block diagram of the wearable device according to the first embodiment.

The wearable device 100 may include an analog watch unit 103, a first battery 170, a first sensor unit 104 including at least one first sensor 131, 132, or 133, a touch screen 110, a first memory 105, a first communication unit 106, and a first control unit 107.

At least a part of the analog watch unit 103 may perform an operation in response to the control data/signal of the first control unit 107.

For example, the drive unit 150 of the analog watch unit 103 may automatically drive the time indicating unit 140 in order to display the present time or control the position and/or operation of at least a part of the time indicating unit 140 in response to the control data/signal of the first control unit 107.

For example, the drive unit 150 may control the position and/or the operation of at least a part of an auxiliary indicating unit that provides at least one auxiliary function, such as date display, heartbeat/pulse display, and/or metronome display, in response to the control data/signal of the first control unit 107. The auxiliary indicating unit may include at least one auxiliary indicator that is mechanically driven. For example, the auxiliary indicating unit may include a needle or weight that reciprocates left and right, according to a heartbeat or a cycle, and/or a date indicator that is indicated on a rotating substrate.

The first sensor unit 104 may include a plurality of sensors, and may sense the state and/or position of at least a part of the analog watch unit 103 through the first sensor unit 104. Each sensor may output the sensed information to the first control unit 107, and the first control unit 107 may detect the state and/or position of at least a part of the analog watch unit 103 through the sensed information. In an embodiment, the first sensor unit 104 may include a biometric sensor that detects a biological signal/information when it is in proximity or in contact with a part of a user's body. The biological information may include at least one of, for example: pulse, heartbeat, oxygen saturation, and blood flow. The biometric sensor may collect raw data for measuring a user's blood pressure, blood flow, heart rate (HRM, HRV), temperature, respiration rate, oxygen saturation, cardiorespiratory sound detection, blood sugar, waist, height, weight, body fat, caloric consumption, brainwave, voice, skin resistance, electromyogram, electrocardiogram, walk, ultrasonic image, sleep state, look (face), pupil dilation, and eye blinking. According to an embodiment, the first control unit 107 may analyze a biological signal so as to generate biological information (or referred to as biological characteristic information). As an example, a pulse wave signal acquired through an HRV (Heart Rate Variability) sensor may the biological signal. The first control unit 107 may obtain primary biological information, such as a mean heart rate or an HRV-index, by analyzing the biological signal, and may obtain secondary biological information, such as a highly difficult stress state or blood vessel senility by further processing the biological information.

For example, the first control unit 107 may detect, through the first sensor unit 104, at least one of: a position (or angular position), rotation or a rotating angle (or rotating amount) of at least a part of the time indicating unit 140; a position (or angular position), rotation or a rotating angle (or rotating amount) of the auxiliary indicating unit; a position (or angular position), rotation or a rotating angle (or rotating amount) of watch stem 151; a position (or angular position), rotation or a rotating angle (or rotating amount) of watch stem rotating shaft 152; a position (or longitudinal position), a movement or a moving amount of the watch stem 151; and/or a position (or longitudinal position), a movement or a moving amount of a watch stem rotating shaft 152.

Alternatively, through a sensor unit in the form of an integrated circuit chip disposed within the drive unit 150 in place of the first sensor unit 104, the position or state of each of the gears that are mechanically connected to the time indicating unit 140, the auxiliary indicating unit, and the watch stem may be sensed.

The first battery 170 may supply power to the circuit board 160 (and the drive unit 150 and/or the at least one first sensor 131, 132 or 133) under the control of the first control unit 107 or according to an automatic setting.

The first memory 105 may include a volatile memory and/or non-volatile memory. The first memory 105 may store, for example, commands or data related to at least one constituent element of the wearable device 100. The first memory 105 may store software and/or a program.

The first communication unit 106 may perform, for example, a communication between the wearable device 100 and a mobile device. For example, the first communication unit 106 may be connected to a network via a wireless communication or a wired communication so as to communicate with a mobile device.

The first control unit 107 may include one or more of a Central Processing Unit (CPU), an Application Processor (AP), and a Communication Processor (CP). The first control unit 107 may execute, for example, an arithmetic operation or a data processing related to a control and/or a communication of at least one of other constituent elements of the wearable device 100.

Figure 17:
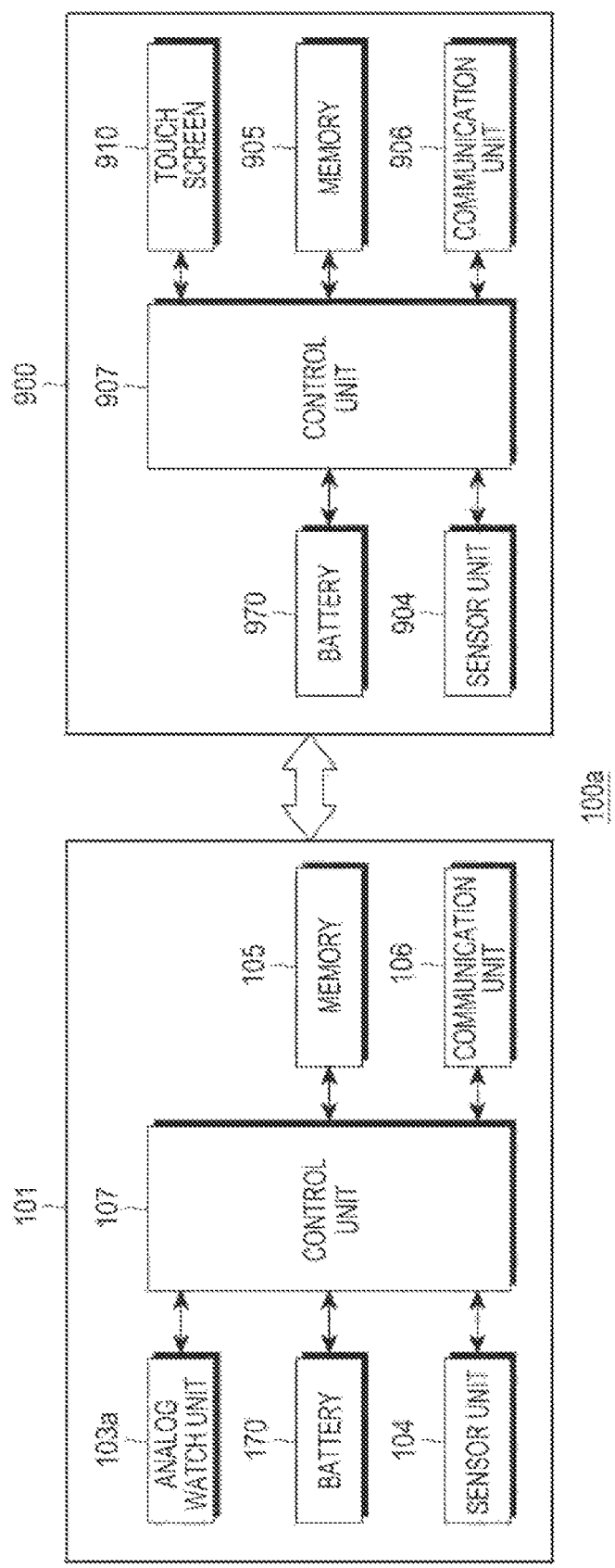
FIG. 17 is a first configuration example of a wearable device according to a second embodiment.

FIG. 17 illustrates a first configuration example of a wearable device according to a second embodiment.

The wearable device 100*a* may include a main body 101 and a mounting unit 900.

The main body 101 may include an analog watch unit 103*a*, a first battery 170, a first sensor unit 104 including at least one sensor, a first memory 105, a first communication unit 106 including a first connector 180, and a first control unit 107.

The mounting unit 900 may include a touch screen 910, a second battery 970, a second sensor unit 904 including at least one sixth sensor 931, 932, 933, or 934, a second memory 905, a second communication unit 906 including a second connector 980, and a second control unit 907.

At least a part of the analog watch unit 103*a* may perform an operation according to control data/signal of the first control unit 107 or the second control unit 907.

For example, in order to display the present time, the drive unit 150 may automatically drive the time indicating unit 140, or may control a position and/or an operation of at least a part of the time indicating unit 140 according to control data/signal which is received from the first control unit 107 or from the second control unit 907 through the second communication unit 906.

For example, the drive unit 150 may control a position and/or an operation of at least a part of the auxiliary indicating unit 144 that provides at least one auxiliary function, such as date display, heart display, and/or metronome display according to control data/signal of the first control unit 107 or the second control unit 907. The auxiliary indicating unit 144 may include at least one auxiliary indicator that is mechanically driven. For example, the auxiliary indicating unit (e.g., see 2510 in FIG. 25) may include a needle or a weight that reciprocates left and right, according to heartbeat or cycle, and/or a date indicator that is formed on a rotating substrate.

The first sensor unit 104 may include a plurality of sensors, and may sense a state and/or position of at least a part of the analog watch unit 103*a* through the plurality of sensors. Each sensor may output the sensed information to the first control unit 107. The sensed information of the first sensor unit 104 may be transmitted to the mounting unit 900 through the first communication unit 106, and the second control unit 907 may receive the sensed information through the second communication unit 906. The first control unit 107 and/or the second control unit 907 may detect the state and/or the position of at least a part of the analog watch unit 103*a* through the sensed information. In an embodiment, the first sensor unit 104 may include a biometric sensor that detects a biological signal/information by being in proximity to or in contact with a portion of the user's body. The first control unit 107 and/or the second control unit 907 may generate biological information (or referred to as biological characteristic information), such as pulse, heartbeat, oxygen saturation, and/or blood flow by analyzing the biological signal.

For example, the first control unit 107 and/or the second control unit 907 may detect, through the first sensor unit 104, at least one of: a position (or angular position), rotation or a rotating angle (or rotating amount) at least a part of the time indicating unit 140; a position (or angular position), rotation or a rotating angle (or rotating amount) at least a part of the auxiliary indicating unit; a rotating position (or angular position), rotation or a rotating angle (or rotating amount) of at least a part of the watch stem 151; a position (or angular position), rotation or a rotating angle (or rotating amount) of the watch stem rotating shaft 152; a position (or longitudinal position), a movement or a moving amount of at least a part of watch stem 151; and/or a position (or longitudinal position), a movement or a moving amount of the watch stem rotating shaft 152.

The first battery 170 may supply power to corresponding constituent elements of the main body 101 (e.g., the circuit board 160, the drive unit 150, and/or at least one first sensor 131, 132, or 133) according to the control of the first control unit 107 or automatic setting. The main body 101 may transmit power to the mounting unit 900 through the first communication unit 106 according to the control data/signal of the first control unit 107 or the second control unit 907, and the mounting unit 900 may charge the second battery 970 with the received power or may supply the power to corresponding constituent elements of the mounting unit 900. The main body 101 may receive power from the mounting unit 900 through the first communication unit 106 according to the control data/signal of the first control unit 107 or the second control unit 907, and the main body 101 may charge the first battery 170 with the received power or may supply the power to constituent elements of the main body 101. For example, the main body 101 and the mounting unit 900 may perform power reception/supply using the first connector 180 and at least one power terminal 982 of the second connector 980.

The first memory 105 may store, for example, commands or data related to constituent elements of at least one of the main body 101 or the mounting unit 900. For example, each of the first memory 105 and the second memory 905 may store a command list for controlling the drive unit 150. For example, the command list may include at least one of, for example: a time adjustment command, an operation mode setting command, a date adjustment command, and a frequency adjustment command.

The first communication unit 106 may perform, for example, a data communication between the main body 101 and the mounting unit 900. For example, the first communication unit 106 and the second communication unit 906 may perform a wired communication using the first connector 180 and at least one data terminal 981 of the second connector 980, or a wireless communication. As the wired communication type, for example, at least one of I2C, RS232, USB, digital I/O (information delivery through an on/off bit signal), and analog I/O (information delivery using a change of an analog value) may be used. As the wireless communication type, for example, at least one of BLE (Bluetooth Low Energy) and ANT+ may be used.

The first control unit 107 may include at least one or more of a Central Processing Unit (CPU), an Application Processor (AP), and a Communication Processor (CP). The first control unit 107 may execute, for example, an arithmetic operation or a data processing related to a control and/or a communication of at least one of other constituent elements of the main body 101.

The touch screen 910 may sense a user input (e.g., a touch or hovering). The touch screen 910 may use, for example, a resistive type, a capacitive type, a pressure sensitive type, an infrared type, an ultrasonic type, an Electro-Magnetic (EM) type, an Electro-Magnetic Resonance (EMR) type, or a combination thereof. The touch screen 910 may sense the user input made through a user's finger or a pen, and may output the sensed information to the second control unit 907. The sensed information of the touch screen 910 may be transmitted to the main body 101 through the second communication unit 906, and the first control unit 107 may receive the sensed information through the first communication unit 106. The first control unit 107 and/or the second control unit 907 may detect the user input information through the sensed information.

The second sensor unit 904 may include one or more sixth sensors 931 to 934, and the second sensor unit 904 may sense the position of at least a part of the time indicating unit 140 through the one or more sixth sensors 931 to 934. Each sensor may output the sensed information to the second control unit 907. The sensed information of the second sensor unit 904 may be transmitted to the main body 101 through the second communication unit 906, and the first control unit 107 may receive the sensed information through the first communication unit 106. The first control unit 107 and/or the second control unit 907 may detect the position of at least a part of the time indicating unit 140 through the sensed information. In an embodiment, the second sensor unit 904 may include a biometric sensor that detects a biological signal/information by being in proximity to or in contact with a part of the user's body. The first control unit 107 and/or the second control unit 907 may generate biological information (or referred to as biological characteristic information), such as pulse, heartbeat, oxygen saturation, and/or blood flow, by analyzing the biological signal.

The second battery 970 may supply power to corresponding constituent elements of the mounting unit 900 (e.g., the touch screen 910, the second sensor unit 904, the second memory 905, the second communication unit 906, and/or the second control unit 907) according to the control of the second control unit 907 or automatic setting. The mounting unit 900 may supply the power to the main body 101 through the second communication unit 906 or may receive the power from the main body 101 according to the control data/signal of the second control unit 907 or the first control unit 107. The first and second batteries 170 and 970 may be connected in a wired manner or a wireless manner (e.g., a resonance method or an inductive method).

The second memory 905 may store, for example, commands or data related to constituent elements of at least one of the main body 101 and the mounting unit 900. For example, the second memory 905 may store a command list for controlling the drive unit 150.

The second communication unit 906 may perform, for example, a data communication between the main body 101 and the mounting unit 900.

The second control unit 907 may include one or more of a Central Processing Unit (CPU), an Application Processor (AP), and a Communication Processor (CP). The second control unit 907 may execute an arithmetic operation or a data processing related to the control and/or the communication of at least one of the other constituent elements of the mounting unit 900.

For the data communication between the main body 101 and the mounting unit 900, a frame with a format as in Table 1 below may be used.

TABLE 1

| Start | Length | Command | Data | CRC | End |

The frame may include a start field that includes an indicator indicating the start of the frame, a length field that includes a length of data (and or command), a command field that includes a pre-set command (or a type field that indicates a type of data), a data field that includes data, a Cyclic Redundancy Check (CRC) field that includes information for error check of the frame, and an end field that includes an indicator indicating the end of the frame.

When data are delivered between the main body 101 and the mounting unit 900 in a streaming manner, or the main body 101 and the mounting unit 900 are time-synchronized and thus exchange data at regular intervals, the start field and the end field may be omitted from the frame. When a data length is constant, the length field may be omitted from the frame.

For example, when time synchronization is performed between the main body 101 and the mounting unit 900, the frame may include the start field, the length field, the command field that includes information indicating the time synchronization, the data field that includes time, a CRC field, and the end field.

For example, when time setting between the main body 101 and the mounting unit 900 (e.g., time adjustment of the time indicating unit 140 through the touch screen 910, or adjustment of the time displayed on the touch screen 910 using the watch stem 151) is performed, the frame may include the start field, the length field, the command field that includes information indicating the time setting, the data field that includes time, the CRC field, and the end field.

For example, when time notification between the main body 101 and the mounting unit 900 is performed, the frame may include the start field, the length field, the command field that includes information indicating the time notification, the data field including time, the CRC field, and the end field.

For example, when alarm setting between the main body 101 and the mounting unit 900 is performed, the frame may include the start field, the length field, the command field that includes information indicating the alarm setting, the data field that includes alarm time, the CRC field, and the end field.

For example, when the main body 101 performs a screen control of the mounting unit 900, the frame may include the start field, the length field, the command field that includes information indicating the screen control, the data field that includes screen control information/contents, the CRC field, and the end field.

For example, when main body 101 performs screen scroll of the mounting unit 900 (e.g., delivery of a scroll value according to a rotating amount of the watch stem 151), the frame may include the start field, the length field, the command field that includes information indicating the screen scroll, the data field that includes the direction/degree/speed of the screen scroll, the CRC field, and the end field.

For example, when data delivery between the main body 101 and the mounting unit 900 is performed (e.g., an alarm is simultaneously set to the mounting unit 900 and the smart phone when a specific command using the watch stem 151 (e.g., the watch stem is pushed twice) is input after the alarm setting using the watch stem 151), the frame may include the start field, the length field, the command field that includes information indicating the data delivery, the data field that includes data to be delivered, the CRC field, and the end field.

The commands are stored in each of the main body 101 and the mounting unit 900, and the commands stored or to be stored in each of the main body 101 and the mounting unit 900 may be transmitted to each of the main body 101 and the mounting unit 900 through, for example, firmware update.

Figure 18A:
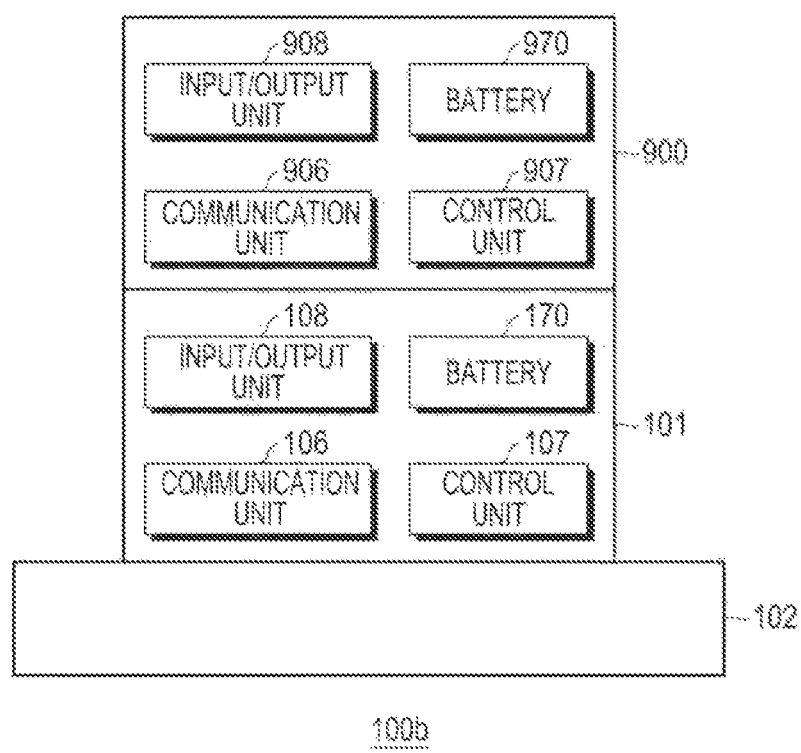
FIG. 18A illustrates a second configuration of the wearable device according to the second embodiment.

FIG. 18A illustrates a second configuration example of the wearable device according to the second embodiment.

The wearable device 100b may include a main body 101, a mounting unit 900, and a band 102 that fixes the main body 101 to a user's wrist.

The main body 101 may include a first input/output unit 108 for a user input/output interface (such as an operating unit (such as a watch stem), a button, a touch screen, or a microphone), a first battery 170 for power supply, a first communication unit 106 for wired/wireless communication with the mounting unit 900 or an external device, and a first control unit 107 that controls the entire functions of the main body 101.

The mounting unit 900 may include a second input/output unit 908 for a user input/output interface (such as an operating unit (such as a watch stem), a button, a touch screen, or a microphone), a second battery 970 for power supply, a second communication unit 906 for wired/wireless communication with the main body 101 or an external device, and a second control unit 907 that controls the entire functions of the mounting unit 900.

The mounting unit 900 may be supplied with power from the first battery 170 of the main body 101. The main body 101 may be supplied with power from the second battery 970 of the mounting unit 900. The main body 101 may transmit a user input received through the first input/output unit 108 and/or the state of the analog watch unit 103a to the mounting unit 900. The mounting unit 900 may transmit a user input received through the second input/output unit 908 and/or the state of the analog watch unit 103a to the main body 101. The first control unit 107 of the main body 101 may perform a control of the first input/output unit 108, the second input/output unit 908 and/or the analog watch unit 103a. The first control unit 107 of the main body 101 may perform a control of the first input/output unit 108, the second input/output unit 908, or the analog watch unit 103a according to the state of the analog watch unit 103a, the user input through the first input/output unit 108, or the user input through the second input/output unit 908. The second control unit 907 of the mounting unit 900 may control the first input/output unit 108, the second input/output unit 908, or the analog watch unit 103a according to the state of the analog watch unit 103a, the user input through the first input/output unit 108, or the user input through the second input/output unit 908.

Figure 18B:
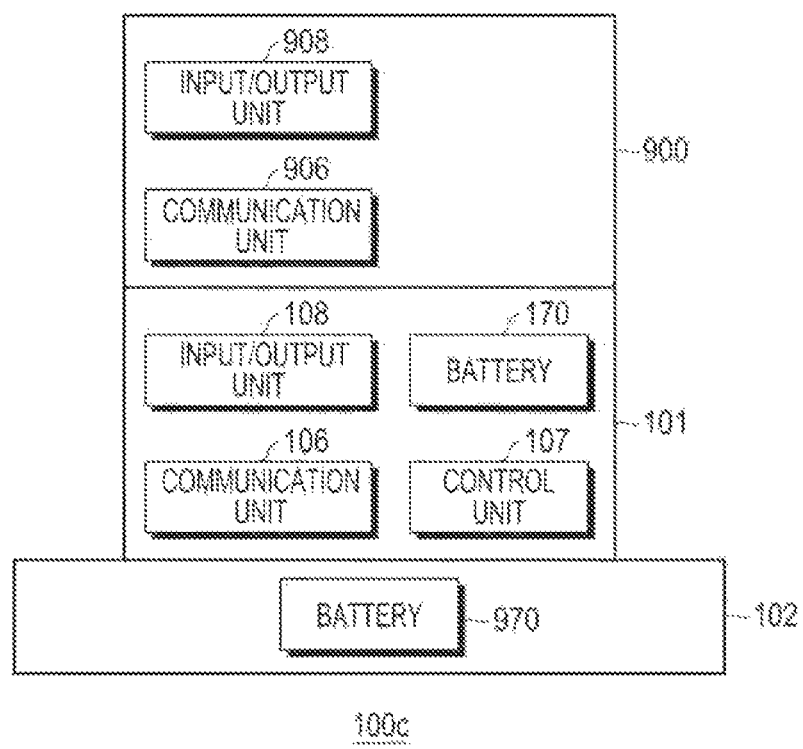
FIG. 18B illustrates a third configuration of the wearable device according to the second embodiment.

FIG. 18B illustrates a third configuration example of the wearable device according to the second embodiment.

The wearable device 100c may include a main body 101, a mounting unit 900, and a band 102 that fixes the main body 101 to the user's wrist.

The main body 101 may include a first input/output unit 108 for a user input/output interface (such as an operating unit (such as a watch stem), a button, a touch screen, or a microphone), a first battery 170 for power supply, a first communication unit 106 for wired/wireless communication with the mounting unit 900 or an external device, and a control unit 107 that controls the entire functions of the main body 101 and/or the mounting unit 900.

The mounting unit 900 may include a second input/output unit 908 for a user input/output interface, such as an operating unit (such as a watch stem), a button, a touch screen, or a microphone, and a second communication unit 906 for wired/wireless communication with the main body 101 or an external device. The band 102 may include a second battery 970 for power supply.

The mounting unit 900 may be supplied with power from the second battery 970 of the band 102 or the first battery 170 of the main body 101. The mounting unit 900 may transmit the user input received through the second input/output unit 908 and/or the state of the analog watch unit 103*a* to the main body 101. The main body 101 may be supplied with power from the second battery 970 of the band 102. The control unit 107 of the main body 101 may control the first input/output unit 108, the second input/output unit 908, or the analog watch unit 103*a*, according to the state of the analog watch unit 103*a*, the user input through the first input/output unit 108, or the user input through the second input/output unit 908.

Figure 18C:
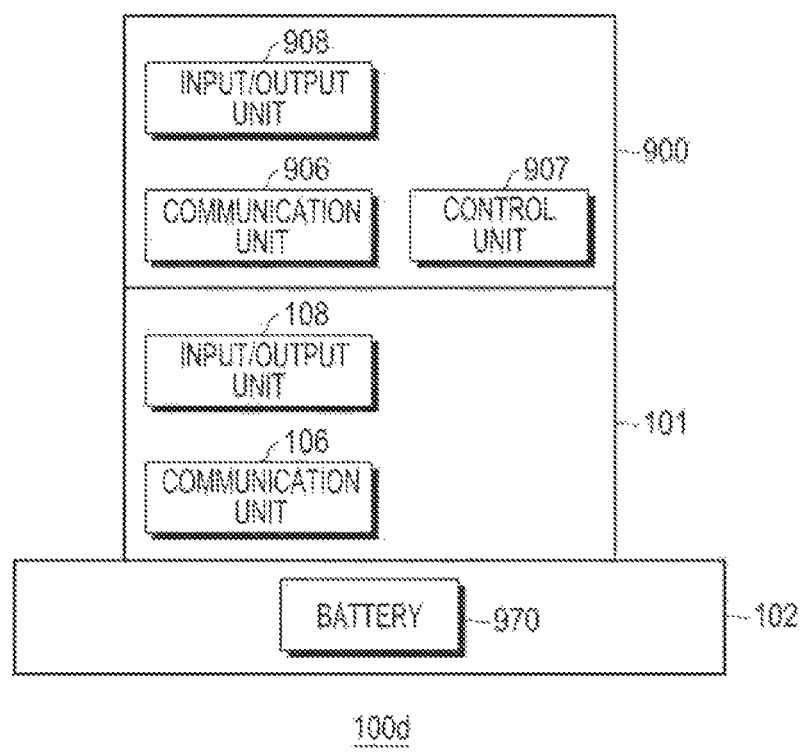
FIG. 18C illustrates a fourth configuration of the wearable device according to the second embodiment.

FIG. 18C is a fourth configuration example of the wearable device according to the second embodiment.

The wearable device 100*d* may include a main body 101, a mounting unit 900, and a band 102 that fixes the main body 101 to the user's wrist.

The main body 101 may include a first input/output unit 108 for a user input/output interface, such as an operating unit (such as a watch stem), a button, a touch screen, or a microphone, and a first communication unit 106 for wired/wireless communication with the mounting unit 900 or an external device. The mounting unit 900 may include a second input/output unit 908 for a user input/output interface (such as an operating unit (such as a watch stem), a button, a touch screen, or a microphone), a second communication unit 906 for wired/wireless communication with the main body 101 or an external device, and a control unit 907 that controls the entire functions of the main body 101 and/or the mounting unit 900. The band 102 may include a battery 970 for power supply.

The mounting unit 900 may be supplied with power from the battery 970 of the band 102. The main body 101 may be supplied with power from the battery 970 of the band 102. The main body 101 may transmit the user input received through the first input/output unit 108 and/or the state of the analog watch unit 103*a* to the mounting unit 900. The control unit 907 of the mounting unit 900 may control the first input/output unit 108, the second input/output unit 908, or the analog watch unit 103*a* according to the state of the analog watch unit 103*a*, the user input through the first input/output unit 108, or the user input second through the input/output unit 908.

Figure 18D:
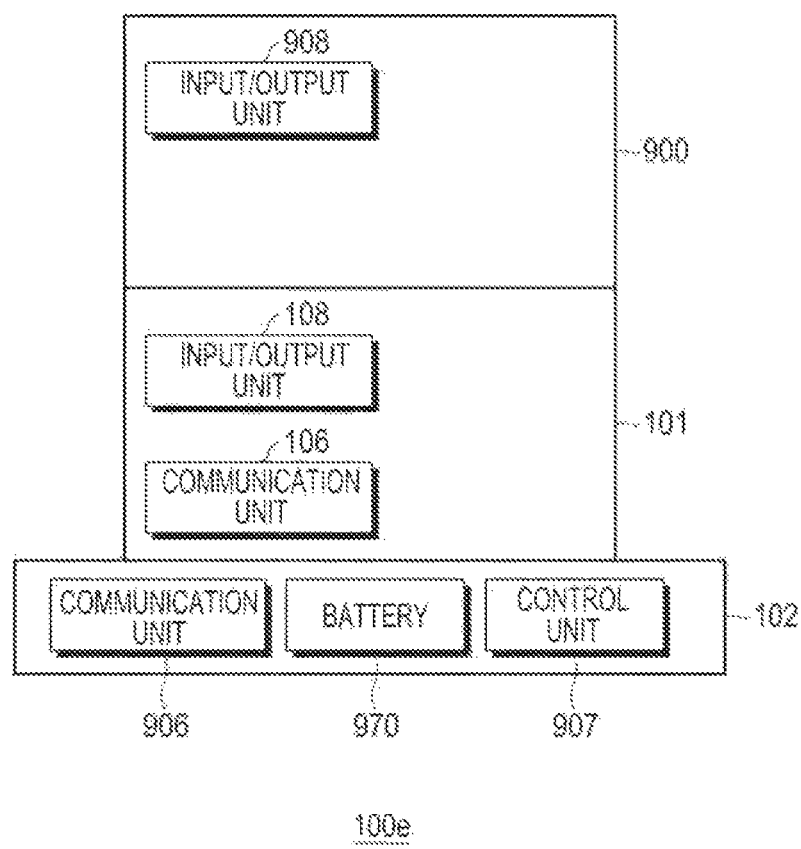
FIG. 18D illustrates a fifth configuration of the wearable device according to the second embodiment.

FIG. 18D illustrates a fifth configuration example of the wearable device according to the second embodiment.

The wearable device 100*e* may include a main body 101, a mounting unit 900, and a band 102 that fixes the main body 101 to the user's wrist.

The main body 101 may include a first input/output unit 108 for a user input/output interface (such as an operating unit (such as a watch stem), a button, a touch screen, or a microphone), and a first communication unit 106 for wired/wireless communication with the band 102 or an external device.

The mounting unit 900 may include a second input/output unit 908 for a user input/output interface (such as an operating unit (such as a watch stem), a button, a touch screen, or a microphone). The band 102 may include a battery 970 for power supply, a second communication unit 906 for wired/wireless communication with the main body 101 or an external device, and a control unit 907 that controls the entire functions of the mounting unit 900 and/or the main body 101.

The mounting unit 900 may be supplied with power from the battery 970 of the band 102. The main body 101 may be supplied with power from the battery 970 of the band 102. The main body 101 may transmit the user input received through the first input/output unit 108 to the band 102. The mounting unit 900 may transmit the user input received through the second input/output unit 908 to the band 102. The control unit 907 of the band 102 may control the first input/output unit 108, the second input/output unit 908, or the analog watch unit 103*a* according to the state of the analog watch unit 103*a*, the user input through the first input/output unit 108, or the user input through the second input/output unit 908.

Figure 18E:
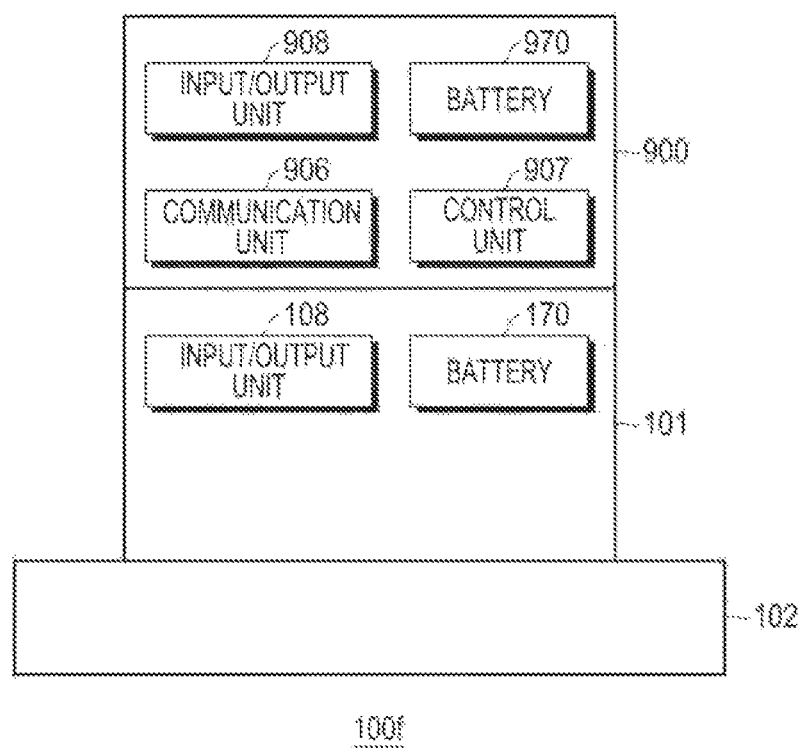
FIG. 18E illustrates a sixth configuration of the wearable device according to the second embodiment.

FIG. 18E illustrates a sixth configuration example of the wearable device according to the second embodiment.

The wearable device 100*f* may include a main body 101, a mounting unit 900, and a band 102 that fixes the main body 101 to the user's wrist.

The main body 101 may include a first input/output unit 108 for a user input/output interface (such as an operating unit (such as a watch stem), a button, a touch screen, or a microphone), and a first battery 170 for power supply.

The mounting unit 900 may include a second input/output unit 908 for a user input/output interface (such as an operating unit (such as a watch stem), a button, a touch screen, or a microphone), a second battery 970 for power supply, a communication unit 906 for wired/wireless communication with an external device, and a control unit 907 that controls the entire functions of the mounting unit 900.

The control unit 907 of the mounting unit 900 may sense a position of at least a part of the indicating unit 140 or 144 of the main body 101 through the sensor unit 904. The control unit 907 may detect information (or state information) associated with the main body 101, such as time information, date information, and/or indicating information of the indicating unit, through the sensing of the indicating unit 140 or 144. The control unit 907 may perform an operation based on the detected information (or state information) associated with the main body 101. For example, the control unit 907 may display the time information of the main body 101 on the touch screen 910.

Figure 18F:
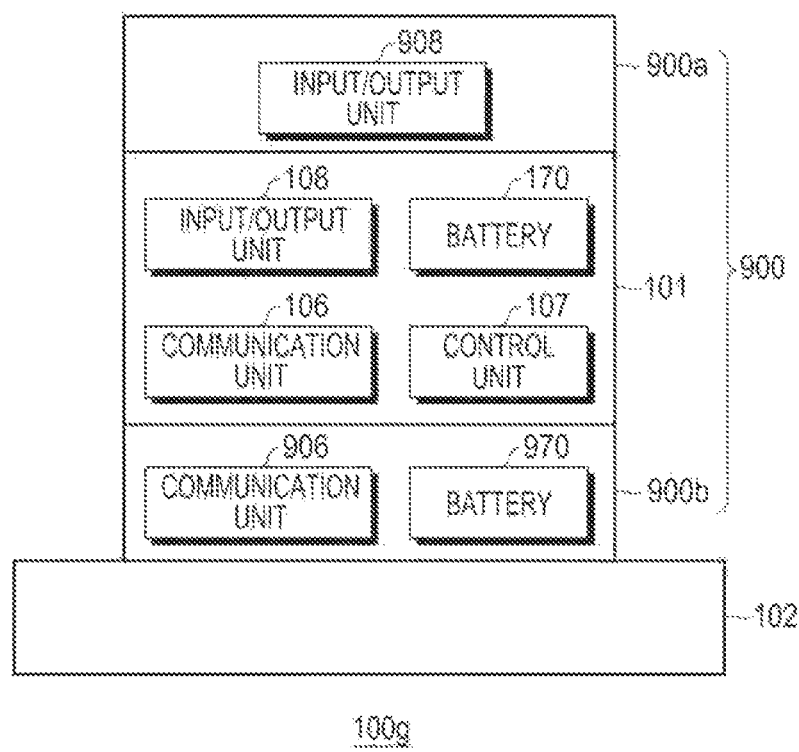
FIG. 18F illustrates a seventh configuration of the wearable device according to the second embodiment.

FIG. 18F is a seventh configuration example of the wearable device according to the second embodiment.

The wearable device 100*g* may include a main body 101, a mounting unit 900, and a band 102 that fixes the main body 101 to the user's wrist.

The mounting unit 900 may include a first portion 900*a* and a second portion 900*b*. The mounting unit 900 and the main body 101 may be coupled to each other by using the above-described methods (e.g. coupling using a screw, coupling using a male screw (recess), coupling using an engagement step (recess), and/or coupling using a snap-fit, coupling using a magnet).

The main body 101 may include a first input/output unit 108 for a user input/output interface (such as an operating unit (such as a watch stem), a button, a touch screen, or a microphone), a first battery 170 for power supply, a first communication unit 106 for wired/wireless communication with the mounting unit 900 or an external device, and a control unit 107 that controls the entire functions of the main body 101.

The first portion 900*a* of the mounting unit 900 may include a second input/output unit 908 for a user input/ output interface (such as an operating unit (such as a watch stem), a button, a touch screen, or a microphone).

The second portion 900b of the mounting unit 900 may include a second battery 970 for power supply, and a second communication unit 906 for wired/wireless communication with an external device.

The mounting unit 900 may transmit the user input received through the second input/output unit 908 and/or the state of the analog watch unit 103a to the main body 101. The control unit 107 of the main body 101 may control the first input/output unit 108, the second input/output unit 908, or the analog watch unit 103a, e.g., according to the state of the analog watch unit 103a, the user input through the first input/output unit 108, or the user input through the second input/output unit 908.

Figure 18G:
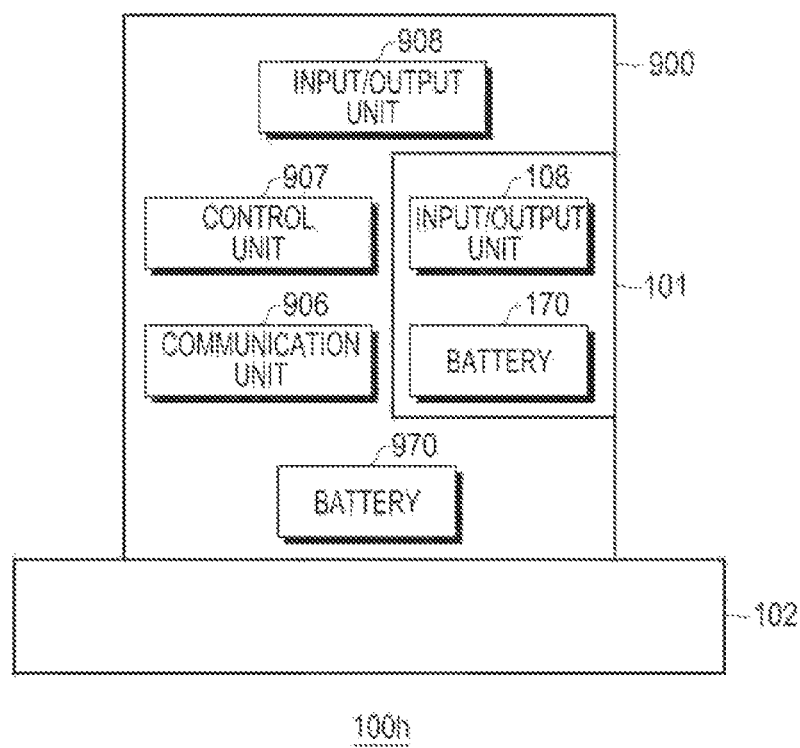
FIG. 18G illustrates an eighth configuration of the wearable device according to the second embodiment.

FIG. 18G illustrates an eighth configuration example of the wearable device according to the second embodiment.

The wearable device 100h may include a main body 101, a mounting unit 900, and a band 102 that fixes the main body 101 to the user's wrist.

The mounting unit 900 may have a C-shape having an opening, into which the main body 101 may be inserted. When the main body 101 is inserted into the mounting unit 900, the mounting unit 900 and the main body 101 may be coupled to each other.

The main body 101 may include, a first input/output unit 108 for a user input/output interface (such as an operating unit (such as a watch stem), a button, a touch screen, or a microphone), and a first battery 170 for power supply.

The mounting unit 900 may include a second input/output unit 908 for a user input/output interface (such as an operating unit (such as a watch stem), a button, a touch screen, or a microphone), a second battery 970 for power supply, a communication unit 906 for wired/wireless communication with an external device, and a control unit 907 that controls the entire functions of the mounting unit 900.

The control unit 907 of the mounting unit 900 may sense a position of at least a part of the indicating unit 140 or 144 of the main body 101 through the sensor unit 904. The control unit 907 may detect information (or state information) associated with the main body 101, such as time information, date information, and/or indicating information of the indicating unit through the sensing of the indicating unit 140 or 144. The control unit 907 may perform an operation based on the detected information (or state information) associated with the main body 101. For example, the control unit 907 may display time information of the main body 101 on the touch screen 910.

Figure 18H:
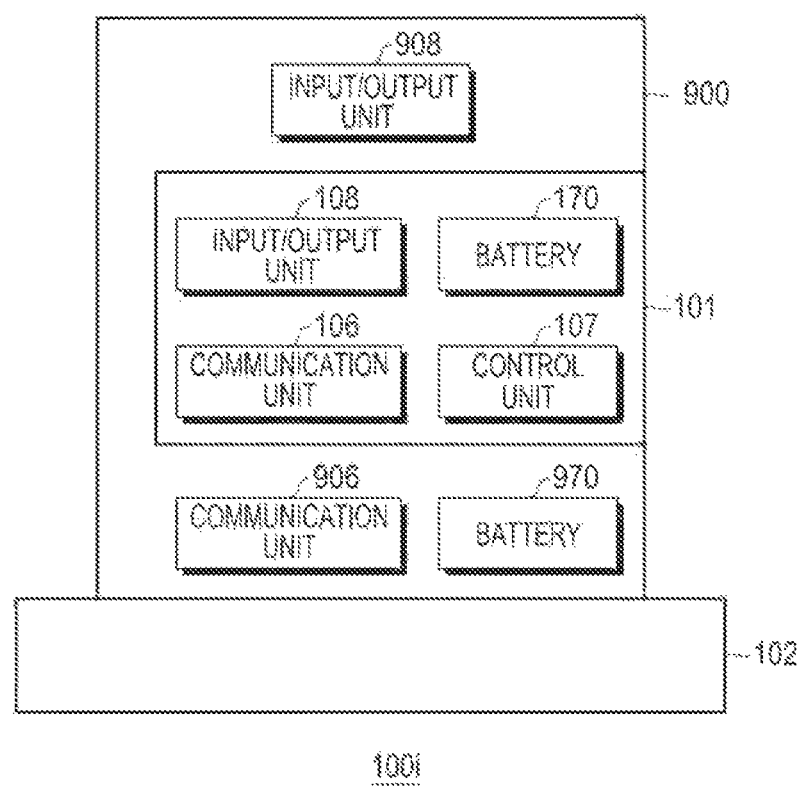
FIG. 18H illustrates a ninth configuration of the wearable device according to the second embodiment.

FIG. 18H illustrates a ninth configuration example of the wearable device according to the second embodiment.

The wearable device 100i may include a main body 101, a mounting unit 900, and a band 102 that fixes the main body 101 to the user's wrist.

The mounting unit 900 may have a C-shape including an opening, into which the main body 101 may be inserted. When the main body 101 is inserted into the inside of the mounting unit 900, the mounting unit 900 and the main body 101 may be coupled to each other.

The main body 101 may include a first input/output unit 108 for a user input/output interface (such as an operating unit (such as a watch stem), a button, a touch screen, or a microphone), a first battery 170 for power supply, a first communication unit 106 for wired/wireless communication with the mounting unit 900 or an external device, and a control unit 107 that controls the entire functions of the main body 101.

The mounting unit 900 may include a second input/output unit 908 for user input (such as an operating unit (such as a watch stem), a button, a touch screen, or a microphone), a second battery 970 for power supply, and a second communication unit 906 for wired/wireless communication with an external device.

The mounting unit 900 may transmit the user input received through the second input/output unit 908 and/or the state of the analog watch unit 103a to the main body 101. The control unit 107 of the main body 101 may control the first input/output unit 108, the second input/output unit 908, or the analog watch unit 103a, e.g., according to the state of the analog watch unit 103a, the user input through the first input/output unit 108, or the user input through the second input/output unit 908.

Figure 19A:
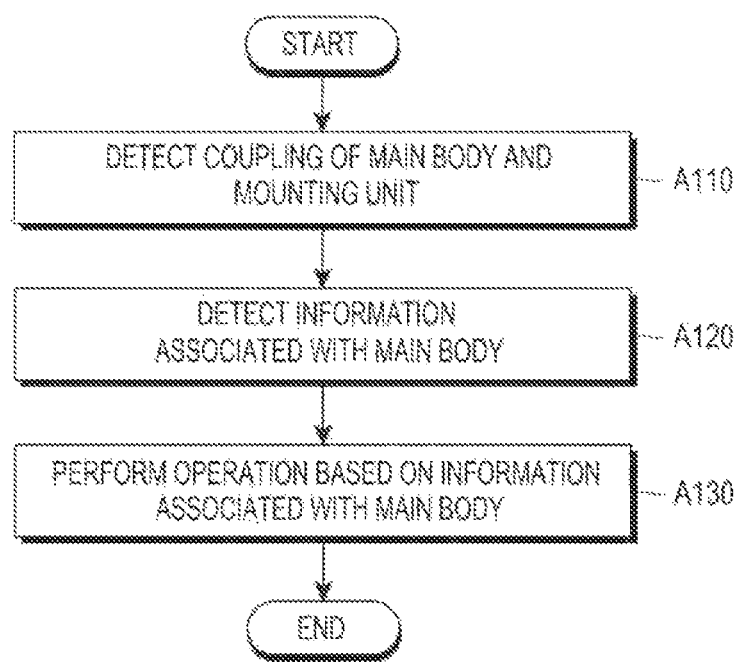
FIG. 19A is a flowchart for describing a first example of an operating method of the mounting unit.

FIG. 19A is a flowchart for describing a first example of a method of operating the mounting unit. The method may include operations A110 to A130.

At operation A110, the control unit 907 of the mounting unit 900 may detect the coupling between the main body 101 and the mounting unit 900. For example, the control unit 907 may detect the coupling of the main body 101 and the mounting unit 900 based on: coupling of the connectors of the main body 101 and the mounting unit 900 (e.g., the first connector 180 and the second connector 980, and the first electric contact 801 and the second electric contact of the main body 101); sensed information of the second sensor unit 904; an input associated with the coupling of the main body 101 and the mounting unit 900 through the second input/output unit 908 for user input (such as an operating unit (such as a watch stem), a button, a touch screen, or a microphone); and reception of data/signal associated with the coupling of the main body 101 and the mounting unit 900 through the second communication unit 906.

At operation A120, the control unit 907 may detect information (or state information) associated with the main body 101. For example, the control unit 907 may sense a position of at least a part of the indicating unit 140 or 144 of the main body 101 through the sensor unit 904. The control unit 907 may detect information (or state information) associated with the main body 101, such as time information, date information, indicating information of the indicating unit, through the sensing of the indicating unit 140 or 144.

At operation A130, the control unit 907 may perform an operation based on the information (or state information) associated with the main body 101.

For example, the control unit 907 may display at least one of the time information, date information, and the indicating information of the indicating unit of the main body 101, the model information of the main body 101, etc. on the touch screen 910.

For example, the control unit 907 may perform an alarm function based on the time indicated by the main body 101.

For example, the control unit 907 may perform a smart watch mode, and the control unit 907 may display a home screen of the smart watch mode on the touch screen 910.

For example, the control unit 907 may display graphic elements based on the information associated with the main body 101 (e.g., a menu, an icon, a text, and/or an item) on the touch screen 910.

For example, the control unit 907 may perform a roaming watch function based on the information associated with the main body 101. When the main body 101 indicates the time/date of a first area, the control unit 907 may display the time/date of a second area on the touch screen 910.

For example, the control unit 907 may perform a stop watch function.

For example, the control unit 907 may change the position of a graphic element displayed on the touch screen 910 at least once so that the graphic element is not covered by (or does not overlap with) the indicating unit 140 or 144 of the main body 101.

For example, the control unit 907 may display the position of the sun/moon/star/constellation on the touch screen 910 based on the position of the indicating unit 140 or 144 of the main body 101.

For example, the control unit 907 may adjust an attribute, such as, the size, position, color, or transparency of a graphic element on the touch screen 910 which exists at a position equal to or proximate to the position of the indicating unit 140 or 144 of the main body 101.

Figure 19B:
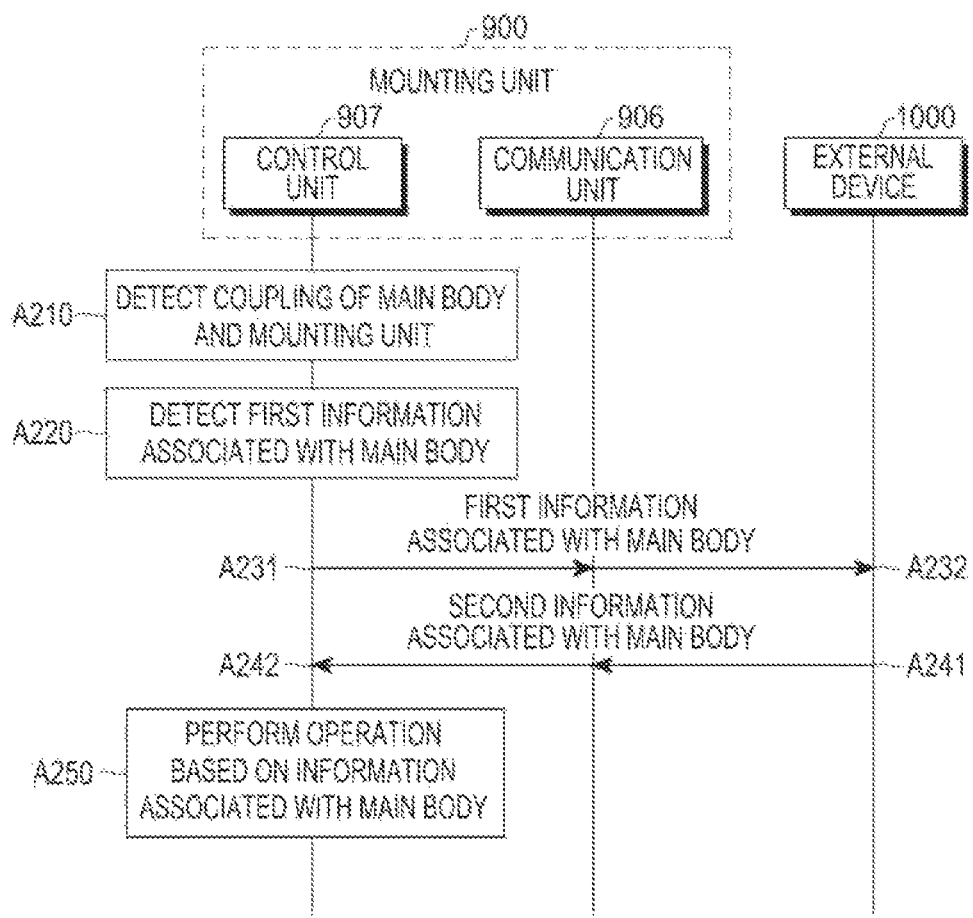
FIG. 19B is a flowchart for describing a second example of an operating method of the mounting unit.

FIG. 19*b* is a flowchart for describing a second example of the operating method of the mounting unit. The method may include operations A210 to A250.

At operation A210, the control unit 907 of the mounting unit 900 may detect the coupling of the main body 101 and the mounting unit 900.

At operation A220, the control unit 907 may detect first information (or state information) associated with the main body 101. The first information associated with the main body 101 may include at least one of, for example: information indicating a position of at least a part of the indicating unit 140 or 144 of the main body 101, which is sensed through the sensor unit 904; an image indicating the front surface of the main body 101, which is acquired through the sensor unit 904 (e.g., an image of a watch plate 145 or the indicating unit 140 or 144); and information recognized from the front image of the main body 101 (e.g., a brand/model name, or a position of at least a part of the indicating unit 140 or 144).

At operation A231, the control unit 907 may deliver at least a part of the first information associated with the main body 101 to the communication unit 906.

At operation A232, communication unit 906 may transmit at least a part of the first information associated with the main body 101 to an external device 1000 in a wired or wireless manner.

At operation A241, the external device 1000 may retrieve (or search for) or generate a second information associated with the main body 101 based on at least a part of the first information associated with the main body 101, and may transmit the second information associated with the main body 101 to the mounting unit 900 in a wired or wireless manner. The second information associated with the main body 101 may include at least one of, for example: information for configuring a screen to be displayed on the touch screen 910 of the mounting unit 900 (e.g., a wallpaper image, a menu, an icon, an item, or a theme/theme resource), information for displaying/changing the time/date (e.g., the time/date of the second area), and information (e.g., a brand/model name, or a position of at least a part of the indicating unit 140 or 144) recognized from an image (e.g., the front image of the main body 101) included in the first information.

At operation A242, the communication unit 906 may deliver the second information associated with the main body 101, which is received from the external device 1000, to the control unit 907.

At operation A250, the control unit 907 may perform an operation based on the first and/or second information associated with the main body 101.

Figure 19C:
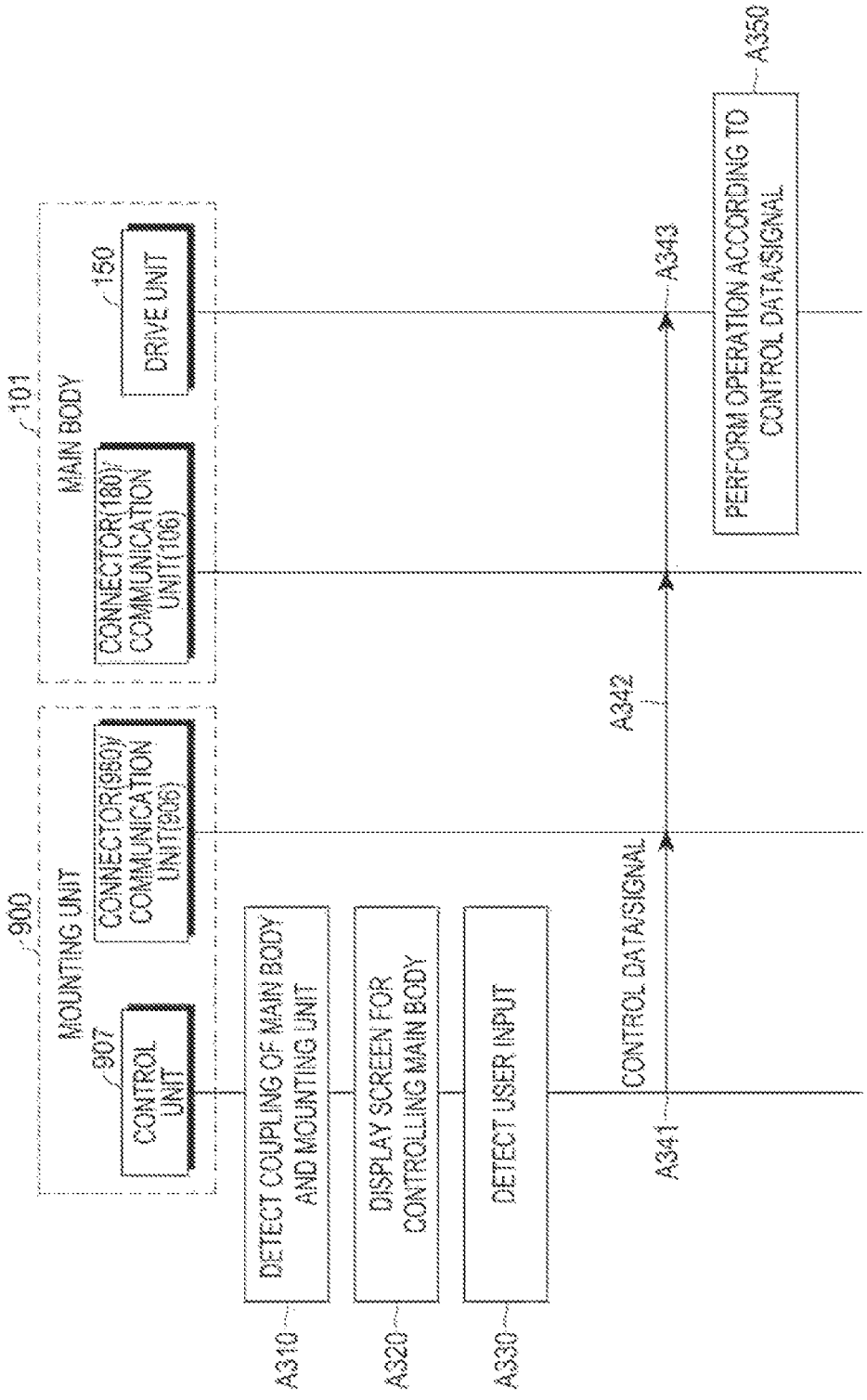
FIG. 19C is a flowchart for describing a third example of an operating method of the mounting unit.

FIG. 19C is a flowchart for describing a third example of the operating method of the mounting unit. The method may include operations A310 to A350.

At operation A310, the control unit 907 of the mounting unit 900 may detect the coupling of the main body 101 and the mounting unit 900.

At operation A320, the control unit 907 may display a screen for controlling the main body 101 on the touch screen 910.

At operation A330, the control unit 907 may detect a user input for a graphic element displayed on the touch screen 910 through the input/output unit 908 for user input, such as an operating unit (such as a watch stem), a button, the touch screen 910, or a microphone.

At operation A341, the control unit 907 may deliver control data/signal to the second connector 980/second communication unit 906.

At operation A342, the second connector 980/second communication unit 906 may deliver/transmit the control data/signal to the first connector 180/first communication unit 106 of the main body 101.

At operation A343, the first connector 180/first communication unit 106 may deliver the control data/signal received from the mounting unit 900 to the drive unit 150 of the main body 101.

At operation A350, the drive unit 150 may perform an operation according to the control data/signal. For example, the drive unit 150 may mechanically operate the indicating unit 140 or 144 and/or the watch stem 151 according to the control data/signal.

For example, the control unit 907 may transmit the control data/signal for changing the time/date to the main body 101, and the drive unit 150 of the main body 101 may change the time/date through the mechanical driving of the indicating unit 140 or 144 and/or the watch stem 151 according to control data/signal.

According to an embodiment, at operation A320, the control unit 907 may display a screen including a graphic element for time control of the main body 101 on the touch screen 910. At operation A330, the control unit 907 may detect a user input for the graphic element for time control, which is displayed on the touch screen 910, through an input/output unit 908 for user input, such as an operating unit (such as a watch stem), a button, the touch screen 910, or a microphone. The control unit 907 may detect the user's selection for one of the hour hand and the minute hand through the touch screen 910. The control unit 907 may detect a user's drag input associated with a rotating direction, a rotating angle (or rotating amount), rotating position (or angular position) or an end position through the touch screen 110. At operation A341, the control unit 907 may determine the rotating direction, the rotating angle (or rotating amount) or the rotating position (or angular position) of the hour hand or the minute hand based on the rotating direction, the rotating angle (or rotating amount), the rotating position (or angular position) or the end position of the drag input. The control unit 907 may generate control data/signal corresponding to the determined rotating direction, rotating angle (or rotating amount) or rotating position (or angular position), and may deliver the control data/signal to the second connector 980/second communication unit 906. At operation A342, the second connector 980/second communication unit 906 may deliver/transmit the control data/signal to the first connector 180/first communication unit 106 of the main body 101. At operation A343, the first connector 180/first communication unit 106 may deliver the control data/signal received from the mounting unit 900 to the drive unit 150 of the main body 101. At operation A350, the drive unit 150 may rotate the hour hand or the minute hand according to the control data/signal.

Figure 19D:
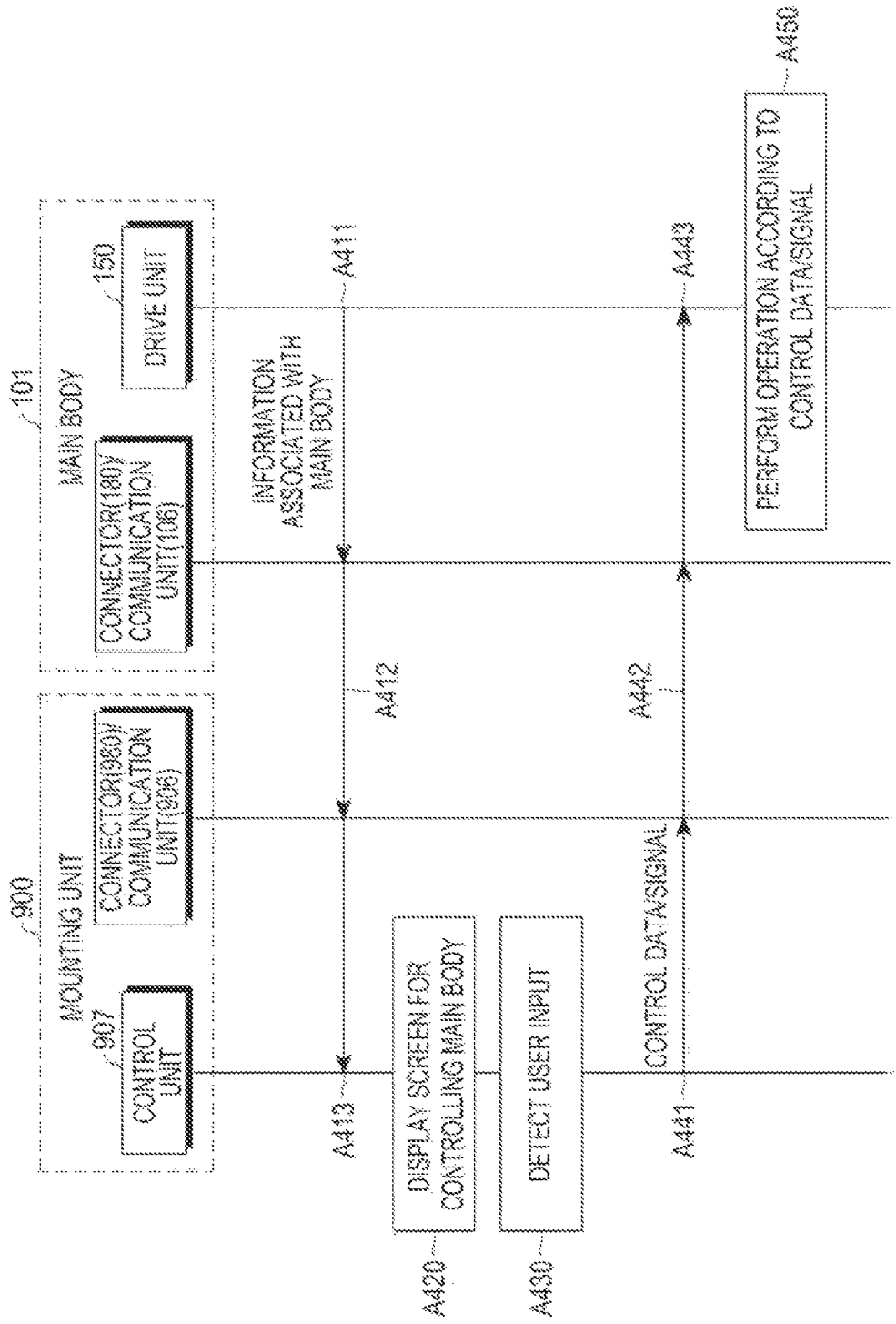
FIG. 19D is a flowchart for describing a fourth example of an operating method of the mounting unit.

FIG. 19D is a flowchart for describing a fourth example of the operation method of the mounting unit. The method may include operations A411 to A450.

At operation A411, the first control unit 107 of the main body 101 may detect information (or state information) associated with the main body 101, and the first control unit 107 may deliver the information associated with the main body 101 to the first connector 180/first communication unit 106 of the main body 101.

At operation A412, the first connector 180/first communication unit 106 may deliver/transmit the information associated with the main body 101 to the second connector 980/second communication unit 906 of the mounting unit 900.

At operation A413, the second connector 980/second communication unit 906 may deliver the information associated with the main body 101, which is received from the main body 101, to the second control unit 907 of the mounting unit 900.

At operation A420, the second control unit 907 may display a screen for controlling the main body 101 on the touch screen 910. The screen for controlling the main body 101 may include at least a part of the information associated with the main body 101, which is received from the main body 101.

At operation A430, the second control unit 907 may detect a user input for a graphic element displayed on the touch screen 910 through an input/output unit 908, such as an operating unit (such as a watch stem), a button or the touch screen 910.

At operation A441, the control unit 907 may deliver the control data/signal generated or selected based on at least a part of the information associated with the main body 101 and/or the user input to the second connector 980/second communication unit 906.

At operation A442, the second connector 980/second communication unit 906 may deliver/transmit the control data/signal to the first connector 180/first communication unit 106 of the main body 101.

At operation A443, the first connector 180/first communication unit 106 may deliver the control data/signal received from the mounting unit 900 to the first control unit 107.

At operation A450, the first control unit 107 may perform an operation according to the control data/signal. For example, the first control unit 107 may control the drive unit 150 to mechanically drive the indicating unit 140 or 144 and/or the watch stem 151 according to the control data/signal.

Figure 20A:
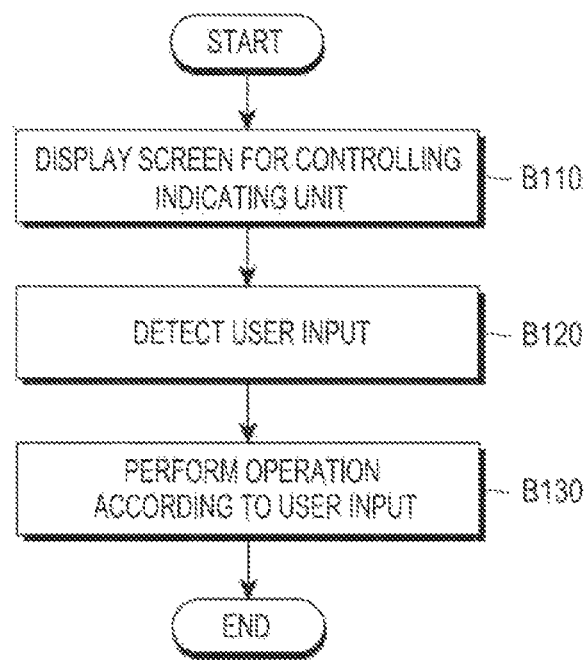
FIG. 20A is a flowchart for describing a first example of an operating method of the main body.

FIG. 20A is a flowchart for describing a first example of the operating method of the main body. The method may include operations B110 to B130.

At operation B110, the control unit 107 of the main body 101 may display a screen for controlling the indicating unit 140 or 144 on the touch screen 110. The control unit 107 may sense the position of at least a part of the indicating unit 140 or 144 through the sensor unit 104 or 904. The control unit 107 may detect the information (or state information) associated with the indicating unit 140 or 144, such as time information, date information, and/or indicating information of the indicating unit through the sensing of the indicating unit 140 or 144. The screen for controlling the indicating unit 140 or 144 may include at least a part of the information associated with the indicating unit 140 or 144.

At operation B120, the control unit 107 may detect a user input for a graphic element displayed on the touch screen 110 or 910 through the input/output unit 108 or 908 for user input, such as an operating unit (such as a watch stem), a button, or the touch screen 110 or 910.

At operation B130, the control unit 107 may perform an operation based on the user input.

For example, the control unit 107 may perform an alarm function with reference to the time indicated by the indicating unit 140 or 144. The control unit 107 may perform a smart watch mode, and the control unit 107 may display a home screen of the smart watch mode on the touch screen 110 or 910.

As a further example, the control unit 107 may display a graphic element associated with the indicating unit 140 or 144 (e.g., a menu, an icon, a text, or an item) on the touch screen 110 or 910. The control unit 107 may also perform a roaming watch function. When the indicating unit 140 or 144 indicates the time/date of a first area, the control unit 107 may display the time/date of a second area on the touch screen 110 or 910.

For example, the control unit 107 may perform a stop watch function.

For example, the control unit 107 may change the position of the graphic element at least one time such that the graphic element displayed on the touch screen 110 or 910 is not covered by (or does not overlap with) the indicating unit 140 or 144. Additionally, the control unit 107 may display the position of the sun/moon/star/constellation on the touch screen 110 or 910 based on the position of the indicating unit 140 or 144.

By way of further example, the control unit 107 may adjust an attribute, such as a size, position, color, or transparency of a graphic element on the touch screen 110 or 910, which exists at a position that is equal to or proximate to the position of the indicating unit 140 or 144.

Figure 20B:
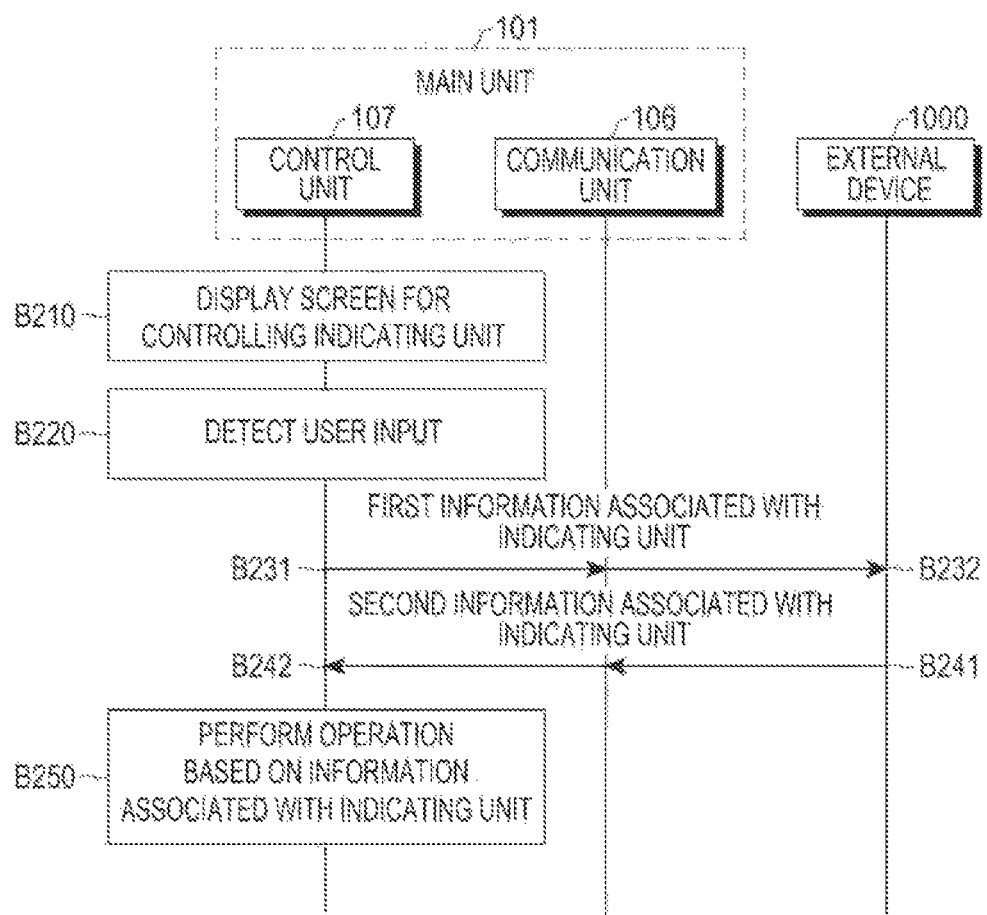
FIG. 20B is a flowchart for describing a second example of an operating method of the main body.

FIG. 20B is a flowchart for describing a second example of the operation of the main body. The method may include operations B210 to B250.

At operation B210, the control unit 107 of the main body 101 may display a screen for controlling the indicating unit 140 or 144 on the touch screen 110.

At operation B220, the control unit 107 may detect a user input for the graphic element displayed on the touch screen 110 or 910 through the input/output unit 108 or 908 for user input, such as an operating unit (such as a watch stem), a button, the touch screen 110 or 910, or a microphone.

At operation B231, the control unit 107 may deliver first information associated with the indicating unit 140 or 144 to the communication unit 106. The first information associated with the main body 101 may include information indicating the position of at least a part of the indicating unit 140 or 144 which is sensed through the sensor unit 104 or 904.

At operation B232, the communication unit 106 may transmit the first information associated with the indicating unit 140 or 144 to the external device 1000 in a wired or wireless manner.

At operation B241, the external device 1000 may retrieve (search for) or generate second information associated with the indicating unit 140 or 144 based on at least a part of the first information associated with the indicating unit 140 or 144, and may transmit the second information associated with the indicating unit 140 or 144 to the main body 101 in a wired or wireless manner. The second information associated with the indicating unit 140 or 144 may include at least one piece of information for displaying/changing the time/date (e.g., the time/date of a second area). The external device 1000 may transmit information for configuring a screen to be displayed on the touch screen 110 or 910 (e.g., a wallpaper image, a menu, an icon, an item, or a theme/theme resource) to the main body 101.

At operation B242, the communication unit 106 may deliver the second information associated with the indicating unit 140 or 144, which is received from the external device 1000, to the control unit 107.

At operation B250, the control unit 107 may perform an operation based on the first and/or second information associated with the indicating unit 140 or 144.

Figure 20C:
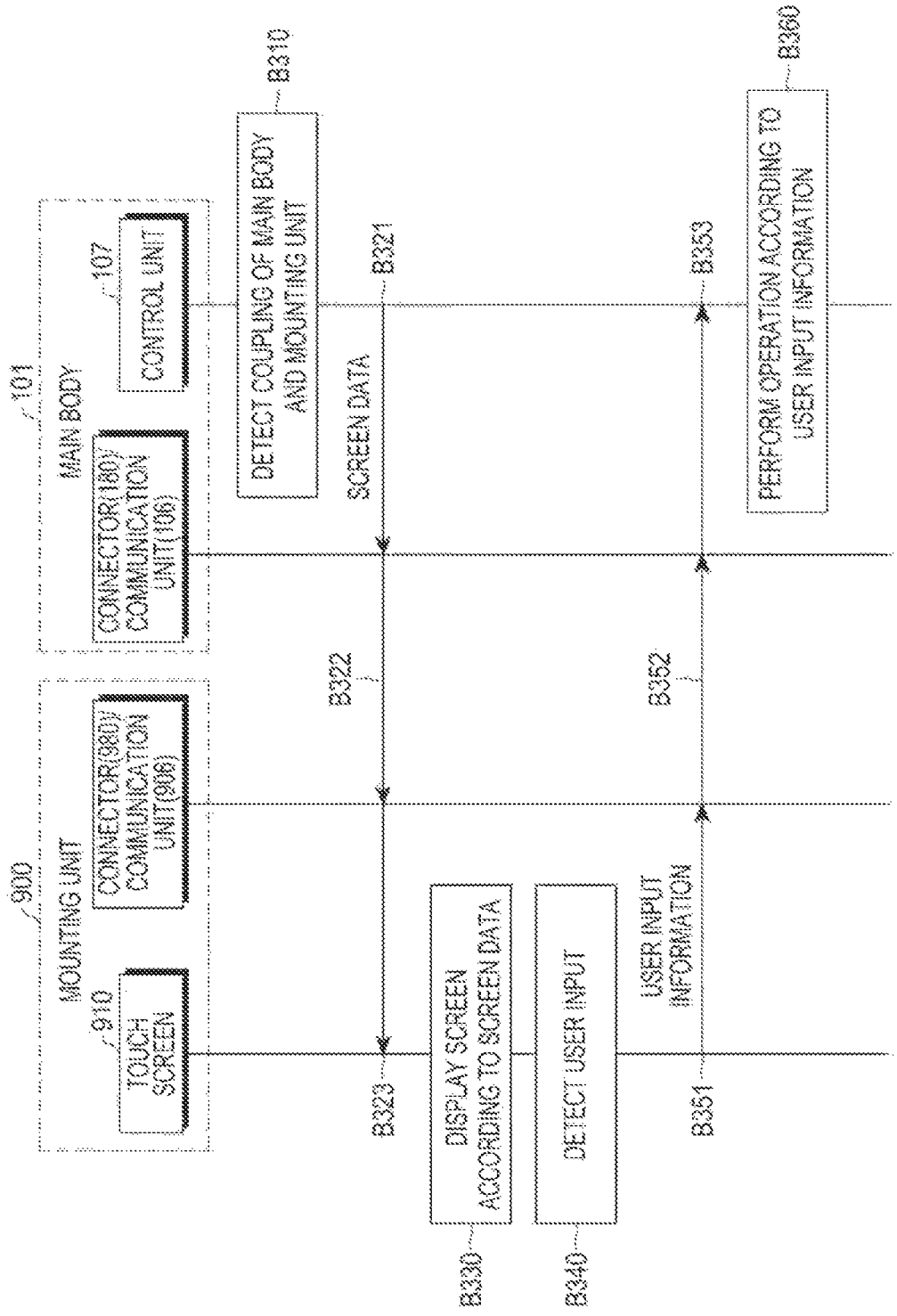
FIG. 20C is a flowchart for describing a third example of an operating method of the main body.

FIG. 20C is a flowchart for describing a third example of the operating method of the main body. The method may include operations B310 to B360.

At operation B310, the control unit 107 of the main body 101 may detect the coupling of the main body 101 and the mounting unit 900. For example, the control unit 107 may detect the coupling of the main body 101 and the mounting unit 900 based on: the coupling of the connectors of the main body 101 and the mounting unit 900 (e.g., the first connector 180 and the second connector 980, and the first electric contact 801 and the second electric contact of the main body 101); the sensed information of the sensor unit 104; the input associated with the coupling of the main body 101 and the mounting unit 900 through the input/output unit 108 for user input (such as an operating unit (such as a watch stem), a button, a touch screen, or a microphone); and the reception of a signal/data associated with the coupling of the main body 101 and the mounting unit 900 through the first communication unit 106.

At operation B321, the control unit 107 may generate screen data for configuring a screen to be displayed on the touch screen 910, and may deliver the generated screen data to the first connector 180/first communication unit 106.

At operation B322, the first connector 180/first communication unit 106 may deliver/transmit the screen data to the second connector 980/second communication unit 906 of the mounting unit 900.

At step B323, the second connector 980/second communication unit 906 may deliver the screen data received from the main body 101 to the touch screen 910 of the mounting unit 900.

At operation B330, the touch screen 910 may display a screen according to the received screen data.

At operation B340, the touch screen 910 may detect a user input, such as a touch or hovering on the screen.

At operation B351, the touch screen 910 may deliver the user input information such as the position/intensity of the touch/hovering to the second connector 980/second communication unit 906.

At operation B352, the second connector 980/second communication unit 906 may deliver/transmit the user input information to the first connector 180/first communication unit 106 of the main body 101.

At operation B353, the first connector 180/first communication unit 106 may deliver the user input information received from the mounting unit 900 to the first control unit 107.

At operation B360, the control unit 107 may perform an operation according to the user input information.

For example, when the user input indicates a selection of a graphic element on the screen displayed on the touch screen 910, the control unit 107 may perform the function mapped to the selected graphic element.

For example, the control unit 107 may generate screen data updated according to the user input, and may display the updated screen data through the touch screen 910.

Figure 21:
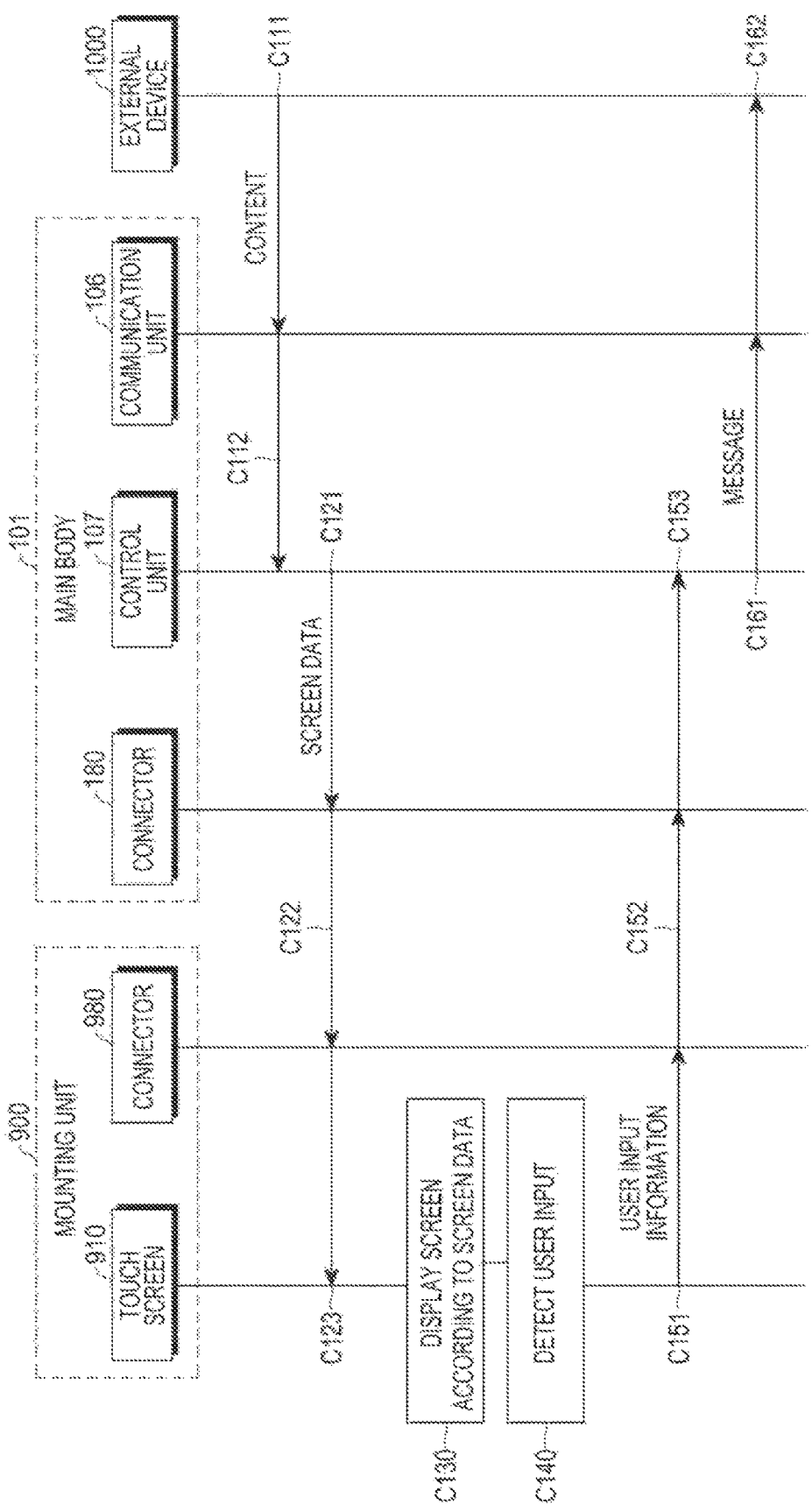
FIG. 21 is a flowchart for describing a fourth example of an operating method of the main body.

FIG. 21 is a flowchart for describing a fourth example of the operating method of the main body. The method may include operations C111 to C162.

At operation C111, the external device 1000 may transmit a specific content (or a first image including the content) to the main body 101 in a wired or wireless manner. The content may include at least one of, for example: a text, an image, and a sound.

At operation C112, the communication unit 106 may deliver the content received from the external device 1000 to the control unit 107.

At operation C121, the control unit 107 may generate screen data for configuring a screen to be displayed on the touch screen 910, and may deliver the generated screen data to the first connector 180.

At operation C122, the first connector 180 may deliver the screen data to the second connector 980 of the mounting unit 900.

At operation C123, the second connector 980 may deliver the screen data received from the main body 101 to the touch screen 910 of the mounting unit 900.

At operation C130, the touch screen 910 may display a screen according to the received screen data. For example, the screen data may include at least a part of the content received from the external device 1000.

At operation C140, the touch screen 910 may detect a user input, such as a touch or a hovering on the screen.

At operation C151, the touch screen 910 may deliver user input information, such as the position/intensity of the touch/hovering to the second connector 980.

At operation C152, the second connector 980 may deliver the user input information to the first connector 180 of the main body 101.

At operation C153, the first connector 180 may deliver the user input information received from the mounting unit 900 to the control unit 107.

At operation C161, the control unit 907 may deliver a second message according to the user input information to the communication unit 106. The second message may include at least one of, for example: a request for a subsequent content associated with the content received from the external device 1000, a request for content-related information, and response information in relation to the first message.

At operation C162, the communication unit 106 may transmit the second message to the external device 1000 in a wired or wireless manner.

Figure 22:
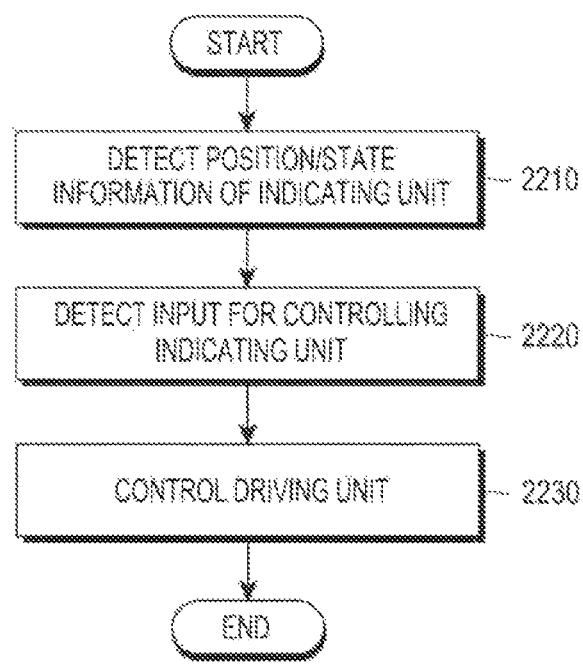
FIG. 22 is a flowchart for describing a control method of an indicating unit according to a user/external input.

FIG. 22 is a flowchart for describing a control method of an indicating unit according to a user/external input. The method may include operations 2210 to 2230.

At operation 2210, the control unit 107 or 907 may detect the position/state information of the indicating unit. For example, the control unit 107 or 907 may detect a position of at least a part of the time indicating unit 140 and/or the auxiliary indicating unit through a sensor unit 104 or 904 (and/or a communication unit 106 or 906). Alternatively, the control unit 107 or 907 may detect the position of at least a part of the time indicating unit 140 and/or the auxiliary indicating unit through a sensor unit in the form of an integrated chip disposed within the drive unit 150, in place of the sensor unit 104.

At operation 2220, the control unit 107 or 907 may detect an input for controlling the indicating unit. For example, the control unit 107 or 907 may detect a touch or hovering input of the user for controlling the time indicating unit 140 or the auxiliary indicating unit through the touch screen 110 or 910.

For example, the control unit 107 or 907 may receive the input for controlling the time indicating unit 140 or the auxiliary indicating unit through the communication unit 106 or 906.

For example, the first control unit 107 may receive a command from the mounting unit 900 through the first communication unit 106.

At operation 2230, the control unit 107 or 907 may control the drive unit 150 according to the input.

For example, the control unit 107 or 907 may control the drive unit 150 using control data/signal for moving the hour hand and/or minute hand to a position according to the input. Additionally, the first control unit 107 may receive the control data/signal for moving the hour hand and/or the minute hand to a specific position from the mounting unit 900, and may control the drive unit 150 using the received control data/signal. By way of further example, the first control unit 107 may receive a command for moving the hour hand and/or the minute hand to a specific position from the mounting unit 900, and may control the drive unit 150 using control data/signal corresponding to the command.

The following examples will be described with reference to the wearable device 100 according to the first embodiment. However, the following examples may also applied to the wearable device 100*a*, 100*b*, 100*c*, 100*d*, 100*e*, 100*f*, 100*g*, 100*h*, or 100*i* according to the second embodiment in the same/similar manner.

FIG. 23A to 23F illustrates examples for describing a control method of a time indicating unit according to a user input.

Figure 23A:
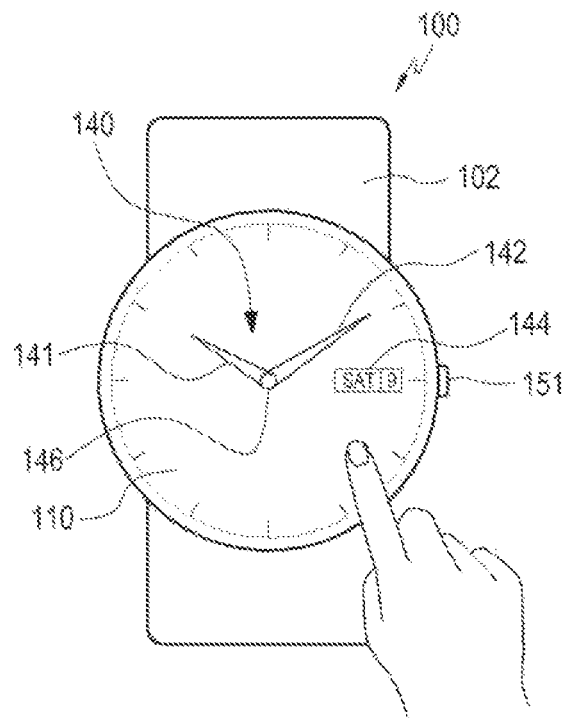
FIGS. 23A to 23F illustrate examples for describing a control method of a time indicating unit according to a user input.

Referring to FIG. 23A, the wearable device 100 may include a time indicating unit 140 that includes an hour hand 141 and a minute hand 142, and an auxiliary indicating unit 144 that indicates day/date. The control unit 107 or 907 may detect a long touch input of the user through the touch screen 110. The control unit 107 or 907 may detect the position of the hour hand and/or the minute hand through the sensor unit 104 or 904 according to the long touch input.

Alternatively, the position detection in relation to a part of the time indicating unit 140 may be performed periodically, by a touch/hovering input/gesture of a preset position/pattern, by a touch/hovering input, by selecting a graphic element displayed on the touch screen 110, or by pushing/pulling the watch stem 151.

Figure 23B:
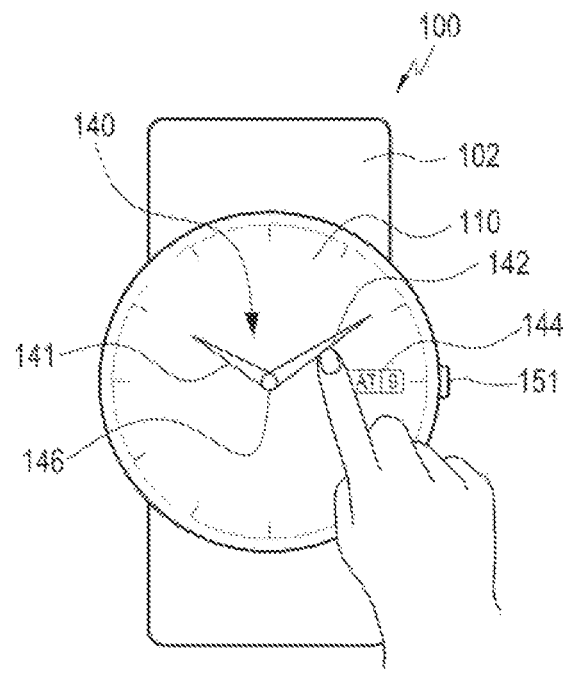

Referring to FIG. 23B, the control unit 107 or 907 may detect a user's selection for one of the hour hand and the minute hand through the touch screen 110.

For example, the control unit 107 or 907 may determine that the user has selected a watch hand closer to the position of the user's touch input among the hour hand and the minute hand.

For example, the control unit 107 or 907 may select one of the hour hand and the minute hand based on the distance between the rotation center 146 of the time indicating unit 140 and the position of the touch input in response to the touch input. For example, when the distance is within the length of the hour hand, the control unit 107 or 907 may select the hour hand, and when the distance exceeds the length of the hour hand, the control unit 107 or 907 may select the minute hand.

Alternatively, the control unit 107 or 907 may automatically select a pre-set watch hand among the hour hand and the minute hand in response to a touch input of an arbitrary or pre-set region/position on the touch screen 110.

In the present example, the control unit 107 or 907 assumes that the user has selected the minute hand.

Figure 23C:
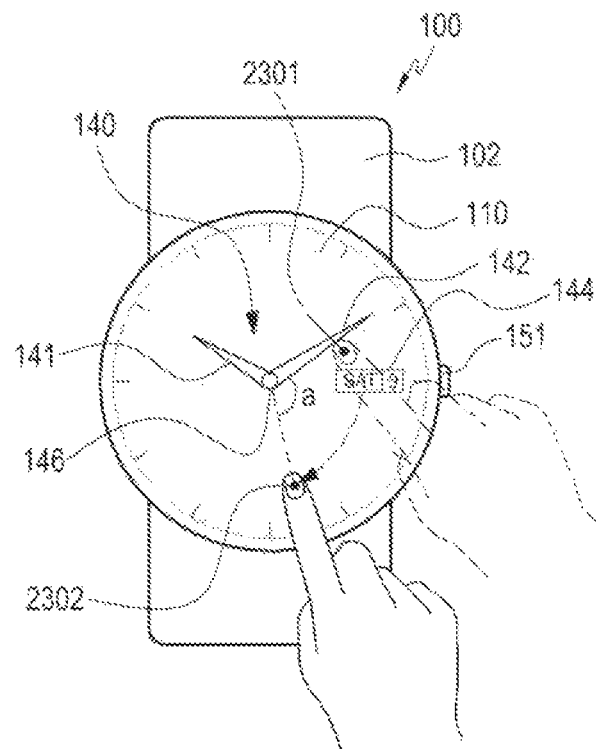

Referring to FIG. 23C, the control unit 107 or 907 may detect a user input related to a rotating angle (or rotating amount) through the touch screen 110. For example, the control unit 107 or 907 may determine a rotating direction, a rotating angle (or rotating amount), or a rotating position (or angular position) of the minute hand, based on a rotating angle (or rotating amount) of a swipe input (or a drag input) and/or a swipe input start/stop position 2302. The swipe input/gesture refers to a gesture of moving a finger by a predetermined distance in a state where the finger is touched on the touch screen.

For example, the control unit 107 or 907 may detect a rotating angle a between a swipe input start position 2301 and a swipe input stop position 2302 with reference to the rotation center 146 of the time indicating unit 140.

Figure 23D:
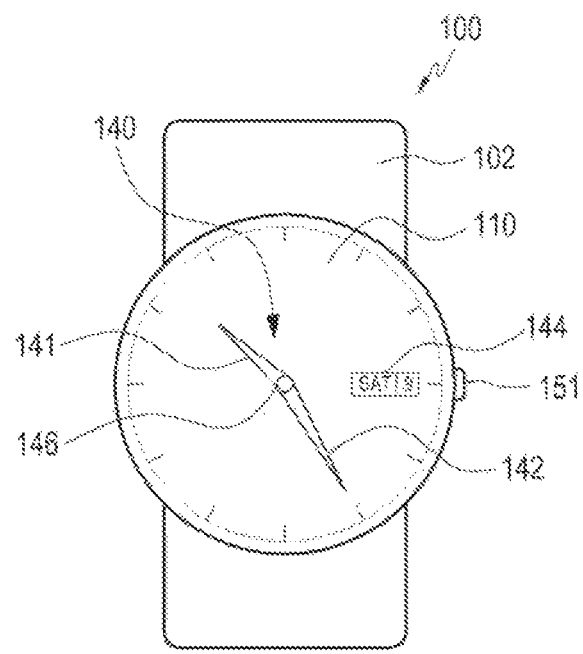

Referring to FIG. 23D, the control unit 107 or 907 may rotate the minute hand through the drive unit 150 according to the determined rotating direction, rotating angle (or rotating amount), or rotating position.

For example, the control unit 107 or 907 may generate control data/signal corresponding to the determined rotating direction, rotating angle (or rotating amount) or rotating position, and may control the first motor 441 using the control data/signal. The first motor 441 may rotate the first rotating shaft 442 and the first gear 443 according to the control data/signal. According to the drive of the first motor 441, the first gear 443 and the gears of the second gear system 420 (and the first gear system 410) may be rotated simultaneously, and according to the rotation of the $24^{th}$ gear 424 of the second gear system 420, the minute hand 142 may be rotated simultaneously.

For example, the control unit 107 or 907 may rotate the minute hand in real time or periodically while following the swipe input. The control unit 107 or 907 may rotate the minute hand in a rotating direction determined during the swipe input, and as the swipe input is stopped, the control unit 107 or 907 may stop the rotation of the minute hand. The control unit 107 or 907 may set the rotating speed of the minute hand according to the moving speed of the swipe input.

Figure 23E:
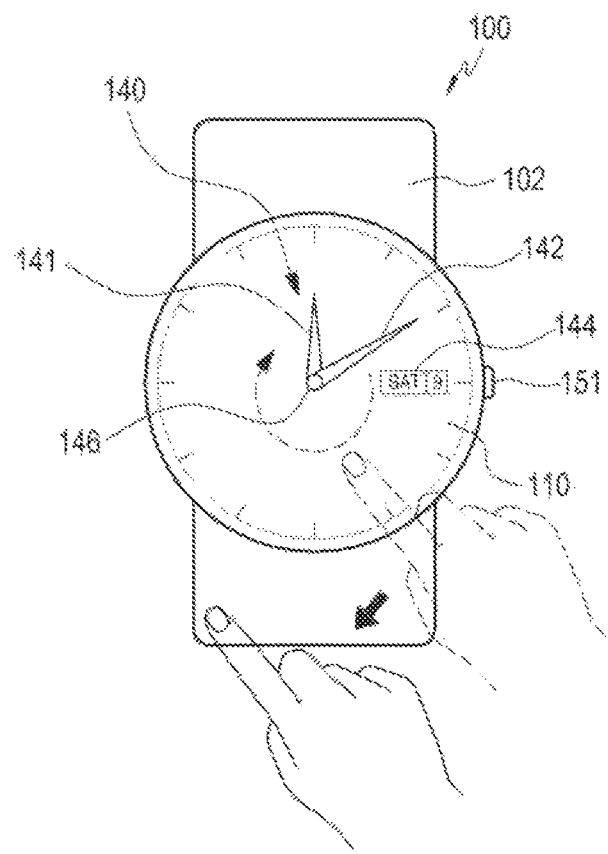

Referring to FIG. 23E, the control unit 107 or 907 may rotate the watch hand selected among the hour hand and the minute hand automatically or based on the user input at a predetermined speed (or at a gradually increasing or decreasing speed) in response to a pre-set touch gesture (e.g., a flick gesture) of the user. The control unit 107 or 907 may rotate the selected watch hand at a predetermined speed according to the direction of the touch gesture. For example, when the flick gesture is directed downwardly (or directed to six o'clock), the selected watch hand may be rotated clockwise, and when the flick gesture is directed upwardly (or directed to 12 o'clock), the selected watch hand may be rotated counterclockwise. The flick gesture refers to a gesture of touching the touch screen 110 with a finger, rapidly moving the finger, and then taking off the finger.

The control unit 107 or 907 may stop the rotation of the selected watch hand according to the user's touch input/gesture (e.g., a tap gesture or a double tap gesture).

Figure 23F:
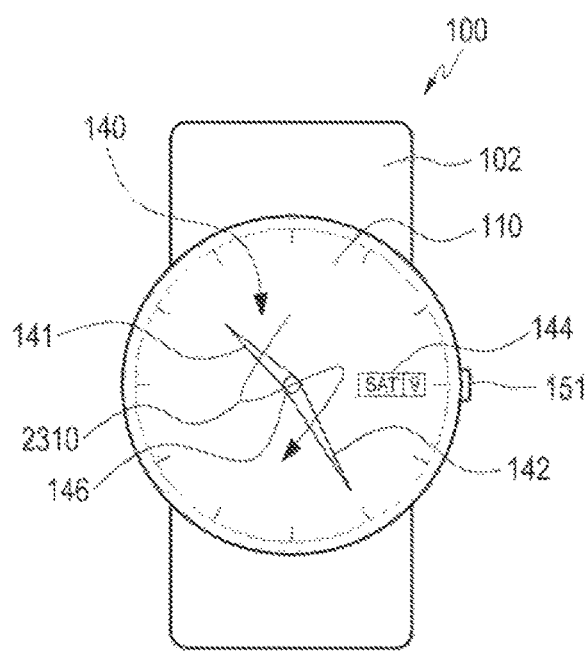

Referring to FIG. 23F, the control unit 107 or 907 may detect a cancellation gesture 2310 of the user through the touch screen 110.

For example, when a pre-set pattern of a touch gesture (i.e., a cancellation gesture 2310) is detected within a pre-set threshold time after controlling the time indicating unit 140, the control unit 107 or 907 may cancel the control operation of the time indicating unit 140. According to the cancellation of the control operation, the time indicating unit 140 may return to the initial position as illustrated in FIG. 23a.

For example, the control unit 107 or 907 may generate control data/signal corresponding to the initial position or the same rotating angle (or rotating amount) in the direction opposite to the determined rotating direction, and may control the first motor 441 using the control data/signal.

Figure 24A:
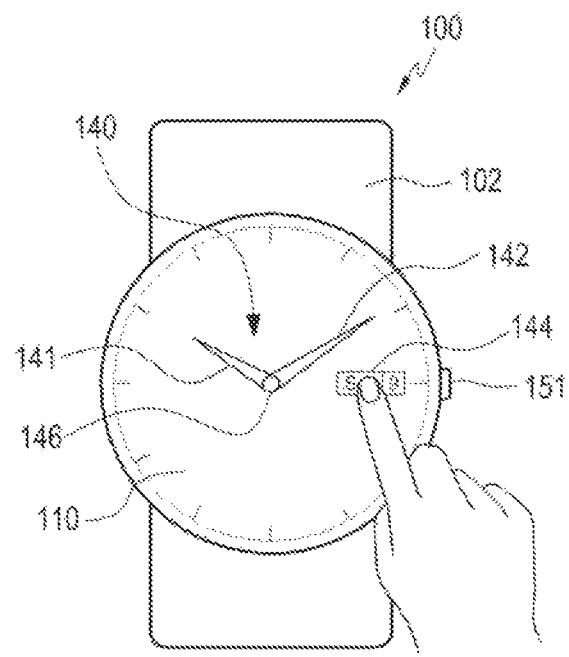
FIGS. 24A and 24B illustrate examples for describing a control method of an auxiliary indicating unit according to a user input.
Figure 24B:
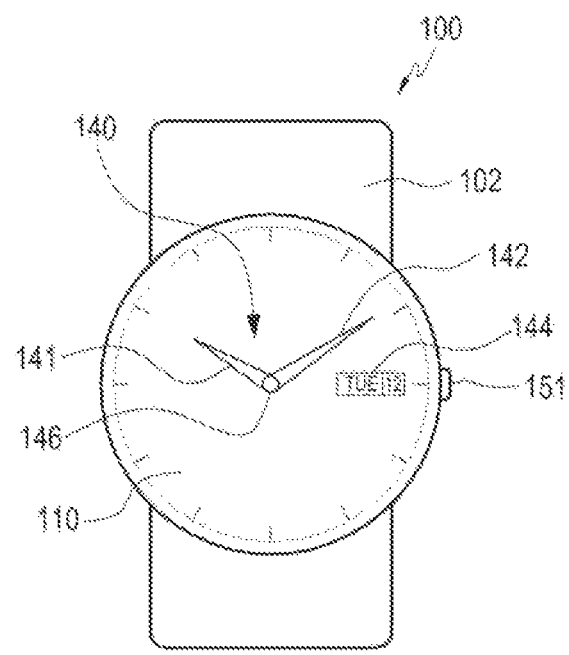

FIGS. 24A and 24B illustrate an example for describing a control method of an auxiliary indicating unit according to a user input.

Referring to FIG. 24A, the control unit 107 or 907 may detect a user's selection for the auxiliary indicating unit 144 that indicates data/day through the touch screen 110.

The control unit 107 or 907 may detect the user's input related to the number of revolution (or a rotating angle or rotating amount) through the touch screen 110. For example, the control unit 107 or 907 may determine the rotating direction and the number of revolution (or rotating angle or rotating amount) of the auxiliary indicating unit 144 based on, for example, the direction, the moving distance in the touch state, and/or the repetition number of the scroll gesture (or swipe gesture).

For example, when the scroll gesture is detected once, the control unit 107 or 907 may rotate the auxiliary indicating unit 144 by one unit (e.g., one day). As an additional example, the control unit 107 or 907 may also rotate the auxiliary indicating unit 144 by one unit for every moving distance of 1 cm in the touch state.

Referring to FIG. 24B, the control unit 107 or 907 may rotate the auxiliary indicating unit 144 according to the moving distance or the repetition number in the determined direction and in the touch state. As illustrated, it can be seen that the auxiliary indicating unit 144 is rotated by three units (e.g., three days) according to the control of the control unit 107 or 907.

For example, the control unit 107 or 907 may generate control data/signal corresponding to the determined direction, the moving distance in the touch state, or the repetition number, and may control the second motor 451 using the control data/signal. The second motor 451 may rotate the second rotating shaft 452 and the second gear 453 according to the control data/signal. According to the drive of the second motor 451, the second gear 453 and the gears of the third gear system 430 (and the first gear system 410) may be rotated simultaneously, and according to the rotation of the $31^{st}$ gear 431 of the third gear system 430, the auxiliary indicating unit 144 may be rotated simultaneously.

Figure 25:
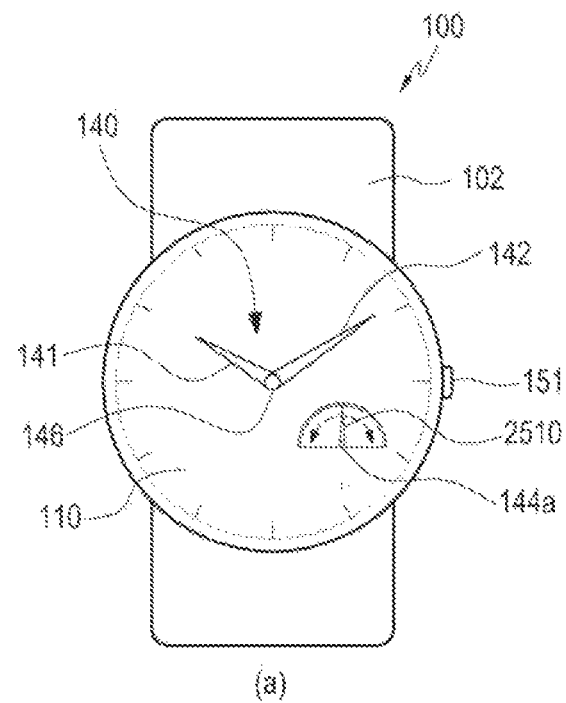
FIG. 25 is an example for describing a control method of an auxiliary indicating unit that indicates a direction/pulse.
Figure 25:
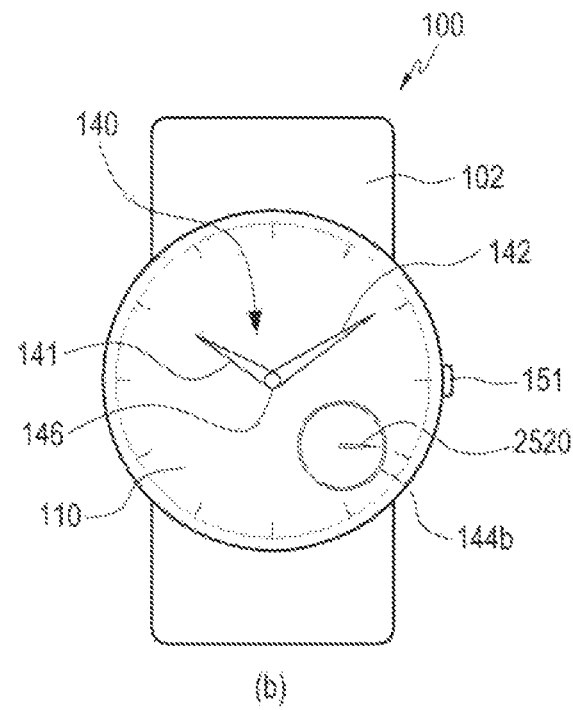

FIG. 25 illustrates an example for describing a control method of an auxiliary indicating unit that indicates direction/pulse.

Referring to FIG. 25(a), the wearable device 100 may include a time indicating unit 140 that includes an hour hand 141 and a minute hand 142, and an auxiliary indicating unit 144a that indicates pulse/heartbeat.

The auxiliary indicating unit 144a may include an auxiliary indicator 2510 that vibrates left and right according to an adjustable frequency.

For example, the control unit 107 or 907 may measure biological information that indicates pulse/heartbeat through the sensor unit 104 or 904. In another example, the first control unit 107 may receive the biological information that indicates pulse/heartbeat from the mounting unit 900 or an external device (e.g., a mobile device) through the first communication unit 106. The control unit 107 or 907 may determine a rotating direction and the number of revolution (or rotating angle or rotating amount) for converting the frequency of the auxiliary indicator 2510 to a frequency corresponding to the pulse/heartbeat.

For example, the control unit 107 or 907 may generate control data/signal corresponding to the determined rotating direction and the number of revolution (or rotating angle or rotating amount), and may control the second motor 451 using the control data/signal. The second motor 451 may rotate the second rotating shaft 452 and the second gear 453 according to the control data/signal. According to the drive of the second motor 451, the second gear 453 and the gears of the third gear system 430 (and the first gear system 410) may be rotated simultaneously, and according to the rotation of the $31^{st}$ gear 431 of the third gear system 430, the $34^{th}$ gear 434 corresponding to a frequency adjustment gear of the auxiliary indicating unit 144a may be rotated simultaneously.

Referring to FIG. 25(b), the wearable device 100 may be a time indicating unit 140 that includes an hour hand 141 and a minute hand 142, and an auxiliary indicating unit 144b that indicates a traveling route.

The auxiliary indicating unit 144b may include an auxiliary indicator 2520 that is a needle indicating a traveling route.

For example, the first control unit 107 may receive navigation information indicating a traveling route from the mounting unit 900 or a mobile device through the first communication unit 106. The control unit 107 or 907 may determine the rotating direction, and the number of revolution (or rotating angle or rotating amount) of the auxiliary indicator 2520 for changing the indicating direction of the auxiliary indicator 2520 to a direction corresponding to the traveling route.

For example, the control unit 107 or 907 may generate control data/signal corresponding to the determined rotating direction and number of revolution (or rotating angle or rotating amount), and may control the second motor 451 using the control data/signal. The second motor 451 may rotate the second rotating shaft 452 and the second gear 453 according to the control data/signal. According to the drive of the second motor 451, the second gear 453 and the gears of the third gear system 430 (and the first gear system 410) may be rotated simultaneously, and according to the rotation of the $31^{st}$ gear 431 of the third gear system 430, the $34^{th}$ gear 434 mechanically connected to the rotating shaft of the auxiliary indicating unit 144b may be rotated simultaneously.

Figure 26:
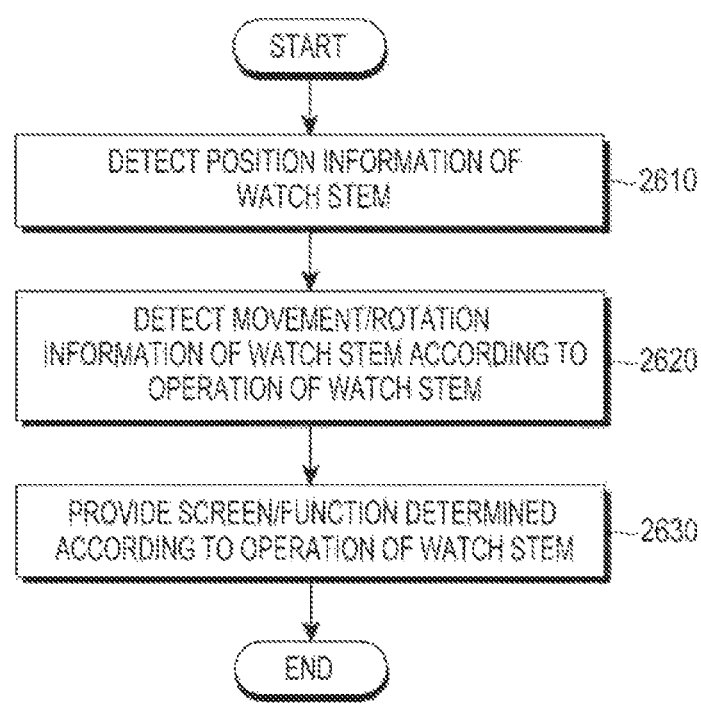
FIG. 26 is a flowchart for describing a method for providing a screen/function according to an operation of a watch stem.

FIG. 26 is a flowchart for describing a method for providing a screen/function according to an operation of a watch stem. The method may include operations 2610 to 2630.

At operation 2610, the control unit 107 or 907 may detect the position information of the watch stem 151. For example, the control unit 107 or 907 may detect the position information of the watch stem 151 through the sensor unit 104 or 904 (and/or the communication unit 106 or 906).

For example, the second control unit 907 may receive the sensed information of the first sensor unit 104, which is related to the watch stem 151, from the main body 101 through the second communication unit 906. By way of further example, the control unit 107 or 907 may detect the position of the watch stem 151 (and/or the position of the watch stem rotating shaft 152) through the fifth sensor 520.

When the watch stem 151 is mechanically coupled to the time indicating unit 140 or the auxiliary indicating unit through at least one gear, the control unit 107 or 907 may not perform the next steps 2620 and 2630.

The control unit 107 or 907 may be configured to retrieve a mode corresponding to a detected position of the watch stem 151 from the information related to the modes that have been stored in the memory 105 or 905 to correspond to the positions of the watch stem, respectively. For example, the modes, which correspond to the positions of the watch stem 151, may include at least one of, for example: a cancellation mode, a selection mode, a scroll mode, and a specific function execution mode.

At operation 2620, the control unit 107 or 907 may detect movement/rotation information of the watch stem 151, according to the operation of the watch stem 151. For example, the control unit 107 or 907 may detect the movement/rotation information of the watch stem through the sensor unit 104 or 904 (and/or the communication unit 106 or 906).

For example, referring to FIG. 15(b), the control unit 107 or 907 may detect a position (or angular position), rotation or a rotating angle (or rotating amount) of the watch stem 151 and/or a position (or angular position), rotation or a rotating angle (or rotating amount) of the watch stem rotating shaft 152 through the fourth sensor 1540.

For example, the control unit 107 or 907 may detect a position (or longitudinal position), a movement, or a moving amount of the watch stem 151 and/or a position (or longitudinal position), a movement, or a moving amount of the watch stem rotating shaft 152 through the fifth sensor 520.

At operation 2630, the control unit 107 or 907 may provide a screen/function according to the operation of the watch stem. For example, the control unit 107 or 907 may perform an operation corresponding to the movement/rotation information of the watch stem at a mode corresponding to the detected position of the watch stem. The corresponding operation may include at least one of, for example: cancellation of a previous operation, selection of a graphic element (e.g. a menu or an item) displayed on the touch screen, scroll of menus, items, messages, or texts, and execution of a specific function.

Figure 27:
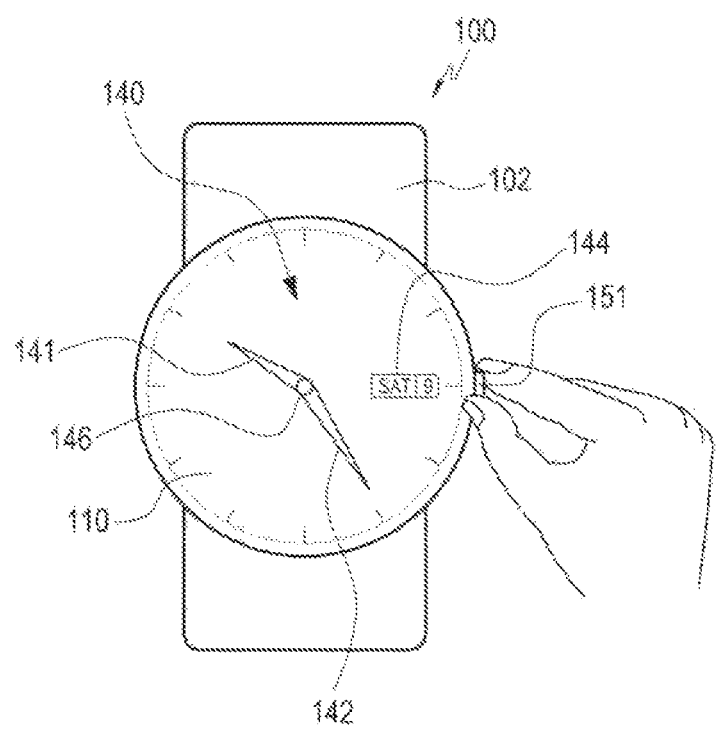
FIG. 27 illustrates an example for describing a method of canceling a previous operation according to the operation of the watch stem.

FIG. 27 illustrates an example for describing a method of canceling a previous operation according to the operation of the watch stem.

When a pre-set pattern of watch stem operation (e.g., a cancellation gesture 2310) is detected within a pre-set threshold time after the time indicating unit 140 is controlled, the control unit 107 or 907 may cancel the control operation of the time indicating unit 140. According to the cancellation of the control operation, the time indicating unit 140 may return to its initial position as illustrated in FIG. 23a. The pre-set pattern of operation of the watch stem 151 may include at least one of, for example: an operation of rotating the watch stem in a direction opposite to a determined rotating direction, and pushing/pulling of the watch stem.

Figure 28A:
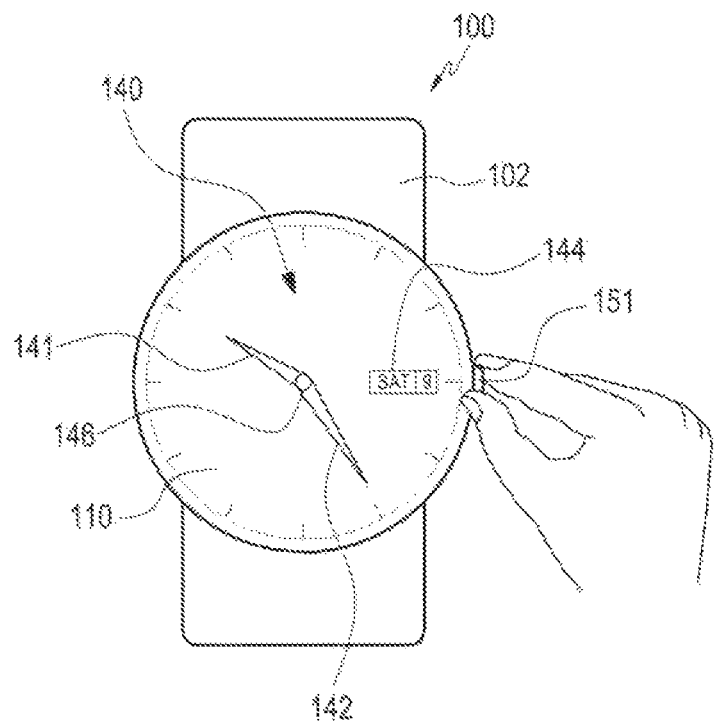
FIGS. 28A to 28C illustrate an example for describing a method for setting an alarm according to the operation of the watch stem.
Figure 28B:
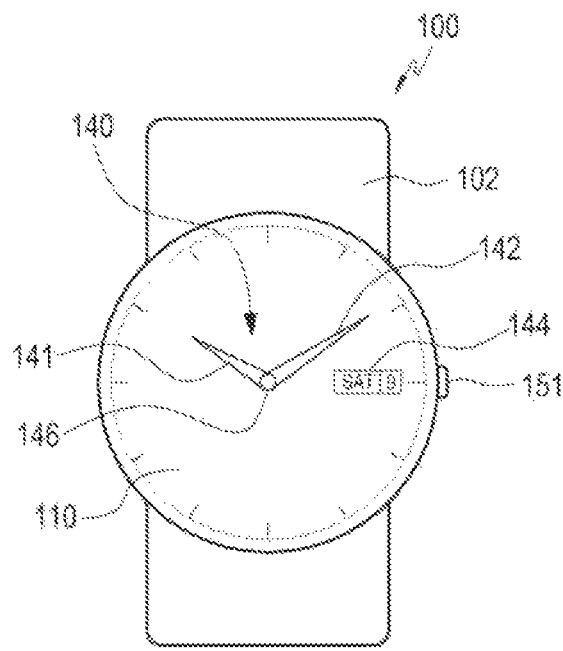
Figure 28C:
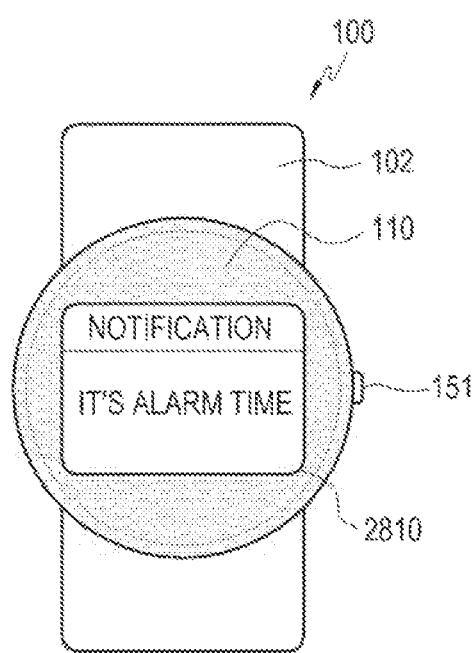

FIGS. 28A to 28C illustrate an example for describing a method for setting an alarm according to the operation of the watch stem.

Referring to FIG. 28A, the control unit 107 or 907 may detect the pre-set pattern of operation of the watch stem 151 for setting an alarm. For example, when the pushing/pulling of the watch stem 151 is detected within a pre-set time after the watch stem 151 is rotated, the control unit 107 or 907 may set the alarm. As illustrated, the user may set an alarm time (e.g., 10:25 a.m.) by rotating the time indicating unit 140 through the operation of the watch stem 151. The control unit 107 or 907 may store the information for the alarm time in the first memory 105.

For example, the control unit 107 or 907 may detect the positions (or angular positions) of the hour hand and the minute hand through the second sensors 1420 and 1440.

Referring to FIG. 28B, after setting the alarm, the control unit 107 or 907 may return the time indicating unit 140 to the position corresponding to the present time (e.g., 10:10 a.m.) or the position prior to alarm setting. For example, the control unit 107 or 907 may store the time prior to alarm setting in the memory 105 or 905. The control unit 107 or 907 may determine the present time by adding elapsed time to the stored time, and may determine the position of the time indicating unit 140, which corresponds to the present time.

For example, the control unit 107 or 907 may return the time indicating unit 140 to the position corresponding to the present time (e.g., 10:10 a.m.) or the position prior to alarm setting through the control of the first rotating unit 440.

Referring to FIG. 28C, when it arrives at an alarm time, the control unit 107 or 907 may display a predetermined notification message 2810 on the touch screen 110.

FIGS. 29A to 29D are exemplary views for describing an operation of switching the wearable device to a smart watch mode.

Figure 29A:
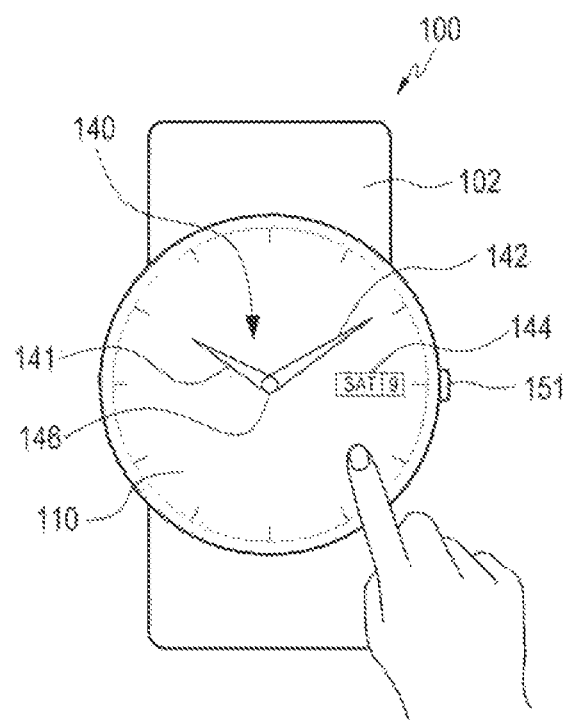
FIGS. 29A to 29D are exemplary views for describing an operation of switching the wearable device to a smart watch mode.
Figure 29B:
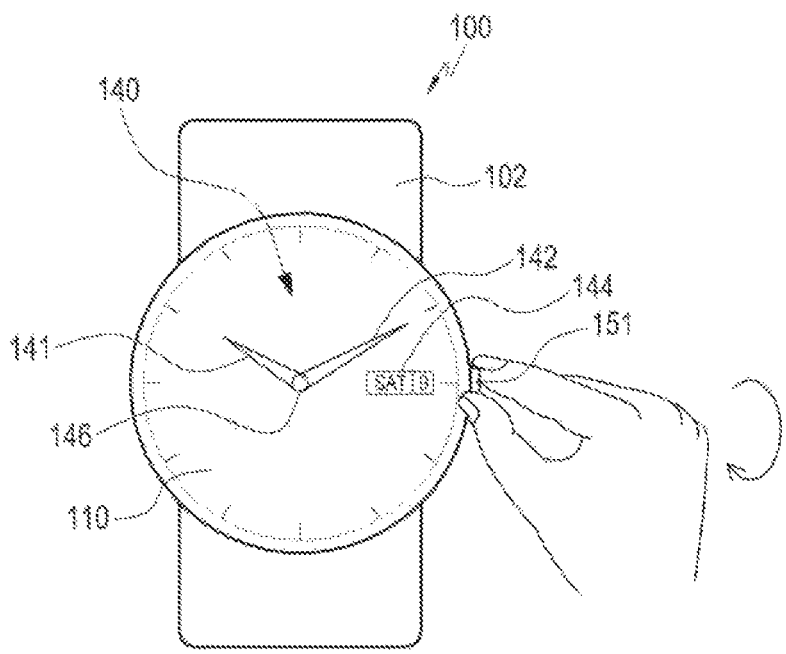

Referring to FIG. 29A, in order to switch the wearable device to a smart watch mode, the control unit 107 or 907 may detect a touch input through the touch screen 110. The touch input may be, for example, a long touch gesture that means a touch exceeding a predetermined length of time. Alternatively, as illustrated in FIG. 29B, the control unit 107 or 907 may detect the rotation of the watch stem 151 through the first sensor unit 104.

Figure 29C:
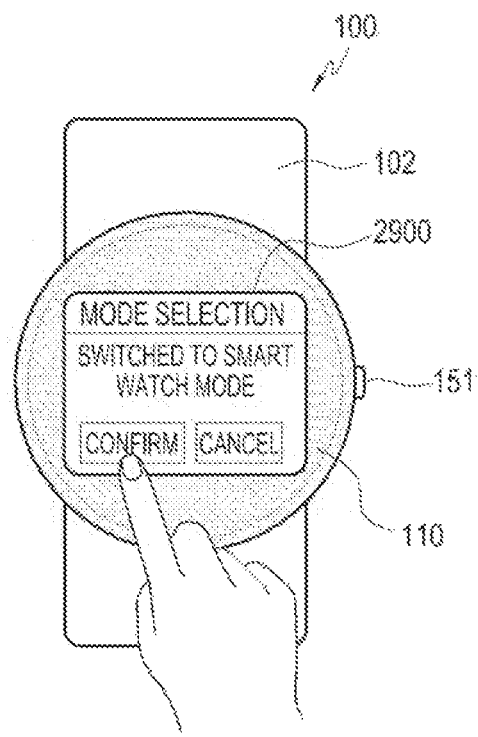
Figure 29D:
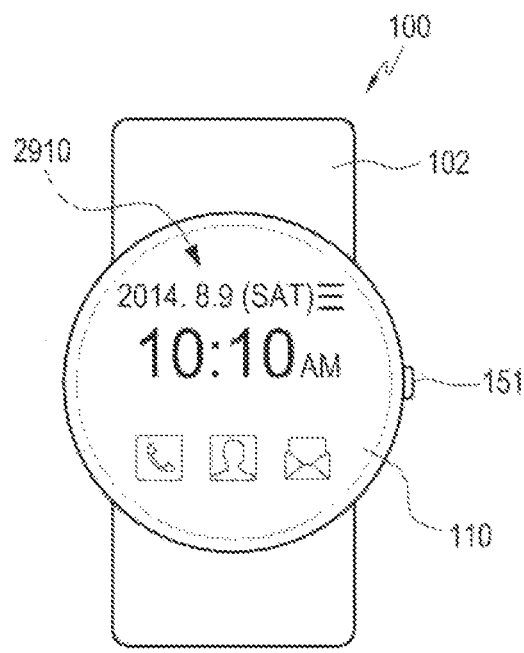

As illustrated in FIG. 29C, the control unit 107 or 907 may display a selection screen 2900 on the touch screen 110 according to the touch input. When a request for mode switching is received from the user, as illustrated in FIG. 29D, the control unit 107 or 907 may display a home screen 2910 of the smart watch mode on the touch screen 110.

FIGS. 30A to 30H are exemplary views for describing an operation of changing the time of the wearable device 100.

Figure 30A:
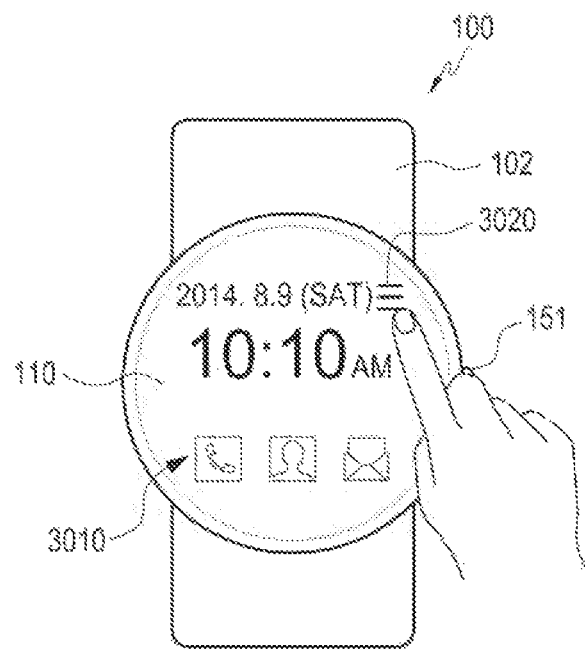
FIGS. 30A to 30H are exemplary views for describing an operation of changing the time of the wearable device.
Figure 30B:
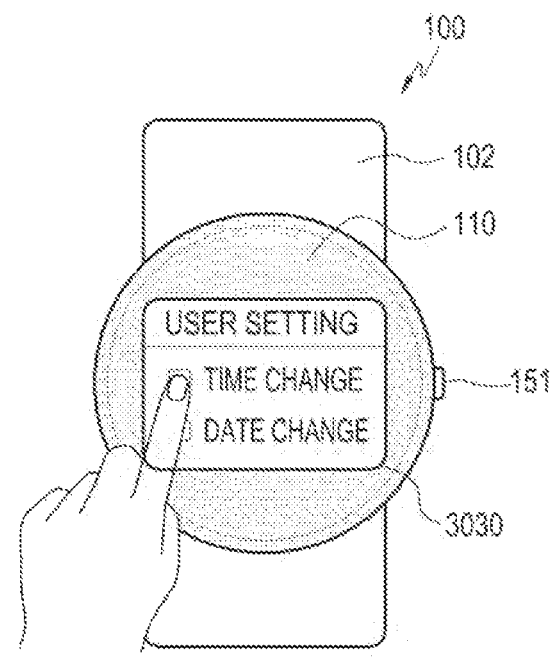
Figure 30C:
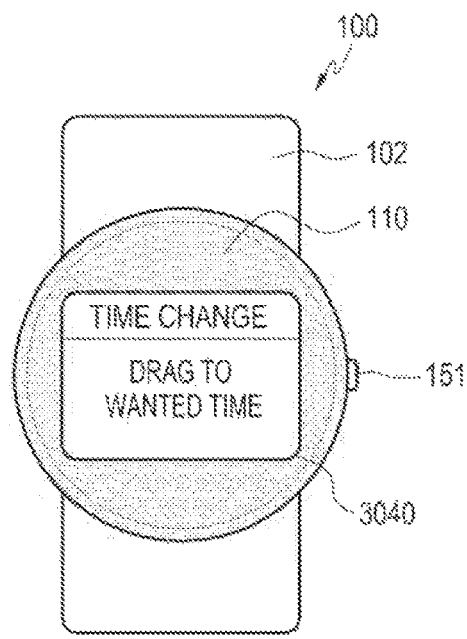

Referring to FIG. 30A, the control unit 107 or 907 may detect a selection input for a setting menu icon 3020 of a screen 3010 through the touch screen 110. When the selection for the setting menu icon 3020 is detected, the control unit 107 or 907 may display an item/items 3030 included in the user's setting menu through the touch screen 110, as illustrated in FIG. 30B. As illustrated in FIG. 30B, the control unit 107 or 907 may detect a selection for a time change item through the touch screen 110. In response to the selection, the control unit 107 or 907 may display an information message 3040 for changing the time through the touch screen 110, as illustrated in FIG. 30C.

Figure 30D:
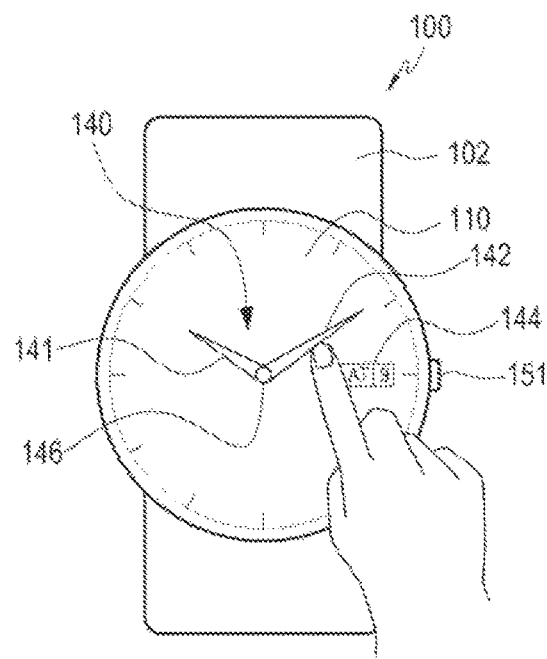
Figure 30E:
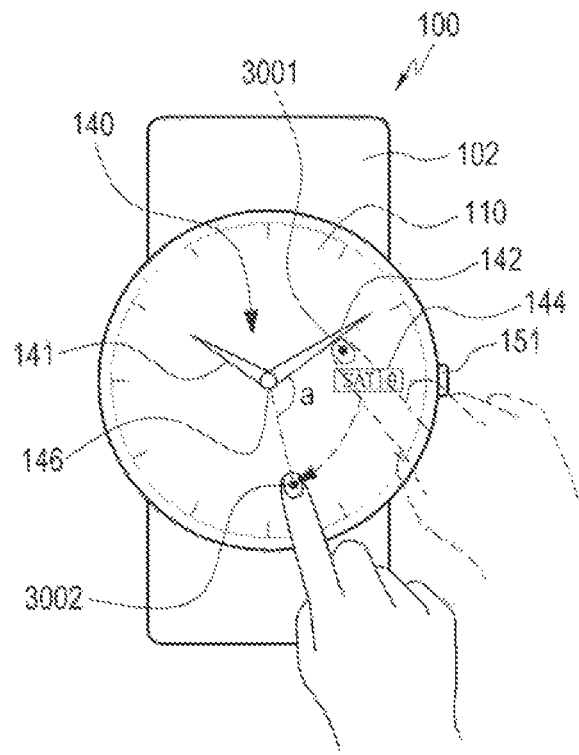
Figure 30F:
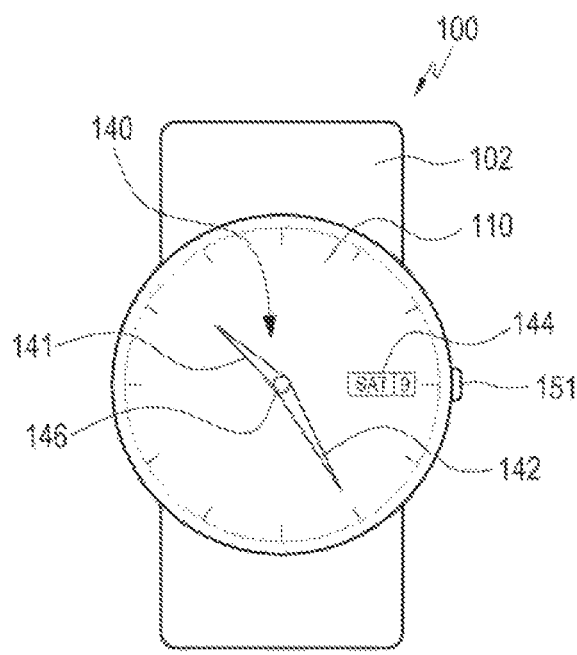

As illustrated in FIG. 30D to 30F, the control unit 107 or 907 may detect an input of moving the position of the time indicating unit 140 through the touch screen 110. The control unit 107 or 907 may change the position of the time indicating unit 140 through the control of the first rotating unit 440 based on the present position of the time indicating unit 140 and a swipe/drag moving route (the route from 3001 to 3002) that is sensed according to a drag gesture (or swipe gesture). Alternatively, the control unit 107 or 907 may change the time displayed on the touch screen 110 to correspond to the changed position of the time indicating unit 140.

Figure 30G:
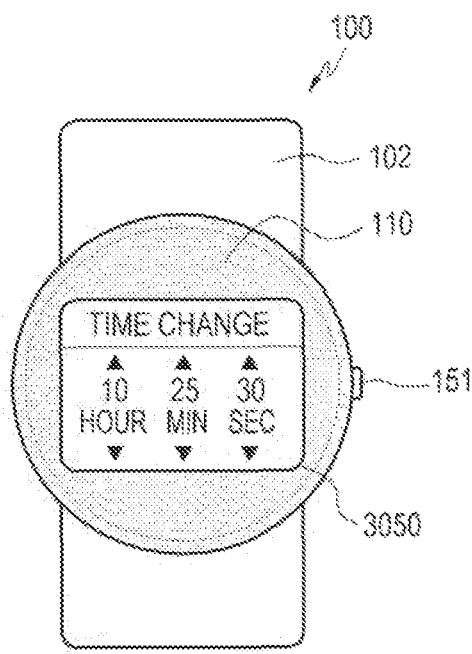

As an alternative, the control unit 107 or 907 may detect an input for changing the time through a time change interface 3050 that is displayed on the touch screen 110 as illustrated in FIG. 30G.

Figure 30H:
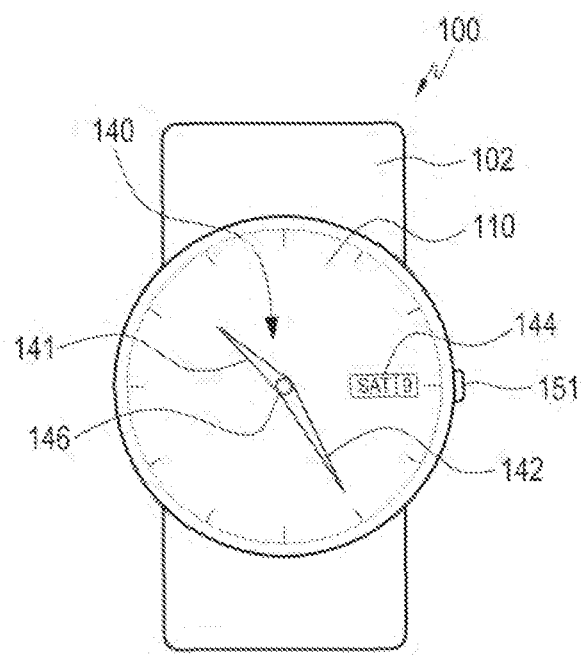

As a further variation, the control unit 107 or 907 may change the position of the time indicating unit 140 through the control of the first rotating unit 440 on the basis of the present position of the time indicating unit 140 and the swipe/drag moving route sensed according to the drag gesture (or swipe gesture), and then may detect the input for correct time change through the time change interface 3050 that is displayed on the touch screen 110 as illustrated in FIG. 30G. For example, in response to the input, the control unit 107 or 907 may change the position of the time indicating unit 140 to correspond to the input through the control of the first rotating unit 440 as illustrated in FIG. 30H.

FIGS. 31A to 31F are exemplary views for describing an operation of changing date.

Figure 31A:
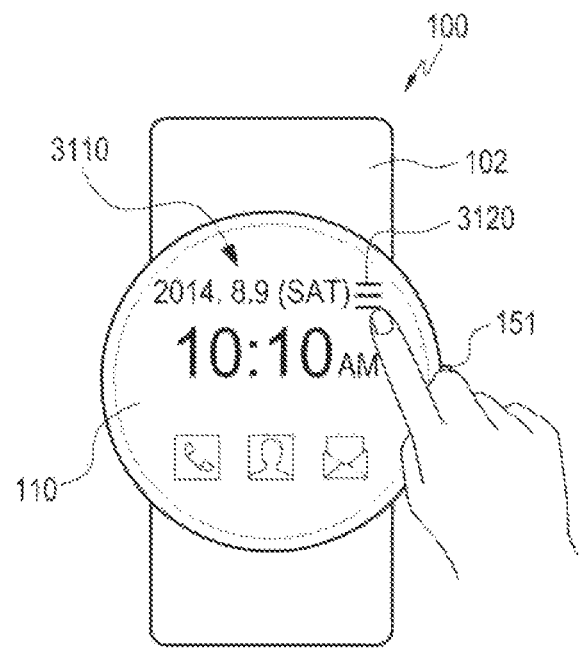
FIGS. 31A to 31F are exemplary views for describing an operation of changing the date.
Figure 31B:
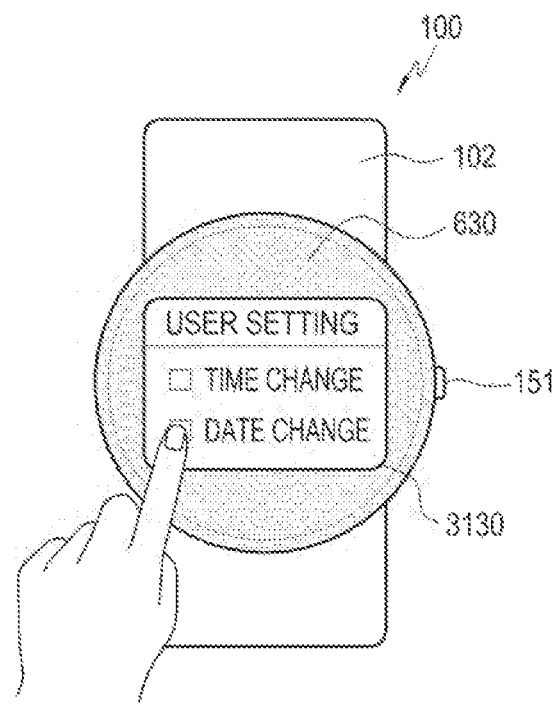
Figure 31C:
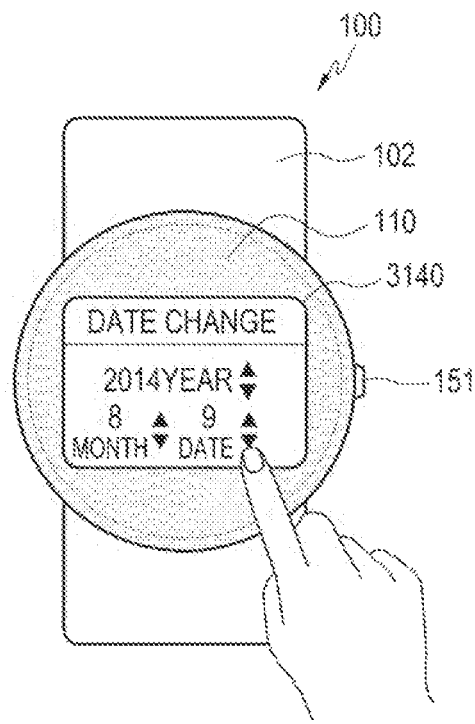

Referring to FIG. 31A, the control unit 107 or 907 may detect a selection input for a setting menu icon 3120 on the screen 3110 through the touch screen 110. As illustrated in FIG. 31B, the control unit 107 or 907 may detect the selection of a date change item 3130 through the touch screen 110. As illustrated in FIG. 31C, the control unit 107 or 907 may detect the selection of a date item 3140 that the user wishes to change, through the touch screen 110.

Figure 31D:
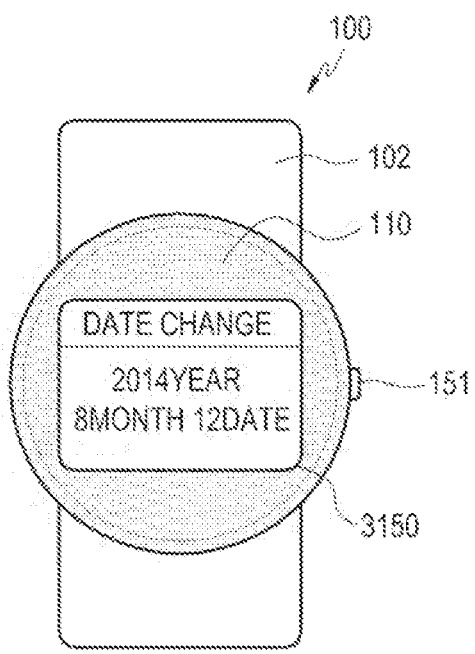
Figure 31E:
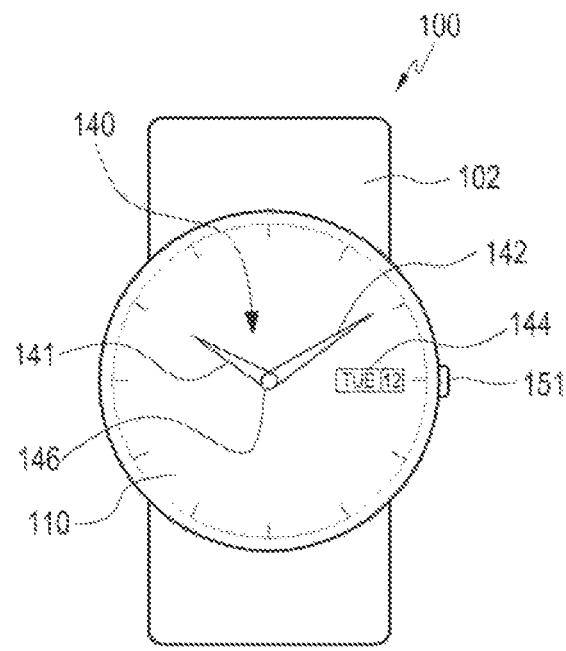
Figure 31F:
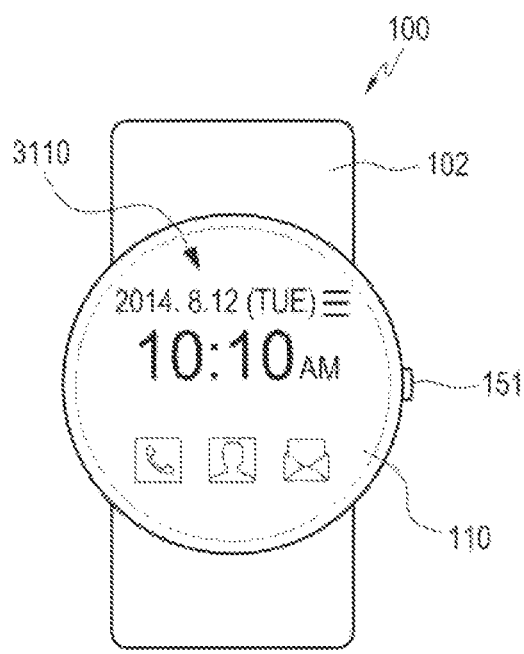

In response to the selection, the control unit 107 or 907 may display a date change confirmation message 3150 on the touch screen 110, as illustrated in FIG. 31D. In response to the date change confirmation, the control unit 107 or 907 may change the auxiliary indicating unit 144 to correspond to the input through the control of the second rotating unit 450 as illustrated in FIG. 31E. Alternatively, the control unit 107 or 907 may also change date and day 3110 displayed on the touch screen 110 to correspond to the input, as illustrated in FIG. 31F.

Figure 32A:
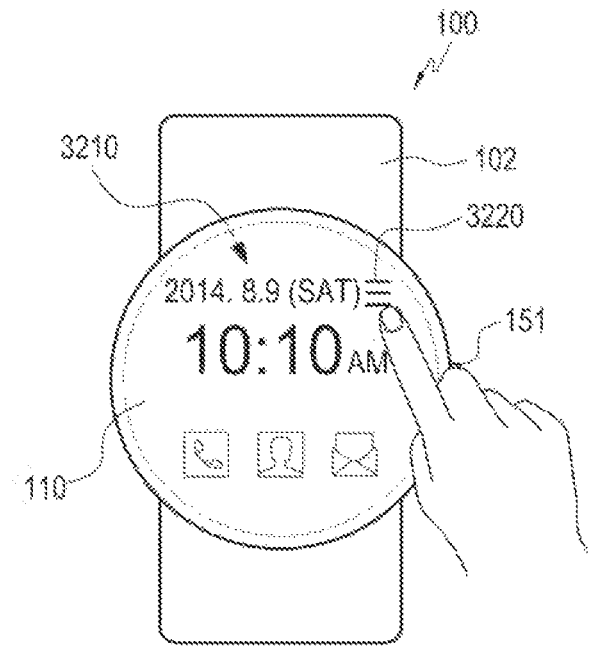
FIGS. 32A to 32C are exemplary views for describing an operation for displaying the times of two or more different areas.
Figure 32B:
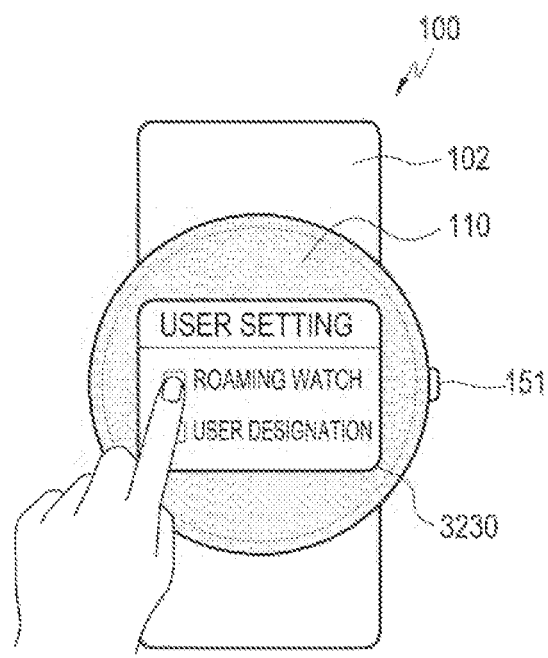
Figure 32C:
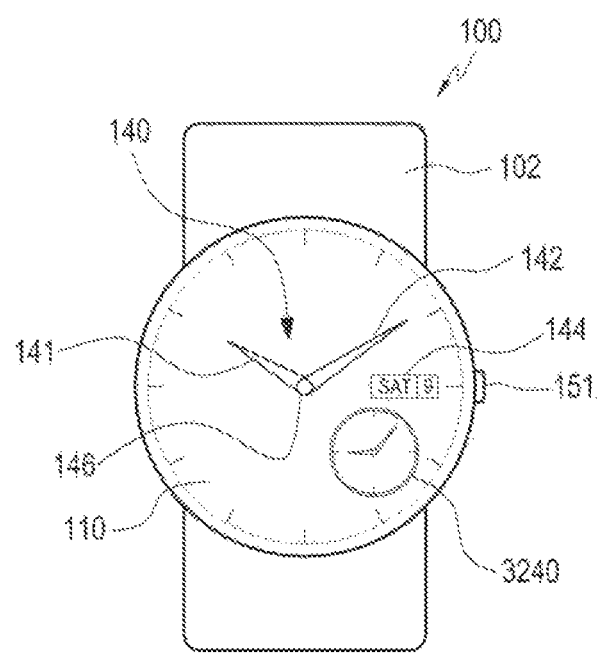

FIGS. 32A to 32C are exemplary views for describing an operation for displaying times of two or more different areas.

Referring to FIG. 32A, the control unit 107 or 907 may detect a selection input for a setting menu icon 3220 on the screen 3210 through the touch screen 110. As illustrated in FIG. 32B, the control unit 107 or 907 may display a menu item 3230 in response to the selection input through the touch screen 110. For the purpose of multiple time display, the user may select a roaming watch item, as illustrated in FIG. 32B. In response to the item selection, the control unit 107 or 907 may control the time indicating unit 140 to indicate time for a first area (or time for a second area) through the control of the first rotating unit 440, as illustrated in FIG. 32C. In response to the item selection, the control unit 107 or 907 may control the touch screen 110 to display time 3240 for the second area (or time for the first area). As described above, the first area and the second area may be, for example, cities or countries that use different local times.

Alternatively, the control unit 107 or 907 may detect a pinch gesture of closing or opening two fingers with respect to the touch screen 110 (e.g., pinch to zoom-out gesture), and may perform a control such that, according to the pinch gesture, the time indicated by the time indicating unit 140 is displayed on the touch screen 110 and the time displayed on the touch screen 110 is indicated by the time indicating unit 140. For example, when the user is in U.S., time in Korea may be displayed using a small window on the touch screen 110, and the time indicating unit 140 may indicate the local time in U.S.

FIGS. 33A to 33F are exemplary views for describing an operation of synchronizing the time indicated by the time indicating unit and the time displayed on the touch screen.

Figure 33A:
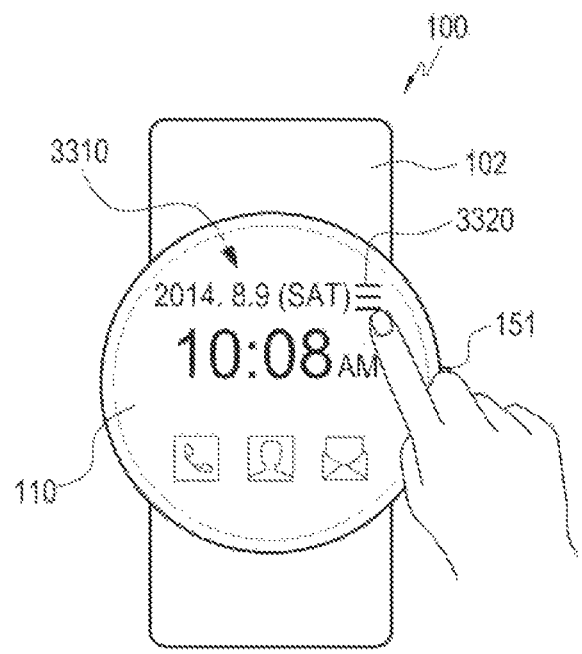
FIGS. 33A to 33F are exemplary views for describing an operation of synchronizing the time indicated by the time indicating unit and the time displayed on the touch screen.
Figure 33B:
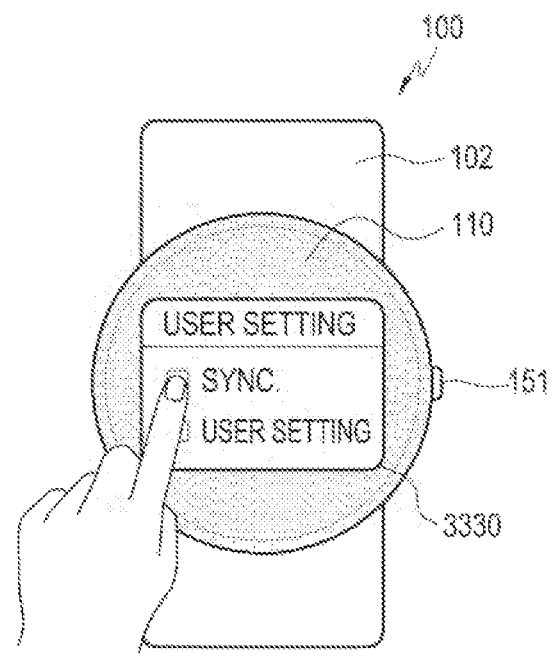
Figure 33C:
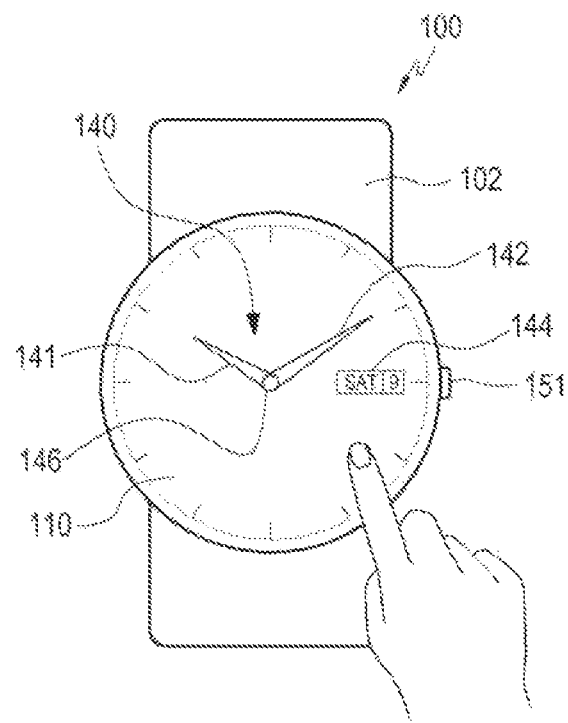
Figure 33D:
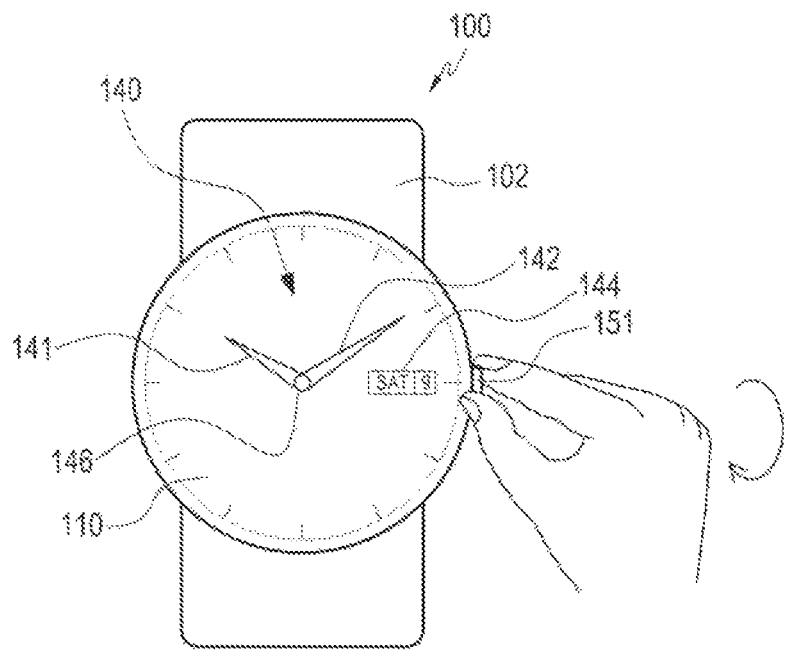
Figure 33E:
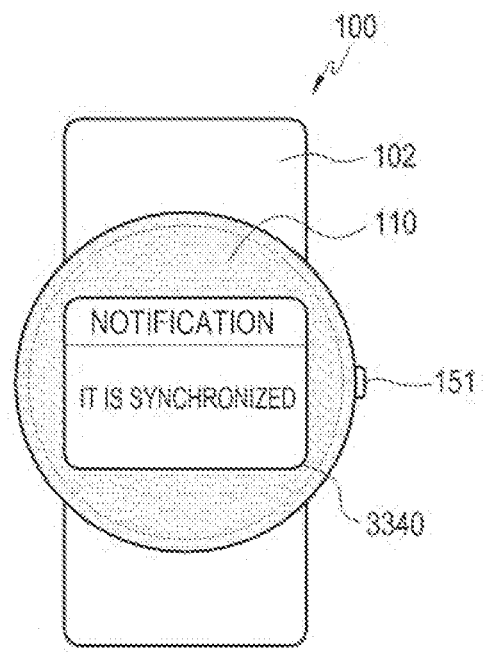
Figure 33F:
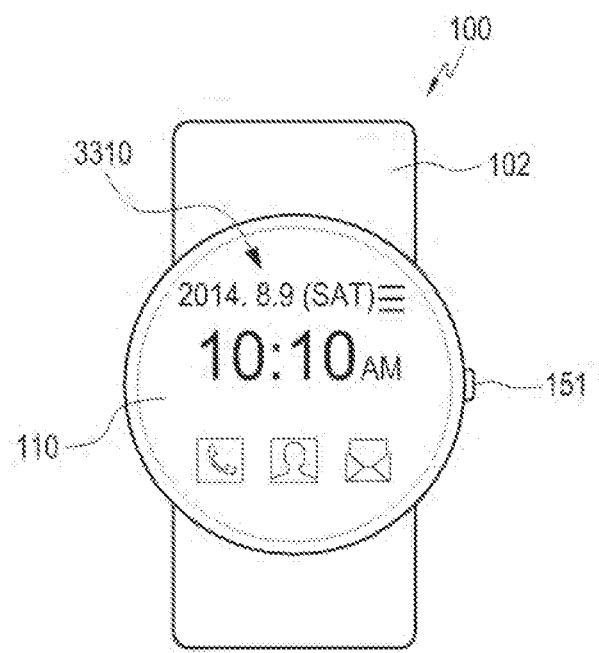

Referring to FIG. 33A, the control unit 107 or 907 may detect a selection input for the setting menu icon 3320 on the screen 3310 through the touch screen 110. As illustrated in FIG. 33B, in response to the selection input, the control unit 107 or 907 may display the menu item 3330 on the touch screen 110. In order to synchronize the times, for example, the user may select a synchronization item 3330, as illustrated in FIG. 33B. After selecting the synchronization item, the control unit 107 or 907 may detect a touch input by the user (e.g., a touch on the touch screen 110) or a predetermined input for the watch stem 151 (e.g., rotation of the watch stem by one half of the periphery thereof clockwise), as illustrated in FIG. 33C and/or FIG. 33D. When the input is detected, the control unit 107 or 907 may synchronize the time indicated by the time indicating unit 140 and the time displayed on the touch screen 110. The control unit 107 or 907 may perform the synchronization with reference to any one of the time indicated by the time indicating unit 140 and the time displayed on the touch screen 110. The control unit 107 or 907 may display a synchronization completion message 3340 on the touch screen 110, as illustrated in FIG. 33E, and may display the synchronized time on the screen 3310, as illustrated in FIG. 33F.

Alternatively, the control unit 107 or 907 may synchronize at least one of the time indicated by the time indicating unit 140 or the time displayed on the touch screen 110 with reference to time received through the first communication unit 106.

Figure 34A:
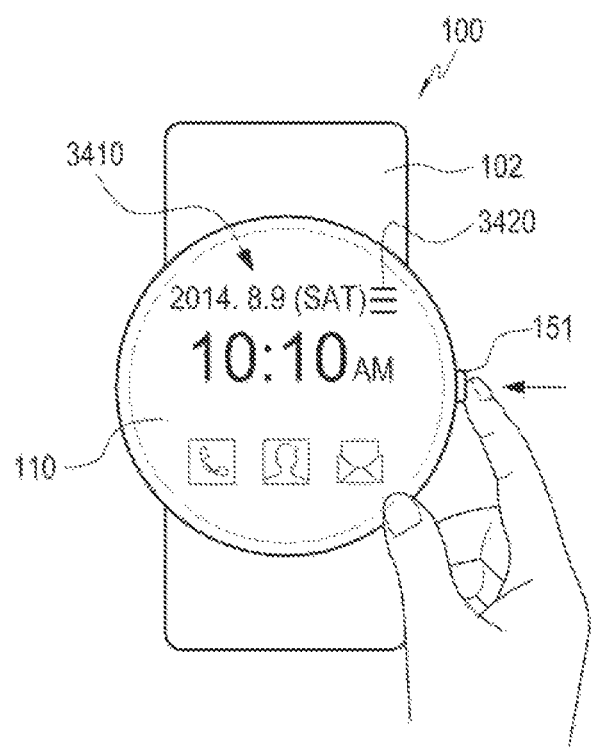
FIGS. 34A and 34B are exemplary views for describing an operation of executing a stop watch function.
Figure 34B:
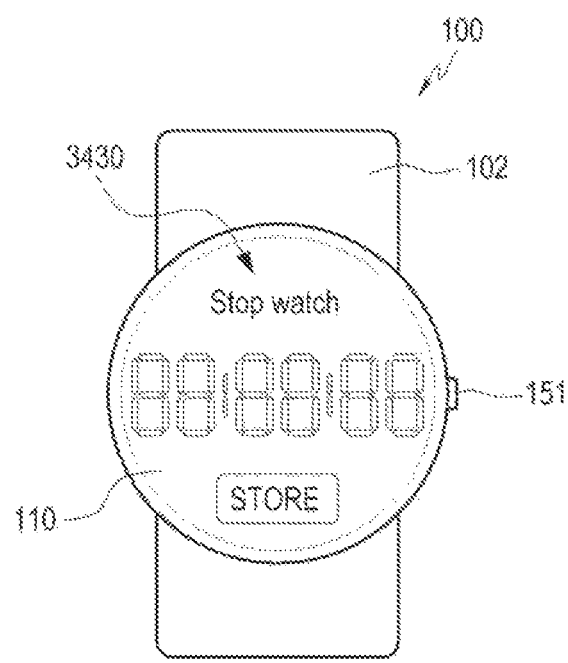

FIGS. 34A and 34B are exemplary views for describing an operation of executing a stop watch function.

Referring to FIG. 34A, the control unit 107 or 907 may detect an input for the watch stem 151. As illustrated in FIG. 34B, in response to the input, the control unit 107 or 907 may change the home screen 3410 to a stop watch interface 3430 and displays the stop watch interface 3430 on the touch screen 110. In an embodiment, the control unit 107 or 907 may select a selection input for the setting menu icon 3420 on the home screen 3410 through the touch screen 110. In response to the selection input, the control unit 107 or 907 may change the home screen 3410 to the stop watch interface 3430 and may display the stop watch interface 3430 on the touch screen 110.

Figure 35A:
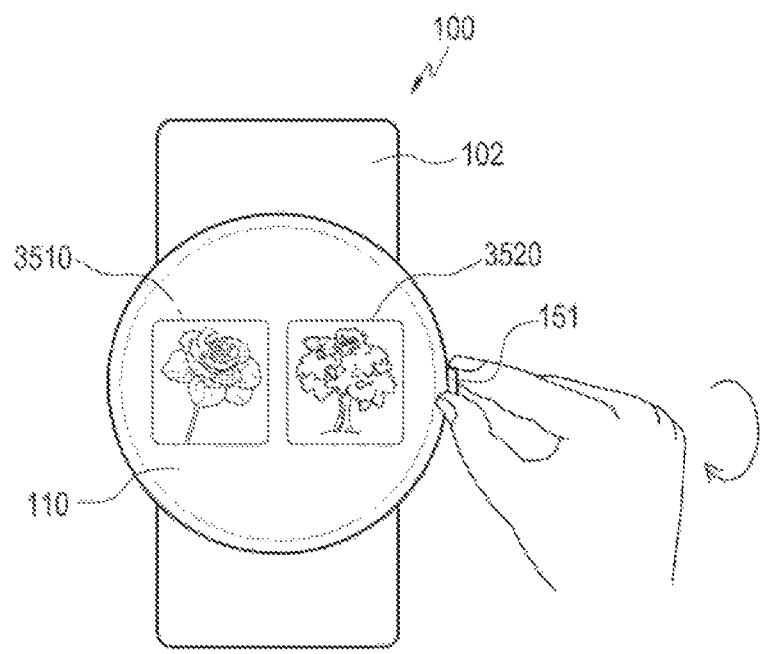
FIGS. 35A and 35B are exemplary views for describing an operation of controlling a graphic element on the touch screen.
Figure 35B:
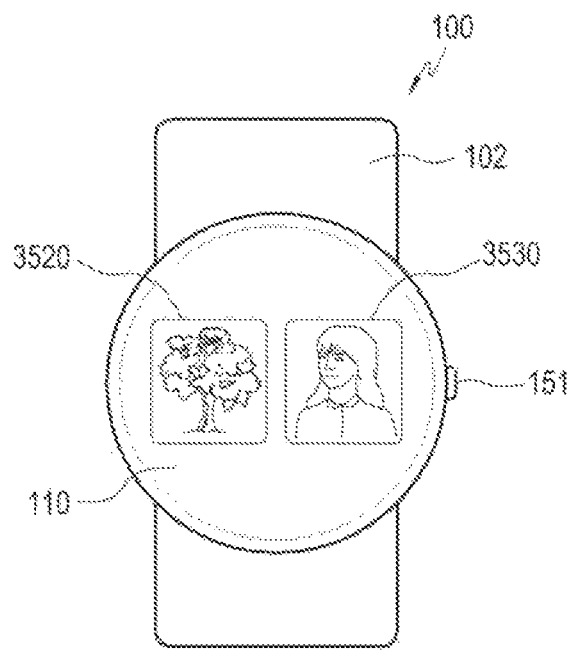

FIGS. 35A and 35B are exemplary views for describing an operation of controlling a graphic element on the touch screen.

Referring to FIG. 35A, various graphic elements such as images 3510 and 3520 may be displayed on the touch screen 110. The control unit 107 or 907 may detect a predetermined input, such an operation of rotating the watch stem 151 in a predetermined direction through the fourth sensor 1540, and as illustrated in FIG. 35B, may perform a control, such as a movement of the graphic elements. According to the movement of the graphic elements, another graphic element 3530 may be displayed. However, the movement of the graphic elements is illustrative, and the control unit 107 or 907 may perform at least one of, for example: an operation of adjusting an attribute of the graphic elements, such as changing the size of the graphic elements according to the input for the watch stem 151, and an operation of changing the display of the graphic elements.

FIGS. 36A to 36E are exemplary views for describing an operation of performing an alarm function.

Figure 36A:
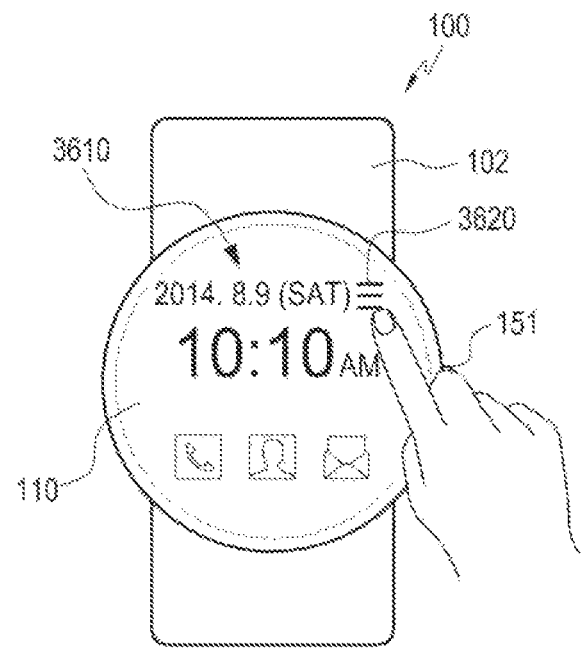
FIGS. 36A to 36E are exemplary views for describing an operation of performing an alarm function.
Figure 36B:
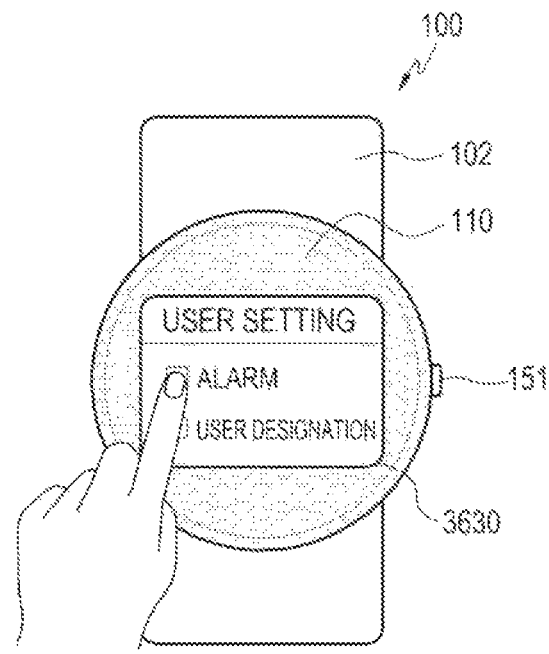
Figure 36C:
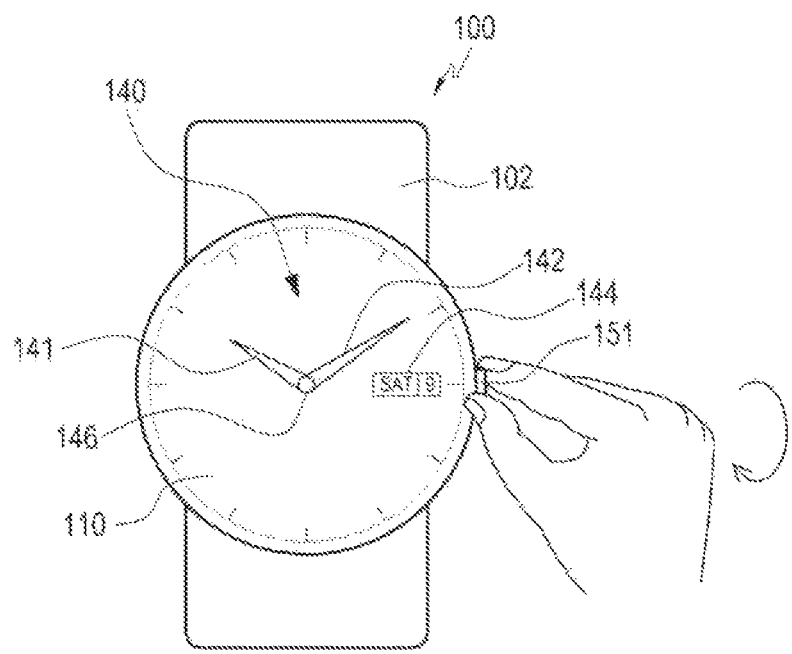
Figure 36D:
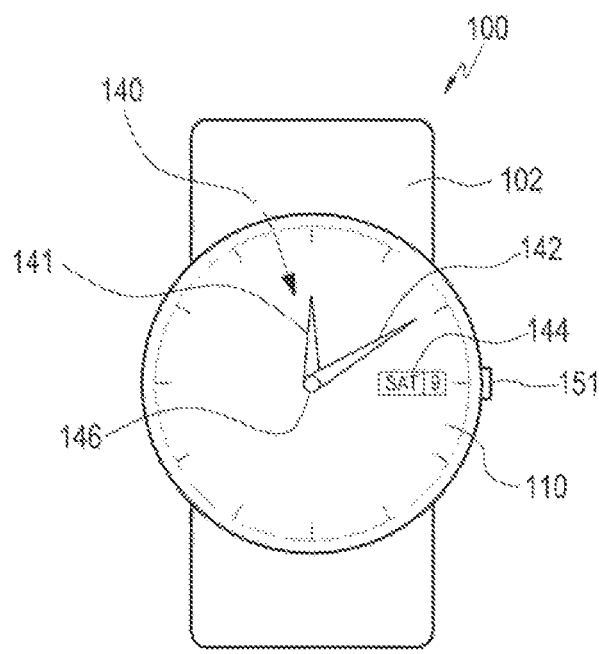
Figure 36E:
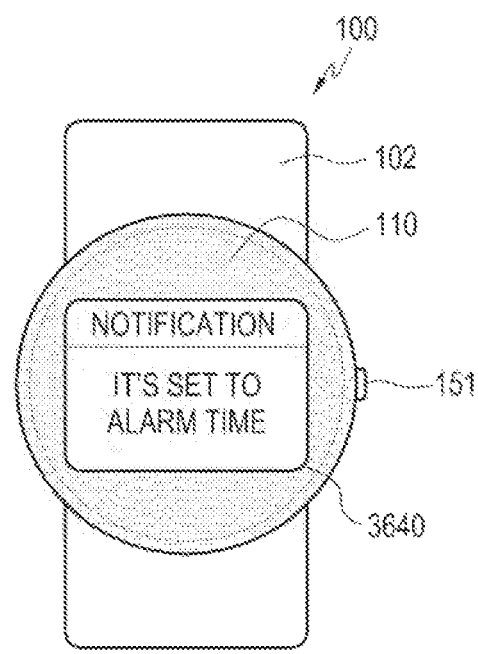

Referring to FIG. 36A, the control unit 107 or 907 may receive a selection input for the setting menu icon 3620 on the screen 3610 through the touch screen 110. As illustrated in FIG. 36B, the control unit 107 or 907 may display the menu item 3630 in response to the selection input. The control unit 107 or 907 may detect an alarm time setting input through the touch screen 110. When the alarm time setting input is detected, the control unit 107 or 907 may perform a control such that the background color of the touch screen 110 is displayed transparently so as to allow the user to set the alarm time. The user may set the alarm time (e.g., 12:10 p.m.) as illustrated in FIG. 36D by operating the watch stem 151, as illustrated in FIG. 36C. The control unit 107 or 907 may receive information for the alarm time and store the information in the memory 105 or 905. As illustrated in FIG. 36E, the control unit 107 or 907 may display an alarm setting confirmation message 3640 on the touch screen 110. When it arrives at the alarm time, the control unit 107 or 907 may perform a control such that a predetermined alarm message is output.

Figure 37A:
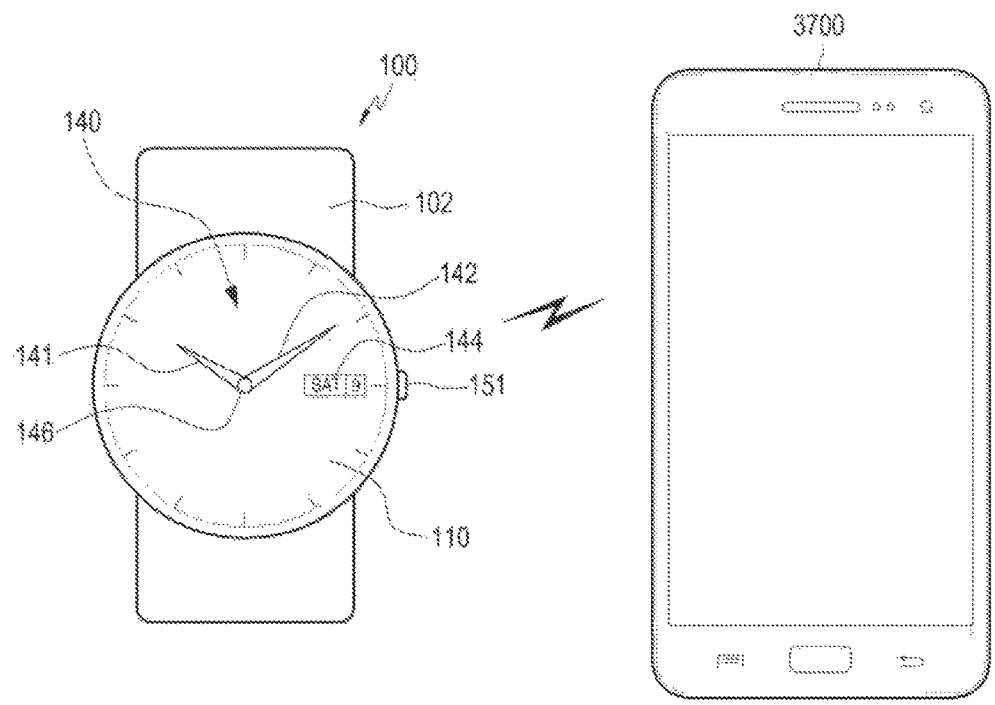
FIGS. 37A to 37C are exemplary views for describing various functions/operations performed between the wearable device and a mobile device that performs a communication with the wearable device.
Figure 37B:
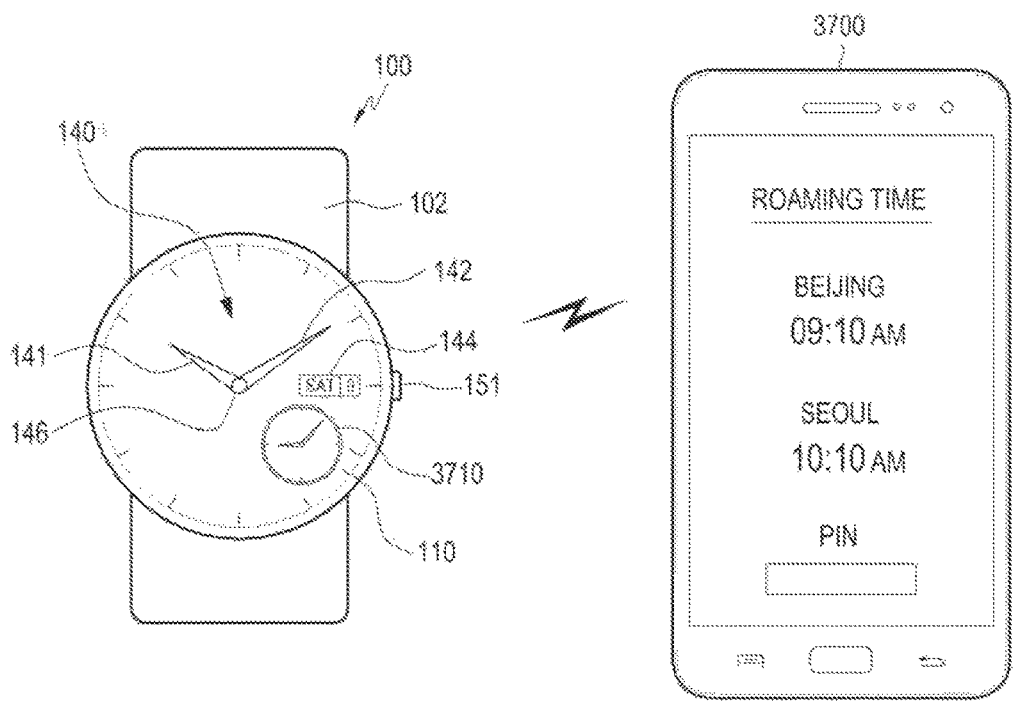
Figure 37C:
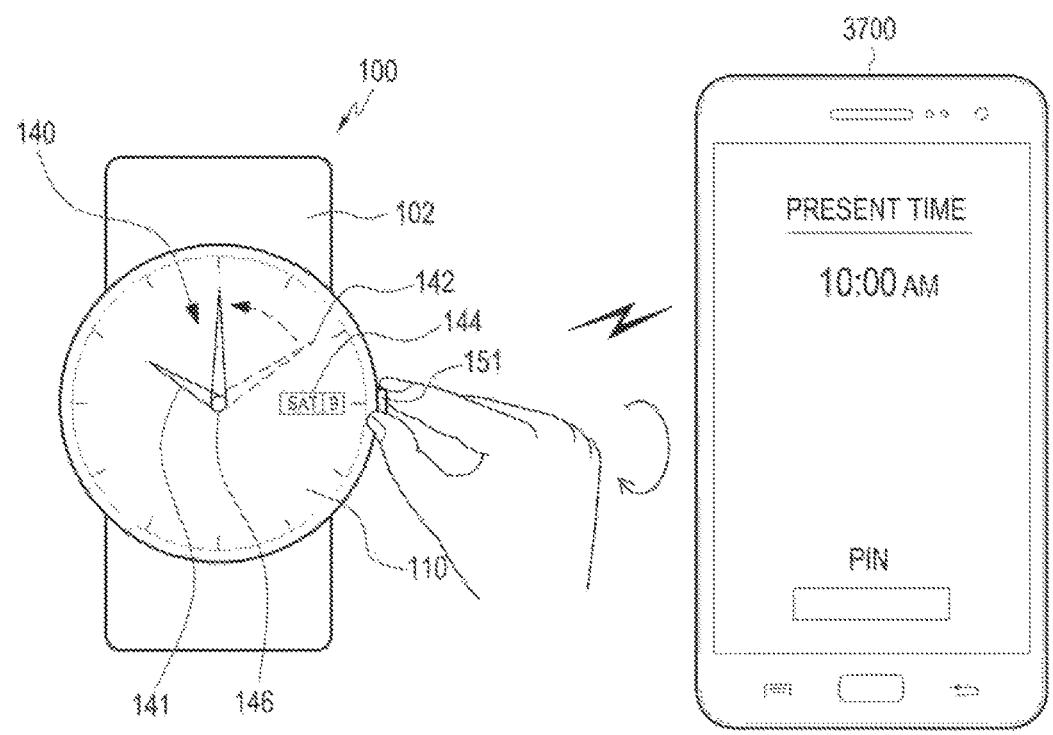

FIGS. 37A to 37C are exemplary views for describing various functions/operations performed between the wearable device and an external mobile device that performs a communication with the wearable device.

Referring to FIG. 37A, the wearable device 100 may connected with the mobile device 3700 in a wired or wireless manner. Since the wired or wireless connections are the same as those described above, detailed descriptions thereof will be omitted.

Referring to FIG. 37B, as an extension concerning multiple time display, a function or operation corresponding to the above-described multiple time display may be performed between the wearable device 100 and the mobile device 3700. The control unit 107 or 907 may indicate the time for a first area (e.g., Seoul) through the time indicating unit 140, and the time 3710 for a second area (e.g., Beijing) may be displayed on the touch screen 110.

Referring to FIG. 37C, when a time change input through the watch stem 151 is detected, the control unit 107 or 907 may send a request to the mobile device 3700 to change the time displayed on the mobile device 3700 in response to the input. When the request is received, the mobile device 3700 may perform a control so as to change the present time displayed on the mobile device 3700 according to the request. Similarly to this, the control unit 107 or 907 may receive a time change request from the mobile device 3700, and may change the time indicated by the time indicating unit 140 according to the request.

Alternatively, the control unit 107 or 907 may change the position/state of the time indicating unit 140 or the auxiliary indicating unit according to the information received from the mobile device 3700 (e.g., time, weather, and date).

FIGS. 38A to 38D are exemplary views for describing an operation of switching the wearable device to an analog watch mode.

Figure 38A:
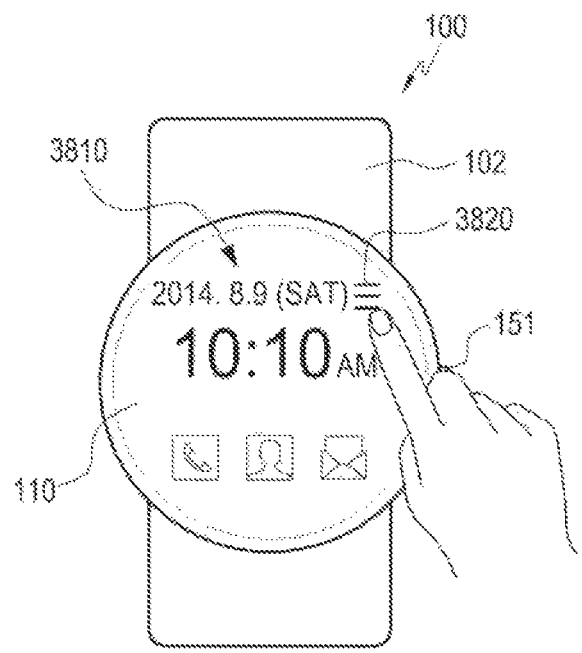
FIGS. 38A to 38D are exemplary views for describing an operation of switching the wearable device to an analog watch mode.
Figure 38B:
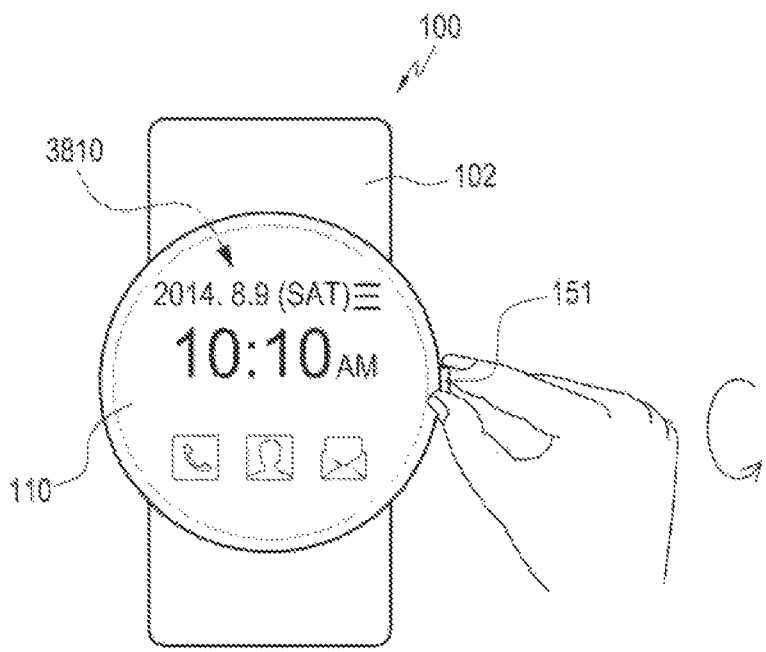
Figure 38C:
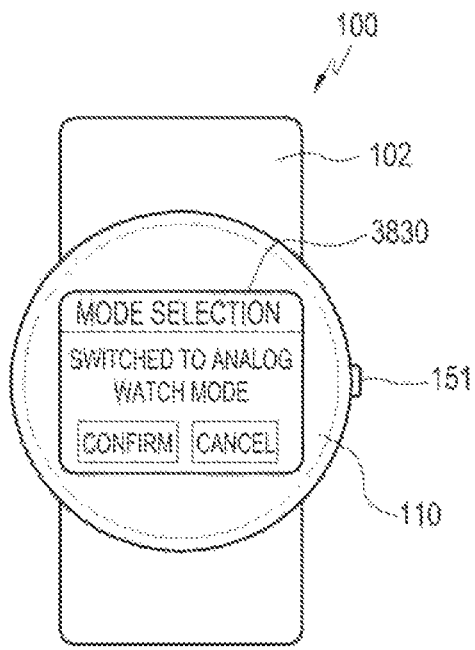
Figure 38D:
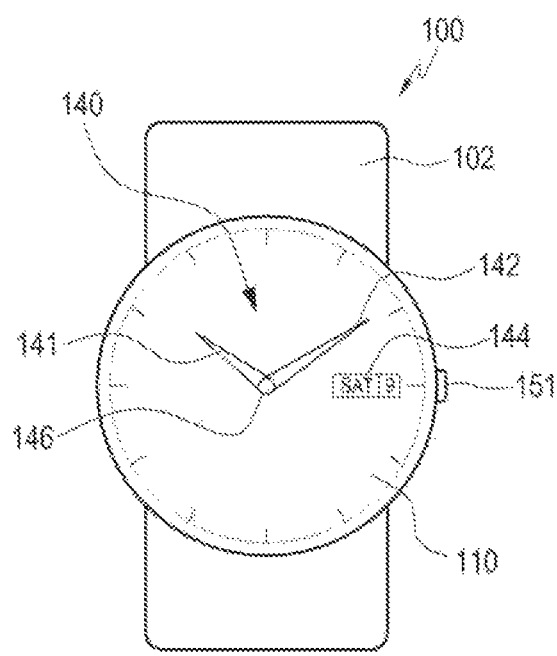

Referring to FIG. 38A, the control unit 107 or 907 may receive a touch input for the setting menu icon 3820 on the screen 3810 through the touch screen 110. The touch input may include, for example, a double tap gesture. Or, as illustrated in FIG. 38B, the control unit 107 or 907 may detect the rotation of the watch stem 151. As illustrated in FIG. 38C, the control unit 107 or 907 may display a mode conversion confirmation message 3830 on the touch screen 110. When a confirmation request is received from the user, the control unit 107 or 907 may switch the wearable device to an analog watch mode, as illustrated in FIG. 38D. The analog watch mode may mean a mode, in which a function/functions or an operation/operations performed by the smart watch are not performed. That is, the analog watch mode may mean a mode for only using the wearable device as an ordinary analog wrist watch.

Figure 39:
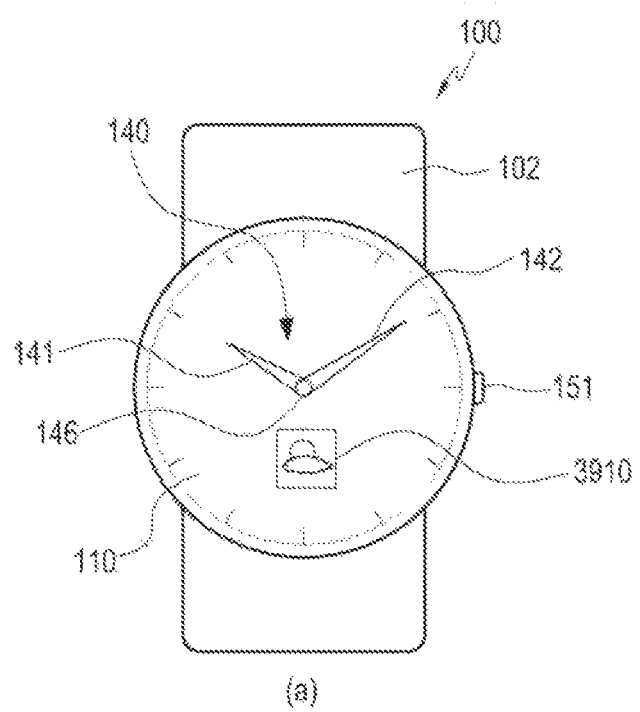
FIG. 39 is an exemplary view for describing a describing a position change operation of a graphic element according to a position of the time indicating unit.
Figure 39:
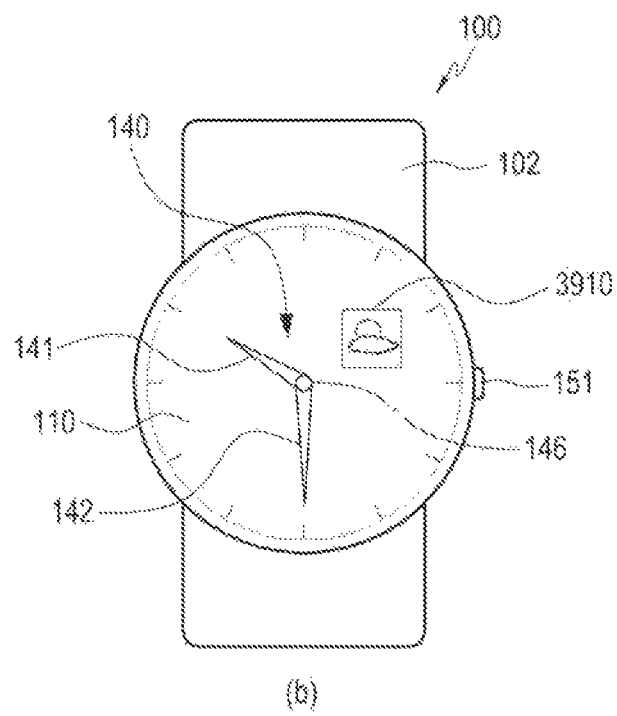

FIG. 39 is an exemplary view for describing a position change operation of a graphic element according to a position of the time indicating unit.

Referring to FIG. 39(*a*), the control unit 107 or 907 may detect the position of the time indicating unit 140 through the sensor unit 104 or 904.

Referring to FIG. 39(*b*), the control unit 107 or 907 may change the position of the graphic element 3910 (e.g., a message or widget) one or more times such that the graphic element 3910 displayed on the touch screen 110 is not covered by (or does not overlap with) the time indicating unit 140.

Alternatively, the control unit 107 or 907 may display the position of the sun on the screen 110 based on the position of the time indicating unit 140. As a further alternative, the control unit 107 or 907 may adjust an attribute, such as a size, a position, a color, or transparency of a graphic element on the touch screen 110, which exists at a position that is equal to or proximate to the position of the time indicating unit 140.

Figure 40A:
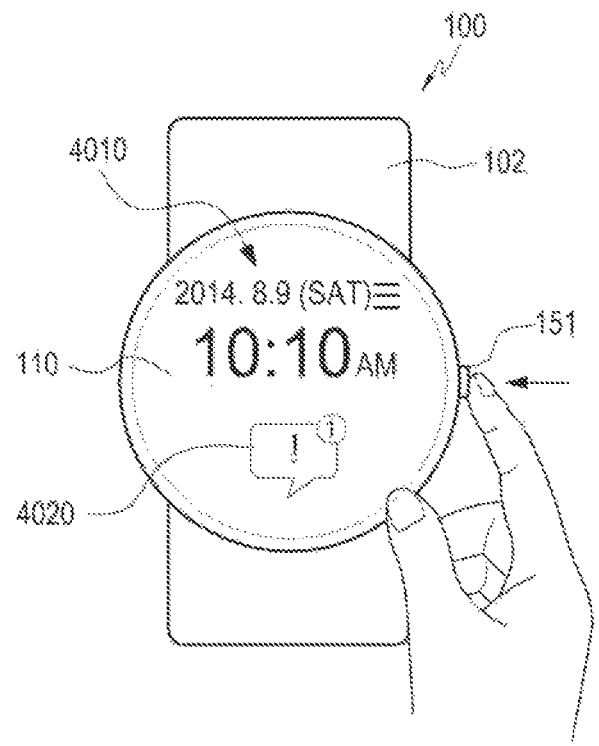
FIGS. 40A and 40B are exemplary views for describing an operation for confirming a message.
Figure 40B:
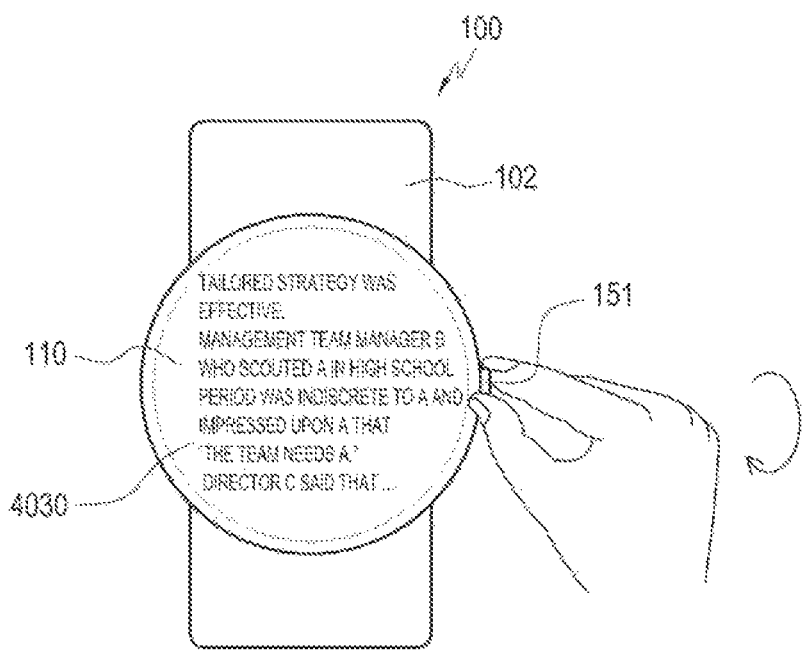

FIGS. 40A and 40B are exemplary views for describing an operation for confirming a message.

Referring to FIG. 40*a*, the control unit 107 or 907 may display an indicator 4020 that indicates reception of a message (e.g., a text message, SMS (short message service) message or an social network service (SNS) message) on a home screen 4010. The control unit 107 or 907 may detect an input for the watch stem 151.

Referring to FIG. 40B, in response to the input for the watch stem 151, the control unit 107 or 907 may display the content 4030 of the received message on the touch screen 110. For example, the control unit 107 or 907 may detect a predetermined input (e.g., a scroll input), such as an operation of rotating the watch stem 151 in a predetermined direction, through the fourth sensor 1540. In response to the scroll input performed using the watch stem 151, the control unit 107 or 907 may scroll and display the content 4030 of the received message. For example, the control unit 107 or 907 may display the next content following the displayed content 4030 of the received message, or the previous content preceding to the displayed content 4030 of the received message.

Figure 41A:
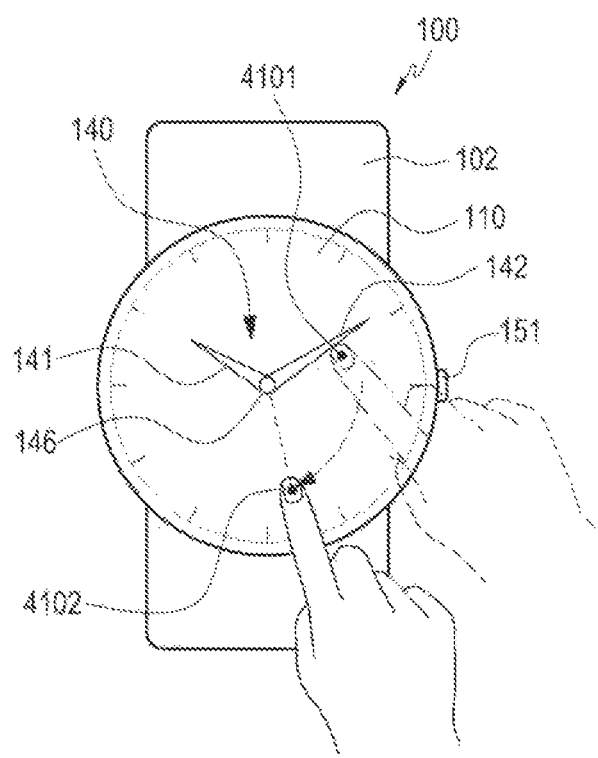
FIGS. 41A and 41B are exemplary views for describing an operation of changing the time.
Figure 41B:
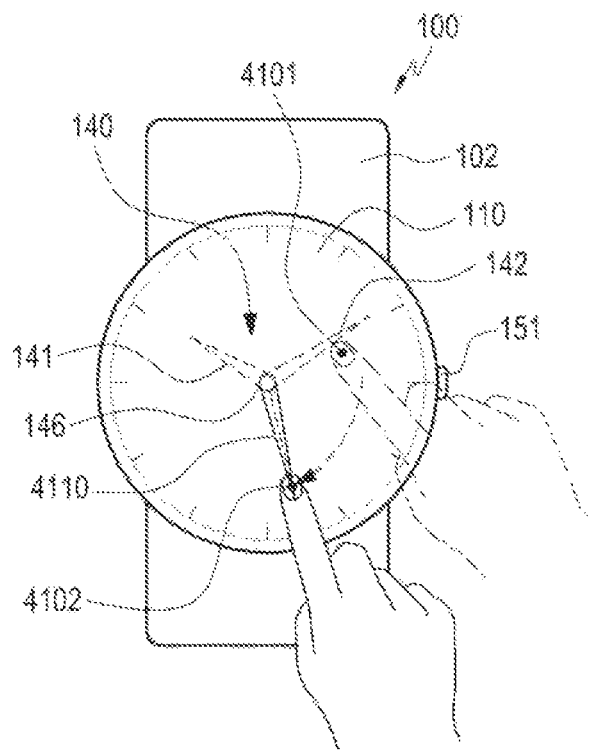

FIGS. 41A and 41B are exemplary views for describing an operation of changing the time.

Referring to FIG. 41A, the control unit 107 or 907 may detect an input of moving the position of the time indicating unit 140 (e.g., a swipe/drag input) through the touch screen 110. The control unit 107 or 907 may change the position of the time indicating unit 140 through the control of the first rotating unit 440, on the basis of the present position of the time indicating unit 140 and a swipe/drag moving route (the route from 4101 to 4102) sensed according to the drag gesture (or swipe gesture). A time delay may occur between the swipe/drag input and the position change of the time indicating unit 140 through the first rotating unit 440.

Referring to FIG. 41B, the control unit 107 or 907 may perform a control such that the touch screen 110 is seen translucently through the control of the background color and/or the background brightness of the touch screen 110. As the touch screen 110 is seen translucently, the time indicating unit 140 may look blurred. The control unit 107 or 907 may display a virtual image 4110 corresponding to at least a part of the time indicating unit 140 (e.g., the minute hand 142) on the touch screen 110. The control unit 107 or 907 may control the virtual image 4110 to move in real time along the swipe/drag moving route (the route from 4101 to 4102). When the time indicating unit 140 completes the movement following the swipe/drag input, the control unit 107 or 907 may perform a control such that the touch screen 110 is seen transparently and may remove the virtual image 4110.

The touch screen 110 may have a characteristic that allows the transparency to be controlled according to the control data/signal of the control unit 107 or 907.

Figure 42A:
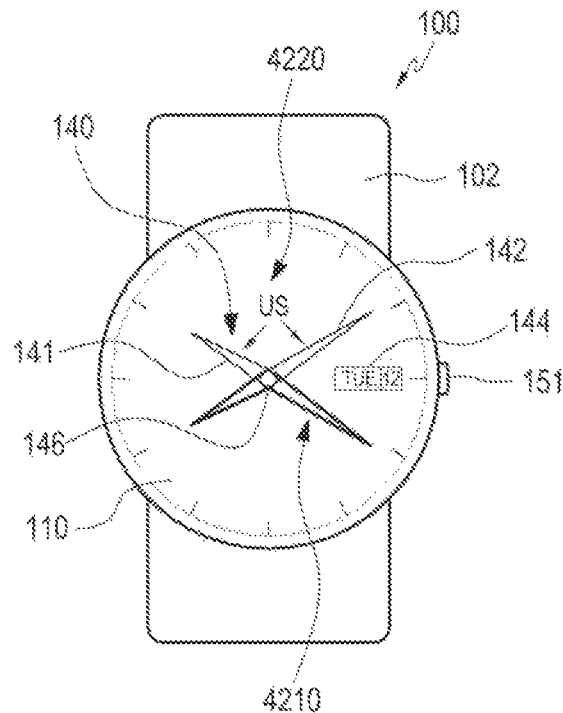
FIGS. 42A and 42B are exemplary views for describing an operation of displaying times for two or more different areas.
Figure 42B:
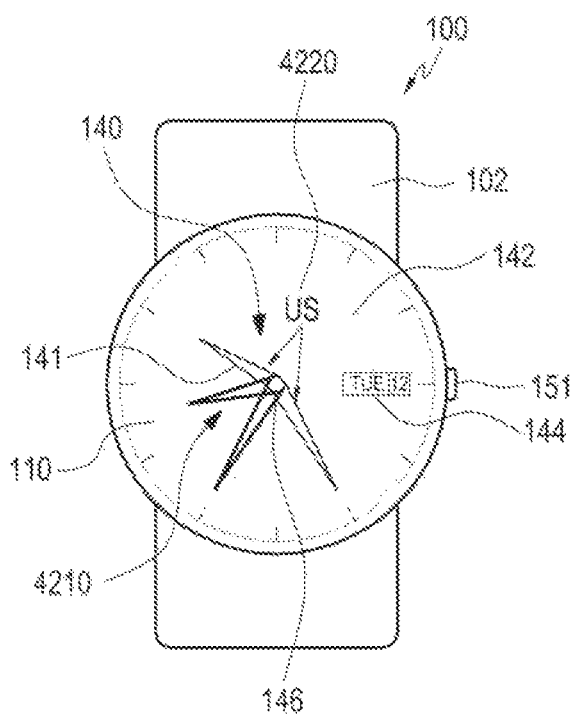

FIGS. 42A and 42B are exemplary views for describing an operation of displaying times for two or more different areas.

As illustrated in FIG. 42A, when the time indicating unit 140 indicates time for a first area (e.g., U.S.), the control unit 107 or 907 may perform a control such that the touch screen 110 displays a virtual time indicating unit 4210. The virtual time indicating unit 4210 indicates time for a second area (e.g., Korea). The control unit 107 or 907 may perform a control such that the touch screen 110 displays an indicator 4220 (e.g., a country or an arrow) that indicates the first area.

As illustrated in FIG. 42B, when the time indicating unit 140 moves following the lapse of time, the control unit 107 or 907 may control the touch screen 110 such that the indicator 4220 (e.g., a country or an arrow) indicating the first area is displayed while moving following the time indicating unit 140.

Figure 43A:
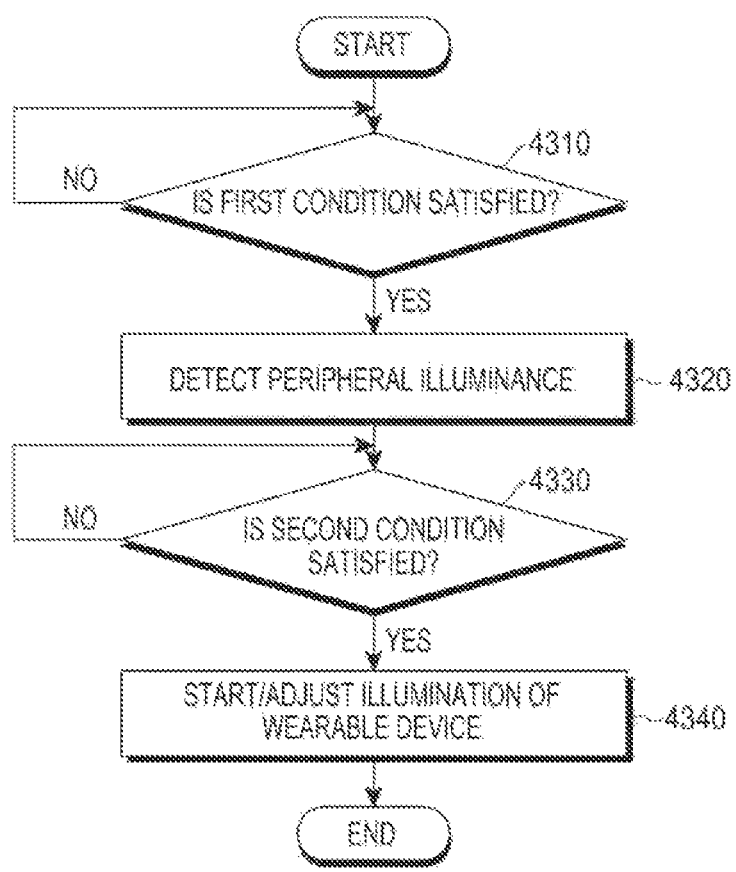
FIG. 43A is a flowchart illustrating an operating method of the wearable device according to various embodiments.

FIG. 43A is a flowchart illustrating an operating method of the wearable device according to various embodiments. The wearable device operating method may include operations 4310 to 4340. The wearable device operating method may be performed by a wearable device (e.g., one of the wearable devices 100 and 100a to 100*l*) or a control unit of the wearable device (e.g., the first control unit 107 or the second control unit 907).

At operation 4310, the wearable device may determine whether a pre-set first condition is satisfied. When the first condition is satisfied, the wearable device may perform operation 4320, and when the first condition is not satisfied, the wearable device may periodically repeat operation 4310.

In an embodiment, the first condition may include at least one of, for example: a case in which a first input is detected; a case in which an event (e.g., reception of a message, arrival of an alarm time, arrival of a pre-set schedule item, or occurrence of an alarm message) occurs; a case in which it arrives at a pre-set period; a case in which it arrives at a pre-set time (e.g., 18:00 or 20:00); a case in which a user/visual line is detected; a case in which a user's operation of a pre-set pattern is detected; and a case in which an attribute value (e.g., a remaining memory level or a signal reception intensity) that indicates the present state of the wearable device is included in a pre-set threshold range or is not more/less than a pre-set threshold value.

In an embodiment, the first input may include at least one of, for example: an input through an input/output unit (e.g., the first input/output unit 108 or the second input/output unit 908); an input using the watch stem 151; a touch input or hovering input on a touch screen (e.g., the touch screen 110 or 910); a voice input, and a gesture input.

In an embodiment, the wearable device may receive a user's voice through a microphone (e.g., a voice input through a microphone). For example, when at least one word in the voice, which coincides with at least one pre-set word, is detected, the wearable device may perform operation 4320.

In yet another embodiment, the wearable device may detect at least one of, for example a user, a user's visual line, and a gesture through a camera of a sensor unit (e.g., the sensor unit 104 or 904). For example, the wearable device may compare information about characteristic features (e.g., an edge, a corner, an image pattern, and a contour line) extracted from an image photographed through the camera with characteristic feature information previously stored in the memory 105 or 905. When the extracted characteristic feature information and the previously stored characteristic feature information coincide with each other, the wearable device may determine that the user (or a previously registered user) is detected. For example, when the user (or the previously registered user) is detected, the wearable device may perform operation 4320.

For example, the wearable device may recognize eyes from an image acquired through the camera. For example, eye recognition is performed using a conventional eye recognition method. For example, an eye recognition technique (which uses at least one of, for example: a contour line of an eye and a template which are stored in a memory) may be used. For example, the wearable device may perform eye learning through eye images of a plurality of users, and may recognize an eye from an input image based on the eye learning. Such eye learning information may be stored in a memory. The wearable device may also detect the user's visual line for the recognized eye. The wearable device may detect the user's visual line using a conventional eye tracking or eye detection technique. The wearable device may detect the user's visual line (or direction of visual line/looking direction) from the pose (position and/or direction) of an iris or pupil. For example, when the user's visual line is directed to the wearable device, the wearable device may perform operation 4320.

In an embodiment, operation 4310 may be omitted from the operating method of the wearable device. For example, the wearable device may periodically perform operation 4320. For example, the wearable device may periodically perform operation 4320 at pre-set time intervals (or within a pre-set time range).

At operation 4320, when the first condition is satisfied, the wearable device may detect peripheral illuminance (or ambient brightness) through an illuminance sensor or a camera of a sensor unit.

At operation 4330, the wearable device may detect whether a pre-set second condition is satisfied. When the second condition is satisfied, the wearable device may perform operation 4340, and when the second condition is not satisfied, operation 4330 may be periodically repeated.

In an embodiment, the second condition may include at least one of, for example: a case in which a second input is detected and a case in which a peripheral illuminance value is included within a threshold range or is not more/less than a threshold value.

In an embodiment, the second input may include at least one of, for example: an input through an input/output unit (e.g., the first input/output unit 108 or the second input/output unit 908); an input using the watch stem 151; a touch input or hovering input on a touch screen (e.g., the touch screen 110 or 910); a voice input; and a gesture input.

In an embodiment, the wearable device may display a graphic element for confirmation/adjustment of the initiation of illumination or an illumination degree on the touch screen. For example, the wearable device may receive a user input for the graphic element (e.g., a selectable text or an image).

At operation 4340, when the second condition is satisfied, the wearable device may adjust the illumination of the wearable device. For example, the wearable device may initiate the illumination or adjust the illumination brightness.

In an embodiment, when the peripheral illuminance is not more than a pre-set threshold value or is included in a threshold range, the wearable device may start the illumination of the wearable device or may increase the illumination brightness. In yet a further embodiment, when the peripheral illuminance is not smaller than the pre-set threshold value or is included in the threshold range, the wearable device may terminate the illumination of the wearable device or decrease the illumination brightness.

In an embodiment, the wearable device may control the illumination of the wearable device based on a difference between the current peripheral illuminance and the previous peripheral illuminance (or reference peripheral illuminance). In other embodiments, the memory may store a database (or a data table) including peripheral illuminances (or ranges) and illumination brightnesses, which correspond to each other. The wearable device may determine a target illumination brightness corresponding to a peripheral illuminance value through at least one of, for example: mapping, interpolation, and equation calculation associated with at least one value of the database.

In an embodiment, the database may have a format similar to Table 2.

TABLE 2

| Peripheral Illuminance | Illumination Brightness |
|---|---|
| A1 | OFF |
| A2 | ON (Level 1) |
| A3 | ON (Level 2) |
| A4 | ON (Level 3) |
| ... | ... |

In Table 2, Peripheral Illuminance (e.g., A1, A2, ...) may indicate a threshold level, a threshold value (e.g., a1, a2, ...), or a threshold range (e.g., a numerical range between an upper limit value and a lower limit value of the peripheral illuminance) for the peripheral illuminance. Illumination Brightness (e.g., OFF, ON (Level 1), ...) may indicate at least one of, for example: whether illumination is provided or not (e.g., OFF or ON), or an illumination degree or brightness (e.g., Level 1, Level 2, and Level 3).

Level 1, for example, may be an illumination level, at which at least a region of the touch screen (e.g., a peripheral portion or an edge region) illuminates at a first brightness, or each of at least some of the illuminating light sources illuminates at the first brightness.

For example, Level 2 is an illumination level, at which at least a region of the touch screen (e.g., a peripheral portion or an edge region) illuminates at a second brightness which is higher than the first brightness, and each of at least some of the illuminating light sources illuminates at the second brightness. For example, Level 2 may be an illumination level, at which at least a region of the touch screen (e.g., a peripheral portion or an edge region), which is wider than the area of Level 1, illuminates at the first brightness, or each of at least some of the illumination light sources the number of which is more than the number of light sources of Level 1, illuminates at the first brightness.

Level 3 may be an illumination level, at which the entire region of the touch screen illuminates at the first brightness or the second brightness (or a third brightness, which is higher than the first and second brightnesses), or all the illumination light sources illuminate at the first brightness or the second brightness (or the third brightness, which is higher than the first and second brightnesses).

Figure 43B:
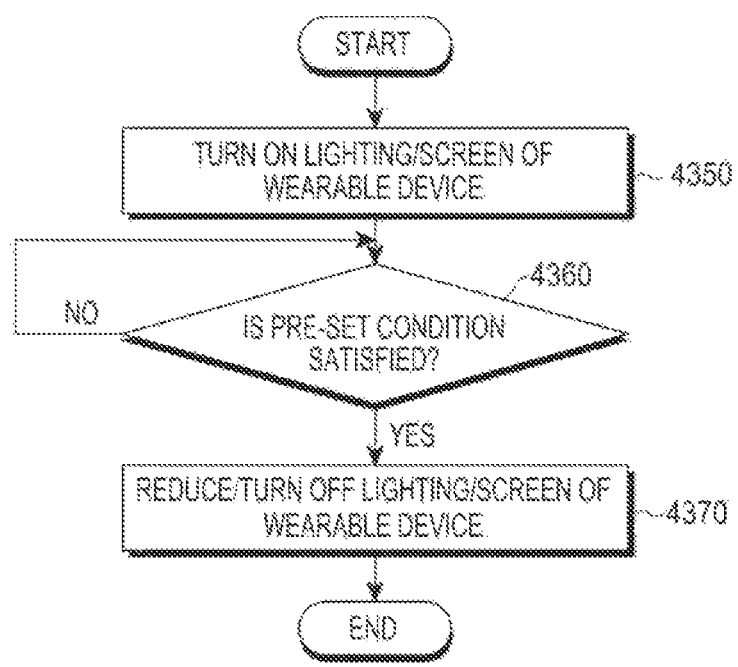
FIG. 43B is a flowchart illustrating an operating method of a wearable device according to various embodiments.

FIG. 43B is a flowchart illustrating an operating method of a wearable device according to various embodiments. The operating method of the wearable device may include operations 4350 to 4370. The operating method of the wearable device may be performed by a wearable device (e.g., one of the wearable devices 100 and 100a to 100l) or a control unit of the wearable device (e.g., the first control unit 107 or the second control unit 907).

At operation 4350, the wearable device may initiate illumination (or power ON), or may display a screen of a touch screen (e.g., the touch screen 110 or 910) (or may power ON the touch screen or may display the touch screen opaquely). For example, the touch screen may display a home screen (e.g., home screen 2910) of the smart watch mode.

At operation 4360, the wearable device may determine whether a pre-set condition is satisfied. When the condition is satisfied, the wearable device may perform operation 4370, and when the condition is not satisfied, the wearable device may periodically repeat operation 4360.

In an embodiment, the condition may include at least one of, for example: a case in which it arrives a pre-set time after the user/visual line was finally detected; a case in which it arrives at a pre-set time after the user input was finally detected; a case in which the proximity of an object is sensed through a sensor unit (e.g., the sensor unit 104 or 904), the proximity of an object is continuously sensed for a pre-set time through a sensor unit (e.g., the sensor unit 104 or 904); a case in which the proximity of an object is sensed through a sensor unit (e.g., the sensor unit 104 or 904) and the peripheral illuminance value is included within a threshold range or is equal to or less than a threshold value; a case in which the peripheral illuminance value is included within the threshold range or is not more than the threshold value; and a case in which a change amount of the peripheral illuminance value exceeds a threshold value.

For example, when the present time is included within a pre-set time range (e.g., daytime) and the peripheral illuminance value is included within the threshold range or not more than the threshold value, the wearable device may determine that the condition is satisfied. By way of another example, when the proximity of an object is sensed and the peripheral illuminance value is included within the threshold range or is not more than the threshold value in a case where the wearable device is covered by, for example, a sleeve, the wearable device may determine that the condition is satisfied.

At operation 4370, when the condition is satisfied, the wearable device may turn OFF (or reduce) the illumination, or may turn OFF the screen of the touch screen (e.g., the touch screen 110 or 910) (or may power OFF the touch screen, may display the touch screen transparently, or may switch the wearable device to the analog watch mode). In an embodiment, when the condition is satisfied, the wearable device may operate at a sleep mode. During the sleep mode, the wearable device may provide a second power to the constituent elements. The second power is lower than a first power provided to the constituent elements of the wearable device during a normal mode. For example, the second power may include the minimum power for maintaining data stored in the memory 105 or 905 of the wearable device and the minimum power for sensing the user input. For example, no power or the minimum power may be applied to the sensor unit (e.g., the sensing unit 104 or 904) or the communication unit 106.

Figure 44:
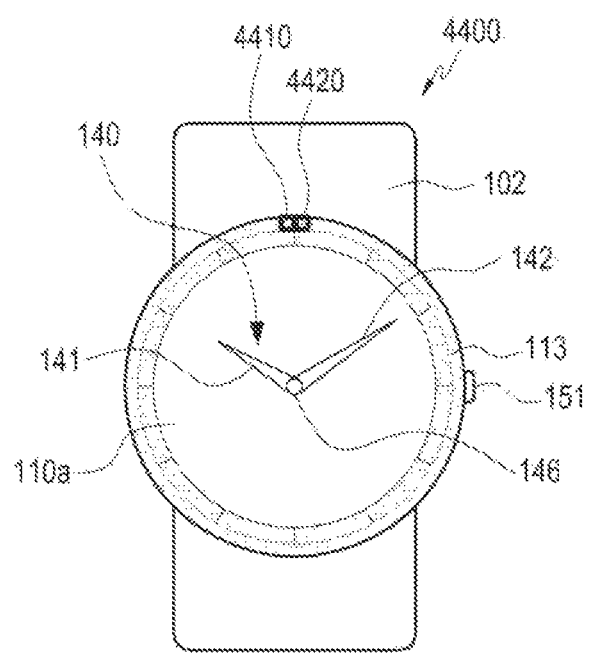
FIGS. 44 and 45 are views for describing an operating method of a wearable device according to various embodiments.
Figure 45:
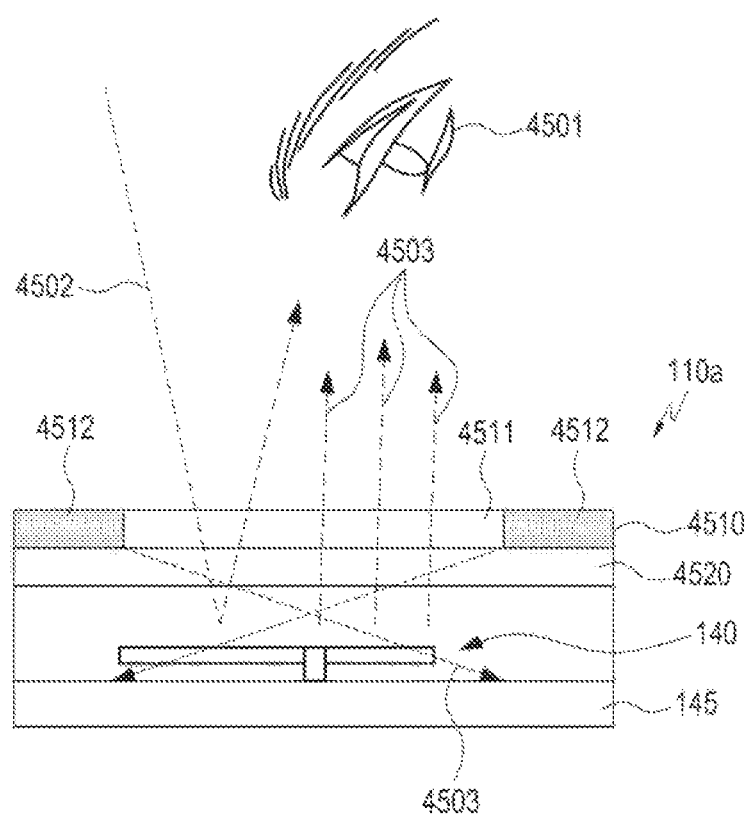

FIGS. 44 and 45 are views for describing an operating method of a wearable device according to various embodiments. The operating method of the wearable device 4400 (e.g., one of the wearable devices 100 and 100a to 100l) may be performed by the wearable device 4400 or the control unit of the wearable device 4400 (e.g., the first control unit 107 or the second control unit 907).

Referring to FIG. 44, the sensor unit of the wearable device 4400 (e.g., the sensor unit 104 or 904) may include a camera 4410 and an illuminance sensor 4420. For example, the camera 4410 and the illuminance sensor 4420 may be disposed on the top surface or inner wall of the upper case 121, or on the watch plate 145. For example, the camera 4410 and the illuminance sensor 4420 may be disposed on the top surface of the housing 920. When the peripheral illuminance is not more than the pre-set threshold value or is included within the threshold range, the wearable device 4400 may initiate the illumination of the wearable device 4400 or may increase the illumination brightness.

The wearable device 4400 may illuminate the indicating unit 140 that includes the hour hand 141 and the minute hand 142 using the light output from at least a region of the touch screen 110a (e.g., the peripheral portion 113).

Referring to FIG. 45, the touch screen 110a may have a characteristic of changing the transmissivity (i.e., transparency) thereof by a signal or voltage applied thereto by the control unit 107 or 907. The touch screen 110a may include a touch panel 4510 that senses a touch input, and a variable window 4520 that adjusts the transparency.

The indicating unit 140 may be illuminated by a first light 4502, which is a natural light passing through the central portion 4511 of the touch panel 4510 and a second light 4503 output from the peripheral portion 4512 of the touch panel 4510. The user 4501 may watch the indicating unit 140 illuminated by the first light 4502 and the second light 4503.

For example, when the peripheral illuminance measured by the camera 4410 or the illuminance sensor 4420 is included within a threshold range of A1 (which is equal to or higher than a threshold value a1 and lower than a threshold value a2 (>a1)), the wearable device 4400 may power OFF the touch panel 4510. For example, when the peripheral illuminance measured by the camera 4410 or the illuminance sensor 4420 is included within the threshold range of A2 (which is equal to or higher than the threshold value a2 and lower than a threshold value a3 (>a2)), the wearable device 4400 may perform a control such that the peripheral portion 4512 of the touch panel 4510 illuminates at the first brightness. For example, when the peripheral illuminance measured by the camera 4410 or the illuminance sensor 4420 is included within the threshold range of A3 (which is equal to or higher than the threshold value a3 and lower than a threshold value a4 (>a3)), the wearable device 4400 may perform a control such that the peripheral portion 4512 of the touch panel 4510 illuminates at the second brightness, which is higher than the first brightness. For example, when the peripheral illuminance measured by the camera 4410 or the illuminance sensor 4420 is included within the threshold range of A4 (which is equal to or higher than the threshold value a4 and lower than a threshold value a5 (>a4)), the wearable device 4400 may perform a control such that the entire touch panel 4510 illuminates or may be operated as the smart watch mode.

Figure 46:
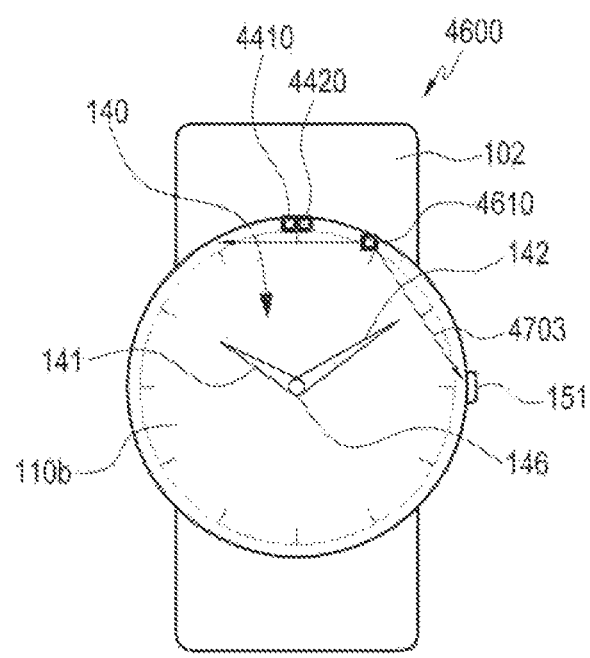
FIGS. 46 and 47 are views for describing an operating method of a wearable device according to various embodiments.
Figure 47:
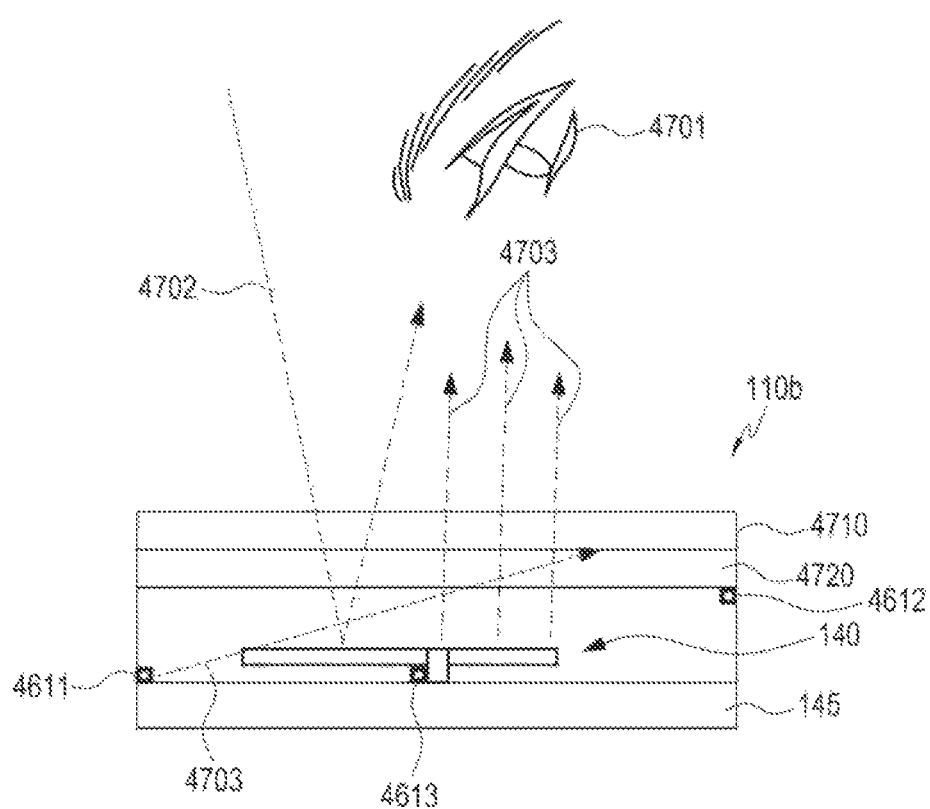

FIGS. 46 and 47 are views for describing an operating method of a wearable device according to various embodiments. The operating method of the wearable device 4600 (e.g., one of the wearable devices 100 and 100a to 100l) may be performed by the wearable device 4600 or a control unit (e.g., the first control unit 107 or the second control unit 907) of the wearable device 4600.

Referring to FIG. 46, the sensor unit (e.g., the sensor unit 104 or 904) of the wearable device 4600 may include a camera 4410 and an illuminance sensor 4420, and the wearable device 4600 may include at least one light source 4610. For example, the at least one light source 4610 may be disposed on the inner wall of the upper case 121 or on the watch plate 145. For example, the at least one light source 4610 may be disposed on the bottom surface 922 of the housing 920.

When the peripheral illuminance is equal to or lower than a pre-set threshold value or is included within a threshold range, the wearable device 4600 may initiate the illumination of the wearable device 4600 or may increase the illumination brightness. The wearable device 4600 may illuminate the time indicating unit 140 using the light 4703 output from the at least one light source 4610.

Referring to FIG. 47, the touch screen 110b (or the touch screen 910) may have a characteristic of changing the transmissivity (i.e., transparency) thereof by a signal or voltage applied thereto by the control unit. The touch screen 110b may include a touch panel 4710 that senses a touch input, and a variable window 4720 that adjusts the transparency.

The indicating unit 140 may be illuminated by a first light 4702, which is an external light passing through the touch panel 4710, and a second light 4703 output from at least one light source 4611, 4612, or 4613. The user 4701 may watch the indicating unit 140 illuminated by the first light 4702 and the second light 4703.

For example, when the peripheral illuminance measured by the camera 4410 or the illuminance sensor 4420 is included within the threshold range of A1 (which is equal to or higher than the threshold value a1 and lower than the threshold value a2 (>a1)), the wearable device 4600 may power OFF the at least one light source 4611, 4612, or 4613. For example, when the peripheral illuminance measured by the camera 4410 or the illuminance sensor 4420 is included within the threshold range of A2 (which is equal to or higher than the threshold value a2 and lower than the threshold value a3 (>a2)), the wearable device 4600 may perform a control such that at least a part of the at least one light source 4611, 4612, or 4613 illuminates at the first brightness. For example, when the peripheral illuminance measured by the camera 4410 or the illuminance sensor 4420 is included within the threshold range of A3 (which is equal to or higher than a3 and lower than the threshold value a4 (>a3)), the wearable device 4600 may perform a control such that at least a part of the at least one light source 4611, 4612, or 4613 illuminates at the second brightness, which is higher than the first brightness, or at least a part of the one or more light sources 4611, 4612, and 4613 the number of which is more than the number of light sources of Level 1, illuminates at the second brightness. For example, when the peripheral illuminance measured by the camera 4410 or the illuminance sensor 4420 is included within the threshold range of A4 (which is equal to or higher than the threshold value a4 and lower than the threshold value a5 (>a4)), the wearable device 4600 may perform a control such that all the one or more light sources 4611, 4612, and 4613 illuminate or the wearable device 4600 is operated at the smart watch mode.

Figure 48:
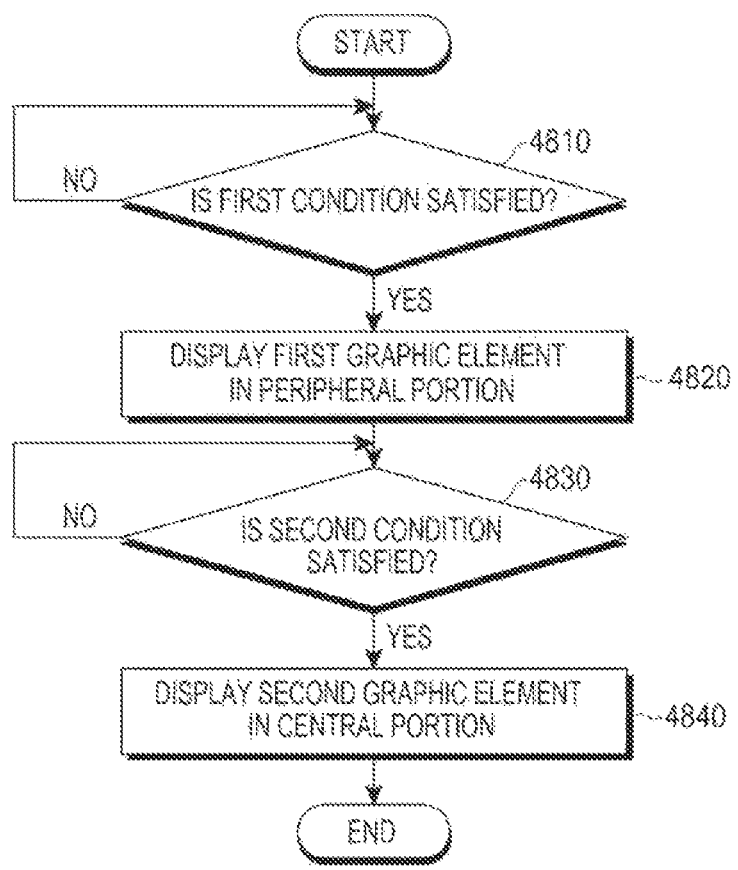
FIG. 48 is a flowchart illustrating an operating method of a wearable device according to various embodiments.

FIG. 48 is a flowchart illustrating an operating method of a wearable device according to various embodiments. The wearable device operating method may include operations 4810 to 4840. The wearable device operating method may be performed by a wearable device (e.g., one of the wearable devices 100 and 100a to 100l) or a control unit of the wearable device (e.g., the first control unit 107 or the second control unit 907).

At operation 4810, the wearable device may determine whether a pre-set first condition is satisfied. When the first condition is satisfied, the wearable device may perform operation 4820, and when the first condition is not satisfied, the wearable device may periodically repeat operation 4810.

In an embodiment, the first condition may include at least one of: a case in which a first input is detected; a case in which a situation (or a context), which is associated with the wearable device and is coincident with a pre-set situation (or a pre-set context), is detected; a case in which an event (e.g., reception of a message or generation of an alarm message) that requires a notice to a user is generated; a case in which the wearable device is positioned at or arrives at a pre-set area/place; a case in which the wearable device enters a locking/restriction mode; a case in which it arrives at a pre-set time (e.g., arrival of an alarm time or arrival of a pre-set schedule item); a case in which the wearable device is operated according to a pre-set operation pattern (e.g., execution of function(s)/application(s)); a case in which a user's biological information coincides with a pre-set state (e.g., included within a threshold range, or not less/more than a threshold value); a case in which an attribute value that indicates the current state of the wearable device (e.g., a remaining memory level or a signal reception intensity) is included within a pre-set threshold range or is not less/more than a pre-set threshold value; and a case in which the current state of the wearable device (e.g., a battery state, a wireless signal reception state, or a memory state) coincides with a pre-set state (e.g., included within a threshold range or not less/more than a threshold value).

In an embodiment, the first input may include at least one of: an input through an input/output unit (e.g., the first input/output unit 108 or the second input/output unit 908); an input using the watch stem 151; a touch input or hovering input on a touch screen (e.g., the touch screen 110 or 910); a voice input; and a gesture input.

At operation 4820, when it is determined that the pre-set first condition is satisfied, the wearable device may display a first graphic element on a peripheral portion of the touch screen. For example, the first graphic element may include at least one of, for example: a menu; an icon; an item; a text; a message; and an image, which may be selectable by the user.

At operation 4830, the wearable device may determine whether a pre-set second condition is satisfied. When the second condition is satisfied, the wearable device may perform operation 4840, and when the second condition is not satisfied, the wearable device may periodically repeat operation 4830.

In an embodiment, the pre-set second condition may include at least one of: a case in which a second input is detected; a case in which a situation (or a context), which is associated with the first graphic element and is coincident with a pre-set situation (or a pre-set context) is detected; and a case in which it arrives at a pre-set time from a time point when the first graphic element was generated (or a time point thereafter).

In an embodiment, the second input may include at least one of: an input for the first graphic element through an input/output unit (e.g., the first input/output unit 108 or the second input/output unit 908); a touch input or hovering input for the first graphic element; a touch input or hovering input for a predetermined time for the first graphic element; a swipe input or drag input for the first graphic element; a swipe input or drag input in a predetermined direction for the first graphic element; and a swipe input or drag input to a pre-set position from the first graphic element.

At operation 4840, when it is determined that the pre-set second condition is satisfied, the wearable device may display the second graphic element on the central portion of the touch screen.

For example, the second graphic element may be associated with the first graphic element. The second graphic element may be at least one of, for example: a menu; an icon; an item; a text; and an image, which are associated with the first graphic element.

Figure 49:
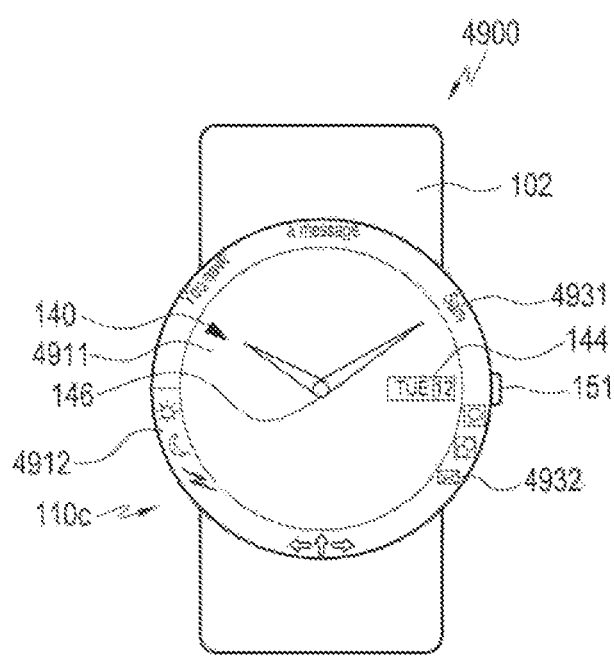
FIGS. 49 to 51 are views for describing an operating method of a wearable device according to various embodiments.
Figure 50:
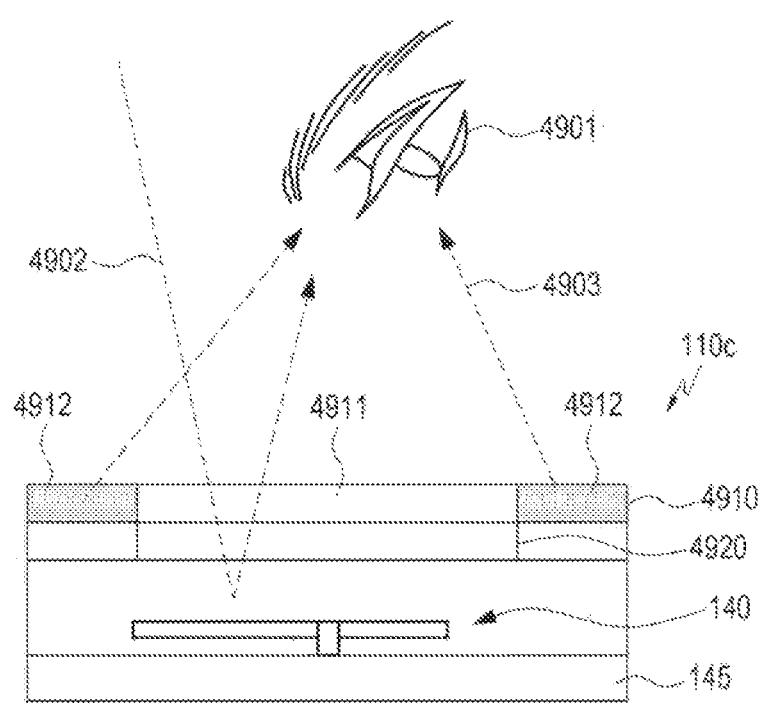
Figure 51:
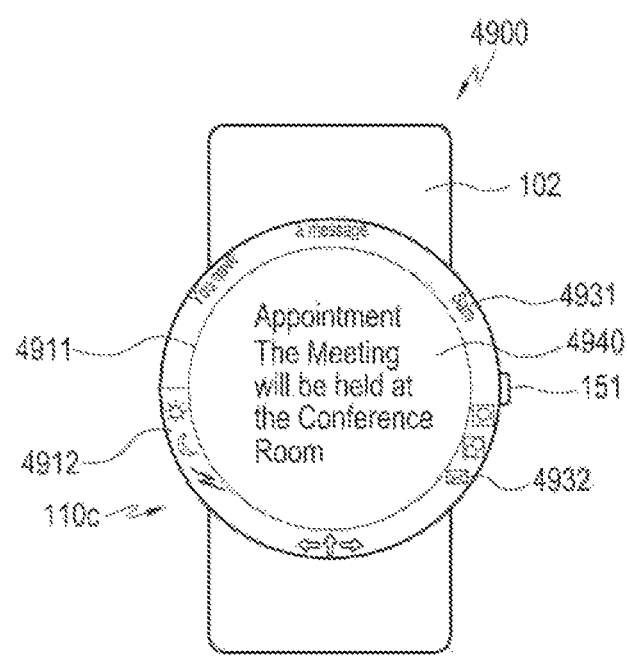

FIGS. 49 to 51 are views for describing an operating method of a wearable device according to various embodiments. An operating method of a wearable device 4900 (e.g., one of the wearable devices 100 and 100a to 100*l*) may be performed by the wearable device 4900 or a control unit of the wearable device 4900 (e.g., the first control unit 107 or the second control unit 907).

Referring to FIG. 49, the touch screen 110*c* of the wearable device 4900 may include a central portion 4911 disposed above a watch plate 145 or indicating units 140 and 144 of an analog watch unit 103 or 103*a*, and a peripheral portion 4912 surrounding the central portion 4911. In an embodiment, the central portion 4911 may be a region in which transparency is controllable, and the peripheral portion 4912 may be an opaque region.

Referring to FIG. 50, the touch screen 110*c* may have a characteristic of changing the transmissivity (i.e., transparency) by a signal or voltage applied thereto by the control unit. The touch screen 110*c* may include a touch panel 4910 that senses a touch input, and a variable window 4920, which is disposed below the central portion 4911 of the touch panel 4910 and adjusts the transparency.

In an embodiment, referring again to FIG. 49, in response to reception of a message, the wearable device 4900 may display the first graphic element 4931, which indicates the reception of the message, on the peripheral portion 4912. Just before the reception of the message, the wearable device 4900 may control the central portion 4911 to be seen transparently. Just before the reception of the message, the wearable device 4900 may or may not display one or more graphic elements (at least one icon 4932 for executing at least one application or buttons for scroll) on the peripheral portion 4912. For example, just before the reception of the message, the wearable device 4900 may power OFF the peripheral portion 4912. The wearable device 4900 may detect a touch input or hovering input for the first graphic element 4931.

Referring to FIG. 51, in response to an input for the first graphic element 4931, the wearable device 4900 may reduce the transparency of the central portion 4911. For example, the wearable device 4900 may control the central portion 4911 to be seen opaquely. In response to the input for the first graphic element 4931, the wearable device 4900 may display a second graphic element 4940 associated with the first graphic element 4931 on the central portion 4911. For example, the second graphic element 4940 may be a text corresponding to the contents of the received message.

Figure 52:
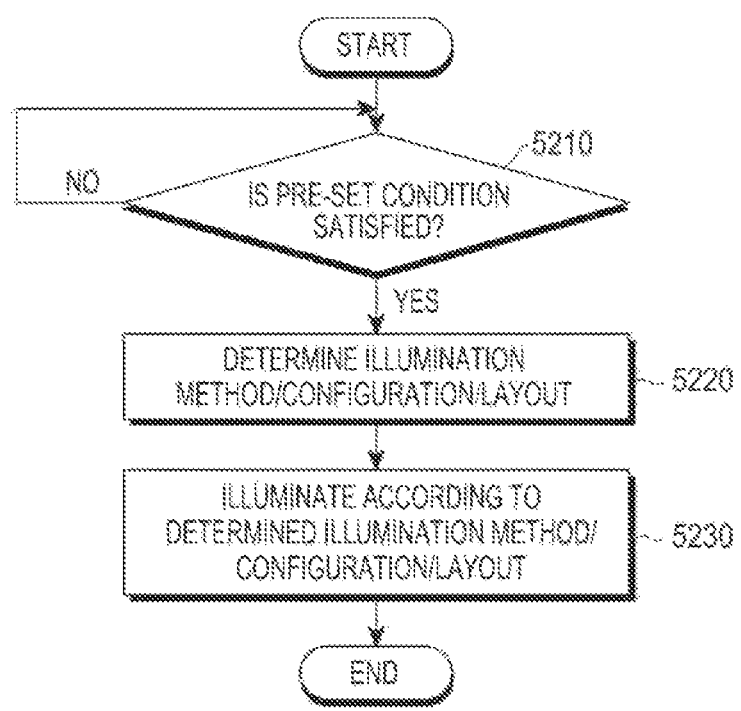
FIG. 52 is a flowchart illustrating an operating method of a wearable device according to various embodiments.

FIG. 52 is a flowchart illustrating an operating method of a wearable device according to various embodiments. The wearable device operating method may include operations 5210 to 5230. The wearable device operating method may be performed by the wearable device (e.g., one of the wearable devices 100 and 100a to 100*l*) or a control unit of the wearable device (e.g., the first control unit 107 or the second control unit 907).

At operation 5210, the wearable device may determine whether a pre-set condition is satisfied. When the condition is satisfied, the wearable device may perform operation 5220, and when the condition is not satisfied, the wearable device may periodically repeat operation 5210.

In an embodiment, the pre-set condition may include at least one of: a case in which a user input is detected; a case in which an event (e.g., reception of a message, arrival of an alarm time, arrival of a pre-set schedule item, or occurrence of an alarm message) occurs; a case in which it arrives at a pre-set period, a case in which it arrives at a pre-set time (e.g., 18:00 or 20:00); a case in which a user/visual line is detected, a case in which a pre-set pattern of a user's action is detected; a case in which an attribute value indicating a current state of the wearable device (e.g., a remaining memory level or a signal reception intensity) is included within a pre-set threshold range or is not less/more than a pre-set threshold value; a case in which a peripheral illuminance is not more than a pre-set threshold value or is included in a threshold range; and a case in which a content and/or an application is displayed/executed.

In an embodiment, the user input may include at least one of, for example: an input through an input/output unit (e.g., the first input/output unit 108 or the second input/output unit 908); an input using the watch stem 151; a touch input or hovering input on a touch screen (e.g. the touch screen 110 or 910); a voice input; and a gesture input.

In another embodiment, the wearable device may receive the user's voice through a microphone (e.g., a voice input through the microphone). For example, when at least one word that coincides with at least one pre-set word is detected from the voice, the wearable device may perform operation 5220. An embodiment of the wearable device may also detect at least one of, for example: a user; a user's visual line; and a gesture through a camera of a sensor unit (e.g., the sensor unit 104 or 904).

By way of example, the wearable device may compare information about characteristic features (e.g., an edge, a corner, an image pattern, and a contour line) extracted from an image photographed through the camera with characteristic feature information previously stored in the memory 105 or 905. When the extracted characteristic feature information and the previously stored characteristic feature information coincide with each other, the wearable device may determine that the user (or a previously registered user) is detected. For example, when the user (or the previously registered user) is detected, the wearable device may perform operation 5220.

Embodiments of the wearable device may recognize the eyes from an image acquired through the camera. For example, eye recognition is performed using a conventional eye recognition method. For example, an eye recognition technique may be used, which uses at least one of, for example: a contour line of an eye and a template which are stored in a memory. For example, the wearable device may perform eye learning through eye images of a plurality of users, and may recognize an eye from an input image based on the eye learning. Such eye learning information may be stored in a memory. The wearable device may detect the user's visual line for the recognized eye. The wearable device may detect the user's visual line using a conventional eye tracking or eye detection technique. The wearable device may detect the user's visual line (or direction of visual line/looking direction) from the pose (position and/or direction) of an iris or pupil. For example, when the user's visual line is directed to the wearable device, the wearable device may perform operation 5220.

In an embodiment, operation 5210 may be omitted from the operating method of the wearable device. For example, the wearable device may periodically perform operation 5220. For example, the wearable device may periodically perform operation 5220 at pre-set time intervals (or within a pre-set time range). At operation 5220, when the condition is satisfied, the wearable device may determine an illumination method/configuration/layout.

At operation 5230, the wearable device may perform illumination according to the determined illumination method/configuration/layout. The wearable device may determine the illumination method/configuration/layout based on the kind of a content/application and/or peripheral illuminance (or ambient brightness). The illumination method/configuration/layout may include at least one of, for example: the number, brightness, position and/or an identifier of light sources to be used for illumination, and whether to shield external light, and an external light shielding level.

In an embodiment, the memory may store a database (or a data table) that includes a kind/identifier of a content/application, peripheral illuminance values (or ranges), and illumination configuration data indicating an illumination method/configuration/layout, which correspond to each other, and the wearable device may determine the illumination method/configuration/layout based on the database.

In an embodiment, the database may have a format similar to Table 3.

TABLE 3

| Content or Application | Peripheral Illuminance | Illumination Method/Configuration/Layout |
|---|---|---|
| B1 | A1 | C1 |
| B1 | A2 | C2 |
| B2 | A1 | C3 |
| B2 | A2 | C4 |
| ... | ... | ... |

In Table 3, Content or Application (e.g., B1, B2, ... ) may indicate a kind/identifier of a content/application/identifier. Peripheral Illuminance (e.g., A1, A2, ... ) may indicate a threshold level, a threshold value (e.g., a1, a2, ... ), or a threshold range (e.g., a numerical range between an upper limit value and a lower limit value of peripheral illuminance) for the peripheral illuminance. Illumination Method/Configuration/Layout (e.g., C1, C2, ... ) may include at least one of, for example: the number, brightness, position and/or identifier of light sources to be used for illumination, whether to shield external light, and an external light shielding level.

Figure 53A:
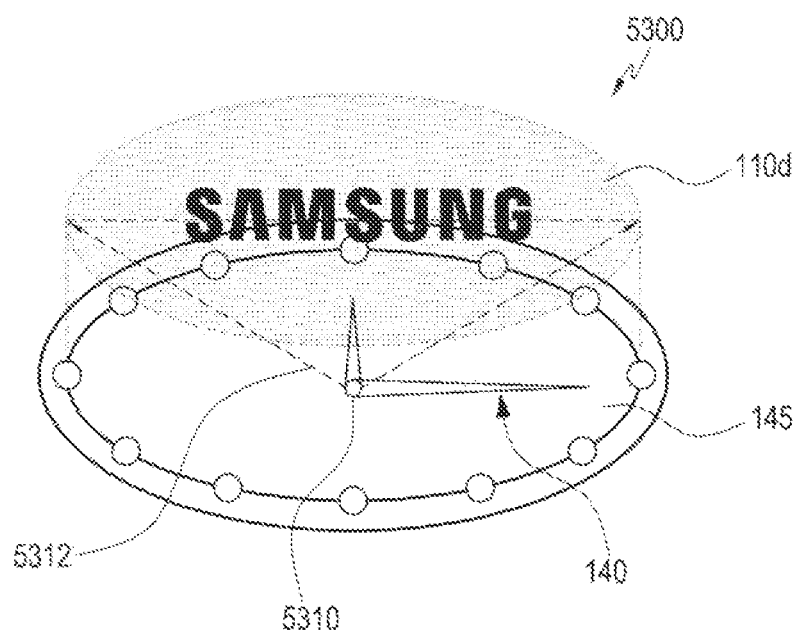
FIGS. 53A to 53C are views for describing an operating method of a wearable device according to various embodiments.
Figure 53B:
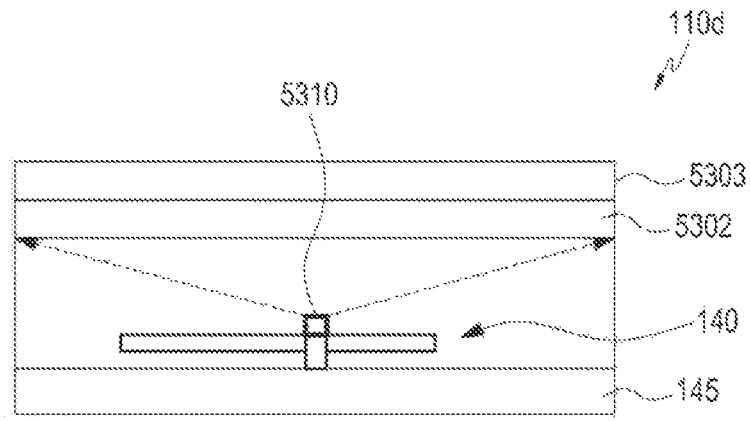
Figure 53C:
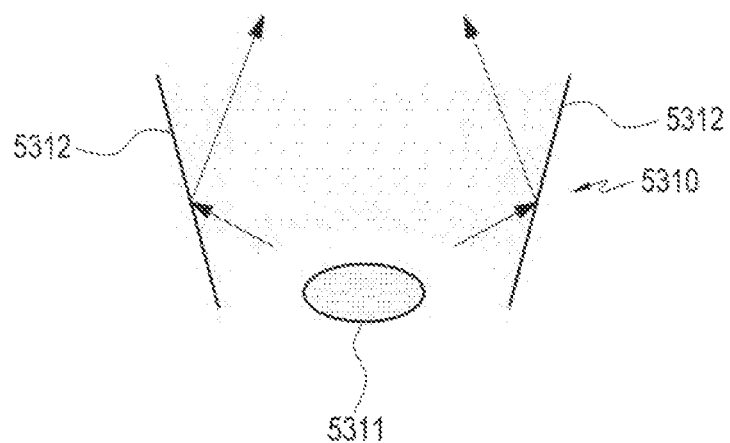

FIGS. 53A to 53C are views for describing an operation method of a wearable device according to various embodiments. A method of a wearable device 5300 (e.g., one of the wearable devices 100 and 100a to 100l) may be performed by the wearable device 5300 or a control unit of the wearable device 5300 (e.g., the first control unit 107 or the second control unit 907).

Referring to FIGS. 53A and 53B, the wearable device 5300 may include a first light source 5310. For example, the first light source 5310 may be disposed on the rotating shaft of the time indicating unit 140 or on the watch plate 145 to be adjacent to the rotating shaft. The touch screen 110d may be illuminated by the light output from the first light source 5310.

The touch screen 110d may include a touch panel 5302 that senses a touch input, and a variable window 5303 that shields external light and transmits the light output from the first light source 5310. The variable window 5303 has a characteristic of changing its transmissivity (i.e., transparency) for the external light by a signal or voltage applied thereto by the control unit.

Referring to FIG. 53C, the first light source 5310 may include a light emitting element 5311, and a condensing lens 5312 that concentrates the light output from the light emitting element 5311. The condensing lens 5312 may have a shape of which the width is gradually widened as the distance from the light emitting element 5311 becomes remote.

For example, when the kind of content that is being displayed or to be displayed on the touch screen 110d is B1 (e.g., a video or a photograph), and the peripheral illuminance measured by a camera (e.g., the camera 4410) or a illuminance sensor (e.g., the illuminance sensor 4420) is included in the threshold range of A1 (which is equal to or more than a threshold value a1 and less than a threshold value a2 (>a1)), the wearable device 5300 may control the variable window 5303 to at least partly shield the external light (or to reduce its transmissivity) according to a first illumination method, and may power ON the first light source 5310. According to the first illumination method, the visibility of the content may be enhanced and the visibility of, for example, the indicating unit may be reduced.

Figure 54:
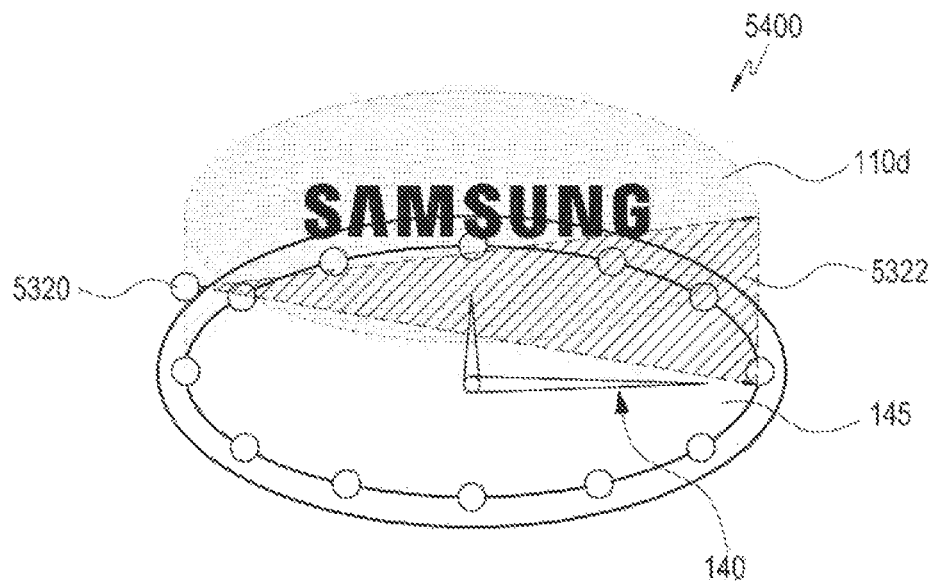
FIG. 54 is a view for describing an operating method of a wearable device according to various embodiments.

FIG. 54 is a view for describing an operating method of a wearable device according to various embodiments. The operating method of a wearable device 5400 (e.g., one of the wearable devices 100 and 100a to 100l) may be performed by the wearable device 5400 or a control unit of the wearable device 5400 (e.g., the first control unit 107 or the second control unit 907).

The wearable device 5400 may include a second light source 5320. For example, the second light source 5320 may be disposed on the inner wall of the upper case 121. The touch screen 110d and the time indicating unit 140 may be illuminated by the light 5322 output from the second light source 5320.

For example, when the kind of content that is being displayed or to be displayed on the touch screen 110d is B2 (e.g., a text or a message) and the peripheral illuminance measured by a camera (e.g., the camera 4410) or an illuminance sensor (e.g., the illuminance sensor 4420) is included within the threshold range of A2 (which is equal to or more than the threshold value a2 and less than a threshold value a3 (>a2)), the wearable device 5400 may control a variable window (e.g., the variable window 5303, as illustrated in FIG. 53B) to at least partly transmit the external light (e.g., not to shield the external light or to increase its transmissivity) according to a fourth illumination method, and may power ON the second light source 5320. According to the fourth illumination method, the visibility of the content and the indicating unit may be enhanced.

Figure 55:
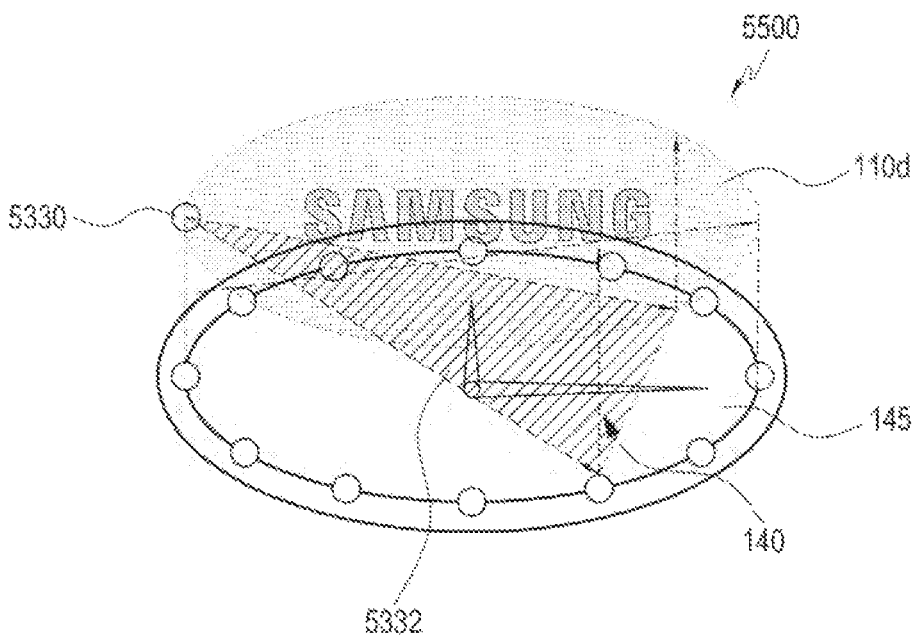
FIG. 55 is a view for describing an operating method of a wearable device according to various embodiments.

FIG. 55 is a view for describing an operating method of a wearable device according to various embodiments. The operating method of a wearable device 5500 (e.g., one of the wearable devices 100 and 100a to 100l) may be performed by the wearable device 5500 or a control unit of the wearable device 5500 (e.g., the first control unit 107 or the second control unit 907).

The wearable device 5500 may include a third light source 5530. For example, the third light source 5330 may be disposed on the upper portion of the inner wall of an upper case (e.g., the upper case 121). The time indicating unit 140 may be illuminated by the light 5332 output from the third light source 5330.

For example, when the kind of content that is being displayed or to be displayed on the touch screen 110d is B3 (e.g., an item having a low priority), and the peripheral illuminance measured by a camera (e.g., the camera 4410) or an illuminance sensor (e.g., the illuminance sensor 4420) is included within the threshold range of A1 (which is equal to or more than the threshold value a1 and less than the threshold value a2 (>a1)), the wearable device 5500 may perform a control such that the external light is shielded (or the transmissivity is reduced) and may power On the third light source 5330 according to a fifth illumination method. According to the fifth illumination method, the visibility is lowered and the visibility of the indicating unit may be enhanced.

FIGS. 56 to 59 are views for describing various illumination methods according to various embodiments. Each of the illumination methods may be performed by a corresponding wearable device (e.g., one of the wearable devices 100 and 100a to 100l) or a corresponding control unit (e.g., the first control unit 107 or the second control unit 907).

Figure 56:
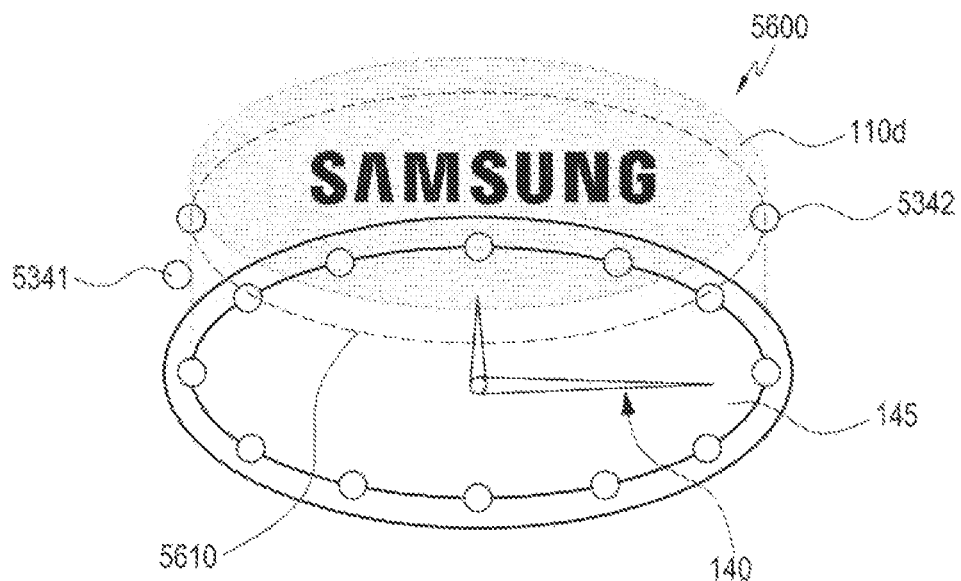
FIGS. 56 to 59 are views for describing various illumination methods according to various embodiments.

Referring to FIG. 56, the wearable device 5600 may include a plurality of fourth light sources 5341 and 5342, and a light guide film 5610. For example, the plurality of fourth light sources 5341 and 5342 may be disposed on the upper portion of the inner wall of the upper case 121. The light output from the plurality of fourth light sources 5341 and 5342 is diffused by the light guide film 5610, and the touch screen 110d may be uniformly illuminated over the entire area thereof by the light diffused by the light guide film 5610. The wearable device 5600 may power ON the plurality of fourth light sources 5341 and 5342 according to a sixth illumination method. According to the sixth illumination method, the visibility of contents may be enhanced and the visibility of the indicating unit may be lowered.

Figure 57:
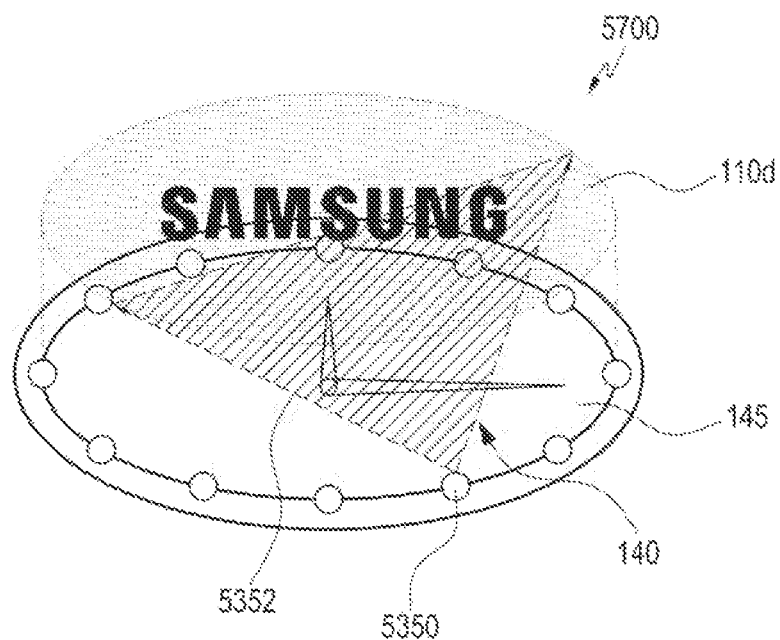

Referring to FIG. 57, the wearable device 5700 may include a fifth light source 5350. For example, the fifth light source 5350 may be disposed on the edge of the watch plate 145. The touch screen 110d and the time indicating unit 140 may be illuminated by the light 5352 output from the fifth light source 5350. The wearable device 5700 may power ON the fifth light source 5350 according to a seventh illumination method. According to the seventh illumination method, the visibility of the contents and the indicating unit 140 may be enhanced.

Figure 58:
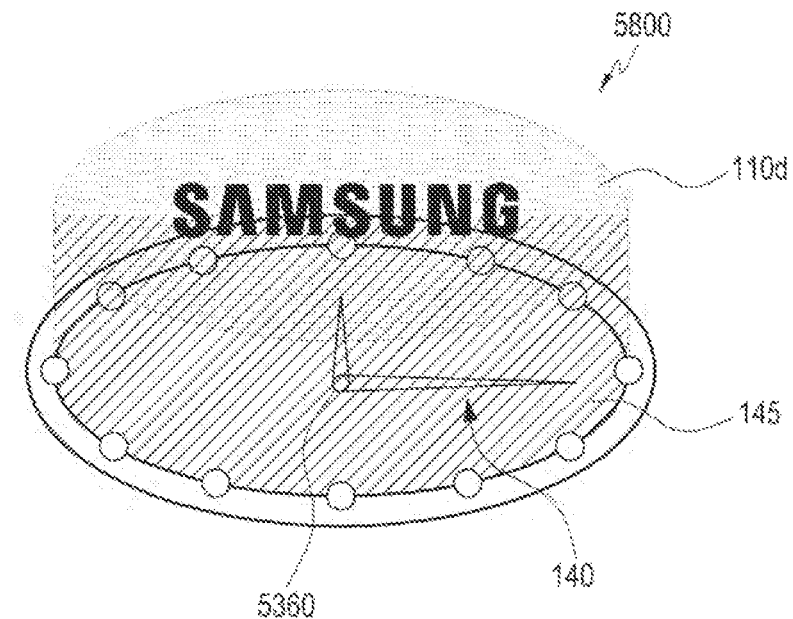

Referring to FIG. 58, the wearable device 5800 may include a sixth light source 5360, and the watch plate 145 may function as a light guide film that diffuses the light output from the sixth light source 5360. For example, the sixth light source 5360 may be disposed at the center of the watch plate 145. The light output from the sixth light source 5360 may be diffused by the watch plate 145, and the touch screen 110d and the indicating unit 140 may be illuminated over the entire areas thereof by the light diffused by the watch plate 145. The wearable device 5800 may power ON the sixth light source 5360 according to an eighth illumination method. According to the eighth illumination method, the visibility of the contents and the indicating unit may be enhanced.

Figure 59:
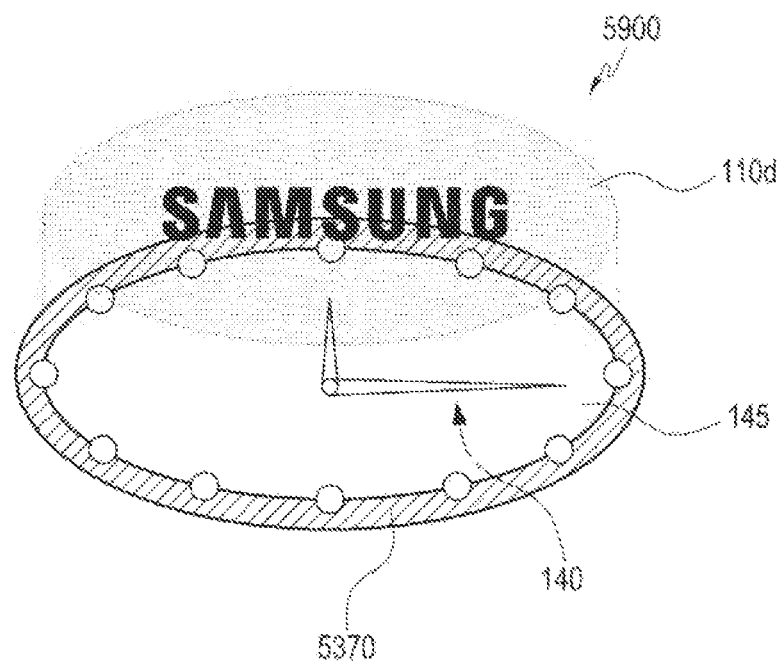

Referring to FIG. 59, the wearable device 5900 may include a seventh light source 5370. For example, the seventh light source 5370 has a ring shape, and may be disposed on the periphery of the watch plate 145. The touch screen 110d and the time indicating unit 140 may be illuminated by the light output from the seventh light source 5370. The wearable device 5900 may power ON the seventh light source 5370 according to a ninth illumination method. According to the ninth illumination method, the visibility of the contents and the indicating unit 140 may be enhanced.

Figure 60A:
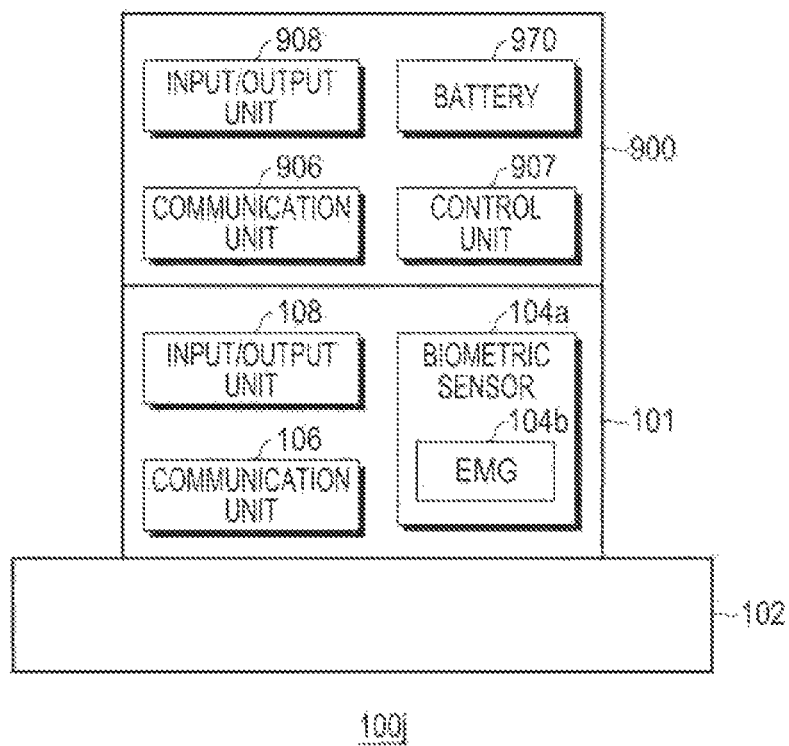
FIG. 60A illustrates a tenth configuration example of the wearable device according to the second embodiment.

FIG. 60A illustrates a tenth configuration example of the wearable device according to the second embodiment.

The wearable device 100j may include a main body 101, a mounting unit 900, and a band 102 that fixes the main body 101 to a user's wrist.

The main body 101 may include, for example: a first input/output unit 108 for user input/output interface (such as an operating unit (such as a watch stem), a button, a touch screen, or a microphone); a first communication unit 106 for wired/wireless communication with the mounting unit 900 or an external device; and a biometric sensor 104a that collects or measures one or more biological signals from the user.

The mounting unit 900 may include, for example: a second input/output unit 908 for user input/output interface (such as an operating unit (such as a watch stem), a button, a touch screen, or a microphone); a battery 970 for power supply; a second communication unit 906 for wired/wireless communication with the main body 101 or an external device; and a control unit 907 that controls the entire functions of the mounting unit 900 and/or the main body 101.

The main body 101 may transmit a user input received through the first input/output unit 108, biological information sensed through the biometric sensor 104a and/or the state of the analog watch unit 103a to the mounting unit 900. The control unit 907 of the mounting unit 900 may perform a control of the first input/output unit 108, the second input/output unit 908, the biometric sensor 104a, and/or the analog watch unit 103a. The control unit 907 of the mounting unit 900 may perform a control of the first input/output unit 108, the second input/output unit 908, or the analog watch unit 103a according to the state of the analog watch unit 103a, the user input through the first input/output unit 108, the user input through the second input/output unit 908, or the biological information through the biometric sensor 104a.

The biometric sensor 104a may collect primary biological signals/information for measuring a user's blood pressure, blood flow, heart rate (HRM, HRV), temperature, respiration rate, oxygen saturation, cardiorespiratory sound detection, blood sugar, waist, height, weight, body fat, caloric consumption, brainwave, voice, skin resistance, electromyogram, electrocardiogram, walk, ultrasonic image, sleep state, look (face), pupil dilation, and eye blinking. According to an embodiment, the control unit 907 may analyze the biological signals/information so as to generate secondary biological information (or referred to as biological characteristic information). As an example, a pulse wave signal acquired through an HRV (Heart Rate Variability) sensor may be the primary biological signal/information. The control unit 907 may obtain secondary biological information, such as a mean heart rate or an HRV-index, by analyzing the primary biological signal/information, and may obtain the secondary biological information, such as a highly difficult stress state or blood vessel senility by further processing such biological information. According to an embodiment, the biometric sensor 104a may merely output the collected user's biological signals, and the biometric sensor 104a may analyze the biological signals through an inner processor so as to output biological information. The primary biological signals/information collected through the biometric sensor 104a are delivered to the processor within the biometric sensor 104a, the control unit 907, or an external device to be used for generating secondary biological information.

By way of further embodiment, when the control unit 907 transmits the primary biological information to an external device (e.g., an electronic device or a server) through the second communication unit 906, the external device, which receives the biological information, may process the biological information so as to generate secondary biological information. The control unit 907 may receive the secondary biological information from the external device from the second communication unit 906.

The biometric sensor 104a may include an electromyography (EMG) sensor 104b that senses a movement of a wrist/forearm muscle (e.g., relaxation, contraction, twist, raising of a hand, or lowering of a hand). The biometric sensor 104a may be included in the sensor unit 104 of the main body 101.

The control unit 907 may provide at least one service/function corresponding to the biological information among a plurality of services or functions supported by the wearable device 100j. The at least one service/function may include, for example: the changing of one or more user interfaces (e.g., a visual interface, such as Graphical User Interface (GUI), an acoustic interface, such as a guide voice, and a tactile interface, such as a haptic feedback), user authentication, exercise coaching, information recommendation, information provision, information storage, function or service provision, access restriction or interruption to pre-set contents, functions, or services, changing of environment setting of the wearable device 100j, and control of the external device.

Figure 60B:
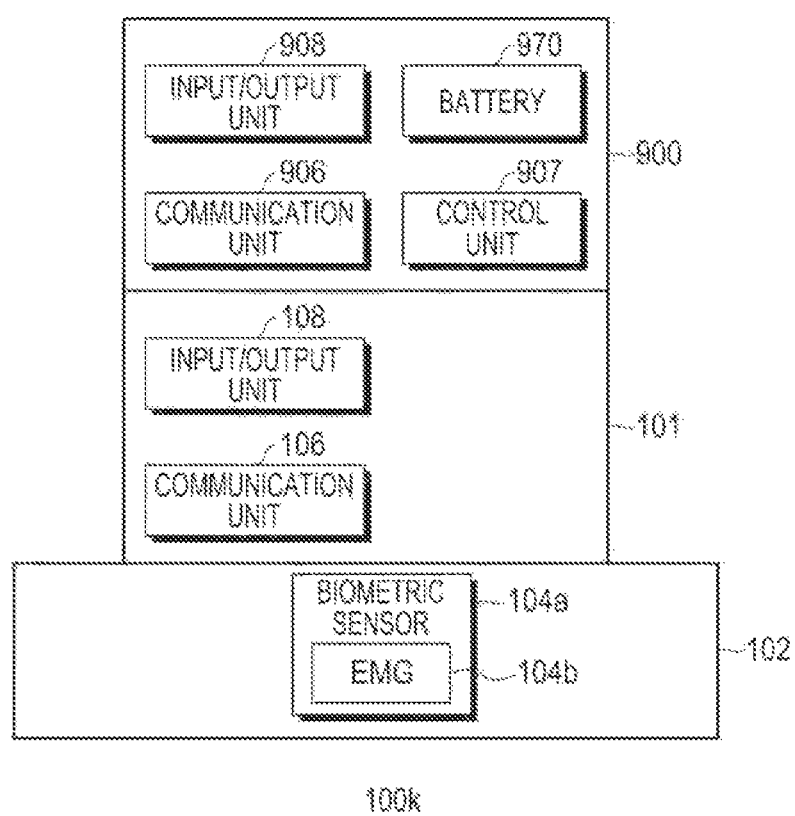
FIG. 60B illustrates an eleventh configuration example of the wearable device according to the second embodiment.

FIG. 60B illustrates an eleventh configuration example of the wearable device according to the second embodiment.

The wearable device 100k may include a main body 101, a mounting unit 900, and a band 102 that fixes the user's wrist to the main body 101.

The main body 101 may include, for example: a first input/output unit 108 for user input/output interface (such as an operating unit (such as a watch stem), a button, a touch screen, or a microphone); and a first communication unit 106 for wired/wireless communication with the mounting unit 900 or an external device.

The mounting unit 900 may include, for example: a second input/output unit 908 for user input/output interface (such as an operating unit (such as a watch stem), a button, a touch screen, or a microphone); a battery 970 for power supply, a second communication unit 906 for wired/wireless communication with the main body 101 or an external device; and a control unit 907 that controls the entire functions of the mounting unit 900 and/or the main body 101.

The band 102 may include a biometric sensor 104a that collects or measures one or more biological signals from the user. The biometric sensor 104a may include an EMG sensor 104b that senses a movement of a wrist muscle (e.g., relaxation, contraction, twist, raising of a hand, or lowering of a hand).

The main body 101 may transmit a user input received through the first input/output unit 108 and/or the state of the analog watch unit 103a to the mounting unit 900. The biometric sensor 104a may transmit the sensed biological information to the mounting unit 900. The control unit 907 of the mounting unit 900 may perform a control of the first input/output unit 108, the second input/output unit 908, the biometric sensor 104a, and/or the analog watch unit 103a. The control unit 907 of the mounting unit 900 may perform a control of the first input/output unit 108, the second input/output unit 908, or the analog watch unit 103a according to the state of the analog watch unit 103a, the user input through the first input/output unit 108, the user input through the second input/output unit 908, or the biological information sensed through the biometric sensor 104*a*.

The control unit 907 may provide one or more services/functions corresponding to the biological information among a plurality of services or functions supported by the wearable device 100*k*.

Figure 60C:
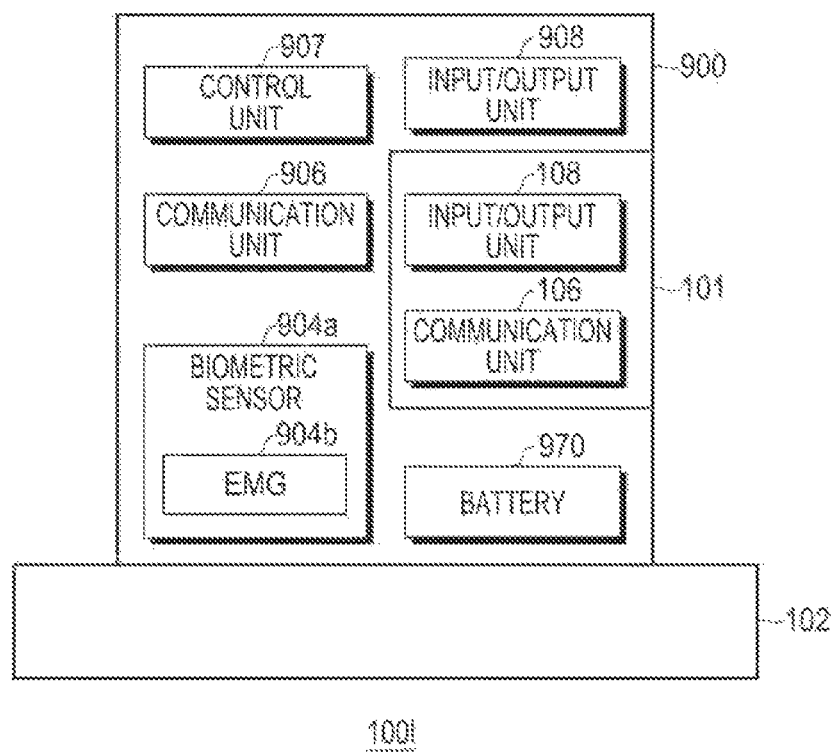
FIG. 60C illustrates a twelfth configuration example of the wearable device according to the second embodiment.

FIG. 60C illustrates a twelfth configuration example of the wearable device according to the second embodiment.

The wearable device 100*l* may include a main body 101, a mounting unit 900, and a band 102 that fixes the main body 101 to the user's wrist.

The mounting unit 900 may have a C-shape including an opening that allows the main body 101 to be inserted into the inside of the mounting unit 900. When the main body 101 is inserted into the inside of the mounting unit 900, the mounting unit 900 and the main body 101 may be coupled to each other.

The main body 101 may include, for example: a first input/output unit 108 for user input/output interface (such as an operating unit (such as a watch stem), a button, a touch screen, or a microphone); and a first communication unit 106 for wired/wireless communication with the mounting unit 900 or an external device.

The mounting unit 900 may include, for example: a second input/output unit 908 for user input/output interface (such as an operating unit (such as a watch stem), a button, a touch screen, or a microphone); a battery 970 for power supply; a second communication unit 906 for wired/wireless communication with the main body 101 or an external device; a biometric sensor 904*a* that collects or measures one or more biological signals from the user; and a control unit 907 that controls the entire functions of the mounting unit 900 and/or the main body 101. The biometric sensor 904*a* may include an EMG sensor 904*b* that senses a movement of a wrist muscle (e.g., relaxation, contraction, twist, raising of a hand, or lowering of a hand).

The main body 101 may transmit the user input received through the first input/output unit 108 and/or the state of the analog watch unit 103*a* to the mounting unit 900. The control unit 907 of the mounting unit 900 may perform a control of the first input/output unit 108, the second input/output unit 908, the biometric sensor 904*a*, and/or the analog watch unit 103*a*. The control unit 907 of the mounting unit 900 may perform a control of the first input/output unit 108, the second input/output unit 908, or the analog watch unit 103*a* according to the state of the analog watch unit 103*a*, the user input through the first input/output unit 108, the user input through the second input/output unit 908, or the biological information sensed through the biometric sensor 904*a*. The control unit 907 may execute one or more services/functions corresponding to the biological information among a plurality of services or functions supported by the wearable device 100*l*.

Figure 61:
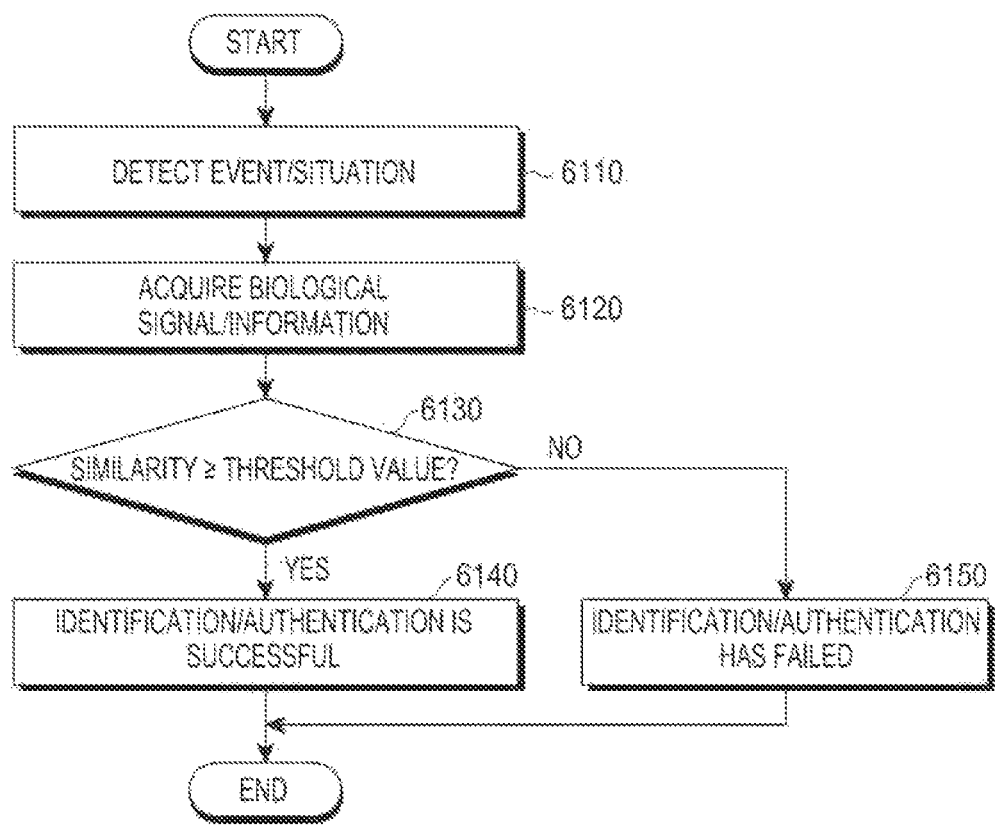
FIG. 61 is a flowchart illustrating an operating method of a wearable device according to various embodiments.

FIG. 61 is a flowchart illustrating an operating method of a wearable device according to various embodiments. The wearable device operating method may include operations 6110 to 6150. The wearable device operating method may be performed by a wearable device (e.g., one of the wearable devices 100 and 100*a* to 100*l*) or a control unit of the wearable device (e.g., the first control unit 107 or the second control unit 907).

At operation 6110, the occurrence of an event/situation that requires user authentication within the wearable device may be detected. For example, the event/situation that requires user authentication may include, for example: a case in which the wearable device starts to operate as a smart watch, or awakens from the sleep state and initiates an arithmetic operation; a case in which personal information is transmitted to/received from the external device; a case in which it is sensed that the user wears the wearable device; and/or a case in which an input occurs by the user and a specific application is driven.

At operation 6120, according to the occurrence of the event/situation, biological signals/information may be acquired. The wearable device may measure the biological signals/information for user authentication from the user through a biometric sensor (e.g., the biometric sensor 104*a* or 904*a*).

At operation 6130, similarity between the acquired biological information and previously stored (or registered) biological information is determined, and the similarity and a pre-set threshold value may be compared with each other. For example, the wearable device may compare a pattern (or characteristic features that define the pattern) or a value (e.g., heart rate) of the acquired biological information and a pattern (or characteristic features that define the pattern) or a value (e.g., heart rate) of previously stored (or registered) biological information of a previously registered user, and may determine the similarity therebetween (e.g., the number of characteristic features that coincide with each other or have a difference within a threshold range, or a ratio of the number or value (e.g., the ratio of the number of similar characteristic features in relation to the number of all the characteristic features).

When the similarity is equal to or more than a pre-set threshold value, the wearable device may determine that the user identification/authentication is successful at operation 6140, and when the similarity is less than the pre-set threshold value, the wearable device may determine that the user identification/authentication has failed at operation 6150. For example, when the similarity is equal to or more than the pre-set threshold value, the wearable device may determine that the user of the acquired biological information is the same as the previously registered user.

When the user identification/authentication is successful, the wearable device allows access to one or more functions/services of the wearable device (e.g., use, execution, or display), and when the user identification/authentication has failed, the wearable device may block access to the one or more services/functions of the wearable device (e.g., use, execution, or display).

Figure 62:
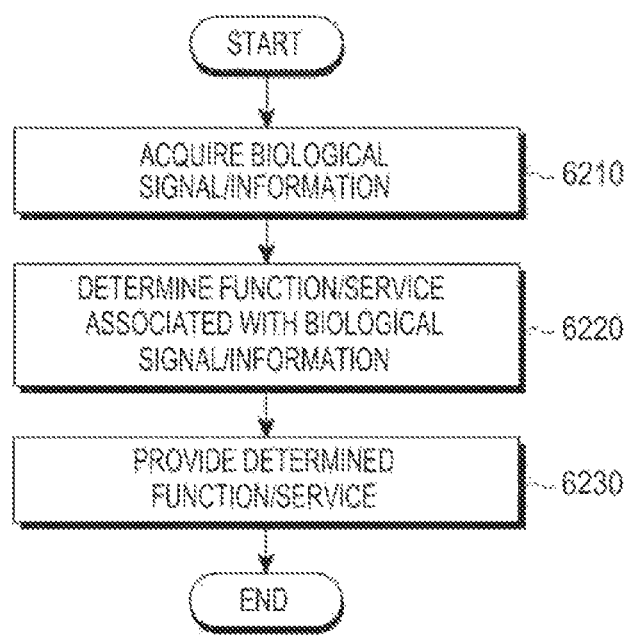
FIG. 62 is a flowchart illustrating an operating method of a wearable device according to various embodiments.

FIG. 62 is a flowchart illustrating an operating method of a wearable device according to various embodiments. The wearable device operating method may include operations 6210 to 6230. The wearable device operation method may be performed by a wearable device (e.g., one of the wearable devices 100 and 100*a* to 100*l*) or a control unit of the wearable device (e.g., the first control unit 107 or the second control unit 907).

At operation 6210, biological signals/information may be acquired. The wearable device may measure the biological signals/information from the user through a biometric sensor (e.g., the biometric sensor 104*a* or 904*a*).

At operation 6220, one or more functions or services may be determined among a plurality of functions/services that are associated with the biological signals/and information and supported by the wearable device. In an embodiment, the wearable device may determine at least one service corresponding to the biological information and situation information among the plurality of functions/services supported by the wearable device. In an embodiment, the wearable device may select at least one function/service corresponding to the biological information (and situation information) among the plurality of functions/services supported by the electronic device by using the previously stored database. The database may be stored in a memory of the wearable device (e.g., the memory 105 or 905) or a memory of the external device.

TABLE 4

| Biological Information | Situation Information | Function/Service Information |
|---|---|---|
| D1 | E1 | F1 |
| D1 | E2 | F2 |
| D2 | E1 | F3 |
| D2 | E2 | F4 |
| . . . | . . . | . . . |

In Table 4, Biological Information (e.g., D1, D2, . . . ) may indicate at least one of, for example: a kind/contents of biological information (e.g., blood pressure, heart rate, blood sugar, or muscle relaxation/contraction); a numerical range of a kind of specific biological information (e.g., blood pressure range, heart rate range, blood sugar range, or muscle relaxation/contraction range); a numerical range of a difference value for a kind of specific biological information (e.g., a difference between a biological information value and a pre-set value); and/or a value or level of a kind of specific biological information. Situation Information (e.g., E1, E2, . . . ) may indicate: a kind/contents of a running service/application/content, current exercise/activity information; current emotion/stress information; and a kind/content of an event that is in occurrence. Function/Service Information (e.g., F1, F2, . . . ) may indicate at least one of, for example: a command and action, a function, an application, and a kind/content/intensity/level of a function/service of, for example, an application execution parameter.

At operation 6230, a determined function/service may be provided. The function/service may include at least one of: changing of a user interface, information recommendation, information provision, information storage, information transmission, function or service provision, access restriction or interruption to pre-set contents, functions, or services; changing of environment setting of the wearable device; and control of the external device.

In an embodiment, the wearable device may automatically perform a function of the wearable device which is pre-set to correspond to biological information. For example, the pre-set function of the wearable device may include at least one of: switching between an analog watch mode and a smart watch mode; adjustment of transparency/brightness/illumination of a touch screen; zoom-in/zoom-out of a content; initiation of photographing with a camera; adjustment of the shutter speed of a camera; volume adjustment at the time of reproducing a content; adjustment of gradation/brightness of a content; and adjustment of brightness/volume/channel/intensity of an external device (e.g., a smart phone, a TV, or an indoor light).

In an embodiment, in response to the acquisition of biological information, the wearable device may automatically re-create a previously stored control pattern of the wearable device. In another embodiment, in response to the acquisition of biological information, the wearable device may sense a specific situation, automatically collect/receive a control activity/function corresponding to the specific situation from a local external device or an external device connected thereto through a communication, and may automatically execute the collected/received control activity/function.

In a further embodiment, in response to the acquisition of biological information, the wearable device may: be connected with any other external device (e.g., a TV set or a set top box) through a wired or wireless communication, and/or deliver information including at least one of, for example: a user name, a phone number, a device identification number (e.g., a SIM or a MAC address) to the external device. The external device may regard that information as the user identification information.

In an embodiment, in response to the acquisition of biological information, the wearable device may perform an identification/authentication operation using user identification information, which is one of: inputting of a pre-set ID; inputting of a password; inputting of pattern lock; fingerprint recognition; iris recognition; face recognition; voice recognition; palm print recognition; and/or recognition of veins of the back of a hand.

Embodiments of the wearable device, in response to acquisition of biological information, may control a function of an external device (e.g., a TV, an air conditioner, or a smart phone). For example, the wearable device may drive an application for controlling an external device (e.g., a TV), or perform a user authentication operation required for access to the external device. By way of further example, the user confirmation or authentication may be executed by the external device rather than the wearable device. Additionally, at least one external device among a TV, a settop box, and a console game machine may be connected with the wearable device through, for example, Bluetooth or WiFi, and the external device may be controlled by receiving a wireless signal delivered from the wearable device (e.g., radio frequency (RF) or an optical signal). The external device may recognize a device that sends a control signal to the external device by receiving at least one of a device identification number or device name, a user name, and a phone number of the device that is wirelessly connected thereto. When transmitting a control signal, the wearable device may also deliver information for user confirmation/identification/authentication therewith. In an embodiment, the wearable device may perform user authentication, and may transmit the authenticated user information or device information to the external device.

In an embodiment, in response to acquisition of biological information, the wearable device may at least one of, for example: change a channel, a program or a content of the external device; adjust the volume/brightness of the external device; or execute an application of the external device.

Figure 63:
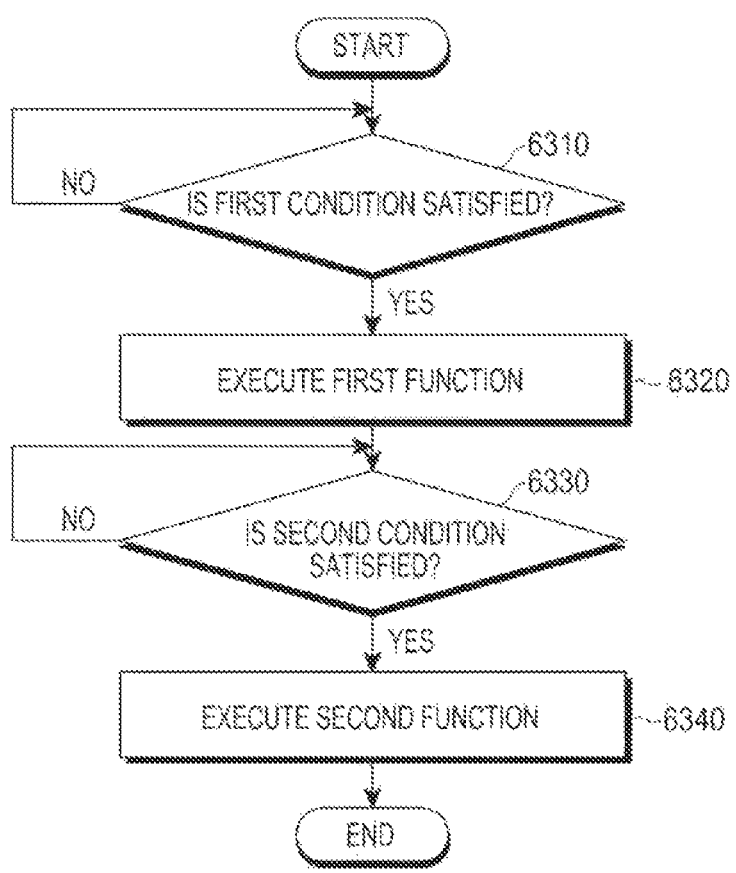
FIG. 63 is a flowchart illustrating an operating method of a wearable device according to various embodiments.

FIG. 63 is a flowchart illustrating an operating method of a wearable device according to various embodiments. The wearable device operating method may include operations of 6310 to 6340. The wearable device operating method may be performed by a wearable device (e.g., one of the wearable devices 100 and 100a to 100l) or a control unit of the wearable device (e.g., the first control unit 107 or the second control unit 907).

At operation 6310, the wearable device may determine whether a pre-set first condition is satisfied. When the first condition is satisfied, the wearable device may perform operation 6320, and when the first condition is not satisfied, the wearable device may periodically repeat operation 6310.

In an embodiment, the first condition may include at least one of, for example: a case in which first biological information is detected; a case in which the first biological information coincides with a pre-set state (e.g., included within a threshold range, or not less/more than a threshold value); a case in which a user input is detected; a case in which a situation (or context), which is associated with the wearable device and is coincident with a pre-set situation (or a pre-set context), is detected; a case in which an event (e.g., reception of a message or generation of an alarm message) that requires a notice to a user is generated; a case in which the wearable device is positioned at or arrives at a pre-set area/place; a case in which the wearable device enters a locking/restriction mode; a case in which it arrives at a pre-set time (e.g., arrival of an alarm time or arrival of a pre-set schedule item); a case in which the wearable device is operated according to a pre-set operation pattern (e.g., execution of function(s)/application(s)); a case in which an attribute value that indicates the current state of the wearable device (e.g., a remaining memory level or a signal reception intensity) is included within a pre-set threshold range or is not less/more than a pre-set threshold value; and/or a case in which the current state of the wearable device (e.g., a battery state, a wireless signal reception state, or a memory state) coincides with a pre-set state (e.g., included within a threshold range or not less/more than a threshold value).

In an embodiment, the first biological information may include information related to a movement of a wrist or a muscle state that is sensed through an EMG sensor (e.g., the EMG sensor 104*b* or 904*b*). For example, the wearable device may detect the user's action of raising the wrist through the EMG sensor.

In yet another embodiment, the first input may include at least one of: an input through an input/output unit (e.g., the first input/output unit 108 or the second input/output unit 908); an input using the watch stem 151; a touch input or hovering input on a touch screen (e.g., the touch screen 110 or 910); a voice input; and a gesture input.

At operation 6320, when it is determined that the pre-set first condition is satisfied, the wearable device may execute a first function corresponding to the first condition.

In an embodiment, the first function may include at least one of, for example: operation of a timer associated with a second condition; adjustment of transparency/brightness/illumination of a touch screen; and display of a graphic element (e.g., a menu, an icon, a text, or an item) associated with a second function.

At operation 6330, the wearable device may determine whether the pre-set second condition is satisfied. When the second condition is satisfied, the wearable device may perform operation 6340, and when the second condition is not satisfied, the wearable device periodically repeats operation 6330.

In an embodiment, the pre-set second condition may include at least one of: detection of second biological information; a case in which the second biological information coincides with a pre-set state (e.g., included in a threshold range or not less than/more than a threshold); expiration of a timer; detection of a user input prior to the expiration of the timer; detection of the second biological information prior to the expiration of the timer; an input through an input/output unit (e.g., the first input/output unit 108 or the second input/output unit 908) for a graphic element; a touch input or hovering input for the graphic element; a touch input or a hovering input for a pre-set length of time for the graphic element; a swipe input or drag input for the graphic element; a swipe input or drag input in a pre-set direction for the graphic element; and a swipe input or drag input to a preset position from the graphic element.

Other embodiments of the second biological information may include information related to a movement of a wrist or a muscle state that is sensed through an EMG sensor (e.g., the EMG sensor 104*b* or 904*b*). For example, the wearable device may detect the user's action of closing or opening first through the EMG sensor.

At operation 6340, when it is determined that the pre-set second condition is satisfied, the wearable device may execute the second function corresponding to the second condition. In an example, the second function may include at least one of, for example: switching between an analog watch mode and a smart watch mode; adjustment of transparency/brightness/illumination of a touch screen; zoom-in/zoom-out of a content; initiation of photographing with a camera; adjustment of shutter speed of a camera; volume adjustment at the time of reproducing a content; adjustment of gradation/brightness of a content; and adjustment of brightness/volume/channel/intensity of an external device (e.g., a smart phone, a TV, or an indoor light).

FIGS. 64A and 64B and FIGS. 65A and 65B are views for describing an operating method of a wearable device according to various embodiments.

Figure 64A:
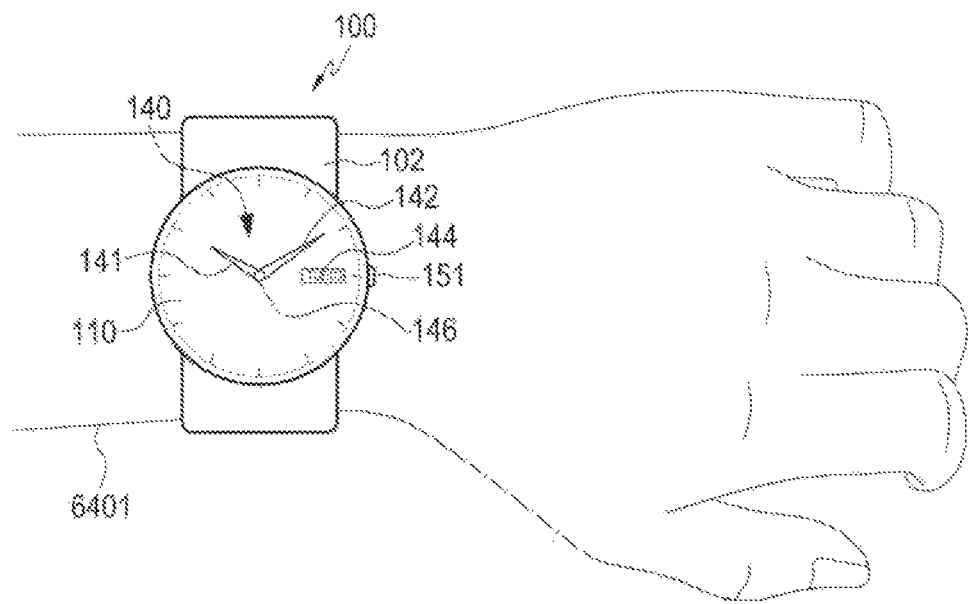
FIGS. 64A and 64B and FIGS. 65A and 65B are views for describing an operating method of a wearable device according to various embodiments.

Referring to FIG. 64A, the wearable device 100 may sense biological information corresponding to the state in which the muscles of a wrist 6401 is relaxed (or the hand is opened) through an EMG sensor (e.g., an EMG sensor 104*b* or 904*b*). The wearable device 100 may maintain an analog watch mode. The analog watch mode may refer to a mode in which a function/functions or a operation/operations executed by a smart watch are not performed. That is, the analog watch mode may refer to a mode in which the wearable device 100 is only used as an ordinary analog wrist watch.

Figure 64B:
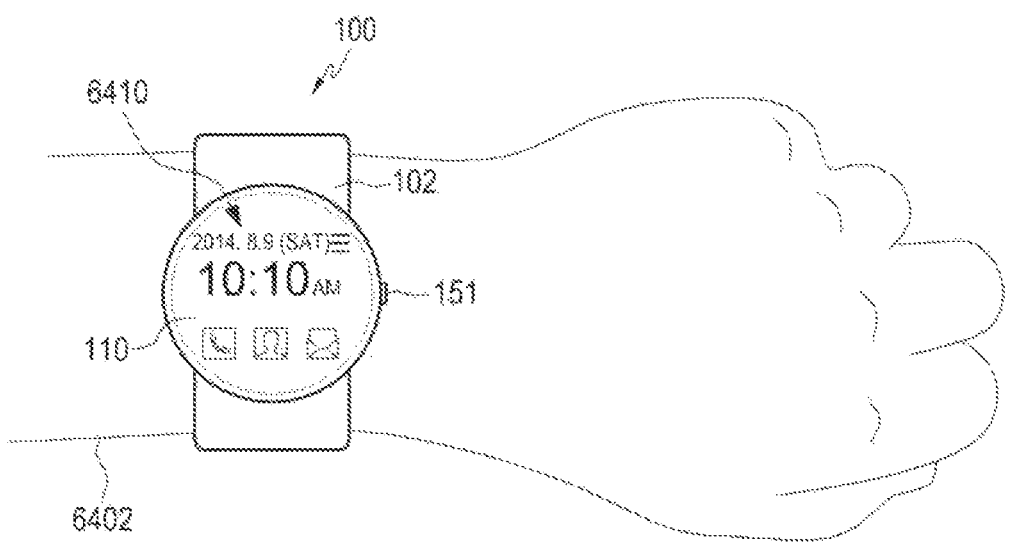

Referring to FIG. 64B, the wearable device 100 may sense biological information corresponding to the state in which the muscles of a wrist 6402 is contracted (or the hand is closed) through the EMG sensor (e.g., an EMG sensor 104*b* or 904*b*). The wearable device 100 may switch the analog watch mode to a smart watch mode in response to the sensing of the biological information. The wearable device 100 may display a home screen 6410 of the smart watch mode on a touch screen 110.

Figure 65A:
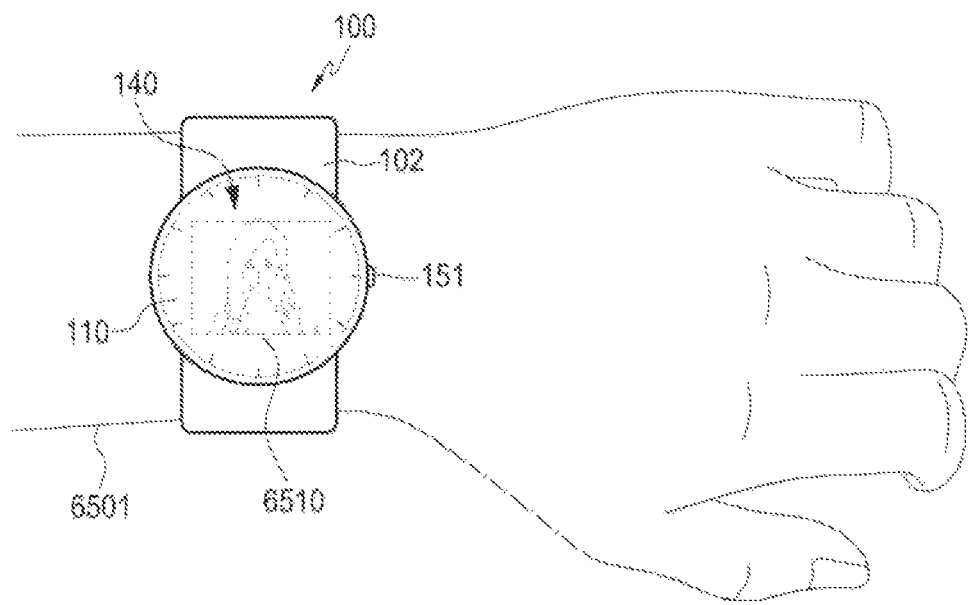

Referring to FIG. 65A, the wearable device 100 may sense biological information indicating a relaxed/contracted degree of the muscles of the wrist 6501 (or an opened or closed degree of a hand) through the EMG sensor (e.g., an EMG sensor 104*b* or 904*b*). The wearable device 100 may adjust the transparency/brightness/illumination of the touch screen 110, or an attribute, such as a size, a position, a color, or transparency of a graphic element 6510 on the touch screen 110 according to the relaxed/contracted degree of the muscles of the wrist 6501. For example, when the relaxed/contracted degree of the muscles of the wrist 6501, which is measured through the EMG sensor (e.g., an EMG sensor 104*b* or 904*b*), is included in a threshold range of D1 (which is equal to or more than a threshold value d1 and less than a threshold value d2 (>d1)), the wearable device 100 may set the transparency/brightness/illumination of the touch screen 110, or the attribute, such as a size, a position, a color, and transparency of the graphic element on the touch screen 110 to a first value.

Figure 65B:
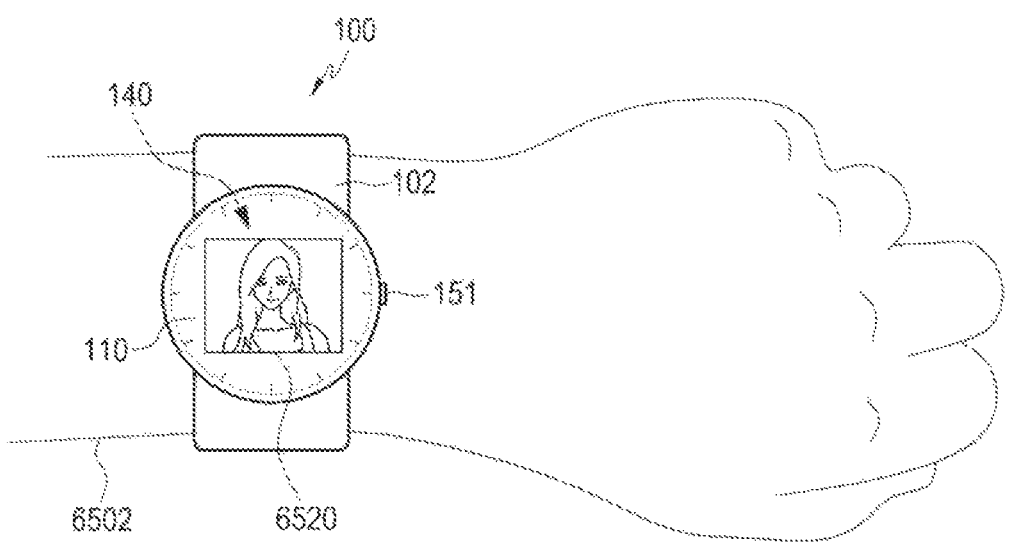

Referring to FIG. 65B, when the muscles of the wrist 6502 are further relaxed/contracted (or when the user further opens or closes the hand firmly), the wearable device 100 may sense biological information indicating the state in which the muscles of the wrist 6502 are more contracted or relaxed (or the state in which the first is clenched) through an EMG sensor. In response to the change of biological information, the wearable device 100 may change the transparency/brightness/illumination of a touch screen 110, or an attribute, such as a size, a position, a color, a transparency of a graphic element 6520 on a touch screen 110. For example, when the relaxed/contracted degree of the muscles of the wrist 6502 measured through the EMG sensor is included in the threshold range of D2 (which is equal to or than the threshold value d2 and less than a threshold value d3 (>d2)), the wearable device may set the transparency/brightness/illumination of the touch screen 110, or the attribute, such as the size, the position, the color, or the transparency of the graphic element 6520 on the touch screen 110 to a second value, which is different from the first value. For example, as the muscles around the wrist 6502 are gradually more contracted (or the first is gradually more clenched), the wearable device 100 may lower the transparency of the touch screen 110 or may lower the transparency of the graphic element.

According to various embodiments, a wearable device may include: an analog watch unit including a time indicating unit that indicates time, and a drive unit configured to drive the time indicating unit; a touch screen configured to sense an input for adjusting the drive unit; and a control unit configured to control the drive unit in response to the sensed input.

According to various embodiments, the wearable device may further include a sensor unit configured to sense a position of the time indicating unit.

According to various embodiments, the analog watch unit may further include a watch stem, the sensor unit may be configured to sense an input for the watch stem, and the control unit may be configured to control the drive unit in response to the input for the watch stem.

According to various embodiments, the analog watch unit may further include a watch stem, the sensor unit may be configured to sense the input for the watch stem, and the control unit may be configured to change a screen of the touch screen in response to the input for the watch stem.

According to various embodiments, the control unit may be configured to change a position of a graphic element displayed on the touch screen such that a position of the time indicating unit and the graphic element displayed on the touch screen do not overlap with each other.

According to various embodiments, the analog watch unit may further include an auxiliary indicating unit, and the sensor unit may be configured to sense a position of the auxiliary indicating unit.

According to various embodiments, the analog watch unit may further include a watch stem, the sensor unit may be configured to sense an input for the watch stem, and the control unit may be configured to control the drive unit to change the position of the auxiliary indicating unit in response to the input for the watch stem.

According to various embodiments, the control unit may be configured to control the drive unit to change the position of the auxiliary indicating unit in response to the sensed input.

According to various embodiments, the time indicating unit may include an hour hand and a minute hand, the control unit may be configured to control the drive unit to change a position of at least one of the hour hand and the minute hand in response to the sensed input.

According to various embodiments, the auxiliary indicating unit may include an indicator, and the control unit may be configured to control the drive unit to change a direction or a vibration period of the indicator in response to the input sensed by the sensor unit.

According to various embodiments, the wearable device may include: a touch screen; a watch unit including a time indicating unit; and a control unit that acquires information associated with the time indicating unit and controls the touch screen to display a graphic element based on the acquired information.

According to various embodiments, the wearable device may include: a touch screen; and a control unit configured to acquire information associated with the indicating unit of the analog watch and to control the touch screen to display a screen associated with the indicating unit.

According to various embodiments, the wearable device may further include a sensor unit configured to sense the indicating unit of the analog watch (or a watch unit).

According to various embodiments, the wearable device may be mechanically coupled to the analog watch (or the watch unit).

According to various embodiments, the analog watch (or the watch unit) may include a first coupling portion, the wearable device may include a second coupling portion, and the first and second coupling portions are mechanically coupled to each other.

According to various embodiments, the mechanical coupling between the wearable device and the analog watch (or the watch unit) may include at least one of coupling using a screw, coupling using an engagement step, coupling using a male screw, and coupling using a magnet.

According to various embodiments, the wearable device may be electrically connected to the analog watch (or the watch unit).

According to various embodiments, the analog watch may include a first connector, the wearable device may include a second connector, and the first and second connectors may be electrically connected with each other. For example, each of the first and second connectors may include a data terminal for data communication and/or a power terminal for power supply.

According to various embodiments, the wearable device may be electrically connected with a band. The band may include a first connector, the wearable device may include a second connector, and the first and second connectors may be electrically connected with each other. For example, each of the first and second connectors may include a connector for data communication and/or a connector for power supply.

According to various embodiments, the control unit may be configured to control the transparency of the touch screen.

According to various embodiments, the sensor unit may be configured to sense the watch stem of the analog watch (or the watch unit).

According to various embodiments, the control unit may be configured to detect the coupling between the wearable device and the analog watch (or the watch unit). The control unit may be configured to detect information associated with the analog watch (or the watch unit). The control unit may be configured to perform an operation based on the information associated with the analog watch (or the watch unit). For example, the information associated with the analog watch (or the watch unit) may include information associated with the indicating unit and/or information associated with the watch stem. For example, the operation based on the information associated with the analog watch (or the watch unit) may include at least one of: display of information, execution of an alarm function, execution of a smart watch mode, display of a graphic element, execution of a roaming watch function, execution of a stop watch function, position change of the graphic element, and adjustment of a size, a position, a color or transparency of the graphic element.

According to various embodiments, the control unit may be configured to transmit first information associated with the analog watch (or the watch unit) to an external device through a communication unit. The control unit may be configured to receive second information associated with the analog watch (or the watch unit) from the external device through the communication unit. The control unit may be configured to perform an operation based on the first and/or second information. For example, the second information may include at least one of: information for configuring a screen to be displayed on the touch screen, information for displaying/changing the time/date, and information recognized from an image included in the first information.

According to various embodiments, the control unit may be configured to display a screen for controlling the analog watch (or the watch unit) on the touch screen. The control unit may be configured to detect a user input for the graphic element displayed on the touch screen. The control unit may be configured to drive the indicating unit and/or the watch stem of the analog watch (or the watch unit) in response to the user input.

According to various embodiments, the control unit may be configured to transmit the first information associated with the indicating unit to an external device through a communication unit. The control unit may be configured to receive the second information associated with the indicating unit from the external device through the communication unit. The control unit may be configured to perform an operation based on the first and/or second information. For example, the first information may include information that indicates a position of at least a part of the indicating unit which is sensed through the sensor unit. For example, the second information may include information for displaying/changing the time and/or date.

According to various embodiments, the control unit may control the touch screen to display a screen thereon. The control unit may be configured to detect a user input through the touch screen. The control unit may be configured to perform an operation according to the user input.

According to various embodiments, the control unit may be configured to receive a first message including contents from an external device through a communication unit. The control unit may be configured to display the contents on the touch screen. The control unit may be configured to detect a user input through the touch screen. The control unit may be configured to transmit a second message according to the user input to the external device through the communication unit. For example, the second message may include at least one of: a request for the next contents associated with the contents received from the external device, a request for information related to the contents, and response information for the first message.

According to various embodiments, the control unit may be configured to detect position/state information of the indicating unit. The control unit may be configured to detect an input for controlling the indicating unit. The control unit may be configured to control the indicating unit according to the input. For example, the input may include at least one of: a user's touch or hovering input through the touch screen, and the reception of an input through the communication unit. For example, the control unit may be configured to move the hour hand and/or the minute hand of the indicating unit to a specific position.

According to various embodiments, the control unit may be configured to detect position information of the watch stem. The control unit may be configured to detect movement/rotation information of the watch stem according to an operation of the watch stem. The control unit may be configured to provide a screen/function according to the operation of the watch stem. For example, the provided function may include at least one of: cancellation of a previous operation; selection of a graphic element displayed on the touch screen; scroll of a menu, items, a message, a text, and a document content; and execution of a specific function.

According to various embodiments, the wearable device may further include, for example: a sensor unit that detects illuminance; and an illumination unit that includes a light source. The control unit may determine whether an event occurs, and when the event occurs, the control unit may drive the sensor unit to detect the illuminance value and may control the illumination of the illumination unit according to the illuminance value detected by the sensor unit.

According to various embodiments, the control unit may be configured to determine whether a pre-set first condition is satisfied. When the first condition is satisfied, the control unit may be configured to detect peripheral illuminance. The control unit may be configured to determine whether a pre-set second condition is satisfied. When the second condition is satisfied, the control unit may adjust the illumination of the wearable device. For example, the first condition may include at least one of: a case in which a first input is detected; a case in which an event occurs; a case in which it arrives at a pre-set period; a case in which it arrives at a pre-set time; a case in which a user/visual line is detected; a case in which a pre-set pattern of a user's operation is detected; and a case in which an attribute value indicating the current state of the wearable device is included within a pre-set threshold range or not less/more than a pre-set threshold value. For example, the first input may include at least one of: an input through an input/output unit of the wearable device; an input using a watch stem, a touch input or hovering input on a touch screen; a voice input; and a gesture input. For example, the second condition may include at least one of: a case in which a second input is detected, and a case in which a peripheral illuminance value is included within a pre-set threshold range or not less/more than a pre-set threshold value. For example, the second input may include at least one of: an input through an input/output unit; an input using a watch stem; a touch input or hovering input on a touch screen; a voice input; and a gesture input.

According to various embodiments, the control unit may be configured to initiate illumination, or to display a screen of the touch screen. The control unit may be configured to determine whether a pre-set condition is satisfied. When the condition is satisfied, the control unit may be configured to turn OFF light, or to turn OFF the screen of the touch screen.

According to various embodiments, the control unit may be configured to determine whether a pre-set first condition is satisfied. When the first condition is satisfied, the control unit may be configured to display a first graphic element on a peripheral portion of the touch screen. The control unit may be configured to determine whether a pre-set second condition is satisfied. When it is determined that the pre-set second condition is satisfied, the control unit may be configured to display the second graphic element on the central portion of the touch screen. For example, the first condition may include at least one of: a case in which an event that requires detection of a first input; detection of a situation (or a context) associated with the wearable device which coincides with a pre-set situation (or a pre-set context); a case in which an event (e.g., reception of a message or generation of an alarm message) that requires a notification to the user is generated; a case in which the wearable device is positioned or arrives at a preset area/place; a case in which the wearable device enters a locking/restriction mode; a case in which it arrives at a pre-set time; a case in which the wearable device is operated according to a pre-set operating pattern; a case in which the user's biological information coincides with a pre-set state; a case in which an attribute value indicating the current state of the wearable device is included within a pre-set threshold range or is not less/more than a preset threshold value; and a case in which the current state of the wearable device coincides with a pre-set state. For example, the second condition may include at least one of: detection of a second input, detection of a situation associated with the first graphic element which coincided with a pre-set situation, a case in which it arrives at a pre-set time from a time point when the first graphic element is generated (or a time point thereafter). For example, the second input may include at least one of: an input through an input/output unit for the first graphic element, a touch input or hovering input for the first graphic element, a touch input or hovering input for a pre-set length of time for the first graphic element, a swipe input or drag input for the first graphic element, a swipe input or drag input in a pre-set direction for the first graphic element, and a swipe input or drag input to a pre-set position from the first graphic element.

According to various embodiments, the control unit may be configured to determine whether a pre-set condition is satisfied. When the condition is satisfied, the control unit may be configured to determine an illumination method/configuration/layout. The control unit may be configured to perform illumination according to the determined illumination method/configuration/layout. For example, the pre-set condition may include at least one of: a case in which a user input is detected, a case in which an event occurs, a case in which it arrives at a pre-set period, a case in which it arrives at a pre-set time, a case in which a user/visual line is detected, a case in which a pre-set pattern of the user operation is detected, a case in which an attribute value indicating the current state of the wearable device is included within a pre-set threshold value or is not less/more than a pre-set threshold value, a case in which peripheral illuminance is not more than a previously set threshold value or is included within a threshold range, and a case in which a content and/or an application are displayed/executed. For example, the illumination method/configuration/layout may include at least one of: the number, brightness, position and/or an identifier of light sources to be used for illumination, whether to shield external light, and an external light shielding degree.

According to various embodiments, the control unit may be configured to detect occurrence of an event/situation within the wearable device that requires user authentication. The control unit may be configured to acquire a biological signal/information according to the occurrence of the event/situation. The control unit may be configured to determine the similarity between the acquired biological information and previously stored (or registered) biological information, and to compare the similarity with a pre-set threshold value. The control unit may be configured to determine that the user identification/authentication is successful when the similarity equals to or more than the pre-set threshold value, and to determined that the user identification/authentication has failed when the similarity is less than the pre-set threshold value.

For example, the event/situation that requires the user authentication may include at least one of: a case in which the wearable device starts to operate as a smart watch or awakens from the sleep state to start an arithmetic operation, a case in which personal information is transmitted to/received from an external device, a case in which it is sensed that the user wears the wearable device, a case in which an input by the user occurs, and a case in which a specific application is driven.

According to various embodiments, the control unit may be configured to acquire a biological signal/information. The control unit may be configured to determine at least one function/service among a plurality of functions/services associated with a biological signal/information supported by the wearable device. The control unit may be configured to provide the determined function/service. For example, the function/service may include at least one of: change of a user interface, recommendation of information, provision of information, storage of information, transmission of information, provision of a function or service, restriction or interruption of access of a pre-set content, function, or service, change of environment setting of the wearable device, control of the external device. For example, the function may include at least one of: switching between an analog watch mode and a smart watch mode, adjustment of transparency/brightness/illumination of a touch screen, zoom-in/zoom-out of a content, initiation of photographing with a camera, adjustment of shutter speed of the camera, adjustment of volume at the time of reproducing a content, adjustment of gradation/brightness of a content, and adjustment of brightness/volume/channel/intensity of an external device (e.g., a smart phone, a TV, or an indoor light).

According to various embodiments, the control unit may be configured to determine whether a pre-set first condition is satisfied. When it is determined that the first condition is satisfied, the control unit may be configured to execute a first function corresponding to the first condition. The control unit may be configured to determine whether a pre-set second condition is satisfied. When it is determined that the second condition is satisfied, the control unit may be configured to execute a second function corresponding to the second condition.

For example, the first condition may include at least one of: detection of first biological information, a case in which the first biological information coincides with a pre-set state, detection of a user input, detection of a situation (or a context) associated with the device which coincides with a pre-set situation (or a pre-set context), a case in which an event that requires a notice to a user occurs, a case in which the wearable device is positioned in or arrives at a pre-set area/place, a case in which the wearable device enters a locking/restriction mode, a case in which it arrives at a pre-set time, a case in which the wearable device operates at a pre-set operation pattern, a case in which an attribute indicating the current state of the wearable device is included within a pre-set threshold value or is not less/more than a pre-set threshold value, and the current state of the wearable device coincides with a pre-set state. For example, the first biological information may include information related to a movement or a muscle state of a wrist which is sensed through an EMG sensor. For example, in an embodiment, the first function may include at least one of: operation of a timer associated with the second condition, adjustment of transparency/brightness/illumination of a touch screen, and display of a graphic element associated with the second function. For example, the pre-set second condition may include at least one of: detection of a second biological information, a case in which the second biological information coincides with a pre-set state, expiration of the timer, detection of a user input prior to the expiration of the timer, detection of the second biological information prior to the expiration of the timer, an input through an input/output unit for a graphic element, a touch input or hovering input for the graphic element, touch input or hovering input for a pre-set time for the graphic element, a swipe input or a drag input for the graphic element, a swipe input or drag input in a pre-set direction for the graphic element, and a swipe input or drag input to a preset position from the graphic element. For example, the second biological information may include a movement or a muscle state of a wrist which is sensed by the EMG sensor. For example, the second function may include at least one of: switching between an analog watch mode and a smart watch mode, adjustment of transparency/brightness/illumination of a touch screen, zoom-in/zoom-out of a content, initiation of photographing with a camera, adjustment of shutter speed of the camera, adjustment of volume at the time of reproducing a content, adjustment of gradation/brightness of a content, and adjustment of brightness/volume/channel/intensity of an external device (e.g., a smart phone, a TV, or an indoor light).

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

According to various embodiments, at least a part of a device (for example, modules or functions thereof) or a method (for example, operations) according to the various embodiments of the present disclosure may be embodied by, for example, a command stored in a computer readable storage medium in a form of a programming module. When an instruction is implemented by one or more processors (for example, the processor 107), one or more processors may execute a function corresponding to the instruction. The computer-readable storage medium may be, for example, the memory 260. At least a part of the programming module may, for example, be implemented (e.g., executed) by a processor. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present invention may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, it should be construed that, in addition to the embodiments disclosed herein, all modifications or modified forms derived from the technical idea of the various embodiments of the present invention fall within the scope of the various embodiments of the present invention.

What is claimed is:

1. A wearable device comprising:
 a main device including:
  an analog watch that includes a time indicator that indicates time;
  a driver that drives the time indicator according to a first control signal;
  a first processor electrically connected to the driver to transmit the first control signal to the driver; and
  a first connector; and
 a mounting device including:
  a touch screen that at least partially covers the time indicator and senses an input for adjusting the driver according to a second control signal;
  a second processor electrically connected to the touch screen to receive the input from the touch screen; and
  a second connector,
 wherein the first control signal is based on the input, and
 wherein the main device and the mounting device are configured to be separably coupled, such that:
  when the mounting device is separated from the main device, there is no electrical connection between the mounting device and the main device, and the mounting device is configured to be coupled to the main device, and
  when the mounting device is coupled to the main device, there is electrical connection to each other through the first connector connected to the second connector, and the mounting device is configured to be separated from the main device.

2. The wearable device of claim 1, further comprising:
 a first sensor that senses a position of the time indicator.

3. The wearable device of claim 1, wherein the analog watch further includes:
 a watch stem; and
 a second sensor that senses an input for the watch stem, and
 wherein the first processor controls the driver in response to the input for the watch stem.

4. The wearable device of claim 1, wherein the analog watch further includes:
 a watch stem; and
 a second sensor that senses the input for the watch stem, and wherein the first processor changes a screen of the touch screen in response to the input for the watch stem.

5. The wearable device of claim 1, wherein the first processor changes a position of an item displayed on the touch screen such that a position of the time indicator and the item displayed on the touch screen do not overlap with each other.

6. The wearable device of claim 1, wherein the analog watch further includes:
an auxiliary indicator that does not indicate any of: hour, minute, or second; and
a third sensor that senses a position of the auxiliary indicator.

7. The wearable device of claim 6, wherein the analog watch further includes:
a watch stem; and
a second sensor that senses an input for the watch stem, and
wherein the first processor controls the driver to change the position of the auxiliary indicator in response to the input for the watch stem.

8. The wearable device of claim 6, wherein the first processor controls the driver to change the position of the auxiliary indicator in response to the input sensed by the touch screen.

9. The wearable device of claim 1, wherein the time indicator includes an hour hand and a minute hand, and
the first processor controls the driver to change a position of at least one of the hour hand and the minute hand in response to the input to the touch screen.

10. The wearable device of claim 6, wherein the first processor controls the driver to change a direction or a vibration period of the auxiliary indicator in response to the input sensed by the third sensor.

11. A wearable device comprising:
a mounting device including:
a touch screen that at least partially covers a time indicator; and
a second processor electrically connected to the touch screen to receive an input from the touch screen; and
a main device including:
a watch including the time indicator; and
a first processor that acquires information associated with the time indicator, and controls the touch screen to display a graphic element based on the information acquired by the first processor,
wherein the first processor is configured to:
display a screen for controlling the watch on the touch screen;
detect a user input for a graphic element displayed on the touch screen; and
drive a watch stem of the watch in response to the user input; and
wherein the mounting device and the main device are configured to be separably coupled such that:
when the mounting device is separated from the main device, there is no electrical connection between the mounting device and the main device, and the mounting device is configured to be coupled to the main device; and
when the mounting device is coupled to the main device, there is electrical connection between the mounting device and the main device, and the mounting device is configured to be separated from the main device.

12. The wearable device of claim 11, wherein the first processor is configured to:
detect coupling of the wearable device and the watch;
detect information associated with the watch; and
perform an operation based on the information associated with the watch.

13. The wearable device of claim 11, wherein the first processor is configured to:
transmit first information associated with the watch to an external device through a communication device of the wearable device;
receive second information associated with the watch through the communication device from the external device; and
perform an operation based on the second information.

14. The wearable device of claim 11, wherein the wearable device further includes:
a sensor that detects an illuminance; and
an illuminator that includes a light source, and
wherein the first processor determines whether an event occurs, and when the event occurs, the first processor drives the sensor to detect the illuminance and controls the illumination of the illuminator according to a detected illuminance value.

15. The wearable device of claim 11, wherein the first processor is configured to:
determine whether a pre-set condition is satisfied, and
turn OFF a screen of the touch screen when the pre-set condition is satisfied.

16. The wearable device of claim 11, wherein the first processor is configured to:
determine whether a pre-set first condition is satisfied;
display a first graphic element on a peripheral portion of the touch screen when the first condition is satisfied;
determine whether a pre-set second condition is satisfied; and
display a second graphic element on a central portion of the touch screen when the second condition is satisfied.

17. The wearable device of claim 11, wherein the first processor is configured to:
determine whether a pre-set condition is satisfied;
determine an illumination method when the pre-set condition is satisfied; and
perform illumination according to the determined illumination method.

18. The wearable device of claim 11, wherein the first processor is configured to:
detect a situation within the wearable device that requires a user authentication:
acquire biological information according to occurrence of the situation;
determine a similarity between the acquired biological information and previously stored biological information;
compare the similarity with a pre-set threshold value; and
determine that the user authentication is successful when the similarity is equal to or more than the pre-set threshold value.

19. The wearable device of claim 11, wherein the first processor is configured to:
acquire biological information;
determine at least one function among a plurality of functions associated with the biological information that is supported by the wearable device; and
provide the at least one function among a plurality of functions determined by the first processor.

* * * * *